(12) United States Patent
Sharma Banjade et al.

(10) Patent No.: US 12,335,824 B2
(45) Date of Patent: Jun. 17, 2025

(54) VULNERABLE ROAD USER BASIC SERVICE COMMUNICATION PROTOCOLS FRAMEWORK AND DYNAMIC STATES

(71) Applicant: Intel Corporation, Santa Clara, CA (US)

(72) Inventors: Vesh Raj Sharma Banjade, Portland, OR (US); Kathiravetpillai Sivanesan, Portland, OR (US); Satish C. Jha, Portland, OR (US); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 84 days.

(21) Appl. No.: 17/916,748

(22) PCT Filed: May 4, 2021

(86) PCT No.: PCT/US2021/030628
§ 371 (c)(1),
(2) Date: Oct. 3, 2022

(87) PCT Pub. No.: WO2021/226065
PCT Pub. Date: Nov. 11, 2021

(65) Prior Publication Data
US 2024/0214786 A1 Jun. 27, 2024

Related U.S. Application Data

(60) Provisional application No. 63/048,015, filed on Jul. 3, 2020, provisional application No. 63/044,864, filed on Jun. 26, 2020, provisional application No. 63/019,915, filed on May 4, 2020.

(51) Int. Cl.
*H04W 4/40* (2018.01)
*H04W 4/029* (2018.01)

(52) U.S. Cl.
CPC ............. *H04W 4/40* (2018.02); *H04W 4/029* (2018.02)

(58) Field of Classification Search
CPC ....... H04W 4/40; H04W 4/029; H04W 4/023; G08G 1/164; G08G 1/162; G08G 1/166
USPC ......................................................... 455/39
See application file for complete search history.

(56) References Cited

U.S. PATENT DOCUMENTS

| 9,483,948 | B1 | 11/2016 | Gordon et al. | |
| 2015/0035685 | A1 | 2/2015 | Strickland et al. | |
| 2018/0162387 | A1 | 6/2018 | Sung et al. | |
| 2018/0342154 | A1* | 11/2018 | Lee .......................... | H04W 4/70 |
| 2019/0268726 | A1 | 8/2019 | Jiang et al. | |

(Continued)

OTHER PUBLICATIONS

Extended European Search Report issued Nov. 10, 2023 for EP Application No. 21799888.9, 13 pages.

(Continued)

*Primary Examiner* — Don N Vo
(74) *Attorney, Agent, or Firm* — Schwabe, Williamson & Wyatt, P.C.

(57) ABSTRACT

The present disclosure is related to Intelligent Transport Systems (ITS), and in particular, to Vulnerable Road User (VRU) basic services (VBS) of a VRU ITS Station (ITS-S). Implementations of how the VBS is arranged within the facilities layer of an ITS-S, different conditions for VRU Awareness Message (VAM) dissemination, and format and coding rules of the VAM generation.

25 Claims, 32 Drawing Sheets

(56) References Cited

U.S. PATENT DOCUMENTS

| | | | |
|---|---|---|---|
| 2019/0287401 A1 | 9/2019 | Aoude et al. | |
| 2020/0018613 A1* | 1/2020 | Stenneth | G08G 1/048 |
| 2020/0064850 A1 | 2/2020 | Hong et al. | |
| 2021/0215830 A1* | 7/2021 | Sahlin | G08G 1/162 |
| 2022/0217568 A1* | 7/2022 | Mach | H04W 36/037 |
| 2022/0415153 A1* | 12/2022 | Hwang | H04W 4/029 |

OTHER PUBLICATIONS

FBConsulting S.A.R.L., "Answers for STF565 on comments TS 103 300-2 received from Intel", European Telecommunications Standards Institute (ETSI), 650, Route Des Lucioles; F-06921 Sophia-Antipolis; France vol. WG ITS WGI Application Requirements and Services Feb. 25, 2020, pp. 1-10, Retrieved from the Internet: URL: docbox.etsi.org/ITS/ITSWGI/05-CONTRIBUTIONS/2020/ITSWG1(20) 000022_Answers_for_ST F565_on_comments_TS_103_300-2_received_fro m_In.docx.

International Search Report and Written Opinion mailed Aug. 20, 2021 for International Patent Application No. PCT/US2021/030628, 11 pages.

* cited by examiner

VRU Profile 3 (Motorcyclist) Container (for CAM)

- Physical Info Container
  - Profile
  - Sub-profile
  - Size Class
  - Weight Class
- Dynamic Container
  - Motion Prediction Container
  - Emergency Electronic Brake Lights Status
- Rider Status Container
  - Number of Riders
  - Personal ITS-S Status
  - Head Orientation
  - Hands on/off Handle
  - Rider On/Off Seat
  - Feet On/Off Pegs
  - Turn Indication (Hand Gesture)

VULNERABLE ROAD USER BASIC SERVICE COMMUNICATION PROTOCOLS FRAMEWORK AND DYNAMIC STATES

RELATED APPLICATIONS

The present application is a national phase entry under 37 U.S.C. § 371 of Int'l App. No. PCT/US2021/030628, filed May 4, 2021 which designated, among various States, the United States of America and which claims priority to U.S. Provisional App. No. 63/019,915 filed May 4, 2020, U.S. Provisional App. No. 63/044,864 filed Jun. 26, 2020, and U.S. Provisional App. No. 63/048,015 filed Jul. 3, 2020, the contents of each of which are hereby incorporated by reference in their entireties and for all purposes.

TECHNICAL FIELD

The present disclosure is generally related to edge computing, network communication, and communication system implementations, and in particular, to connected and computer-assisted (CA)/autonomous driving (AD) vehicles, Internet of Vehicles (IoV), Internet of Things (IoT) technologies, and Intelligent Transportation Systems.

BACKGROUND

Intelligent Transport Systems (ITS) comprise advanced applications and services related to different modes of transportation and traffic to enable an increase in traffic safety and efficiency, and to reduce emissions and fuel consumption. Various forms of wireless communications and/or Radio Access Technologies (RATs) may be used for ITS. These RATs may need to coexist in one or more communication channels, such as those available in the 5.9 Gigahertz (GHz) band.

Cooperative Intelligent Transport Systems (C-ITS) have been developed to enable an increase in traffic safety and efficiency, and to reduce emissions and fuel consumption. The initial focus of C-ITS was on road traffic safety and especially on vehicle safety. Recent efforts are being made to increase traffic safety and efficiency for vulnerable road users (VRUs), which refers to both physical entities (e.g., pedestrians) and/or user devices (e.g., mobile stations, and/or the like) used by physical entities. Regulation (EU) No 168/2013 of the European Parliament and of the Council of 15 Jan. 2013 on the approval and market surveillance of two- or three-wheel vehicles and quadricycles ("EU regulation 168/2013") provides various examples of VRUs. Computer-assisted and/or autonomous driving (AD) vehicles ("CA/AD vehicles") are expected to reduce VRU-related injuries and fatalities by eliminating or reducing human-error in operating vehicles. However, to date CA/AD vehicles can do very little about detection, let alone correction of the human-error at VRUs' end, even though it is equipped with a sophisticated sensing technology suite, as well as computing and mapping technologies.

BRIEF DESCRIPTION OF THE DRAWINGS

In the drawings, which are not necessarily drawn to scale, like numerals may describe similar components in different views. Like numerals having different letter suffixes may represent different instances of similar components. The figures of the accompanying drawings include:

FIGS. 10*a* and 10*b* illustrate VAM structures.
FIGS. 12, 13, and 14 illustrate VRU Profile 3 structures.

DETAILED DESCRIPTION

Figure 1:
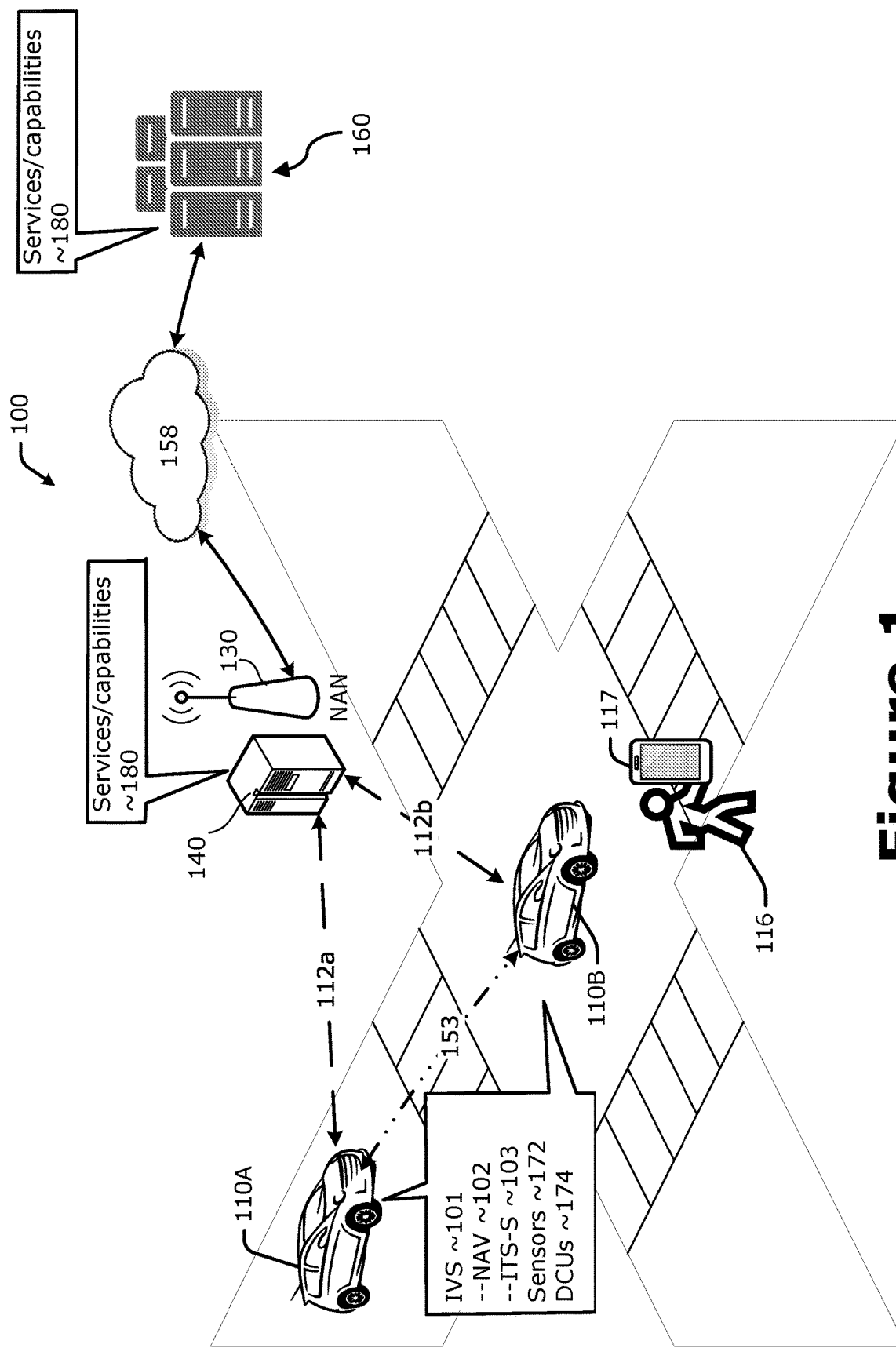
FIG. 1 illustrates an operative arrangement.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, and/or the like in order to provide a thorough understanding of the implementations discussed herein. However, it will be apparent to those skilled in the art having the benefit of the present disclosure that the various implementations may be practiced in other ways that depart from the specific details outlined herein. In certain instances, descriptions of well-known devices, circuits, and methods are omitted so as not to obscure the description of the implementations with unnecessary detail.

The operation and control of vehicles is becoming more autonomous over time, and most vehicles will likely become fully autonomous in the future. Vehicles that include some form of autonomy or otherwise assist a human operator may be referred to as "computer-assisted or autonomous driving" vehicles. Computer-assisted or autonomous driving (CA/AD) vehicles may include Artificial Intelligence (AI), machine learning (ML), and/or other like self-learning systems to enable autonomous operation. Typically, these systems perceive their environment (e.g., using sensor data) and perform various actions to maximize the likelihood of successful vehicle operation.

Vehicle-to-Everything (V2X) applications (referred to simply as "V2X") include the following types of communications Vehicle-to-Vehicle (V2V), Vehicle-to-Infrastructure (V2I) and/or Infrastructure-to-Vehicle (I2V), Vehicle-to-Network (V2N) and/or network-to-vehicle (N2V), Vehicle-to-Pedestrian communications (V2P), and ITS station (ITS-S) to ITS-S communication (X2X). V2X can use co-operative awareness to provide more intelligent services for end-users. This means that entities, such as vehicle stations or vehicle user equipment (vUEs) including such as CA/AD vehicles, roadside infrastructure or roadside units (RSUs), application servers, and pedestrian devices (e.g., smartphones, tablets, and/or the like), collect knowledge of their local environment (e.g., information received from other vehicles or sensor equipment in proximity) to process and share that knowledge in order to provide more intelligent services, such as cooperative perception, maneuver coordination, and the like, which are used for collision warning systems, autonomous driving, and/or the like.

One such V2X application include Intelligent Transport Systems (ITS), which are systems to support transportation of goods and humans with information and communication technologies in order to efficiently and safely use the transport infrastructure and transport means (e.g., automobiles, trains, aircraft, watercraft, and/or the like). Elements of ITS are standardized in various standardization organizations, both on an international level and on regional levels.

Communications in ITS (ITSC) may utilize a variety of existing and new access technologies (or radio access technologies (RAT)) and ITS applications. Examples of these V2X RATs include Institute of Electrical and Electronics Engineers (IEEE) RATs and Third Generation Partnership (3GPP) RATs. The IEEE V2X RATs include, for example, Wireless Access in Vehicular Environments (WAVE), Dedicated Short Range Communication (DSRC), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes the IEEE 802.16 protocol referred to as Worldwide Interoperability for Microwave Access (WiMAX). The term "DSRC" refers to vehicular communications in the 5.9 GHz frequency band that is generally used in the United States, while "ITS-G5" refers to vehicular communications in the 5.9 GHz frequency band in Europe. Since any number of different RATs (including IEEE 802.11p-based RATs) may be used in any geographic or political region, the terms "DSRC" (used, among other regions, in the U.S.) and "ITS-G5" (used, among other regions, in Europe) may be used interchangeably throughout this disclosure. The 3GPP V2X RATs include, for example, cellular V2X (C-V2X) using Long Term Evolution (LTE) technologies (sometimes referred to as "LTE-V2X") and/or using Fifth Generation (5G) technologies (sometimes referred to as "5G-V2X" or "NR-V2X"). Other RATs may be used for ITS and/or V2X applications such as RATs using UHF and VHF frequencies, Global System for Mobile Communications (GSM), and/or other wireless communication technologies.

1. Vulnerable Road Users (VRUs)

FIG. 1 illustrates an overview of an environment 100 including VRUs 116, vehicles 110A and 110B (collectively "vehicle 110"), and roadside ITS-Ss 130. Vehicles 110 includes an engine, transmission, axles, wheels and so forth (not shown). The vehicles 110 may be any type of motorized vehicles used for transportation of people or goods, each of which are equipped with an engine, transmission, axles, wheels, as well as control systems used for driving, parking, passenger comfort and/or safety, and/or the like. The terms "motor", "motorized", and/or the like as used herein refer to devices that convert one form of energy into mechanical energy, and include internal combustion engines (ICE), compression combustion engines (CCE), electric motors, and hybrids (e.g., including an ICE/CCE and electric motor (s)). The plurality of vehicles 110 shown by FIG. 1 may represent motor vehicles of varying makes, models, trim, etc.

For illustrative purposes, the following description is provided for deployment scenarios including vehicles 110 in a 2D freeway/highway/roadway environment wherein the vehicles 110 are automobiles. However, other types of vehicles are also applicable, such as trucks, busses, motorboats, motorcycles, electric personal transporters, and/or any other motorized devices capable of transporting people or goods. 3D deployment scenarios are also applicable where some or all of the vehicles 110 are implemented as flying objects, such as aircraft, drones, UAVs, and/or to any other like motorized devices.

For illustrative purposes, the following description is provided for vehicles 110 include in-vehicle systems (IVS) 101, which are discussed in more detail infra. However, the vehicles 110 could include additional or alternative types of computing devices/systems such as smartphones, tablets, wearables, laptops, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, microcontroller, control module, engine management system, and the like that may be operable to perform the various functionality discussed herein. Vehicles 110 including a computing system (e.g., IVS 101) as well as the vehicles referenced throughout the present disclosure, may be referred to as vehicle user equipment (vUE) 110, vehicle stations 110, vehicle ITS stations (V-ITS-S) 110, computer assisted (CA)/ autonomous driving (AD) vehicles 110, and/or the like.

Each vehicle 110 includes an in-vehicle system (IVS) 101, one or more sensors 172, and one or more driving control units (DCUs) 174. The IVS 100 includes a number of vehicle computing hardware subsystems and/or applications including, for example, various hardware and software elements to implement the ITS architecture of FIG. 20. The vehicles 110 may employ one or more V2X RATs, which allow the vehicles 110 to communicate directly with one another and with infrastructure equipment (e.g., network access node (NAN) 130). The V2X RATs may refer to 3GPP cellular V2X RAT (e.g., LTE, 5G/NR, and beyond), a WLAN V2X (W-V2X) RAT (e.g., DSRC in the USA or ITS-G5 in the EU), and/or some other RAT such as those discussed herein. Some or all of the vehicles 110 may include positioning circuitry to (coarsely) determine their respective geolocations and communicate their current position with the NAN 130 in a secure and reliable manner. This allows the vehicles 110 to synchronize with one another and/or the NAN 130. Additionally, some or all of the vehicles 110 may be computer-assisted or autonomous driving (CA/AD) vehicles, which may include artificial intelligence (AI) and/or robotics to assist vehicle operation.

Figure 23:
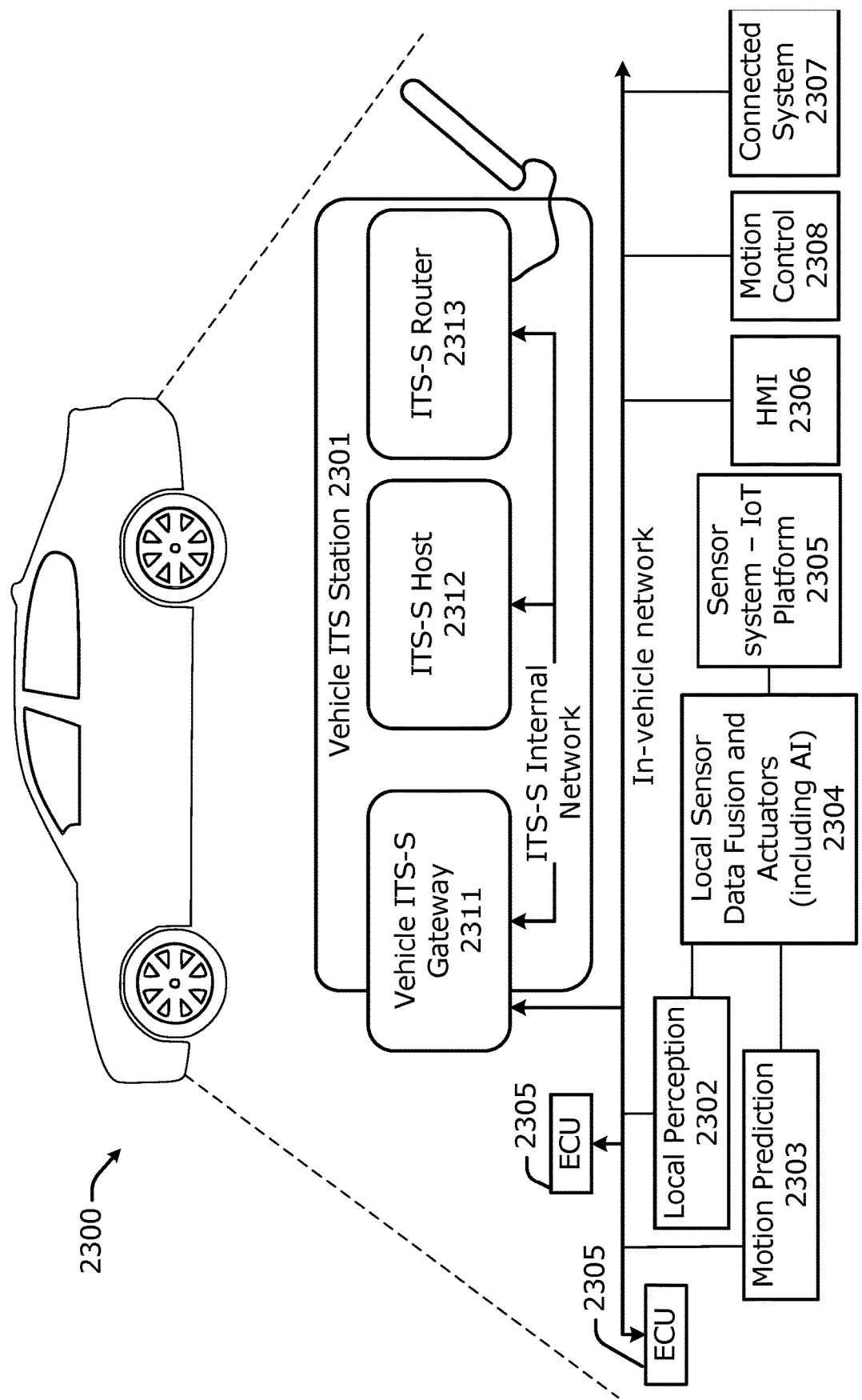
FIG. 23 depicts a vehicle ITS station in a vehicle system.

The IVS 101 includes the ITS-S 103, which may be the same or similar to the ITS-S 2301 of FIG. 23. The IVS 101 may be, or may include, Upgradeable Vehicular Compute Systems (UVCS) such as those discussed infra. As discussed herein, the ITS-S 103 (or the underlying V2X RAT circuitry on which the ITS-S 103 operates) is capable of performing a channel sensing or medium sensing operation, which utilizes at least energy detection (ED) to determine the presence or absence of other signals on a channel in order to determine if a channel is occupied or clear. ED may include sensing radiofrequency (RF) energy across an intended transmission band, spectrum, or channel for a period of time and comparing the sensed RF energy to a predefined or configured threshold. When the sensed RF energy is above the threshold, the intended transmission band, spectrum, or channel may be considered to be occupied.

Except for the UVCS technology of the present disclosure, IVS 101 and CA/AD vehicle 110 otherwise may be any one of a number of in-vehicle systems and CA/AD vehicles, from computer-assisted to partially or fully autonomous vehicles. Additionally, the IVS 101 and CA/AD vehicle 110 may include other components/subsystems not shown by FIG. 1 such as the elements shown and described throughout the present disclosure. These and other details of the underlying UVCS technology used to implement IVS 101 will be further described with references to remaining FIGS. 20-25.

In addition to the functionality discussed herein, the ITS-S 2301 (or the underlying V2X RAT circuitry on which the ITS-S 2301 operates) is capable of measuring various signals or determining/identifying various signal/channel characteristics. Signal measurement may be performed for cell selection, handover, network attachment, testing, and/or other purposes. The measurements/characteristics collected by the ITS-S 2301 (or V2X RAT circuitry) may include one or more of the following: a bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate (PLR), packet reception rate (PRR), Channel Busy Ratio (CBR), Channel occupancy Ratio (CR), signal-to-noise ratio (SNR), signal-to-noise and interference ratio (SINR), signal-plus-noise-plus-distortion to noise-plus-distortion (SINAD) ratio, peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between a NAN 130 reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, FILS discovery frames, or probe response frames for IEEE 802.11 WLAN/WiFi networks. Other measurements may be additionally or alternatively used, such as those discussed in 3GPP TS 36.214 v15.4.0 (2019 September), 3GPP TS 38.215 v16.1.0 (2020 April), IEEE 802.11, Part 11: "Wireless LAN Medium Access Control (MAC) and Physical Layer (PHY) specifications, IEEE Std.", and/or the like. The same or similar measurements may be measured or collected by the NAN 130.

The subsystems/applications may also include instrument cluster subsystems, front-seat and/or back-seat infotainment subsystems and/or other like media subsystems, a navigation subsystem (NAV) 102, a vehicle status subsystem/application, a HUD subsystem, an EMA subsystem, and so forth. The NAV 102 may be configurable or operable to provide navigation guidance or control, depending on whether vehicle 110 is a computer-assisted vehicle, partially or fully autonomous driving vehicle. NAV 102 may be configured with computer vision to recognize stationary or moving objects (e.g., a pedestrian, another vehicle, or some other moving object) in an area surrounding vehicle 110, as it travels enroute to its destination. The NAV 102 may be configurable or operable to recognize stationary or moving objects in the area surrounding vehicle 110, and in response, make its decision in guiding or controlling DCUs of vehicle 110, based at least in part on sensor data collected by sensors 172.

The DCUs 174 include hardware elements that control various systems of the vehicles 110, such as the operation of the engine, the transmission, steering, braking, and/or the like. DCUs 174 are embedded systems or other like computer devices that control a corresponding system of a vehicle 110. The DCUs 174 may each have the same or similar components as devices/systems of FIG. 29 discussed infra, or may be some other suitable microcontroller or other like processor device, memory device(s), communications interfaces, and the like. Individual DCUs 174 are capable of communicating with one or more sensors 172 and actuators (e.g., actuators 2974 of FIG. 29). The sensors 172 are hardware elements configurable or operable to detect an environment surrounding the vehicles 110 and/or changes in the environment. The sensors 172 are configurable or operable to provide various sensor data to the DCUs 174 and/or one or more AI agents to enable the DCUs 174 and/or one or more AI agents to control respective control systems of the vehicles 110. Some or all of the sensors 172 may be the same or similar as the sensor circuitry 2972 of FIG. 29. In particular, the IVS 101 may include or implement a facilities layer and operate one or more facilities within the facilities layer.

IVS 101, on its own or in response to user interactions, communicates or interacts with one or more vehicles 110 via interface 153, which may be, for example, 3GPP-based direct links or IEEE-based direct links. The 3GPP (e.g., LTE or 5G/NR) direct links may be sidelinks, Proximity Services (ProSe) links, and/or PC5 interfaces/links, IEEE (WiFi) based direct links or a personal area network (PAN) based links may be, for example, WiFi-direct links, IEEE 802.11p links, IEEE 802.11bd links, IEEE 802.15.4 links (e.g., ZigBee, IPv6 over Low power Wireless Personal Area Networks (6LoWPAN), WirelessHART, MiWi, Thread, and/or the like). Other technologies could be used, such as Bluetooth/Bluetooth Low Energy (BLE) or the like. The vehicles 110 exchange ITS protocol data units (PDUs) or other messages discussed herein with one another over the interface 153.

IVS 101, on its own or in response to user interactions, communicates or interacts with one or more remote/cloud servers 160 via NAN 130 over interface 112 and over network 158. The NAN 130 is arranged to provide network connectivity to the vehicles 110 via respective interfaces 112 between the NAN 130 and the individual vehicles 110. The NAN 130 is, or includes, an ITS-S, and may be a roadside ITS-S(R-ITS-S). The NAN 130 is a network element that is part of an access network that provides network connectivity to the end-user devices (e.g., V-ITS-Ss 110 and/or VRU ITS-Ss 117). The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. All or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. The CRAN, CR, or vBBUP may implement a RAN function split, wherein one or more communication protocol layers are operated by the CRAN/CR/vBBUP and other communication protocol entities are operated by individual RAN nodes 130. This virtualized framework allows the freed-up processor cores of the NAN 130 to perform other virtualized applications, such as virtualized applications for the VRU 116/V-ITS-S 110.

Environment 100 also includes VRU 116, which includes a VRU ITS-S 117. The VRU 116 is a non-motorized road users as well as L class of vehicles (e.g., mopeds, motorcycles, Segways, and/or the like), as defined in Annex I of EU regulation 168/2013 (see e.g., International Organization for Standardization (ISO) D., "Road vehicles—Vehicle dynamics and road-holding ability—Vocabulary", ISO 8855 (2013) (hereinafter "[ISO8855]")). A VRU 116 is an actor that interacts with a VRU system 117 in a given use case and behavior scenario. For example, if the VRU 116 is equipped with a personal device, then the VRU 116 can directly interact via the personal device with other ITS-Stations and/or other VRUs 116 having VRU devices 117. The VRU ITS-S 117 could be either pedestrian-type VRU (see e.g., P-ITS-S 2401 of FIG. 24) or vehicle-type (on bicycle, motorbike) VRU. The term "VRU ITS-S" as used herein refers to any type of VRU device or VRU system. Before the potential VRU 116 can even be identified as a VRU 116, it may be referred to as a non-VRU and considered to be in IDLE state or inactive state in the ITS.

If the VRU 116 is not equipped with a device, then the VRU 116 interacts indirectly, as the VRU 116 is detected by another ITS-Station in the VRU system 117 via its sensing devices such as sensors and/or other components. However, such VRUs 116 cannot detect other VRUs 116 (e.g., a bicycle). In ETSI TS 103 300-2 V0.3.0 (2019 December) ("[TS103300-2]"), the different types of VRUs 116 have been categorized into the following four profiles: VRU Profile-1: Pedestrians (e.g., pavement users, children, pram, disabled persons, elderly, and/or the like); VRU Profile-2: Bicyclists (e.g., light vehicles carrying persons, wheelchair users, horses carrying riders, skaters, e-scooters, Segways, and/or the like); VRU Profile-3: Motorcyclists (motorbikes, powered two wheelers, mopeds, and/or the like); and VRU Profile-4: Animals posing safety risk to other road users (dogs, wild animals, horses, cows, sheep, and/or the like).

These profiles further define the VRU functional system and communications architectures for VRU ITS-S 117. For robustly supporting the VRU profile awareness enablement, VRU related functional system requirements, protocol and message exchange mechanisms including (e.g., VAMs CPMs, and/or the like), the VRU device types listed in Table 1 are discussed herein.

TABLE 1

| VRU Type | Description |
| --- | --- |
| VRU-Tx | VRU device 117 is equipped with transmitter only and can broadcast beacon messages about the VRU 116 |
| VRU-Rx | VRU device 117 is equipped with a receiver only and application to receive message from other ITS-Ss and capable of warning/notifying the VRU 116 |
| VRU-St | VRU device 117 contains and ITS-S including both VRU-Tx and VRU-Rx capabilities |

A VRU 116 can be equipped with a portable device (e.g., device 117). The term "VRU" may be used to refer to both a VRU 116 and its VRU device 117 unless the context dictates otherwise. The VRU device 117 may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VRU basic service when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

A "VRU system" (e.g., VRU ITS-S 117) comprises ITS artefacts that are relevant for VRU use cases and scenarios such as those discussed herein, including the primary components and their configuration, the actors and their equipment, relevant traffic situations, and operating environments. The terms "VRU device," "VRU equipment," and "VRU system" refers to a portable device (e.g., mobile stations such as smartphones, tablets, wearable devices, fitness tracker, and/or the like) or an IoT device (e.g., traffic control devices) used by a VRU 116 integrating ITS-S technology, and as such, the VRU ITS-S 117 may include or refer to a "VRU device," "VRU equipment," and/or "VRU system".

The VRU systems considered in the present disclosure are Cooperative Intelligent Transport Systems (C-ITS) that comprise at least one Vulnerable Road User (VRU) and one ITS-Station with a VRU application. The ITS-S can be a Vehicle ITS-Station or a Road side ITS-Station that is processing the VRU application logic based on the services provided by the lower communication layers (Facilities, Networking & Transport and Access layer (see e.g., ETSI EN 302 665 V1.1.1 (2010 September) ("[EN302665]")), related hardware components, other in-station services and sensor sub-systems. A VRU system may be extended with other VRUs, other ITS-S and other road users involved in a scenario such as vehicles, motorcycles, bikes, and pedestrians. VRUs may be equipped with ITS-S or with different technologies (e.g., IoT) that enable them to send or receive an alert. The VRU system considered is thus a heterogeneous system. A definition of a VRU system is used to identify the system components that actively participate in a use case and behavior scenario. The active system components are equipped with ITS-Stations, while all other components are passive and form part of the environment of the VRU system.

The VRU ITS-S 117 may operate one or more VRU applications. A VRU application is an application that extends the awareness of and/or about VRUs and/or VRU clusters in or around other traffic participants. VRU applications can exist in any ITS-S, meaning that VRU applications can be found either in the VRU itself or in non-VRU ITS stations, for example cars, trucks, buses, road-side stations or central stations. These applications aim at providing VRU-relevant information to actors such as humans directly or to automated systems. VRU applications can increase the awareness of vulnerable road users, provide VRU-collision risk warnings to any other road user or trigger an automated action in a vehicle. VRU applications make use of data received from other ITS-Ss via the C-ITS network and may use additional information provided by the ITS-S own sensor systems and other integrated services.

In general, there are four types of VRU equipment 117 including non-equipped VRUs (e.g., a VRU 116 not having a device); VRU-Tx (e.g., a VRU 116 equipped with an ITS-S 117 having only a transmission (Tx) but no reception (Rx) capabilities that broadcasts awareness messages or beacons about the VRU 116); VRU-Rx (e.g., a VRU 116 equipped with an ITS-S 117 having only an Rx (but no Tx) capabilities that receives broadcasted awareness messages or beacons about the other VRUs 116 or other non-VRU ITS-Ss); and VRU-St (e.g., a VRU 116 equipped with an ITS-S 117 that includes the VRU-Tx and VRU-Rx functionality). The use cases and behavior scenarios consider a wide set of configurations of VRU systems 117 based on the equipment of the VRU 116 and the presence or absence of V-ITS-S 110 and/or R-ITS-S 130 with a VRU application. Examples of the various VRU system configurations are shown by table 2 of ETSI TR 103 300-1 v2.1.1 (2019 September) ("[TR103300-1]").

The message specified for VRUs 116/117 is the VRU awareness message (VAM). VAMs are messages transmitted from VRU ITSs 117 to create and maintain awareness of VRUs 116 participating in the VRU/ITS system. VAMs are harmonized in the largest extent with the existing Cooperative Awareness Messages (CAM) defined in [EN302637-2]. The transmission of the VAM is limited to the VRU profiles specified in clause 6.1 of [TS103300-2] The VAMs contain all required data depending on the VRU profile and the actual environmental conditions. The data elements in the VAM should be as described in Table 2.

TABLE 2

VAM data elements

| Parameter | Comments |
| --- | --- |
| VAM header including VRU identifier | The VRU ID is a unique identifier of a VRU 116/117 within the coverage region of an ITS-S such as an R-ITS-S 130. |
| VRU position | The VRU position is a unique position, set of coordinates, geolocation, Geo-Area, and/or the like, associated with a VRU's physical location in 2D or 3D plane |
| (VAM) Generation time | A timestamp of VAM generation; the time required for a VAM generation refers to the time difference between time at which a VAM generation is triggered and the time at which the VAM is delivered to the networking & transport layer. |
| VRU Profile | profiles derived from the use cases and analysis in clause 7.2 of [TR103300-1] |
| VRU type | For example, VRU profile is pedestrian, VRU type is infant, animal, adult, child, and/or the like. |
| VRU cluster identifier (ID) | Random and/or locally unique ID of a VRU cluster; locally unique in that it is different from any cluster identifier in a VAM received by the VBS in the last timeClusterUniqueness Threshold time. |
| VRU cluster position | The reference position of a VRU cluster, which refers to a ground position at the center point of the face side of the first VRU bounding box. |
| VRU cluster dimension | geographical size and/or bounding box size |
| VRU cluster size | number of members in the cluster |
| VRU size class | mandatory if outside a VRU cluster, optional if inside a VRU cluster |
| VRU weight class | mandatory if outside a VRU cluster, optional if inside a VRU cluster |
| VRU speed | Velocity of an individual VRU or coherent speed of a VRU cluster; speed in moving direction and/or speed accuracy of the originating ITS-S, |
| VRU direction | Heading and/or heading accuracy of the originating ITS-S with regards to the true north or some other geodetic direction. |
| VRU orientation | The angle of a VRU with respect to its longitudinal axis with regards to WGS84 north or true north. |
| Predicted trajectory | succession of way points |
| Predicted velocity | including 3D heading and average speed |
| Heading change indicators | turning left or turning right indicators |
| Hard braking indicator | Indicator alerting drivers/riders of any hard braking that is performed by vehicles or vehicle VRUs in front. |

NOTE:
"M" stands for "mandatory" which means that the data element is always included in the VAM message.
"O" stands for "optional" which means that the data element can be included in the VAM message.
"C" stands for "conditional" which means that the data element is included in the VAM message under certain conditions The VRU system 117 supports the flexible and dynamic triggering of messages with generation intervals from X milliseconds (ins) at the most frequent, where X is a number (e.g., X=100 ms). The VAMs frequency is related to the VRU motion dynamics and chosen collision risk metric as discussed in clause 6.5.10.5 of [TS103300-3].

The number of VRUs 116 operating in a given area can get very high. In some cases, the VRU 116 can be combined with a VRU vehicle (e.g., rider on a bicycle or the like). In order to reduce the amount of communication and associated resource usage (e.g., spectrum requirements), VRUs 116 may be grouped together into one or more VRU clusters. A VRU cluster is a set of two or more VRUs 116 (e.g., pedestrians) such that the VRUs 116 move in a coherent manner, for example, with coherent velocity or direction and within a VRU bounding box. A "coherent cluster velocity" refers to the velocity range of VRUs 116 in a cluster such that the differences in speed and heading between any of the VRUs in a cluster are below a predefined threshold. A "VRU bounding box" is a rectangular area containing all the VRUs 116 in a VRU cluster such that all the VRUs in the bounding box make contact with the surface at approximately the same elevation.

VRU clusters can be homogeneous VRU clusters (e.g., a group of pedestrians) or heterogeneous VRU clusters (e.g., groups of pedestrians and bicycles with human operators). These clusters are considered as a single object/entity. The parameters of the VRU cluster are communicated using VRU Awareness Messages (VAMs), where only the cluster head continuously transmits VAMs. The VAMs contain an optional field that indicates whether the VRU 116 is leading a cluster, which is not present for an individual VRUs (e.g., other VRUs in the cluster should not transmit VAM or should transmit VAM with very long periodicity). The leading VRU also indicates in the VAM whether it is a homogeneous cluster or heterogeneous, the latter one being of any combination of VRUs. Indicating whether the VRU cluster is heterogeneous and/or homogeneous may provide useful information about trajectory and behaviors prediction when the cluster is disbanded.

The use of a bicycle or motorcycle will significantly change the behavior and parameters set of the VRU using this non-VRU object (or VRU vehicle such as a "bicycle"/ "motorcycle"). A combination of a VRU 116 and a non-VRU object is called a "combined VRU." VRUs 116 with VRU Profile 3 (e.g., motorcyclists) are usually not involved in the VRU clustering.

A VAM contains status and attribute information of the originating VRU ITS-S 117. The content may vary depending on the profile of the VRU ITS-S 117. A typical status information includes time, position, motion state, cluster status, and others. Typical attribute information includes data about the VRU profile, type, dimensions, and others. The generation, transmission and reception of VAMs are managed by the VRU basic service (VBS) (see e.g., FIGS. 20-21). The VBS is a facilities layer entity that operates the VAM protocol. The VBS provides the following services: handling the VRU role, sending and receiving of VAMs to enhance VRU safety. The VBS also specifies and/or manages VRU clustering in presence of high VRU 116/117 density to reduce VAM communication overhead. In VRU clustering, closely located VRUs with coherent speed and heading form a facility layer VRU cluster and only cluster head VRU 116/117 transmits the VAM. Other VRUs 116/117 in the cluster skip VAM transmission. Active VRUs 116/117 (e.g., VRUs 116/117 not in a VRU cluster) send individual VAMs (called single VRU VAM or the like). An "individual VAM" is a VAM including information about an individual VRU 116/117. A VAM without a qualification can be a cluster VAM or an individual VAM.

The Radio Access Technologies (RATs) employed by the NAN 130, the V-ITS-Ss 110, and the VRU ITS-S 117 may include one or more V2X RATs, which allow the V-ITS-Ss 110 to communicate directly with one another, with infrastructure equipment (e.g., NAN 130), and with VRU devices 117. In the example of FIG. 1, any number of V2X RATs may be used for V2X communication. In an example, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize an air interface 112a and the WLAN V2X RAT may utilize an air interface 112b. The access layer for the ITS-G5 interface is outlined in ETSI EN 302 663 V1.3.1 (2020 January) (hereinafter "[EN302663]") and describes the access layer of the ITS-S reference architecture 2000. The ITS-G5 access layer comprises IEEE 802.11-2016 (hereinafter "[IEEE80211]") and IEEE 802.2 Logical Link Control (LLC) (hereinafter "[IEEE8022]") protocols. The access layer for 3GPP LTE-V2X based interface(s) is outlined in, inter alia, ETSI EN 303 613 V1.1.1 (2020 January), 3GPP TS 23.285 v16.2.0 (2019 December); and 3GPP 5G/NR-V2X is outlined in, inter alia, 3GPP TR 23.786 v16.1.0 (2019 June) and 3GPP TS 23.287 v16.2.0 (2020 March). The NAN 130 or an edge compute node 140 may provide one or more services/capabilities 180.

In V2X scenarios, a V-ITS-Ss 110 or a NAN 130 may be or act as a RSU or R-ITS-S 130, which refers to any transportation infrastructure entity used for V2X communications. In this example, the RSU 130 may be a stationary RSU, such as an gNB/eNB-type RSU or other like infrastructure, or relatively stationary UE. The RSU 130 may be a mobile RSU or a UE-type RSU, which may be implemented by a vehicle (e.g., V-ITS-Ss 110), pedestrian, or some other device with such capabilities. In these cases, mobility issues can be managed in order to ensure a proper radio coverage of the translation entities.

In an example implementation, RSU 130 is a computing device coupled with radio frequency circuitry located on a roadside that provides connectivity support to passing V-ITS-Ss 110. The RSU 130 may also include internal data storage circuitry to store intersection map geometry, traffic statistics, media, as well as applications/software to sense and control ongoing vehicular and pedestrian traffic. The RSU 130 provides various services/capabilities 180 such as, for example, very low latency communications required for high speed events, such as crash avoidance, traffic warnings, and the like. Additionally or alternatively, the RSU 130 may provide other services/capabilities 180 such as, for example, cellular/WLAN communications services. In some implementations, the components of the RSU 130 may be packaged in a weatherproof enclosure suitable for outdoor installation, and may include a network interface controller to provide a wired connection (e.g., Ethernet) to a traffic signal controller and/or a backhaul network. Further, RSU 130 may include wired or wireless interfaces to communicate with other RSUs 130 (not shown by FIG. 1)

In arrangement 100, V-ITS-S 110a may be equipped with a first V2X RAT communication system (e.g., C-V2X) whereas V-ITS-S 110b may be equipped with a second V2X RAT communication system (e.g., W-V2X which may be DSRC, ITS-G5, or the like). The V-ITS-S 110a and/or V-ITS-S 110b may each be employed with one or more V2X RAT communication systems. The RSU 130 may provide V2X RAT translation services among one or more services/capabilities 180 so that individual V-ITS-Ss 110 may communicate with one another even when the V-ITS-Ss 110 implement different V2X RATs, the RSU 130 (or edge compute node 140) may provide VRU services among the one or more services/capabilities 180 wherein the RSU 130 shares CPMs, MCMs, VAMs DENMs, CAMs, and/or the like, with V-ITS-Ss 110 and/or VRUs for VRU safety purposes including RSS purposes. The V-ITS-Ss 110 may also share such messages with each other, with RSU 130, and/or with VRUs. These messages may include the various data elements and/or data fields as discussed herein.

In this example, the NAN 130 may be a stationary RSU, such as an gNB/eNB-type RSU or other like infrastructure. The NAN 130 may be a mobile RSU or a UE-type RSU, which may be implemented by a vehicle, pedestrian, or some other device with such capabilities. In these cases, mobility issues can be managed in order to ensure a proper radio coverage of the translation entities. The NAN 130 that enables the connections 112 may be referred to as a "RAN node" or the like. The RAN node 130 may comprise ground stations (e.g., terrestrial access points) or satellite stations providing coverage within a geographic area (e.g., a cell). The RAN node 130 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 130 is embodied as a NodeB, evolved NodeB (eNB), or a next generation NodeB (gNB), one or more relay nodes, distributed units, or Road Side Unites (RSUs). Any other type of NANs can be used. Additionally, the RAN node 130 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, and/or the like.

The network 158 may represent a network such as the Internet, a wireless local area network (WLAN), or a wireless wide area network (WWAN) including proprietary and/or enterprise networks for a company or organization, a cellular core network (e.g., an evolved packet core (EPC) network, a NextGen Packet Core (NPC) network, a 5G core (5GC), or some other type of core network), a cloud computing architecture/platform that provides one or more cloud computing services, and/or combinations thereof. As examples, the network 158 and/or access technologies may include cellular technology such as LTE, MuLTEfire, and/or NR/5G (e.g., as provided by Radio Access Network (RAN) node 130), WLAN (e.g., WiFi®) technologies (e.g., as provided by an access point (AP) 130), and/or the like. Different technologies exhibit benefits and limitations in different scenarios, and application performance in different scenarios becomes dependent on the choice of the access networks (e.g., WiFi, 3GPP 5G and/or LTE, WiMAX, and/or the like) and the used network and transport protocols (e.g., Transfer Control Protocol (TCP), Virtual Private Network (VPN), Multi-Path TCP (MPTCP), Generic Routing Encapsulation (GRE), and/or the like).

The remote/cloud servers 160 may represent one or more application servers, a cloud computing architecture/platform that provides cloud computing services, and/or some other remote infrastructure. The remote/cloud servers 160 may include any one of a number of services and capabilities 180 such as, for example, ITS-related applications and services, driving assistance (e.g., mapping/navigation), content provision (e.g., multi-media infotainment streaming), and/or the like.

Additionally, the NAN 130 is co-located with an edge compute node 140 (or a collection of edge compute nodes 140), which may provide any number of services/capabilities 180 to vehicles 110 such as ITS services/applications, driving assistance, and/or content provision services 180. The edge compute node 140 may include or be part of an edge network or "edge cloud." The edge compute node 140 may also be referred to as an "edge host 140," "edge server 140," or "compute platforms 140." The edge compute nodes 140 may partition resources (e.g., memory, CPU, GPU, interrupt controller, I/O controller, memory controller, bus controller, network connections or sessions, and/or the like) where respective partitionings may contain security and/or integrity protection capabilities. Edge nodes may also provide orchestration of multiple applications through isolated user-space instances such as containers, partitions, virtual environments (VEs), virtual machines (VMs), Servlets, servers, and/or other like computation abstractions. The edge compute node 140 may be implemented in a data center or cloud installation; a designated edge node server, an enterprise server, a roadside server, a telecom central office; or a local or peer at-the-edge device being served consuming edge services. The edge compute node 140 may provide any number of driving assistance and/or content provision services 180 to vehicles 110. The edge compute node 140 may be implemented in a data center or cloud installation; a designated edge node server, an enterprise server, a roadside server, a telecom central office; or a local or peer at-the-edge device being served consuming edge services. Examples of such other edge computing/networking technologies that may implement the edge compute node 140 and/or edge computing network/cloud include Multi-Access Edge Computing (MEC), Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes of the following discussion.

Various implementations discussed herein involve ITS-Ss providing ITS services, which involve the transmission and reception of ITS service messages (e.g., VAMs, CAMs, CPMs, and/or the like). In the ITS service (e.g., facilities layer service) messages, an application container is used along with ITS PDU header(s) and/or ITS service containers. Implementations include various communication protocols, message formats, and data frames (DFs) and/or data elements (DEs), semantics and syntax as well as interfaces and protocol operation for the ITS services (e.g., VRU awareness services and the like). Additionally or alternatively, DEs/DFs (e.g., CAM and/or VAM DEs/DFs) can be extended or enhanced at the ITS-S Tx and/or ITS-S Rx side and may be measured using suitable signal measuring means.

Implementations for the various ITS services discussed herein include VRU ITS-Ss, connected computer assisted and/or autonomous driving (CA/AD) vehicles, edge computing nodes and networks, Intelligent Transportation System (ITS), and/or Internet of Vehicles (IoV)/IoT systems/networks. Such implementations can be specified and/or standardized by suitable standards bodies and/or working groups such as ETSI ITS standards/frameworks and/or Multi-access Edge Computing (MEC) standards/framework and readily scalable across a city or geographical area. In these implementations, one or more MEC apps may provide the facility layer entities to generate, receive, and transmit CAMs, VAMs, CPMs, and/or the like.

The implementations discussed herein enhance VRU and vehicle safety in an ITS, which enhances VRU and/or vehicle ITS-S robustness in timely collision risk analysis and collision avoidance.

2. VRU Basic Service Protocols, Frameworks, and Dynamic States

As mentioned previously, VRUs are high-at-collision-risk users of the road including pedestrians, safety emergency responders, road workers, animals, wheelchair users, skaters, bikers, powered two wheelers, mopeds, low speed motorbikes, and others, as defined in [TR103300-1]. One of the critical features of ITS is to ensure safety of such VRUs from road hazards, larger road users such as vehicles, emergency collision situations, and other dangerous unforeseen circumstances appearing in the environment of the VRU. For enabling VRU safety, it is crucial for ITS to robustly identify situations with high collision risk, and trigger among the involved agents any subsequent actions (maneuvering, warning messages, physical notifications such as sound, flashing lights, and/or the like) that may avoid the potential collision.

VRU awareness messages (VAMs) are message transmitted by the VRU ITS-Ss in order to provide VRU awareness to the ITS of the VRU's participation in the ITS and contains the status (time, position, motion state, and/or the like) and attribute (VRU profile, type, size, and/or the like) of the source VRU ITS-S. The ITS-Ss which receive such VAMs become aware of the presence/absence, type, status and dynamic state of the originating VRU ITS-S and thus can be used to enable the VRU safety related functional requirements such as collision risk analysis and collision risk avoidance (see e.g., [TS103300-2]).

The VRU basic service (VBS) is a facilities layer entity that operates the VAM protocol, handles the VRU role, sending and receiving VAMs. The present disclosure provides communication protocols, message format, semantics and syntax as well as interfaces and protocol operation for the VBS within the scope of [TS103300-3]. The solutions further help in enabling VBS functional architecture services including VAM generation rules and triggering, VAM RX/TX, and VAM construction.

To this end, the present disclosure provides facilities layer services (or "facilities") to address issues related to VBS for VRU Safety in ITS regarding the VAM format specification. This includes details of the general hierarchical structure including ITS PDU header, VAM message and the underlying containers, including a motion dynamic container and management container, and container structures and parameter definitions.

Within the motion dynamic container, four containers along with the underlying data elements (DEs) are provided, including:

(1) Road Grid Occupancy Container: for which the underlying DE is based on our prior concept of Dynamic Contextual Road Occupancy Map Perception (DCROMP) (see e.g., U.S. Provisional App. No. 62/994,471 filed on 25 Mar. 2020 ("'471"), U.S. Provisional App. No. 63/033,597 field on 2 Jun. 2020 ("'597]"), and/or Int'l App. No. PCT/US2020/066483, filed on 21 Dec. 2020 ("'483-PCT]"), the contents of each of which are hereby incorporated by reference in their entireties).

(2) Safe Distance Container: for which the DEs are relatable (but not limited to line of sight time inter-distance measurement related parameters): (i) Longitudinal Distance (LoD), (ii) Lateral Distance (LaD), (iii) Vertical Distance (VD) along with their accompanying thresholds Minimum Safe Longitudinal Distance (MSLoD), Minimum Safe Lateral Distance (MSLaD), Minimum Safe Vertical Distance (MSVD), respectively (see e.g., [TS103300-2]);

(3) Trajectory Interception Container with trajectory interception indication (TII) (see e.g., [TS103300-2]) as the underlying DE; and (4) Maneuvering Container with maneuvering indication (MI) (see e.g., [TS103300-2]) as the underlying data element.

The present disclosure also provides representation of the VBS control state machine of VRU ITS-S for: (i) VRU profile transition prediction (ii) dynamic states prediction. The present disclosure provides ASN.1 specification of VAM based on the framework discussed herein. For all the concepts discussed herein, the extendibility and generalization of the framework are provided to cover the cases where the VAM originating stations could be one or more of the following four station types: (i) Standalone VRUs SVRU-ITS-S) which are individual VRUs not part of any cluster; (ii) Clustered VRUs (CVRU-ITS-S); (iii) RSUs (R-ITS-Ss 130); and (iv) Vehicles (V-ITS-Ss 110).

2.1. VAM Format Specification
2.1.1. General Structure for VAM PDU

The general structure of the VAM format per [TS103300-3] and details of the underlying containers and DEs including ITS PDU headers as extended/enhanced as discussed infra. Furthermore, the DEs needed for enabling motion dynamic prediction (motion prediction container) related functionalities are also provided infra.

Figure 2:
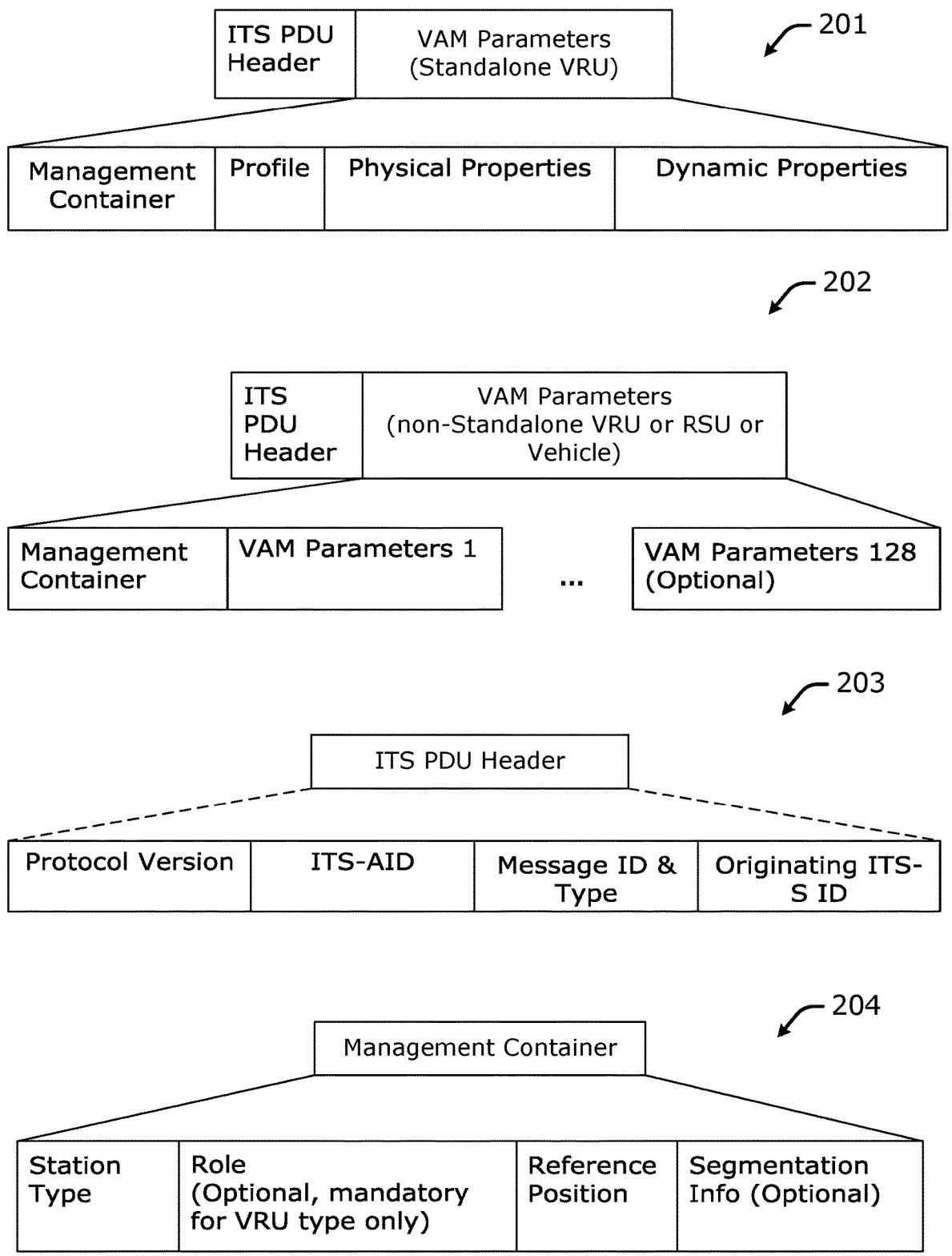
FIGS. 2, 3, and 4 illustrate various VAM structures.

FIG. 2 illustrates various VAM structures. The example VAM structure 201 is for standalone VRU ITS-S as the originating ITS-S with new DFs. The example VAM structure 202 is a Hierarchy VAM structure including new DFs for non-standalone VRU. The non-standalone VRU is a CVRU-ITS-S, R-ITS-S, or V-ITS-S 110 as the originating station that may have more than one VAM parameter containers with each container representing the VAM parameters of unique standalone VRU.

The general hierarchical structure of VAM structure 201 for an SVRU-ITS-S as the originating station comprises of the ITS PDU header followed by multiple containers including VRU physical properties/parameters and VRU dynamic properties/parameters. In addition, [TS103300-3] does not preclude Other Use Properties Container thus leaving margin for extension of VAM with additional DEs as required.

Similarly, VAM structure 202, shows how the VAM structure hierarchy can be extended so that it corresponds to multiple VAM parameters where each parameter corresponds to a unique standalone VRU.

2.1.2. ITS-S PDU Header

FIG. 2 also includes an example VAM structure 203 of ITS PDU Header showing various DFs. The ITS PDU header is common message header for application and facilities layer messages spanning across various kinds of messages included but not limited to DENM, CAM, POI, SPAT, MAP, among many others. For the general PDU header, four fields which reflect the basics, or the necessary elements are depicted in VAM structure 203. The ITS PDU header is a common header that includes information of protocol version, ITS application ID (AID), message ID and type of message and the source ITS-S's ID.

The textual description of the semantics of the VAM message ID to be one of the data elements of the header are discussed infra and follow the representation guide in the applications and facilities layer common data dictionary format extracted from ETSI TS 102 894-2 V1.3.1 (2018 August) ("[TS102894-2]"). The addition of VAM message ID is shown in Table 3.

TABLE 3

| | DF_ItsPduHeader |
|---|---|
| Descriptive Name | ItsPduHeader |
| Identifier | DataType__114 |
| ASN.1 representation | ItsPduHeader :: = SEQUENCE {<br><br>   protocolVersion INTEGER (0..255),<br>   messageID INTEGER{ denm(1), cam(2), poi(3), spatem(4), mapem(5), ivim(6), ev-rsr(7), tistpgtransaction(8), srem(9), ssem(10), evcsn(11), saem(12), rtcmem(13), vam(14) } (0..255),<br>   stationID<br>} |
| Definition | Common message header for application and facilities layer messages. It is included at the beginning of an ITS message as the message header. The DF shall include the following information:<br>  • protocolVersion: version of the ITS message,<br>  • messageID: Type of the ITS message. Following message type values are assigned in the present document:<br>    - denm(1): Decentralized Environmental Notification Message (DENM) as specified in ETSI EN 302 637-3,<br>    - cam(2): Cooperative Awareness Message (CAM) as specified in ETSI EN 302 637-2,<br>    - poi(3): Point of Interest message as specified in ETSI TS 101 556-1,<br>    - spatem(4): Signal Phase And Timing (SPAT) message as specified in SAE J2735 and in ETSI TS 103 301,<br>    - mapem(5): MAP message as specified in SAE J2735 and in ETSI TS 103 301,<br>    - ivim(6): In Vehicle Information (IVI) message as defined in ISO TS 19321,<br>    - ev-rsr(7): Electric vehicle recharging spot reservation message, as defined in ETSI TS 101 556-3,<br>    - tistpgtransaction(8): messages for Tyre Information System (TIS) and<br>    - Tyre Pressure Gauge (TPG) interoperability, as specified in ETSI TS 101 556-2,<br>    - srem(9): Traffic light Signal Request Message as specified in ETSI TS 103 301,<br>    - ssem(10): Traffic Light Signal Request Status Message as specified in ETSI TS 103 301.<br>    - evcsn(11): Electrical Vehicle Charging Spot Notification message as specified in ETSI TS 101 556-1,<br>    - saem(12): Services Announcement Extended Message as specified in ETSI TS 102 890-1,<br>    - rtcmem(13): Radio Technical Commission for Maritime Services (RTCM) Message as specified in ETSI TS 103 301,<br>    - vam(14): vulnerable road user awareness message (VRU) as specified in ETSI TS 103 300-3<br>    - value 14-255: reserved for future usage,<br>  • stationID: the identifier of the ITS-S that generates the ITS message in question. It shall be represented as specified in clause A.77 StationID. |
| Unit | N/A |
| Category | Communication information |

2.1.3. VAM Management Container

FIG. 2 also includes a VAM structure 204 shows an example VAM Management Container including new DFs. The VAM Management Container comprises basic information about the originating ITS-S, which are not VRU, vehicle or RSU specific. The VAM Management Container includes the following four DFs within the management container along with their respective DEs as below and depicted in VAM structure 204.

2.1.3.1. Station Type DF

The following station types are possible based on the VAM originating station: (1) VRU station 117 (standalone case); (2) VRU cluster head 117 (cluster case); (3) other non-VRU station type: RSU/R-ITS-S 130; (4) other non-VRU station type: vehicle/V-ITS-S 110.

2.1.3.2. Role DF (Present Only for VRU Type)

This container/DF is present only if the station type is VRU and is optional for other station types. ON: the ITS device is a VRU 116 and transmits and/or receives VAMs; OFF: the device user is not considered a VRU 116 and/or VRU 116 does not transmit or receive VAMs (e.g., device user inside a bus or building)

Overall, this DE does not change that rapidly since an ITS-S can start as a VRU role and can remain ON during the entire course of the travel or activity that the VRU 116 is in and around the road environment. Hence, it is included in the management container because if the VRU 116 is OFF then there is no need to trigger and exchange VAM between the VRU 116 and the neighboring ITS-Ss. Note that the VBS remains operational in both roles.

2.1.3.3. Reference Position DF

For referencing objects relative to a provided global position, the following options may be possible depending on the originating station type:

For SVRU-ITS-S 117, it can be the center of the VRU 116. For this type, the VRU's 116 ground position of the center of its bounding box can be considered as the reference position.

For CVRU-ITS-S 117, it can be the center of the cluster head. For this type, the cluster head's ground position of the center of its bounding box can be considered as the reference position.

Two possible cases for non-VRU: (i) R-ITS-S 130 ground position, and (ii) V-ITS-S 110 ground position.

2.1.3.4. Segment Information DF

In case the message is segmented, a segment management container exists and could include: the segment ID; and/or total number of message segments.

2.1.4. VAM Profile Container

This container is for either of the four VRU profiles possible: Profile 1 (pedestrians), Profile 2 (bicycle), Profile 3 (motorcycle), Profile 4 (animals).

2.1.5. VAM Physical Properties Container

Figure 3:
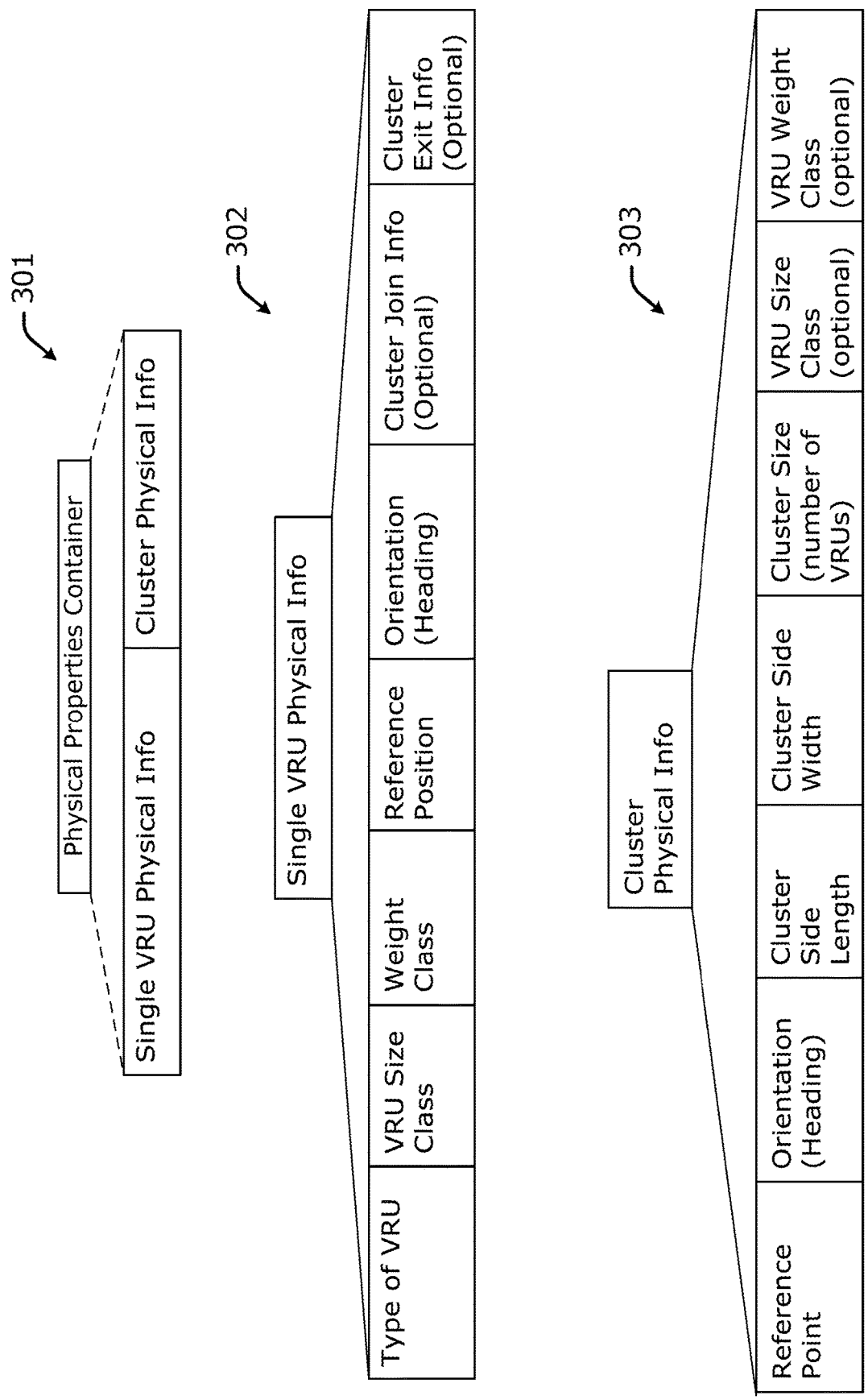

FIG. 3 shows an example VAM Physical Properties Container 301 including the enhanced/new DEs. The VAM Physical Properties Container comprises a single VRU physical information container 302 and a cluster physical information container 303, as follows:

(1) The single VRU physical information container 302 is associated with an individual VRU and they are essentially associated with a standalone VRU. Within this DE, the following 3 additional DEs shown by VRU physical information container 302 can be included: Type of VRU: with 4 possible categories as: (i) infant; (ii) toddler; (iii) kid; (iv) adult; (v) pet/animal; (b) VRU Size Class: with 3 possible categories as: (i) small; (ii) medium; (iii) large. VRU Weight Class: with 3 possible categories as: (i) low; (ii) medium; (iii) high.

(2) The cluster physical information container 303 is like the single VRU physical information DE, the underlying DEs are extended/enhanced to the clustered VRU concept as shown by the cluster physical information container 303 as explained below: (a) Cluster Size: this DE contains the number of VRUs within a given cluster where the cluster size is limited to a maximum limit (e.g., 50 VRUs per cluster at max); (b) VRU Size Class (Optional): this DE is optional since the information regarding the cluster head size class may be enough and the individual VRU size class may not be essential for clustered VRU protocol operation; and (c) VRU Weight Class (Optional): this DE is optional since the information regarding the cluster weight class may be enough and the individual VRU weight class may not be essential for clustered VRU protocol operation.

2.1.6. VAM Dynamic Properties Container

Figure 4:
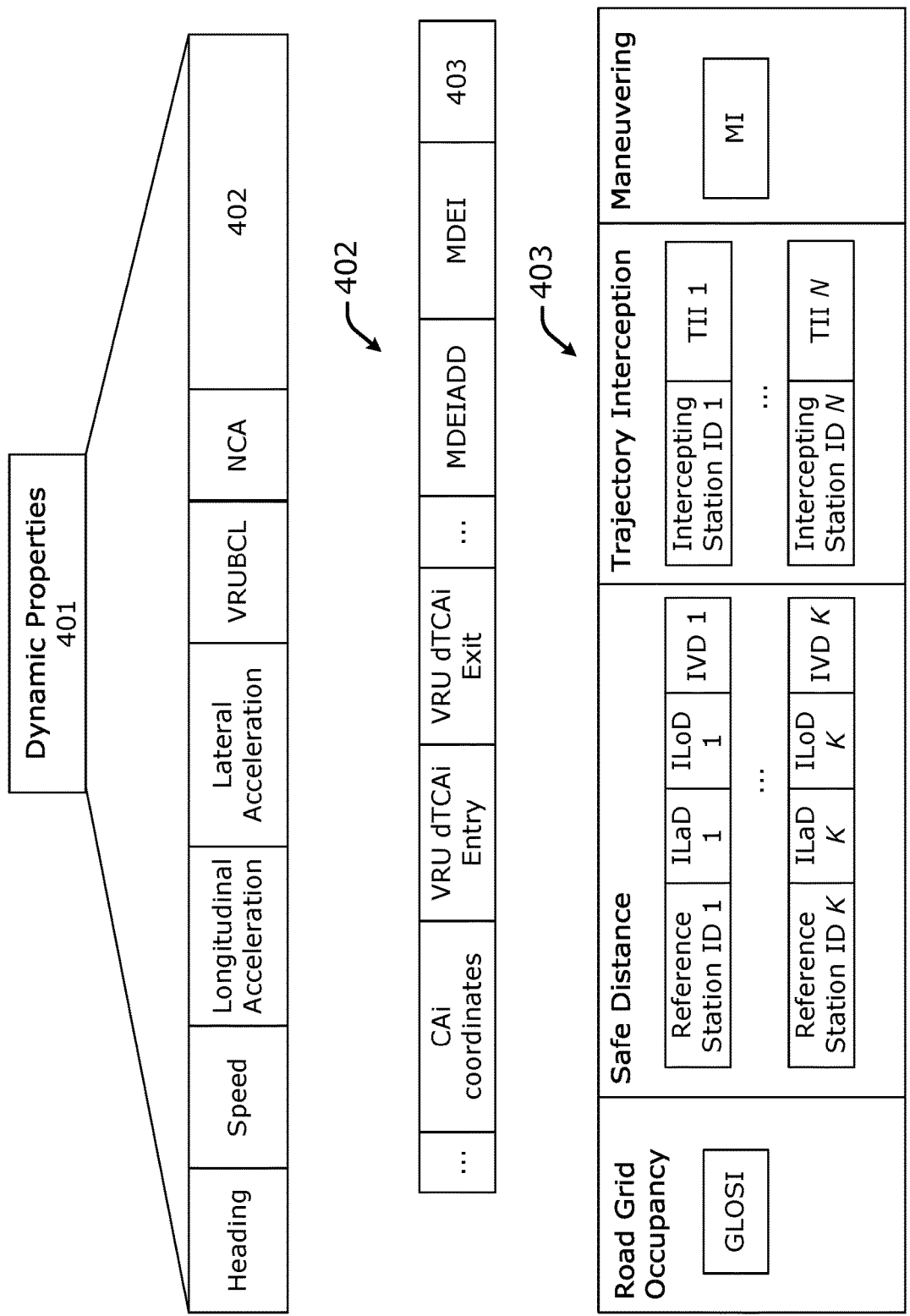

FIG. 4 shows an example dynamic properties container 401. The dynamic properties container 401 includes DEs that can change frequently over the course of the VRU activity period. These DEs are related to the dynamic state that a VRU 116 may be in.

Four new containers are provided as extension to the existing containers with the underlying DEs. The VAM motion dynamic container 402 extensions and corresponding DEs along with the bit construction, bit designation rule, potential collision and the required number of bits of the bit designation are summarized in Table 4. For the DEs defined within the dynamic properties 401, required confidence levels need to be pre-defined by the station applying the DE. Such definitions are specified in conjunction with the respective DEs in each of the following subclauses below. The data type for confidence level is imported from CPS specification as ObjectConfidence and/or the like.

Figure 10A:
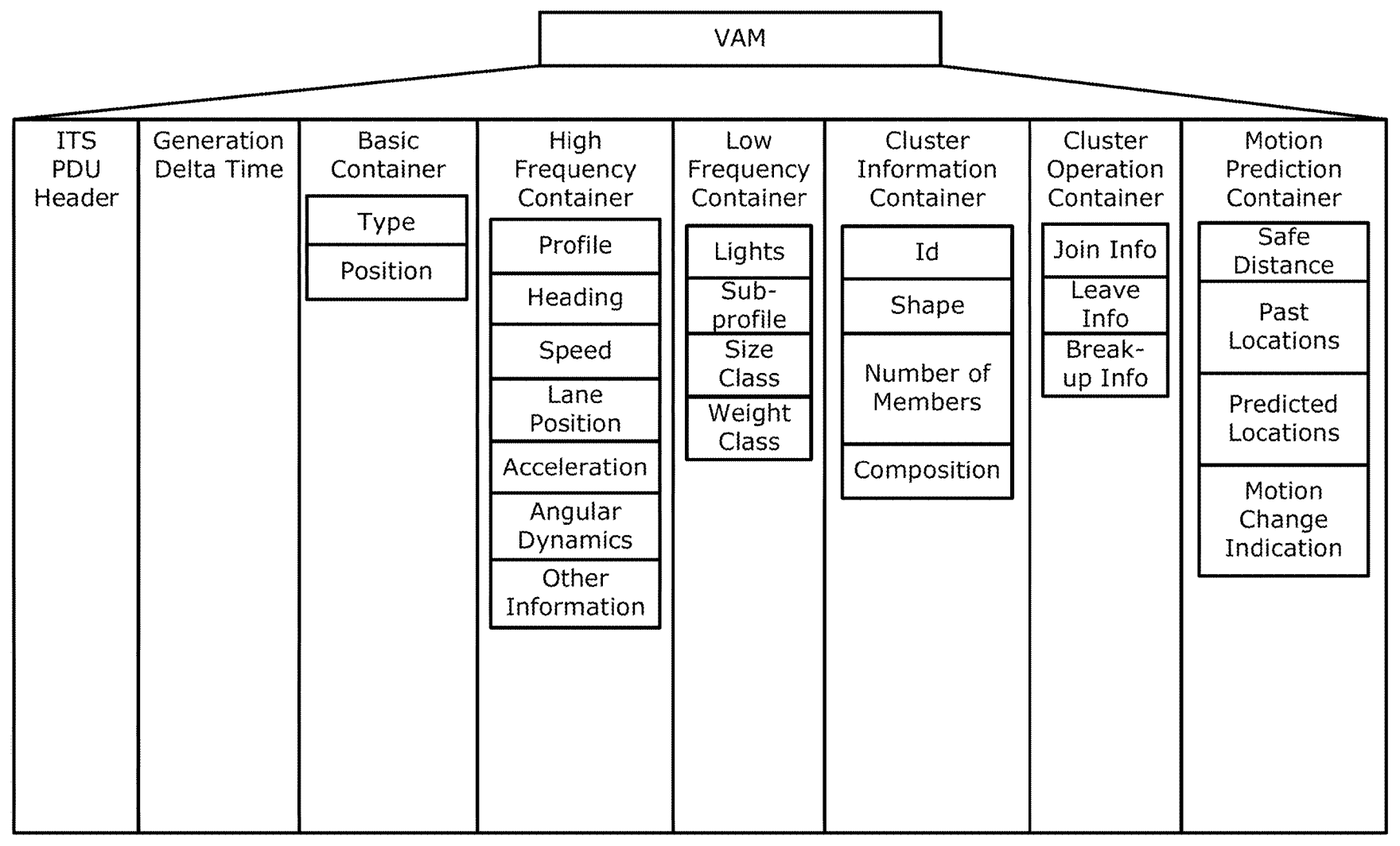
Figure 10B:
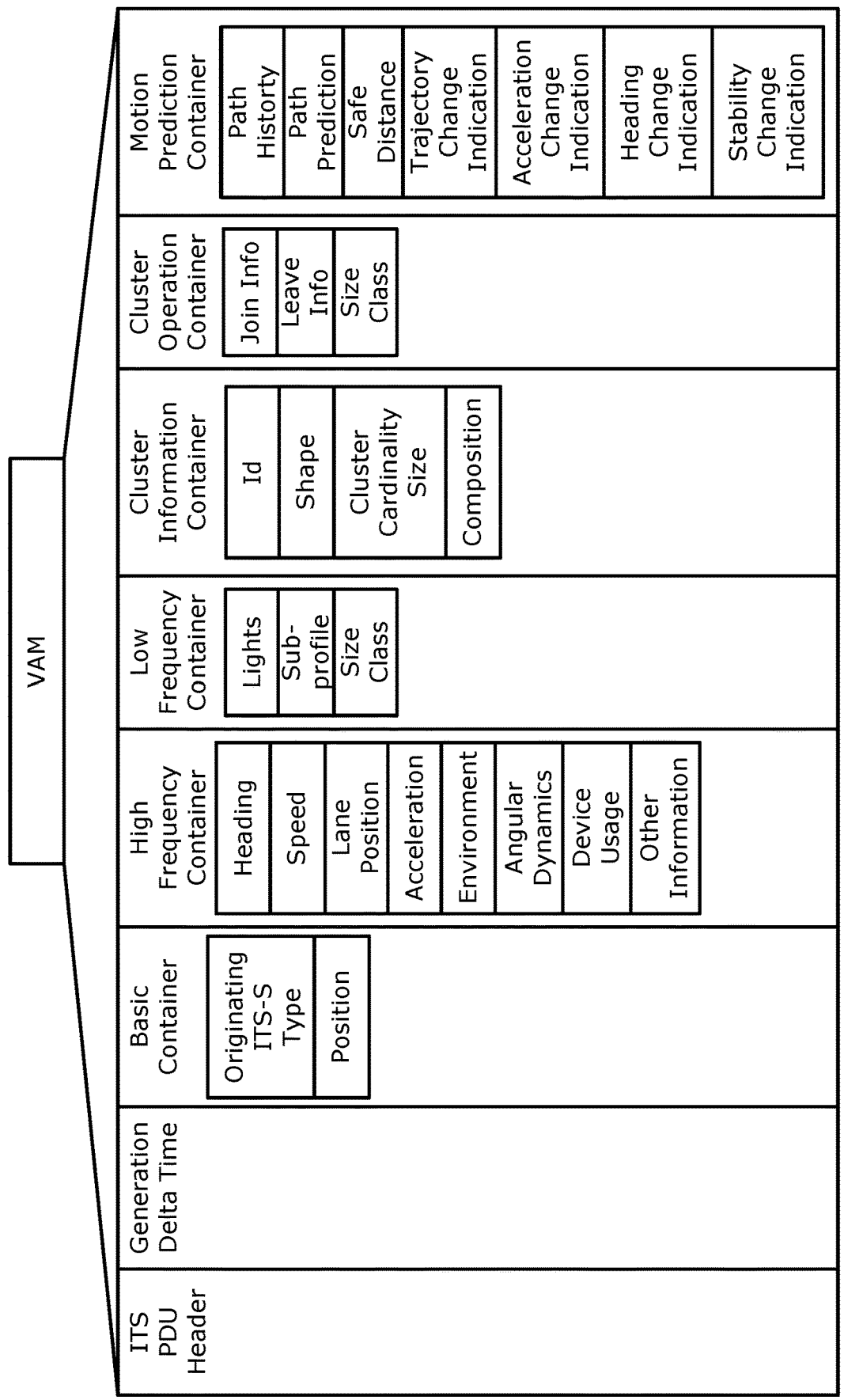

Additionally or alternatively, the VAM motion dynamic container 403 may correspond to the Motion Prediction Container shown and described with respect to FIGS. 10*a* and 10*b*.

Figure 5:
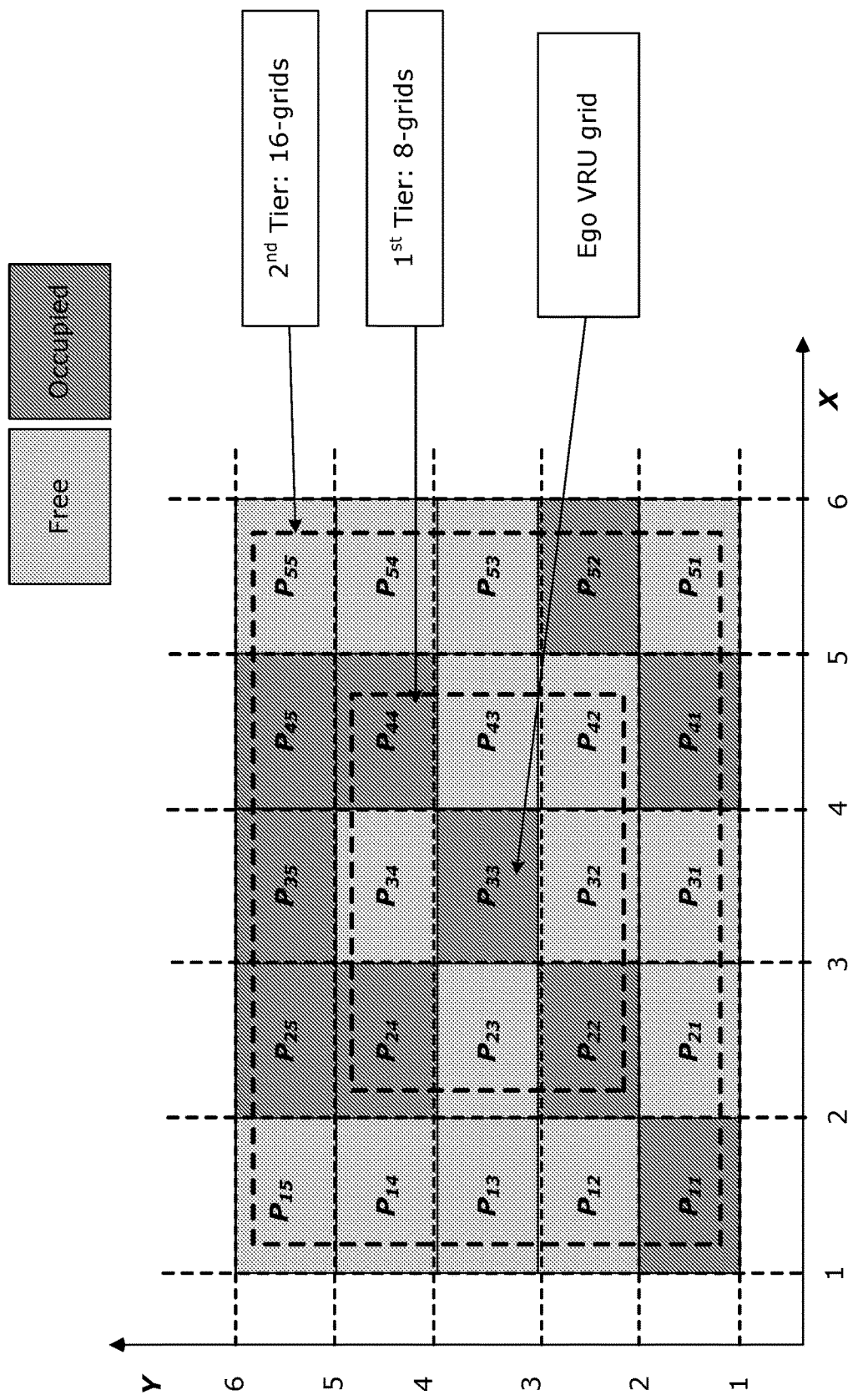
FIG. 5 illustrates an occupancy map.

2.1.6.1. Road Grid Occupancy DF and Grid Location and Occupancy Status Indicator (GLOSI) DE FIG. 5 shows an example grid occupancy map representation. Non-VRU ITS-Ss such as a nearby R-ITS-S 130 with advanced sensors or perception capabilities may also be able to create, maintain and share a dynamic road occupancy map with ego-VRU 116 and the nearby VRUs 116 as shown in FIG. 5. The dynamic road occupancy map is a predefined grid area of a road segment represented by Boolean values for the occupancy accompanied by corresponding confidence values. Since non-VRUs such as a nearby R-ITS-S 130 may have better global view of the road segment it can be used for the management of VRU clustering and dissemination of multiple-VRU VAMs and multiple-VRU-cluster VAMs. Furthermore, the accurate environment perception, power availability, and computation capability of the non-VRU ITS-S could be leveraged for accurate environmental awareness and positioning of the VRUs 116 and V-ITS-Ss 110.

In this example of FIG. 5, the grid occupancy map is at the R-ITS-S 130 of the true occupancy map corresponding along with the computed occupancy probability shown for each grid element from road occupancy grid concept in ['471], ['597], and ['483-PCT]. To explain the concept of Grid Location and Occupancy Status Indicator (GLOSI) data element within the Road Grid Occupancy DF, from FIG. 4, a 2-tier representation of the dynamic contextual road occupancy map (DCROMP) concept from ['471], ['597], and ['483-PCT] is shown. The DCROMP concept divides the road into consecutive/adjacent grid tiles thus forming a grid map around reference grid which is assigned to the ego-VRU 116 location. The purpose is to represent the relative grid locations around the reference ego-VRU 116 grid in terms of logical representation as well as bitmap representation.

A rectangular shape for the grid is assumed as the baseline with a fixed shape for an individual grid. Moreover, a parameterization of the grid around the originating ITS-S in terms of the following configuration parameters and details of the payload may include one or more of the following: (1) reference point (specified by the location of the originating ITS-S for the overall area); (2) grid/cell size (predefined global grid sizes specified by length and width of the grid assuming rectangular grid reflecting the granularity of the cells); (3) starting position of the cell (starting cell of the occupancy grid ($P_{11}$) as shown in FIG. 5 as the reference grid—the other grid locations can be labelled based on offset from the reference grid); (4) bitmap of the occupancy values (Boolean values representing the occupancy of each cell in the grid as shown in FIG. 5); (5) confidence values (the confidence values corresponding to each cell in the grid (associated to the bitmap)).

In addition to the above parameters, the mapping pattern of the occupancy grid into bitmap as shown in FIG. 5 are also specified.

For the purpose, the nearest 8 grid layer around the ego VRU grid is defined as Tier-1 grids (shown by yellow dotted rectangle) and the next outer layer of 16 grid layer as Tier-2 grids (shown by white dotted rectangle). For the sake of brevity and to exemplify the minimum number of bits required to represent the concept of grid location and occupancy status indicator (GLOSI), focus henceforth on the Tier-1 grids only. The GLOSI indices are defined to reflect the 8 possible locations of the occupancy grids relative to the ego VRU's and the corresponding occupancy for each grid. And since for the $1^{st}$ tier there are a total of 9 grids including the VRU, a total of 9-bit GLOSI BOOLEAN representation where each bit position within the 9-bit D corresponds to a unique grid in the grid map with '1' representing 'OCCUPIED' while '0' representing 'FREE' grid, is enough to indicate the $1^{st}$ tier road grid occupancy as depicted in the $2^{nd}$ row of Table 4 under the DF label 'Road Grid Occupancy.' In a similar manner, if the $2^{nd}$ Tier occupancy is to be represented, then a total of 25-bit GLOSI BOOLEAN representation would suffice. Note that for indicating the multiple/simultaneous grids' occupancy, the corresponding significant bits would be turned ON (1), otherwise it will be OFF (0).

The individual probabilities $P_{ij}$ with i={1,2,3,4,5} and j={1,2,3,4,5} illustrated within each grid in FIG. 5 specify the confidence with which a grid occupancy is declared to be occupied. The required confidence level conditions for setting the GLOSI DE is as follows: GLOSI=1, if the grid occupancy is detected to be occupied with confidence of 90% or more, that is, $P_{ij}>90\%$; Else, GLOSI=0, if the grid occupancy is detected to be free with confidence of 90% or more, that is, $(1-P_{ij})>90\%$.

2.1.6.2. Safe Distance DF and Safe Distance Indication (SDI) DE

Given the K number of other ITS-S in the vicinity of the ego-VRU, a DE called Safe Distance Indication (SDI) is provided within the Safe Distance Container. To elaborate the concept, consider the designation of SDIi between an ego-VRU 116 and another ITS-S i with respect to it needs to be decided (and indicated via SDIi) whether the ego-VRU 116 is at a safe distance (that is less likely to physically collide) from another station i where i=1, 2, ... K. For the purpose, the conditional relation ("greater than" or "less than") between the triple of {LaD, LoD, VD} measured between the ego-VRU 116 and an i-th station are compared against the corresponding safe distance thresholds {MSLaD, MSLoD, MSVD} to designate the SDI as below:

If LaDi>MSLaD AND LoDi>MSLoD AND VDi>MSVD, then SDIi=1 implying that the distance between ego-VRU 116 and the i-th station is large enough to be considered as safe for the ego-VRU; Else, if LaDi≤MSLaD AND LoDi≤MSLoD AND VDi≤MSVD, then SDIi=0 implying that the distance between ego-VRU 116 and the i-th station is not large enough to be considered as safe for the ego-VRU.

Where there could be a total of K possible number of another ITS-S in the path of the ego-VRU. The required confidence level conditions for setting the SDI DE can be specified as below: SDIi=1, if LaDi>MSLaD AND LoDi>MSLoD AND VDi>MSVD with confidence of 90% or more; else, SDIi=0, if LaDi≤MSLaD AND LoDi≤MSLoD AND VDi≤MSVD, with confidence of 90% or more.

2.1.6.3. Trajectory Interception DF and Trajectory Interception Indication (TII) DE Within the Trajectory Interception DF, the TII shall be present and representing the TII DE via condition checking on the trajectory interception probability (TIP) metric computed with respective to an ITS-S in the path of potential trajectory interception. The TIP shall be defined as a probabilistic indicator of the estimation uncertainty of the ego-VRU 116 trajectory and its potential interception with any other object or people on the road ranging from other stations in the road. Depending upon the analysis of the scene in terms of the sensory as well as shared inputs, the level of likelihood of the ego VRU's path to be intercepted by another station j=1, 2, ... N can be computed and utilized to set the TII BOOLEAN as: If TIP of ego-VRU 116 with ITS-S j, that is, TIPj≤0.25, TIIj=0 (low likelihood of trajectory interception); and/or If TIP of ego-VRU 116 with ITS-S j, that is, TIPj>0.75, TIIj=1 (high likelihood of trajectory interception)

The required confidence level conditions for setting the TII DE can be specified as: TIPj=0, if TIPj≤0.25 with confidence of 90% or more, and/or TIPj=1, if TIPj>0.25 with confidence of 90% or more.

2.1.6.4. Maneuvering DF and Maneuvering Index (MI) DE

The maneuvering container includes the MI DE which is a response action recommendation in case the TIIj is true (TIIj=1), with respect to another station j=1, 2, ..., N. In this case, the MI may be represented according to four possible maneuvering action recommendations and thus four different options for setting MI DE as: MI=1: longitudinal trajectory change maneuvering; MI=2: lateral trajectory change maneuvering; MI=3: heading change maneuvering; and/or MI=4: Emergency braking (or deceleration) maneuvering. For this case, BOTH the trajectory interception check and safe distance checks need to be performed by the originating station between ego-VRU 116 and the station j=1, 2, ..., N to decide that the collision cannot be avoided by either of {longitudinal, lateral, heading} change maneuvering and braking maneuvering is the only choice.

The required confidence level conditions for setting the MI DE can be specified as: MI=1, if TIIj=1 for j=1, 2, ..., N in longitudinal direction with confidence of 90% or more; MI=2, if TIIj=1 for j=1, 2, ..., N in lateral direction with confidence of 90% or more; MI=3, if TIIj=1 for j=1, 2, ..., N in the direction of heading with confidence of 90% or more; and/or MI=4, if TIIj=1 AND SDIj for j=1, 2, ..., N in longitudinal direction with confidence of 90% or more.

TABLE 4 example VAM motion dynamic container DFs and corresponding DEs along with the bit construction and bit designation rule

| DF | Data Element | Integer Index for | Bit construction | Bit Designation Rule |
|---|---|---|---|---|
| Road Grid Occupancy | GLOSI | 1 | XXXXXXXX0 | Ego VRU grid empty |
| | | | XXXXXXXX1 | Ego VRU grid occupied |
| | | 2 | XXXXXXX0X | North (N) grid from ego VRU empty |
| | | | XXXXXXX1X | North (N) grid from ego VRU occupied |
| | | 3 | XXXXXX1XX | South (S) grid from ego VRU empty |
| | | | XXXXXX0XX | South (S) grid from ego VRU occupied |
| | | 4 | XXXXX0XXX | East (E) grid from ego VRU empty |
| | | | XXXXX1XXX | East (E) grid from ego VRU occupied |

TABLE 4-continued example VAM motion dynamic container DFs and corresponding DEs
along with the bit construction and bit designation rule

| DF | Data Element | Integer Index for | Bit construction | Bit Designation Rule |
|---|---|---|---|---|
| | | 5 | XXXX1XXXX | West (W) grid from ego VRU empty |
| | | | XXXX0XXXX | West (W) grid from ego VRU occupied |
| | | 6 | XXX1XXXXX | Northwest (NW) grid from ego VRU empty |
| | | | XXX0XXXXX | Northwest (NW) grid from ego VRU occupied |
| | | 7 | XX1XXXXXX | Northwest (NE) grid from ego VRU empty |
| | | | XX0XXXXXX | Northwest (NE) grid from ego VRU occupied |
| | | 8 | X1XXXXXXX | Southeast (SE) grid from ego VRU empty |
| | | | X0XXXXXXX | Southeast (SE) grid from ego VRU occupied |
| | | 9 | 1XXXXXXXX | Southwest (SW) grid from ego VRU empty |
| | | | 0XXXXXXXX | Southwest (SW) grid from ego VRU occupied |
| Safe Distance from station i where i = 1, 2, . . . , K | $SDI_i$ | 1 | 0 | LaD ≤ MSLaD and LoD ≤ MSLoD and VD ≤ MSVD, then VRU is at unsafe distance from station i |
| | | 2 | 1 | All other conditions between {LaD, LoD, VD} compared to {MSLaD, MSLoD, MSVD}, then VRU is at safe distance from station i |
| Trajectory Interception with station j where j = 1, 2, . . . , N | $TII_j$ | 1 | 0 | TIP ≤ 0.25 |
| | | 2 | 1 | TIP ≥ 0.75 |
| Maneuvering | MI | 1 | 00 | Longitudinal trajectory change maneuvering |
| | | 2 | 01 | Lateral trajectory change maneuvering |
| | | 3 | 10 | Heading change maneuvering |
| | | 4 | 11 | Emergency braking (or deceleration) maneuvering |

The containers and the underlying DEs within the VAM may be exchanged as follows: (i) in a periodic manner with periodicity $T_{VAM}$ sec (for example, with a VAM transmission frequency, $$\frac{1}{T_{VAM}} \geq 1 \text{ Hz}\bigg)$$

to broadcast an awareness of the VRU environment and context to the neighboring ITS-Ss. The periodicity may be configurable depending upon a-priori conditions; and (ii) In an event triggered manner due to appearance of potential emergency situations.

Figure 6:
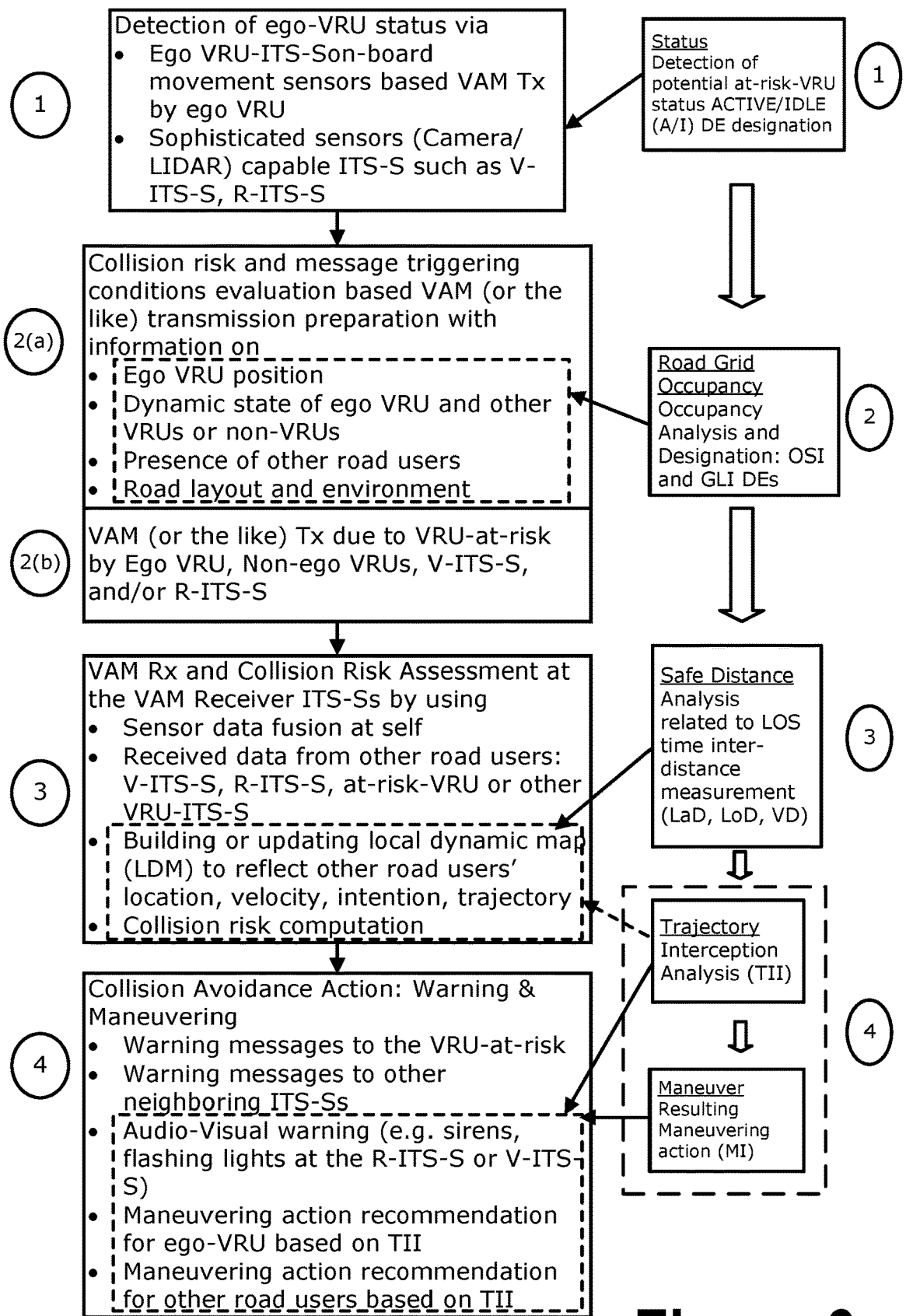
FIGS. 6 and 7 illustrate VBS processes.
Figure 7:
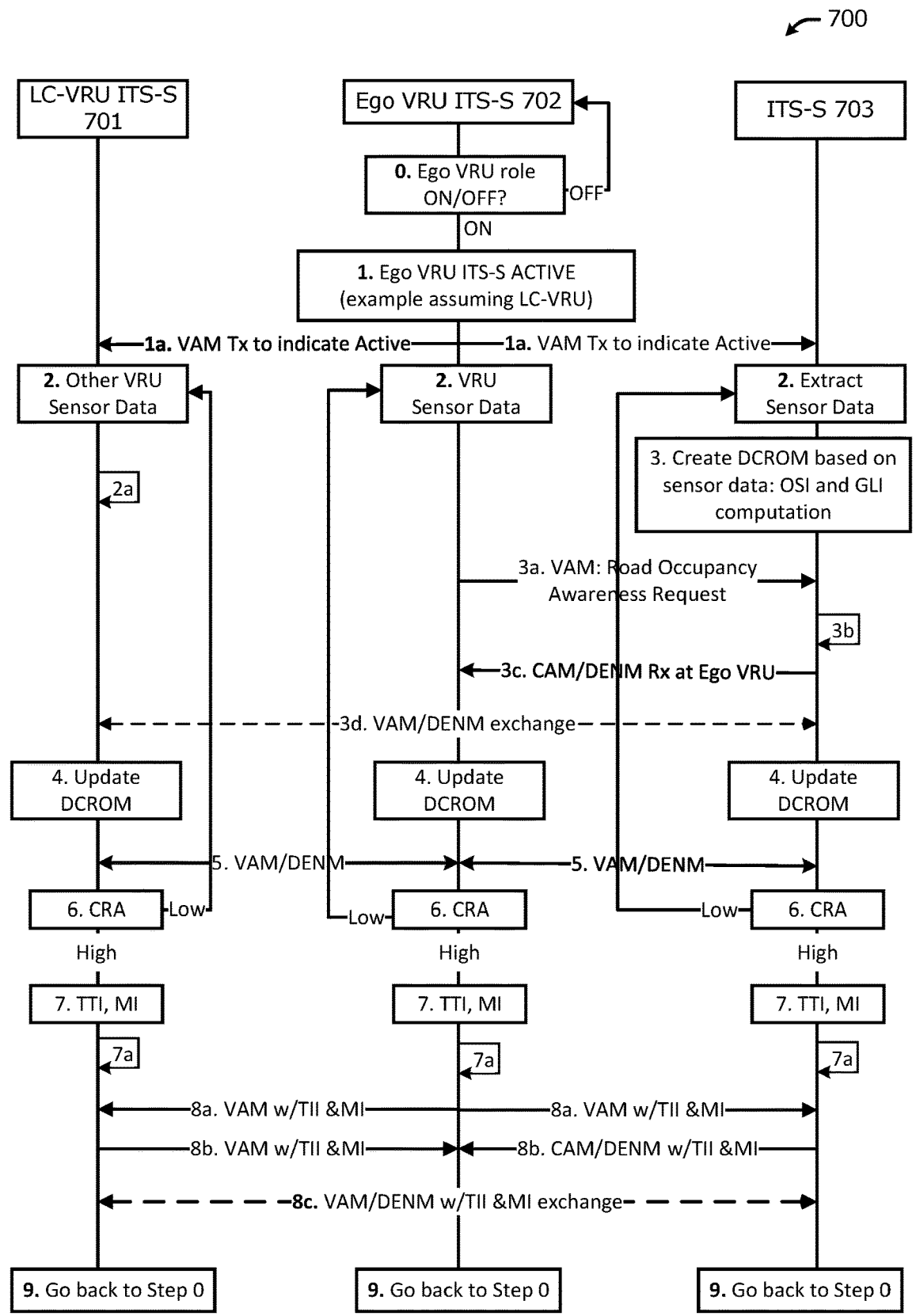

2.1.6.5. Mapping of VAM Container on Functional Operation of the VRU Basic Service FIG. 6 shows a mapping of VAM fields on functional operation of the VRU Basic Service as illustrated in steps 1 through 4 including Detection of VRUs, Collison Risk Analysis, Collision risk avoidance. The TII field is mostly associated with the MI however, it may also be used to augment the safe distance-based collision risk analysis 2.1.6.6. Detailed Protocol Operation Flowchart for VRU-Basic Service Including VAM Triggering and Exchange Among Ego-VRU and Neighboring ITS-Ss FIG. 7 shows a Protocol Operation procedure 700 for VRU-basic service including VAM triggering and exchange among ego-VRU ITS-S 702 (which may be the same or similar to the VRU 116, 117) and neighboring ITS-Ss including a low complexity (LC) VRU ITS-S 701 and an ITS-S 703, which may be a High Complexity (HC)-VRU ITS-S 117 (e.g., with advanced sensor and/or processing capabilities), a V-ITS-S 110, and/or an R-ITS-S 130 in the vicinity of the ego-VRU ITS-S 702. The VRU ITS-S 701 may represent one or multiple VRU ITS-Ss 701 and the ITS-S 703 may represent one or more ITS-Ss 703. The containers (and/or DEs therein) are shown at the respective stages along with the VAM transmissions 1 through 4. Procedure 700 may operate as follows.

Step 0. The ego-VRU ITS-S 702 determines if its role is ON or OFF. If ON, then ego-VRU ITS-S 702 proceeds to step 1.

Step 1: Ego VRU ITS-S 702 in ACTIVE state (e.g., assuming ego VRU ITS-S 702 is an LC-VRU). Step 1a: Ego VRU ITS-S 702 transmits VAMs to LC-VRU ITS-S 701 and ITS-S 703 to indicate Active state.

Step 2: Ego VRU ITS-S 702, LC-VRU ITS-S 701, and ITS-S 703 collected respective sensor data. Step 2a: LC-VRU ITS-S 701: Initial VAM Construction for aiding awareness at neighboring ITS-Ss.

Step 3: HC-VRU ITS-S 703 creates DCROM based on sensor data: OSI and GLI computation. Step 3a: VAM Tx from Ego VRU ITS-S 702: Road Occupancy Awareness Request from neighboring ITS-S(s) 703. Step 3b: ITS-S 703 constructs VAM, CAM, and/or DENM for transmitting DCROM features including computed OSI and GLI. Step 3c: ITS-S 703 transmits VAM, CAM, and/or DENM to Ego VRU ITS-S 702. Step 3d: VAM/CAM/DENM exchange between other LC-VRU ITS-S 701 and ITS-S 703 (e.g., non-VRU ITS-Ss) for Road Occupancy Awareness.

Step 4: Ego VRU ITS-S 702 and LC-VRU ITS-S 701 their respective DCROM features based on OSI and GLI data incoming from other ITS-Ss; ITS-S 703 updates its DCROM based on data incoming from self-sensors and other ITS-Ss.

Step 5: VAM/DENM Safe Distance Metrics exchange between Ego VRU ITS-S 702 and other ITS-Ss 701, 703.

Step 6: LC-VRU ITS-S 701, Ego VRU ITS-S 702, and ITS-S 703 perform respective safe distance-based collision risk analyses (CRAs). If CRA is low, loop back to step 2 to collect sensor data; if CRA is high, proceed to step 7.

Step 7: LC-VRU ITS-S 701, Ego VRU ITS-S 702, and ITS-S 703 perform Trajectory Interception Indicator (TII) computations, and trigger collision avoidance action module to compute maneuvering identifier (MI). Step 7a: LC-VRU ITS-S 701, Ego VRU ITS-S 702, and ITS-S 703 generate respective VAMs with TII and MI DFs.

Step 8a: Ego VRU ITS-S 702 transmits VAMs with TII and MI DFs to LC-VRU ITS-S 701 and ITS-S 703. Step 8b: Ego VRU ITS-S 702 receives VAM with TII and MI DFs from LC-VRU ITS-S 701 and receives VAM, CAM, or DENM from ITS-S 703. Step 8c: LC-VRU ITS-S 701 and ITS-S 703 exchange VAMs, CAMs, or DENMs with TII and MI DFs.

Step 9: LC-VRU ITS-S 701, Ego VRU ITS-S 702, and ITS-S 703 loop back to step 0

2.1.6.7. VRU Basic Service (VBS) Management for Motion Dynamic State and Profile Transitions and State Diagrams
2.1.6.7.1. VRU Dynamic Motion State Prediction and Transitions FIG. 8 shows an example state transition diagram for an ego-VRU 116 in ON role showing four possible motion states and the transitions (back-and-forth) among them along with triggering of the VAM broadcast messages at various state transitions.

The VRU profile transition prediction (and profile updates) are based on utilization of the speed and trajectory ambiguity parameters of the VRU 116 along with the dynamic motion state prediction assuming available of related instantaneous input from on-board sensors such as accelerometer, gyroscope, compass, GPS, gravity senor, speedometer, and others in the VRU 116.

A function of updating the VRU current profile based on profile prediction shall consider dynamic motion state prediction. The on-board sensors at the VRU 116 can be utilized for estimating the dynamic motion state. To this end, for an ON VRU role, four possible states that the VRU 116 may currently be in and perceived accordingly by the respective motion sensors are as follows: (i) Waiting: as indicated by temporary pause in motion (zero speed); (ii) Starting to Move: as perceived by sensors from acceleration. The acceleration for non-vehicle VRU 116 (like pedestrian or cyclist) could be very short in existence or even abruptly jump (impulse) before vanishing to zero when the VRU 116 starts from almost zero speed and reaches a steady motion state (after starting to run or getting into a bicycle); (iii) Moving: constantly evolving locations that may be approximated by using a constant velocity model where the position coordinates keep changing with time; and/or (iv) Stopping: as perceived from deceleration.

Figure 8:
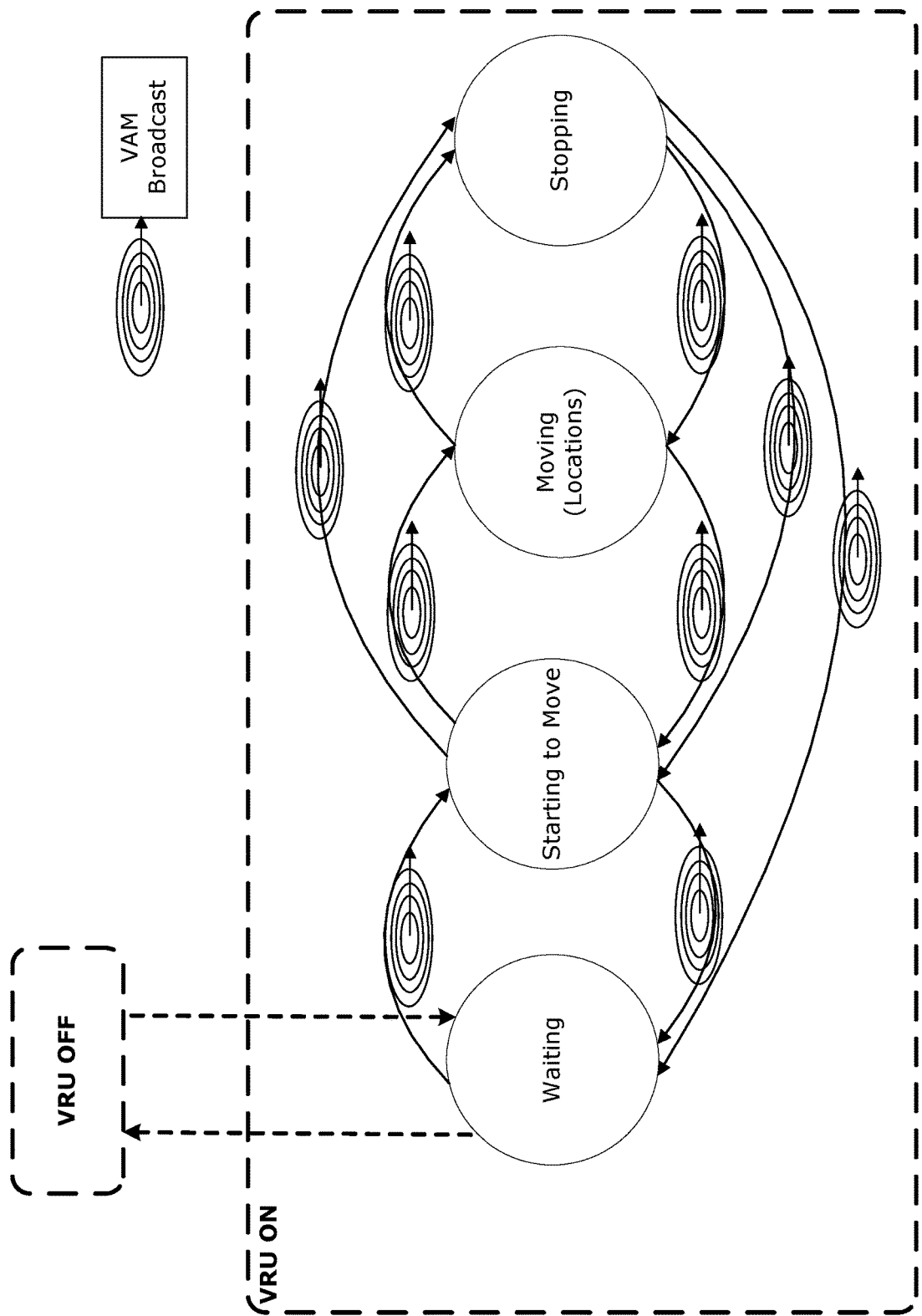
FIGS. 8 and 9 illustrate VBS finite state machines.

For a VRU 116 with role ON, due to the continuously evolving motion reflected by the speed and trajectory computing sensors, the VAM broadcast may be triggered accordingly to indicate other ITS-Ss in the vicinity during the transition from one physical motion state to another as depicted in FIG. 8.

2.1.6.7.2. VRU Dynamic Profile Transition Prediction (and Profile Update) Based on Estimated Motion State The possible transitions in VRU profiles and the correspondingly triggered VAM broadcast messages in terms of state diagram. The mechanism that can be used to estimate the transition in profile is based on two profile parameters: (i) VRU Profile (Typical) Speed (TS); and/or (ii) VRU Profile Trajectory Ambiguity (TA).

Various dynamic motion states possible for a VRU 116 were discussed previously. Once the dynamic motion state is estimated, the estimation can be utilized to decide whether the existing VRU profile has changed or it remains the same. For instance, if there is constant high acceleration of a slow-moving VRU 116 detected after changes in its movement, then there is a high probability that a pedestrian VRU 116 (Profile 1) has transitioned into a motorcyclist VRU 116 (Profile 3). Thus, the dynamic motion prediction outcome serves as an input to probabilistically estimate such transition. Similarly, a constant deceleration also provides a hint at a potential upcoming change in the VRU profile, for instance, when a VRU 116 motorcyclist or bicyclist is braking to come to a stop following which it may park the motorcycle or bike and start walking thus transitioning from Profile 2 (or Profile 3) to Profile 1. The VRU ITS-S 116/117 is responsible for updating the initial profile based on all the sensor input. Additionally, the VRU ITS-S 116/117 now also has the trajectory related predictions of the VRU 116 via time-series analysis of the sensory data.

For instance, let $P_k$ be the current position at time k. Then, K past positions of the VRU 116 expressed as a vector, $P_{tP} = \{P_{k-K} > P_{k-K+1}, \ldots, P_k\}$ can be as observed trajectory reference input for predicting the trajectory of N future positions $P_{tF} = \{P_{k+1} > P_{k+2}, \ldots, P_{k+N}\}$ where each position $P_L \forall i \in \{k-K, k-K+1, \ldots, k, \ldots, k+N\}$ is a 2D global coordinate of the form $P_i = (x_i, y_i)$. Then, based on time series representation (approximation) with knowledge of its absolute current position, speed, heading (direction), the next trajectory point can be predicted via Kalman Filtering (KF) or advanced KF such as Multi-Modal KF. Note that within the a given profile, the KF or Multi-Modal KF are a good method to estimate or predict the trajectory. However, after the transition from one VRU profile to another, the KF may need to be re-initialized based on the updated input parameters.

Given the above trajectory prediction mechanism available at the ego-VRU, a Trajectory Ambiguity Probability (TAP) is provided as a probabilistic indicator of the estimation certainty of the VRU 116 trajectory. For VRU Profile-1 and Profile-4, the TAP values are high specially for stationary or LOW speed VRUs since it is very difficult to predict or estimate the intended trajectory of Stationary (and slow moving) pedestrians and animals.

Table 5 shows the Typical Speeds, Maximum Speeds and Trajectory Ambiguity (TA) levels for VRU Profiles (see e.g., [TS103300-2]) and the notations for Typical Speed (TS) thresholds per VRU profile for using in state diagram. Note that the typical speed values are not limited to the values shown in the table and considered as a typical example value. In general, for a VRU profile i, the typical speed is represented as the variable TS_Pi as shown in the third column of Table 5, mainly for ease of notation in the state transition diagram (see e.g., FIG. a6). Similarly, the three possible levels for TA are {LOW, MEDIUM, HIGH} as borrowed from [TS103300-2].

Table 6 shows example TAP Indication (TAPI) designations based on TAP range-based designations for {LOW, MEDIUM, HIGH} levels. Note that the higher the value of TAP, the higher chances of error in correctly predicting the VRU profile. For instance, the TAP would fall in LOW (for motorcyclist VRU) to HIGH (e.g., for Pedestrian and animal VRUs). Furthermore, three levels reflected via TAP Indicator (TAPI) as depicted in Table 6 corresponding to the three possible levels of TA include: {LOW, MEDIUM, HIGH}.

TABLE 5

| VRU Profile | Typical Speed (TS) | TS Notation | Maximum Speed | Trajectory Ambiguity (TA) |
|---|---|---|---|---|
| 1 | 5 kmph | TS_P1 | 12 kmph (humans) | High |
| 2 | 20 kmph | TS_P2 | 25 kmph | Medium |

TABLE 5-continued

| VRU Profile | Typical Speed (TS) | TS Notation | Maximum Speed | Trajectory Ambiguity (TA) |
|---|---|---|---|---|
| 3 | 35 kmph | TS_P3 | 45 kmph | Low |
| 4 | 5 kmph | TS_P3 | 40 kmph | High |

TABLE 6

| TAP Range | TAP Indicator (TAPI) | Designation |
|---|---|---|
| 0 to 0.25 | 1 | LOW |
| 0.25 to 0.5 | 2 | MEDIUM |
| 0.5 to 1 | 3 | HIGH |

Figure 9:
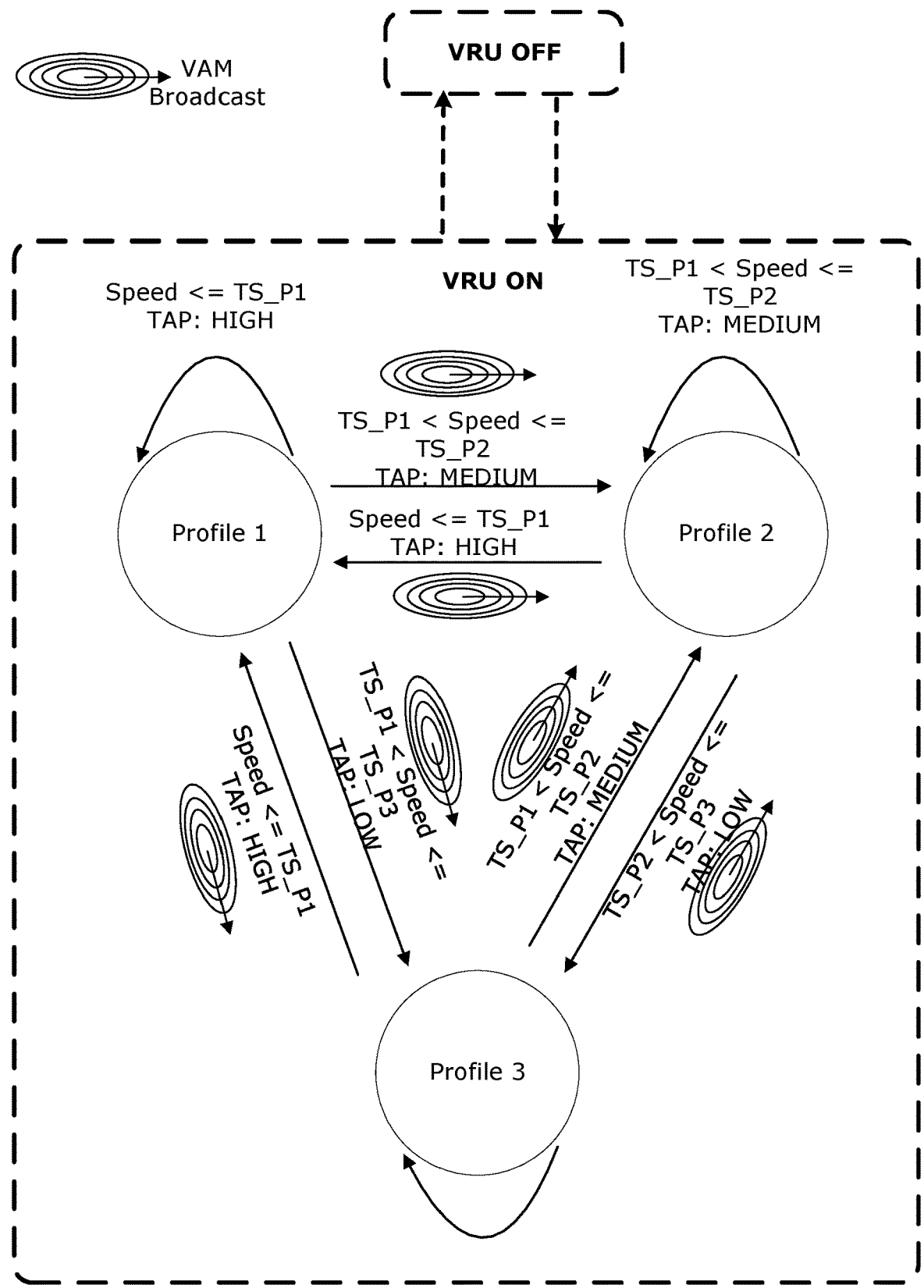

FIG. 9 shows another example state diagram. Assuming VRU 116 is ON and can be in different states of profiles, the state-transition diagram example is based on speed range and Trajectory Ambiguity Probability based checks along with triggering of the VAM broadcast messages at various state transitions. The transition from and to Profile 4 (animals) is not shown in the current example but can be addressed using the profile transition prediction framework by considering additional sensors input, for instance, cameras available at the nearby R-ITS-S 130 or V-ITS-S 110 or even when the VRU 116 is equipped with such cameras (say mounted on in a bike/helmet or on a pedestrian's phone). Profile 4 to Profile 3 (and vice versa) and Profile 4 to Profile 2 (and vice versa) profile transition could still be possible shown assuming a person could put a pet in a motorcycle or a bicycle and could take it out after reaching the destination For illustrative purposes, to predict the VRU profile transition and to show how the concepts lend themselves for dynamic VRU profile transition and awareness at the ego-VRU, the state transition diagram in FIG. 9 is based on the VRU 116 speed and trajectory ambiguity along with the triggering of the corresponding VAM messages at various transition instants.

Table 7 shows example VRU Profile Transition Check Condition/Rules in the VBS for the state transition diagram example shown in FIGS. 8 and/or 9. The following condition/rules associated with each VRU profile that are used to trigger the VRU profile transition awareness in the VBS in Table 7.

TABLE 7

| Conditions Check | VRU Profile Designation |
|---|---|
| VRU Speed <= TS_P1 and TAP: HIGH | 1 |
| TS_P1 < VRU Speed <= TS_P2 and TAP: MEDIUM | 2 |
| TS_P2 < VRU Speed <= TS_P3 and TAP: LOW | 3 |

An ASN.1 representation showing example implementation of the VAM dynamic motion prediction container along with the underlying DEs is shown infra.

2.2. Example Implementations VAM DFs and DEs

An example implementation of the Facilities Layer VBS (see e.g., FIG. 21), including the extensions of the VAM containers and the underlying DFs and DEs are shown by Table 8. Table 8 shows an example ASN.1 representation based on the format defined in SAE International, "Dedicated Short Range Communications (DSRC) Message Set Dictionary", V2X Core Technical Committee, SAE Ground Vehicle Standard J2735, DOI: https://doi.org/10.4271/J2735_202007 ("[SAE-J2735]").

TABLE 8

```
VAM-PDU-Descriptions {itu-t(0) identified-organization(4) etsi(0) itsDomain(5)
    wg1(1) ts(103300) vam(3) version(1)}
DEFINITIONS AUTOMATIC TAGS ::=
BEGIN
    IMPORTS
        ItsPduHeader, ReferencePosition, AccelerationControl,
            Heading, HeadingValue, Speed, StationID, VehicleLength, VehicleWidth,
    ObjectConfidence
            PathHistory, ProtectedCommunicationZone, PtActivation,
            Latitude, Longitude, ProtectedCommunicationZonesRSU
            FROM ITS-Container {itu-t(0) identified-organization(4) etsi(0)
                itsDomain(5) wg1(1) ts(102894) cdd(2) version(2)}
    GenerationDeltaTime
    FROM CAM-PDU-Descriptions {itu-t(0) identified-organization(4) etsi(0)
        itsDomain(5) wg1(1) en(302637) cam(2) version(2)}
;
VAM :: = SEQUENCE {
    header ItsPduHeaderVam,
    vam VruAwareness
}
-- contains StationId
-- StationId should change when certificate changes, or when VRU
-- enters or leaves a cluster (as leader or otherwise)
ItsPduHeaderVam ::= ItsPduHeader(WITH COMPONENTS {
    ...,
    messageID(vam)
})
VruAwareness :: = SEQUENCE {
    generationDeltaTime GenerationDeltaTime,
        -- @details managementParameters
        -- The management Parameters comprise basic information about the originating ITS-S
```

TABLE 8-continued

```
and
        -- other common information, which may not be specific to VRU, RSUs or vehicles
        -- originated VAM such as Segmentation information of VAM.
        managementParameters                                              VamManagementParameters OPTIONAL,
        -- @details VAM Parameters
        -- VamParameters comprise information about either a VRU or a VRU Cluster included
in
    -- this VAM. For VRU ITS-S generated VAM, there will be only one VamParameters
container
    -- for Single VRU VAM
        -- For Cluster Head VRU ITS-S generated VAM, there will be only one VamParameters
        -- container for VRU Cluster VAM
        -- For Non-VRU ITS-S generated Infrastructure VAM, there will be one or more
        -- VamParameters containers: one container for each of perceived VRUs and one
container
        -- for each of perceived VRU
        -- clusters to be included in the current Infrastructure VAM
        vamParameters                                           SEQUENCE (Size(0..MAX)) OF VamParameters,
    vamExtensions                                               SEQUENCE (SIZE(0..MAX)) OF VamExtension
}
        -- @brief VAM Management Parameters
        -- The VAM Management Parameters comprise basic information about the originating
ITS-S,
        -- which are not specific to VRU, RSUs or vehicles originated VAM
        --such as Segmentation information of VAM. Default is VAM not segmented
    VamManagementParameters ::= SEQUENCE {
        -- @details Originating Station Type
        -- OriginatingStationType by Default is VRU for Single VRU and VRU cluster VAM.
        --However it can be RSU (or Designated Vehicles in future) for Infrastructure VAM
        originatingStationType                                              OriginatingStationType,
        -- @details VAM Types
        -- VamType indicates types of VAM
        -- Single VRU VAM (e.g., transmitted by VRU ITS-S in VRU-ACTIVE-STANDALONE VBS
State)
        -- VRU Cluster VAM (e.g., transmitted by VRU ITS-S in VRU-ACTIVE-CLUSTERHEAD VBS
State)
        -- Infrastructure VAM (e.g., transmitted by R-ITS-S)
        -- and so on
        vamType                                                 VamType,
        -- @details vamSegmentInfo
        -- The VAM segment info describes the segmentation information in case
        -- the data for VAM transmission needs to be split up into multiple messages due to
        -- message size constraints.
        vamSegmentInfo                                          VamSegmentInfo OPTIONAL,
        -- @details OriginatingStationReferencePosition
        -- It provides reference position of the VAM reporting station. It may be same as
        -- SingleVruPhysicalInfo referencePoint in case of individual VAM originated by VRU
        -- station Type and can be skipped.
        -- However, it may be different if VAM is reported by RSU; or VAM is Cluster VAM.
        -- Default is stationReferencePosition is same as referencePoint DE.
        originatingStationReferencePosition                                    OriginatingReferencePosition OPTIONAL,
        ...
    }
        -- @brief VamType
        --·VamType indicates types of VAM
        -- Single VRU VAM (e.g., transmitted by VRU ITS-S in VRU-ACTIVE-STANDALONE VBS
State)
        -- VRU Cluster VAM (e.g., transmitted by VRU ITS-S in VRU-ACTIVE-CLUSTERHEAD VBS
State)
        -- Infrastructure VAM (e.g., transmitted by R-ITS-S)
        -- and so on
    VamType ::= INTEGER {
        singleVruVam                                    (0),  -- Single VRU VAM (e.g., transmitted by VRU ITS-S
                                                                -- in VRU-ACTIVE-STANDALONE VBS State)
        vruClusterVam                                   (1),  -- VRU Cluster VAM (e.g., transmitted by VRU ITS-S
                                                                -- in VRU-ACTIVE-CLUSTERHEAD VBS State)
        infrastructureVam                               (2),  -- Infrastructure VAM (e.g., transmitted by a R-ITS-S)
        vehicleVam                                      (3),             -- vehicle VAM (e.g., transmitted by a V-ITS-S)
    }(0..7)
        -- @brief VAM Segment Information
        -- Information about segmented VAM and the number of generated segments.
    VamSegmentInfo ::= SEQUENCE {
        -- @details totalMsgSegments
        -- Total number of messages required on the transmitter side to distribute
information
        -- to several messages.
        totalMsgSegments SegmentCount,
        -- @details thisSegmentNum
```

TABLE 8-continued

```
                    -- Indicates the number of the received message out of the total number of messages
                    -- used to realize segmentation.
                    thisSegmentNum                          SegmentCount
        }
                    -- @brief Segment Count
                    -- A data element for representing either the total number of generated segments by
the
                    -- transmitter
                    -- or the identification of the received message segment.
                    -- @unit n/a
        SegmentCount                                ::= INTEGER( 1..32)
        VamParameters                               ::= SEQUENCE {
          activeProfile                             VruProfileId,
          physicalProperties VruPhysicalProperties,
          dyanmicProperties VruDynamicProperties,
          ...
        }
        VruProfileId :: = ENUMERATED {
          pedestrian(1), lowSpeedTwoWheel(2), fullSpeedTwoWheel(3), animal(4)...
        }
        VruPhysicalProperties :: = CHOICE {
          singleVruPhysInfo SingleVruPhysicalInfo,
          clusterPhysInfo VruClusterPhysicalInfo,
          ...
        }
        SingleVruPhysicalInfo :: = SEQUENCE {
          reference                                 Point ReferencePosition,
          orientation                               Heading,
          clusterJoinInfo                           ClusterJoinInfo OPTIONAL,
          clusterExitInfo                           StationID OPTIONAL,
                    -- type of VRU within a given profile for pedestrian (profile 1) the type can be
infant,                                             -- toddler, kid, adult, petAnimal, and/or the like.
          typeOfVru                                 VruType,
          sizeClassOfVru                            VruSizeClass,
                    -- weight class can be one of Low, Medium or High
          weightClassOfVru                          VruWeightClass,
          singleVruConfidence                       ObjectConfidence,
          ...
        }
          VruType ::= ENUMERATED {
          infant(1), toddler(2), kid(3), adult(4), petAnimal(5)...
        }
        VruSizeClass :: = ENUMERATED {
          small(1), medium(2), large(3)...
        }
          VruWeightClass ::= ENUMERATED {
          low(1), medium(2), high(3)...
        }
        ClusterJoinInfo ::= SEQUENCE {
          clusterId                                 StationID,
          countdown                                 INTEGER (0..7),
          ...
        }
        VruClusterPhysicalInfo :: = SEQUENCE {
          referencePoint                            ReferencePosition, -- middle of front edge of cluster
          heading                                   HeadingValue,          -- direction of perp. line through referencePoint
          width                                     VruClusterSideLength, -- width (with referencePoint in the
                                                                          -- middle) in units of 10 cm
          length                                    VruClusterSideLength, -- length (from referencePoint to rear of
                                                                          -- cluster) in units of 10 cm
          numberOfVRUs                              INTEGER(0..255), -- 0 means unknown
              sizeClassOfVru                          VruSizeClass              OPTIONAL,
              weightClassOfVru                        VruWeightClass            OPTIONAL,
          clusterVruConfidence ObjectConfidence,
          ...
        }
          VruClusterSideLength ::= INTEGER {tenCentimeters(1), outOfRange(61), unavailable(62)}
(1..62)
          -- none of these fields are OPTIONAL as each of the types below has an "unknown" value,
which
          -- should be used if the value isn't provided.
          VruDynamicProperties ::= SEQUENCE {
          heading                                   Heading,
          speed                                     Speed,
          longitudinalAcceleration                                         LongitudinalAcceleration,
          lateralAcceleration                                              LateralAcceleration,
          verticalAcceleration                                             VerticalAcceleration,
          yawRate                                   YawRate,
          pastLocations                             PathHistory,
          predictedLocations                                               PathHistory,
```

TABLE 8-continued

```
        -- road grid occupancy related parameters and confidence
            gridOccupancy                                       GridOccupancyStatus Indication           OPTIONAL,
                confidenceLevelPerGrid                          SEQUENCE (Size(1..8...)) OF ObjectConfidence
    OPTIONAL,
        -- safe distance indication related parameters and confidence
            safeDistance                                        SafeDistanceIndication                   OPTIONAL,
                confidenceLevelSafeDistanceSEQUENCE (Size(1..8...)) OF ObjectConfidence
    OPTIONAL,
        -- trajectory interception related parameters and confidence
            trajectoryInterception                              TrajectoryInterceptionIndication
    OPTIONAL,
                confidenceLevelTrajecotryInterception SEQUENCE (Size(1..8...)) OF
                                                                ObjectConfidence OPTIONAL,
        -- maneuvering indication related parameter and confidence
            maneuverRecommendation                              ManeuveringIndication                    OPTIONAL,
                confidenceLevelManeuverRecommendation                   SEQUENCE (Size(1..8...)) OF
                                                                ObjectConfidence                         OPTIONAL,
        ...
    }
VamExtension ::= CHOICE {
    dummy       NULL,
    ...
}
-- Grid Location Occupancy Container comprises a sequence of 9 BOOLEAN correspnding to the
-- first tier of 8 grids adjacent to the VRU grid, to result a total of 9 grids including VRU
-- grid
GridLocOccupancyStatusIndiation                                 ::= SEQUENCE {
        egoVruGridOccupancy                                     ::= BOOLEAN
        northOfEgoVruGridOccupancy                              ::= BOOLEAN
        southOfEgoVruGridOccupancy                              ::= BOOLEAN
        eastOfEgoVruGridOccupancy                               ::= BOOLEAN
        westOfEgoVruGridOccupancy                               ::= BOOLEAN
        northwestOfEgoVruGridOccupancy                          ::= BOOLEAN
        northeastOfEgoVruGridOccupancy                          ::= BOOLEAN
        southeastOfEgoVruGridOccupancy                          ::= BOOLEAN
        southwestOfEgoVruGridOccupancy                          ::= BOOLEAN
    }
-- Safe Distance container size depends upon the number of occupied grid locations with
maximum --- size equal to 9 (inluding ego-VRU grid) corresponding to 9 adjacent stations or
objects if all -- grids are occupied at the same time when considering the first tier of
grids
SafeDistance ::= SEQUENCE(SIZE(1..8)) OF VruMinimumDistanceIndication
VruMinimumDistanceIndication ::= SEQUENCE {
        distanceFromStation                                     StationID                                OPTIONAL,
        stationSafeDistanceIndication                           SafeDistanceIndication
    }
SafeDistanceIndication ::= BOOLEAN
-- true: triple of {LaD, LoD, VD} greater than triple of {MSLaD, MSLOD, MSVD}
-- false: triple of {LaD, LoD, VD} less than or equal to triple of {MSLaD, MSLOD, MSVD}
TrajectoryInterceptionIndication ::= SEQUENCE (SIZE(1..8)) OF
VRUTrajectoryInterceptionIndication
VruMinimumDistanceIndication ::= SEQUENCE {
        trajectoryToStation                                     StationID                                OPTIONAL,
        trjectoryInterceptoinIndication                         TrajectoryInterceptionIndication
    }
TrajectoryInterceptionIndication ::= BOOLEAN
-- true : Trajectory Interception Probability of VRU with other road users is high (≥0.75)
-- false: Trajectory Interception Probability of VRU with other road users is low (≤0.25)
VRUManeuveringIndication ::= SEQUENCE (SIZE(1..8)) OF VRUManeuveringIndication
VRUManeuveringIndication ::= ENUMERATED {
        longitudinalTrajectoryChangeManeuvering                         (0),
        lateralTrajectoryChangeManeuvering                              (1),
        headingChangeManeuvering                                        (2),
        emergencyBrakeManeuvering                                       (3),
    }
...
END
```

3. VRU Special Vehicle Container for CAM and VAM in its

As mentioned previously, the different types of VRUs have been categorized into the following four profiles: VRU Profile-1: Pedestrians (e.g., pavement users, children, pram, disabled persons, elderly, and/or the like); VRU Profile-2: Bicyclists (e.g., light vehicles carrying persons, wheelchair users, horses carrying riders, skaters, e-scooters, Segways, and/or the like); VRU Profile-3: Motorcyclists with engine equipped which can reach speeds similar to other vehicles; and VRU Profile-4: Animals posing safety risk to other road users (e.g., dogs, wild animals, horses, cows, sheep, and/or the like).

Among all Profiles, Profile-3 is treated as a special Profile given its similarity to other fast moving users of the road such as cars, buses, and similar vehicles and at the same time housing one or two persons who, after getting off the motorbike would naturally default to becoming Profile 1 VRUs. Thus, as specified in [TS103300-3], in case of motorcycle, the VRU basic service (VBS) would interact with the cooperative awareness (CA) basic service [EN302637-2] for improving safety of motorcyclist Profile VRUs. Moreover, additional data frames and data elements not already present in the cooperative awareness message (CAM) of the CA basic service and in the VRU Awareness Message (VAM) managed by the VBS for enabling such additional safety related message exchange specialized to Profile 3 are needed in order to inform the vehicles, infrastructure and other road users about the Profile 3 specific details of the VRU.

To this end, this invention thus addresses the problem by proposing such data frames and data elements to be included in the CAM and VAM via a special vehicle container including: a Special Vehicle container for Profile 3 VRUs to be included in the in CAM; a Special Vehicle container for Profile 3 to be included in VAM, for the aforementioned special vehicle container, new DEs and/or DFs for both CAMs and VAMs for enabling special vehicle container for Profile 3 to cover: ITS-S Equipped/unequipped rider, Orientation, Status indicators for augmenting stability indication (on/off seat, hands on/off handle, attention on/off road), Number of riders, Type/Class (and features) of motorcycle, and Turn Assistance Indication, Electronic Emergency Brake Light (EEBL); and/or ASN.1 specification proposal for the above concepts with construction and format details of the proposed DFs/DEs.

It is possible to the extend and generalize the solutions discussed herein to cover the cases where the special vehicle container originating stations could be one or more of the following four station types: Standalone (non-clustered) Profile 3 VRU vehicles equipped with ITS-Ss; Clustered Profile 3 VRU vehicles equipped with at least one ITS-Ss; RSUs (R-ITS-Ss 130) and/or vehicles (V-ITS-Ss 110), standalone (non-clustered) Profile 1 VRU riders equipped with ITS-S; standalone (non-clustered) Profile 1 VRU riders not equipped with any ITS-S. Note that for this case, it is assumed that the VRU vehicle (e.g., motorcycle) is equipped with an ITS-S.

3.1. VAM and CAM Formats

FIG. 10a illustrates an example message structure of that may be used as a Collective Perception Message (CPM) and/or a VAM (see e.g., [TS103300-3]) for standalone VRU ITS-S as the originating ITS-S. The CPM/VAM comprises multiple containers. Current ETSI standards may define various containers as comprising a sequence of optional or mandatory data elements (DEs) and/or data frames (DFs). However, it should be understood that the requirements of any particular standard should not limit the present disclosure, and as such, any combination of containers, DFs, DEs, values, actions, and/or features are possible, including any combination of containers, DFs, DEs, values, actions, and/or features that are strictly required to be followed in order to conform to such standards or any combination of containers, DFs, DEs, values, actions, and/or features strongly recommended and/or used with or in the presence/absence of optional elements. The DEs and DFs included in the CPM format are based on the ETSI Common Data Dictionary (CDD) (see e.g., [TS102894-2]) and/or makes use of certain elements defined in CEN ISO/TS 19091: "Intelligent transport systems—Cooperative ITS—Using V2I and I2V communications for applications related to signalized intersections" ("[CEN19091]").

As shown by FIGS. 10a and 10b, the VAM comprises an ITS PDU Header, Generation Delta Time, Basic Container, High Frequency (HF) Container, Low Frequency (LF) container, Cluster Information Container, Cluster Information Container, Cluster Operation Container and Motion Prediction Container. Note that any special container for VRU Profile 3 is not present in the existing VAM format.

ITS PDU header. The ITS PDU header is a common header that includes information of the protocol version, message type, and the ITS-S ID of the originating ITS-S. The ITS PDU header is included as specified in [TS102894-2] and annex B of [TS103300-3]. The StationId field in the ITS PDU Header changes when the signing pseudonym certificate changes, or when the VRU starts to transmit individual VAMs after being a member of a cluster (e.g., either when, as leader, it breaks up the cluster, or when, as any cluster member, it leaves the cluster). If the VRU device experiences a "failed join" of a cluster as defined in clause 5.4.2.1 of [TS103300-3], it should continue to use the StationId and other identifiers that it used before the failed join.

The generation time in the VAM is a GenerationDeltaTime as used in CAMs. This is a measure of the number of milliseconds elapsed since the ITS epoch, modulo $2^{16}$ (e.g., 65536).

The basic container provides basic information of the originating ITS-S including a type of the originating ITS-S in the type DE and a position of the station in the station DE. The type DE somehow overlaps with the VRU profile, even though they do not fully match (e.g., moped(3) and motorcycle(4) both correspond to a VRU profile 3). To enable a future possibility to have the VAM transmitted by non VRU ITS-S (see e.g., [TS103300-3] clause 4.1 and annex I), both data elements are kept independent. The position in the position DE may be the latest geographic position of the originating ITS-S as obtained by the VBS at the VAM generation. As a reminder, this DF is already defined in [TS102894-2] and includes a positionConfidenceEllipse which provides the accuracy of the measured position with the 95% confidence level. The basic container is present for a VAM generated by all ITS-Ss implementing the VBS.

The VAMs generated by a VRU ITS-S include at least a VRU high frequency (VRU 1F) container. The VRU HF container contains potentially fast-changing status information of the VRU ITS-S such as heading or speed. In [TS103300-3], since the VAM is not used by VRUs from profile 3 (motorcyclist), none of these containers apply to VRUs profile 3. VRUs profile 3 only transmit the motorcycle special container with the CAM (see e.g., [TS103300-3] clause 7.4).

The VRU high frequency (HF) container of the VAM contains potentially fast-changing status information of the VRU ITS-S. It includes the parameters listed in annex B.3.1 of [TS103300-3]. The VRU profile is included in the VRU LF container and so is not transmitted as often as the VRU HF container. However, the VRU profile may be deduced from the StationType field: pedestrian indicates profile 1, bicyclist indicates profile 2, and moped or motorcycle indicates profile 3.

The DF used to describe the lane position in CAM is not sufficient when considering VRUs, as it does not include bicycle paths and sidewalks. Accordingly, it has been extended to cover all positions where a VRU could be located. When present, the vruLanePosition DF either describes a lane on the road (same as for a vehicle), a lane off the road or an island between two lanes of the previous types. Further details are provided in the DF definition, in clause B.3.X of [TS103300-3].

The VruOrientation DF complements the dimensions of the VRU vehicle by defining the angle between the VRU vehicle longitudinal axis and the lane longitudinal axis. It is restricted to VRUs from profile 2 (bicyclist) and profile 3 (motorcyclist). When present, it is as defined in clause B.3.X of [TS103300-3]. The RollAngle DF provides an indication of a cornering two-wheeler.

The DE vruDeviceUsage provides indications to the VAM receiver about a parallel activity of the VRU. It is restricted to VRUs from profile 1, e.g., pedestrians. When present, it is as defined in clause B.3.X and will provide the possible values given in Table 9. To respect the user's choice for privacy, the device configuration application should include a consent form for transmitting this information. How this consent form is implemented is out of scope of the present document. In the case the option is opted-out (default), the device systematically sends the value "unavailable(0)".

TABLE 9 vruDeviceUsage possible values

| Activity definition | Value | Description |
| --- | --- | --- |
| unavailable | 0 | Not determined or VRU did not consent to transmission of this personal data in this DE |
| other | 1 | Used for states other than defined below |
| idle | 2 | Human is not interacting with device |
| listeningToAudio | 3 | Any audio source other than calling |
| typing | 4 | Including texting, entering addresses and other manual input activity |
| calling | 5 | |
| playingGames | 6 | |
| reading | 7 | |
| viewing | 8 | Watching dynamic content, including following navigation prompts, viewing videos or other visual contents that are not static |

The VRU low frequency (VRU LF) container. The VRU LF container contains static or slow-changing vehicle data like the profile or the status of the exterior lights. The VRU LF container of the VAM contains potential slow-changing information of the VRU ITS-S. It includes the parameters listed in B.4. Some DE are mandatory others are optional or optional mandatory. The VRU LF container is included into the VAM with a parameterizable frequency.

The DE VRUProfile contains the identification of the profile of the originating VRU ITS-S. The DE VRUProfile is an enumerated value and takes one of the five possible values: Unavailable (0); Pedestrian (1); Bicyclist (2); Motorcyclist (3); Animals (4).

The DE VRUSubProfile contains the identification of the sub-profile of the originating VRU ITS-S if defined (see Table 10).

TABLE 10

VruSubProfile description based on profiles

| Profile | Profile Value | SubProfile Value | VruSubProfile description |
| --- | --- | --- | --- |
| Pedestrian | 1 | 0 | Unavailable |
| | | 1 | default |
| | | 2 | Ordinary Pedestrian |
| | | 3 | Road workers |
| | | 4 | First responder |
| | | ... | |
| | | N | TBD |
| Bicyclist | 2 | 0 | Unavailable |
| | | 1 | default |
| | | 2 | Bicyclist |
| | | 3 | Wheelchair User |
| | | 4 | Horse and rider |
| | | 5 | Rollerskater |
| | | 6 | E-Scooter |
| | | 7 | Personal Transporter |
| | | 8 | E-Bicyclist (Pedelec), up to 25 km/h in Europe |
| | | 9 | E-Cyclist (Speed-Pedelec), up to 45 km/h but with a motion dynamic similar to a bicycle |
| | | ... | |
| | | N | TBD |

TABLE 10-continued

VruSubProfile description based on profiles

| Profile | Profile Value | SubProfile Value | VruSubProfile description |
|---|---|---|---|
| Motorcyclist | 3 | 0 | Unavailable |
| | | 1 | default |
| | | 2 | Moped |
| | | 3 | Motorcycle |
| | | 4 | Motorcycle + Sidecar right |
| | | 5 | Motorcycle + Sidecar left |
| | | ... | |
| | | N | TBD |
| Animals | 4 | 0 | Unavailable |
| | | 1 | default |
| | | ... | |
| | | N | TBD |

The DE VRUSizeClass contains information of the size of the VRU. The DE VruSizeClass depends on the VRU profile. This dependency is shown by Table 11.

TABLE 11

VruSizeClass description based on profiles

| Profile | Profile Value | VruSizeClass Value | VruSizeClass description |
|---|---|---|---|
| Unavailable | 0 | 0 | N/A |
| Pedestrian | 1 | 0 | Unavailable |
| | | 1 | N/A |
| | | 2 | N/A |
| | | 3 | N/A |
| Bicyclist | 2 | 0 | Unavailable |
| | | 1 | low → example: scooter, |
| | | 2 | medium → example: bicycle |
| | | 3 | high → example: VRU on horse |
| Motorcyclist | 3 | 0 | Unavailable |
| | | 1 | low → example: mopeds |
| | | 2 | medium → example: motorcycles up to 125 ccm or 11 kW |
| | | 3 | high → example: motorcycles over 125 ccm or 11 kW |
| Animals | 4 | 0 | Unavailable |
| | | 1 | low → example: cats, dogs |
| | | 2 | medium → example: sheep, antelopes, kangaroos |
| | | 3 | high → example: elks, elephants, cows, horse |

The DE VruExteriorLight gives the status of the most important exterior lights switches of the VRU ITS-S that originates the VAM.

The VRU cluster containers of the VAM contain the cluster information and/or operations related to the VRU clusters of the VRU ITS-S. The VRU cluster containers are made of two types of cluster containers according to the characteristics of data/parameters included in.

The VRU Cluster Information Container provides the information/parameters relevant to a VRU cluster. A VRU cluster information container is added to a VAM originated from the VRU cluster leader. This container provides the information/parameters relevant to the VRU cluster. VRU cluster information container is of type VruClusterInformationContainer.

VRU cluster information container comprises information about the cluster ID, shape of the cluster bounding box, size of cluster and profiles of VRUs in the cluster. Cluster ID is of type ClusterID. ClusterID includes Station ID of the cluster leader. The shape of the VRU cluster bounding box is specified by DF ClusterBoundingBoxShape. The shape of the cluster bounding box can be rectangular, circular or polygon.

The VRU Cluster Operation Container: This container provides information relevant to change of cluster state. It may be included by a cluster VAM transmitter or by a cluster member (leader or ordinary member). VRU cluster operation container contains information relevant to change of cluster state and composition. This container may be included by a cluster VAM transmitter or by a cluster member (leader or ordinary member). A cluster leader includes VRU cluster operation container for performing cluster operations of disbanding (breaking up) cluster. A cluster member includes VRU cluster operation container in its individual VAM to perform cluster operations of joining a VRU cluster and leaving a VRU cluster.

VRU cluster operation container is of type VruClusterOperationContainer. VruClusterOperationContainer provides: DF clusterJoinInfo for cluster operation of joining a VRU cluster by a new member; DF clusterLeaveInfo for an existing cluster member to leave a VRU cluster; DF clusterBreakupInfo to perform cluster operations of disbanding (breaking up) cluster respectively by the cluster leader; and/or DF clusterIdChangeInfo to indicate that the cluster leader is planning to change the cluster ID.

The VruClusterOperationContainer doesn't include the creation of VRU cluster by the cluster leader. When the cluster leader starts to send a cluster VAM, it indicates that the cluster leader starts to create the VRU cluster. While the cluster leader is sending a cluster VAM, any individual VRUs can join the cluster if the joining condition is met.

The VRU Motion Prediction Container provides dynamic VRU motion prediction information as well as explicit path prediction when the information is available in the VRU ITS-S. The VRU Motion Prediction Container carries the past and future motion state information of the VRU. Details of the (sub)containers of the Motion Prediction Container shown by FIG. 10a are discussed in detail infra and/or supra in section 2.

In the example of FIG. 10b, the VRU Motion Prediction Container of type VruMotionPredictionContainer contains information about the past locations of the VRU of type PathHistory, predicted future locations of the VRU (formatted as PathHistory), safe distance indication between VRU and other road users/objects of type VruSafeDistance, VRU's possible trajectory interception with another VRU/object is of type VruTrajectoryInterceptionIndication, the change in the acceleration of the VRU is of type AccelerationChangeIndication, the heading changes of the VRU is of HeadingChangeIndication, and changes in the stability of the VRU is of type StabilityChangeIndication.

The VruMotionPredictionContainer, the underlying DFs and DEs, and details of encoding and generation of the motion prediction container are discussed in more detail infra. The DFs and DEs within the motion prediction container of type VruMotionPredictionContainer are as follows The Path History DF is of PathHistory type. The PathHistory DF comprises the VRU's recent movement over past time and/or distance. It may include up to 40 past path points. When a VRU leaves a cluster and wants to transmit its past locations in the VAM, the VRU may use the PathHisrtory DF. The Path Prediction DF is of PathHistory type and defines a set of future path points of the VRU. It contains future path information for up to [10] seconds or up to [40] path points.

The Safe Distance Indication is of type VruSafeDistance and provides an indication of whether the VRU is at a safe distance laterally, longitudinally and vertically from up to 8 other stations in its vicinity. The simultaneous comparisons between Lateral Distance (LaD), Longitudinal Distance (LoD) and Vertical Distance (VD) and their respective thresholds, Minimum Safe Lateral Distance (MSLaD), Minimum Safe Longitudinal Distance (MSLoD), and Minimum Safe Vertical Distance (MSVD) as defined in clause 6.5.10.5 in [TS103300-2], is used for setting the SafeDistanceIndication DE. Other ITS stations are indicated as StationID DE within the VruMinimumDistanceIndication DF of VruSafeDistance container. The time to collision (TTC) DE within the container reflects the estimated time taken for collision based on the latest onboard sensor measurements and VAMs.

The TrajectoryInterceptionIndication DF contains ego-VRU's possible trajectory interception with up to 8 other stations in the vicinity of the ego-VRU. The trajectory interception is indicated by TrajectoryInterception DE and stations are designated by StationID DE.

The trajectory Interception Indication (TII) DF corresponds to the TII definition in [TS103300-2].

The AccelerationChangeIndication DF contains ego-VRU's change in acceleration (acceleration or deceleration) for a time period. The DE AccelOrDecel gives the choice between acceleration and deceleration. The DE ActionDeltaTime indicates the time duration.

The HeadingChangeIndication DF contains ego-VRU's change in heading (left or right) for a time period. The DE LeftOrRight gives the choice between heading change in left and right directions. The DE ActionDeltaTime indicates the time duration.

The StabilityChangeIndication DF contains ego-VRU's change in stability for a time period. The DE StabilityLossProbability gives the probability indication of the stability loss of the ego-VRU. The DE ActionDeltaTime indicates the time duration.

Some implementations include a special container for VRU Profile 3 (motorcyclist). ITS stations in VRUs profile 3 devices (motorcyclist) already transmit the CAM. Accordingly, as specified in [TS103300-2] and in clause 5 of [TS103300-3], VRUs of VRU profile 3 do not transmit the full VAM but may transmit a VRU special vehicle container in the CAM they already transmit. When relevant, this requirement also applies in case of a combined VRU (see clause 5.4.2 of [TS103300-3]) made of one VRU Profile 3 (motorcycle) and one or more VRU Profile 1 (pedestrian(s)). This special vehicle container notifies to surrounding vehicles that the V-ITS-S 110 is hosted by a VRU Profile 3 device and to provide additional indications about the VRU.

Figure 11:
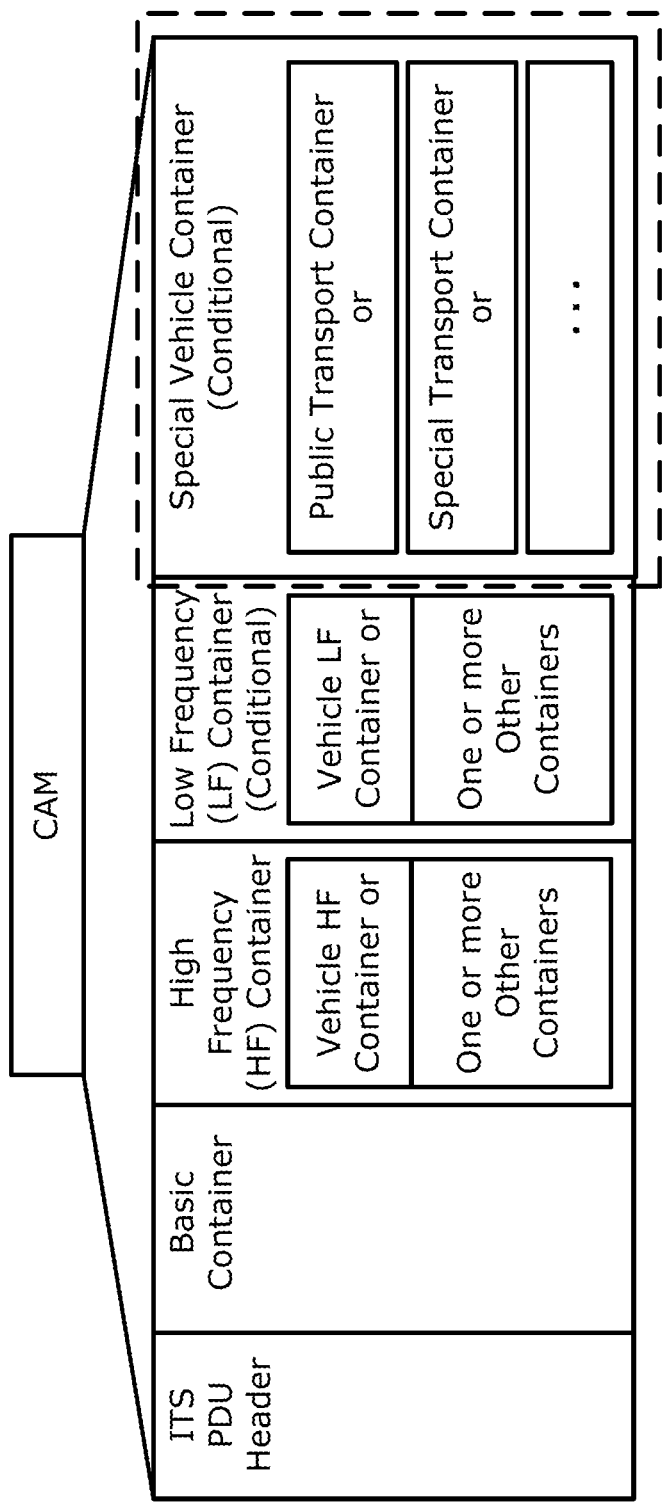
FIG. 11 illustrates a CAM structure.

FIG. 11 depicts a structure of a CAM [EN302637-2]. The CAM may include an ITS PDU Header and Basic Container that may be the same or similar as the ITS PDU Header and Basic Container of the VAM as discussed previously.

The CAM generated by a vehicle ITS-S (V-ITS-S) also includes a high frequency vehicle (Vehicle HF) container, and a low frequency vehicle (Vehicle LF) container. The Vehicle HF container contains all fast-changing (dynamic) status information of the vehicle ITS-S such as heading or speed. The Vehicle LF container contains static or slow-changing vehicle data like the status of the exterior lights.

V-ITS-Ss 110 which have a specific role in road traffic such as public transport shall provide further status information in special vehicle containers according to the specification in annex A. The vehicle role is indicated by the data element {CAM.cam.basicVehicleContainerLowFrequency.vehicleRole} as specified in annex A of [EN302637-2]. Table 5 of [EN302637-2] shows the list of specified vehicle roles and the related special vehicle container.

Table 5 of [EN302637-2]: Special vehicle container according to the vehicle role

| Vehicle role description | CAM data requirement Value of {CAM.cam.basicVehicleContainer LowFrequency.vehicleRole} shall be set to | Special vehicle container represented as |
|---|---|---|
| public transport when the originating ITS-S is a public transport vehicle in operation | publicTransport(1) | public transport container, {CAM.cam. specialVehicleContainer. publicTransportContainer} |

Table 5 of [EN302637-2]: Special vehicle container according to the vehicle role

| Vehicle role description | CAM data requirement Value of {CAM.cam.basicVehicleContainer LowFrequency.vehicleRole} shall be set to | Special vehicle container represented as |
|---|---|---|
| special transport when the originating ITS-S is a special transport vehicle in operation, e.g., heavy load | specialTransport(2) | special transport container, {CAM.cam. specialVehicleContainer. specialTransportContainer} |
| dangerous goods when the originating ITS-S is transporting dangerous goods | dangerousGoods(3) | dangerous goods container, {CAM.cam. specialVehicleContainer. dangerousGoodsContainer} |
| road work when the originating ITS-S is operating road work tasks | roadWork(4) | road work container, {CAM.cam.specialVehicleContainer.roadWorksContainer} |
| Rescue vehicle in operation without any privileges in the road traffic, e.g., a towing truck | rescue(5) | rescue container, {CAM.cam. specialVehicleContainer. rescueContainer} |
| Emergency vehicle in operation with privileges regarding road traffic rules such as crossing an intersection when the traffic light is red or exceeding speed limits. Examples are police, fire brigade or ambulance vehicles | emergency(6) | emergency container, represented as {CAM.cam. specialVehicleContainer.emergencyContainer} |
| Safety vehicle in operation, e.g., a vehicle accompanying a special transport vehicle in order to avoid accidents with following vehicles | safetyCar(7) | Safety car container, represented as {CAM.cam. specialVehicleContainer. safetyCarContainer} |

The umbrella container discussed herein may be included in the section highlighted in red in FIG. 11. Note that special container for VRU Profile 3 is not present in the existing CAM format.

3.2. Special Vehicle Container for VRU Profile 3 for CAMs

Figure 12:
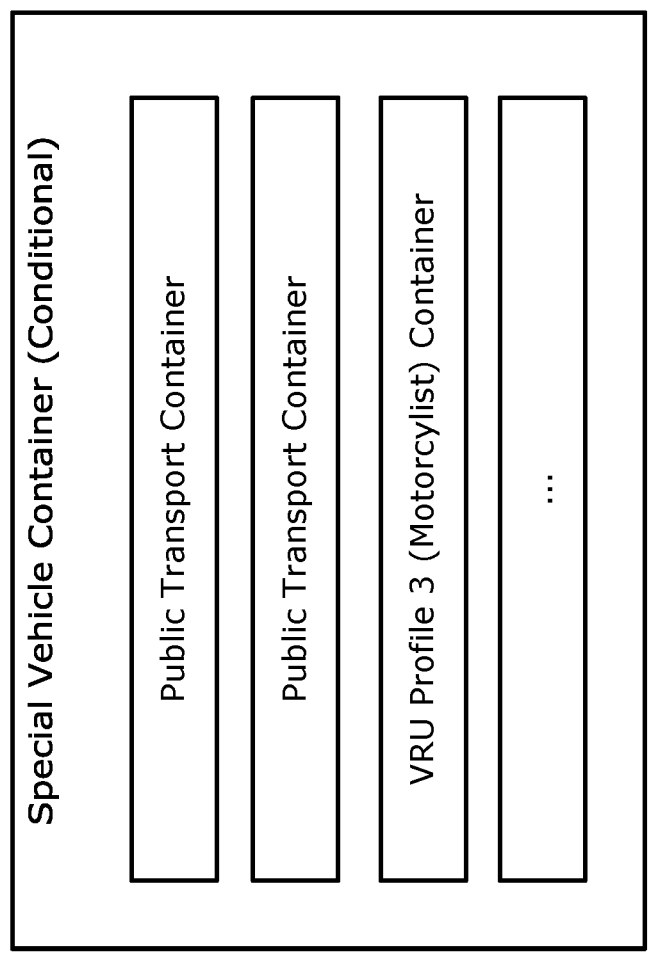

FIG. 12 depicts a VRU Profile 3 (Motorcyclist) Special Vehicle Container within Special Vehicle Container. The VRU Profile 3 of FIG. b3 may be included in the CAM structure, within the Special Vehicle Container in FIG. 11, which would automatically encompass the underlying categories of Profile 3 to be included.

Accordingly, Table 5 of [EN302637-2] is updated to include the VRU Profile 3 Special Vehicle container entry as depicted below in Table 12.

TABLE 12

Special vehicle container according to the vehicle role with update

| Vehicle role description | CAM data requirement Value of {CAM.cam.basicVehicleContainer LowFrequency.vehicleRole} shall be set to | Special vehicle container represented as |
|---|---|---|
| public transport when the originating ITS-S is a public transport vehicle in operation | publicTransport(1) | public transport container, {CAM.cam. specialVehicleContainer. publicTransportContainer} |
| special transport when the originating ITS-S is a special transport vehicle in operation, e.g., heavy load | specialTransport(2) | special transport container, {CAM.cam. specialVehicleContainer. specialTransportContainer} |
| dangerous goods when the originating ITS-S is transporting dangerous goods | dangerousGoods(3) | dangerous goods container, {CAM.cam. specialVehicleContainer. dangerousGoodsContainer} |
| road work when the originating ITS-S is operating road work tasks | roadWork(4) | road work container, {CAM.cam.specialVehicleContainer.roadWorksContainer} |
| Rescue vehicle in operation without any privileges in the road traffic, e.g., a towing truck | rescue(5) | rescue container, {CAM.cam. specialVehicleContainer. rescueContainer} |
| Emergency vehicle in operation with privileges regarding road traffic rules such as crossing an intersection when the traffic light is red or exceeding speed limits. Examples are police, fire brigade or ambulance vehicles | emergency(6) | emergency container, represented as {CAM.cam. specialVehicleContainer.emergencyContainer} |

TABLE 12-continued

Special vehicle container according to the vehicle role with update

| Vehicle role description | CAM data requirement Value of {CAM.cam.basicVehicleContainer LowFrequency.vehicleRole} shall be set to | Special vehicle container represented as |
|---|---|---|
| Safety vehicle in operation, e.g., a vehicle accompanying a special transport vehicle in order to avoid accidents with following vehicles | safetyCar(7) | Safety car container, represented as {CAM.cam. specialVehicleContainer. safetyCarContainer} |
| Vulnerable Road User Profile 3 or VRU Motorcyclist | vruProfile3(8) or vruMotorcyclist(8) | VRU Profile 3 or VRU Motorcyclist container, represented as {CAM.cam.specialVehicleContainer.vruProfile3Container} or {CAM.cam.specialVehicleContainer.vruMotorcyclistContainer} |

3.3. DFs/DEs for VRU Profile 3 (Motorcyclist) Special Vehicle

The structure, DFs and DEs are proposed as shown in FIG. 13. Note that the ASN.1 representation for CAM (discussed infra) containers/DFs/DEs elaborates the detailed construction and sequence and thus those are omitted from this section for brevity.

3.3.1. VRU Profile 3 Physical Information Container

The DEs within the Physical Information container are imported from VAM and explained as follows. The notation variable_name(number) refers to the corresponding event of occurrence captured by "variable_name" along with the indication number captured by "number." For instance, in case of Profile, an obvious example is that the "Profile" DE will always be "Profile3" which corresponds to the DE value "1". This notation applies to all similar notation used henceforth to describe the DEs.

(1) Profile: for indicating Profile 3 VRU type and is one of: {unavailable (0), Profile3 (1)}; (2) Sub-profile: with indication options among one of: {unavailable (0), moped (1), motorcycle (2), sidecar (3)}; (3) Size class: with indication options among one of: {unavailable (0), low (1), medium (2), high (3)}; (4) Weight class: with indication options among one of: {unavailable (0), small (1), medium (2), large (3)}.

3.3.2. VRU Profile 3 Dynamic Container

The DEs within the Physical Information container (see e.g., FIG. 10a) are as follows:

Motion Prediction Container: This container is imported from VAM as it is along with the four underlying DFs/DEs as shown in FIG. 1 with the details defined in [TS103300-3], including (a) Safe Distance; (b) Past Locations; (c) Prediction Locations; and/or (d) Motion Change Indication including three underlying DFs: (i) Trajectory Interception Indication (TII); (ii) Maneuvering Indication (MI); and (iii) Stability Change Indication (SCI).

Emergency Electronic Brake Light (EEBL) Indication: to indicate if the motorcycle brake pedal is pressed abruptly for the emergency electronic brake light to turn on. For example, to illustrate the concept, this DE may take on one of the values based on sensors on the brake pedal: {unavailable (0), eeblON (1), eeblOFF (2)}. In some cases, the formal description of the EEBL can be captured via VruExteriorLights as presented in the ASN.1 representation in section 6.7 below by importing the corresponding DE from [TS103300-3].

3.3.3. Rider Status Container with new DEs

FIG. 13 shows an example VRU Profile 3 Container contents within the CAM Special Vehicle Container. In this container, the following new DEs are included:

Number of riders: to capture the number of VRUs carried by the motorcycle with one of the following values: {single (0), pillion (1)}.

Personal ITS-S status: One of the following possibilities exists: {unavailable (0), ITS-S equipped (1), unequipped (2), unreachable/switched-off/out-of-coverage (3)}. This information is useful to decide whether there is possibility the rider to communicate directly with its ITS-S or if it relies on the motorcycle being equipped with ITS-S. If the rider is equipped with an ITS-S, it may help provide additional sensor information related to the specific rider (e.g., orientation).

Head Orientation: described formally by yawRate [TS102894-2] possible to be reported from measurements using a camera sensor located on the windshield or dashboard or helmet of the VRU rider construction details are defined per ASN.1 representation in [TS102894-2].

Hands On/Off handle: which takes on one of the following values. The notation variable_name(number) refers to the corresponding event of occurrence captured by "variable_name" along with the indication number captured by "number.". For instance, if the rider has his/her left hand off, then the Hands On/Off handle DE would be set to the value 1. This notation applies to all similar notation used henceforth to describe the DEs: {unavailable (0), leftHandOff (1), rightHandOff (2), bothHandsOff (3)}. Such information possible to be extracted from measurements using touch sensors on the handle or cameras on the dashboard/windshield.

Rider On/Off seat: takes on one of the values: {unavailable (0), onSeat (1), offSeat (2)}, possible to be reported from proximity or touch sensors on the seat or cameras on the dashboard/windshield.

Feet on/off pegs: takes on one of the values: {unavailable (0), leftFeetOff (1), rightFeetOff (2), bothFeetOff (3)}, possible to be reported from proximity or touch sensors on the seat or cameras on the dashboard/windshield.

Turn Indication (non-electronic or physical indication or emergency indication): This indication is a special indication when the rider physically extends his/her arm out to gesture the intention to turn left or right. When such motion happens, the camera sensor on the motorcycle windshield or dashboard needs to be able to capture the gesture and corresponding set this DEs value. It takes on one of the following values: {unavailable (0), leftTurnGesture (1), rightTurnGesture (2), stopGesture (3)}.

3.4. Special Container Extension for VRU Profile 3 for VAM

Figure 14:
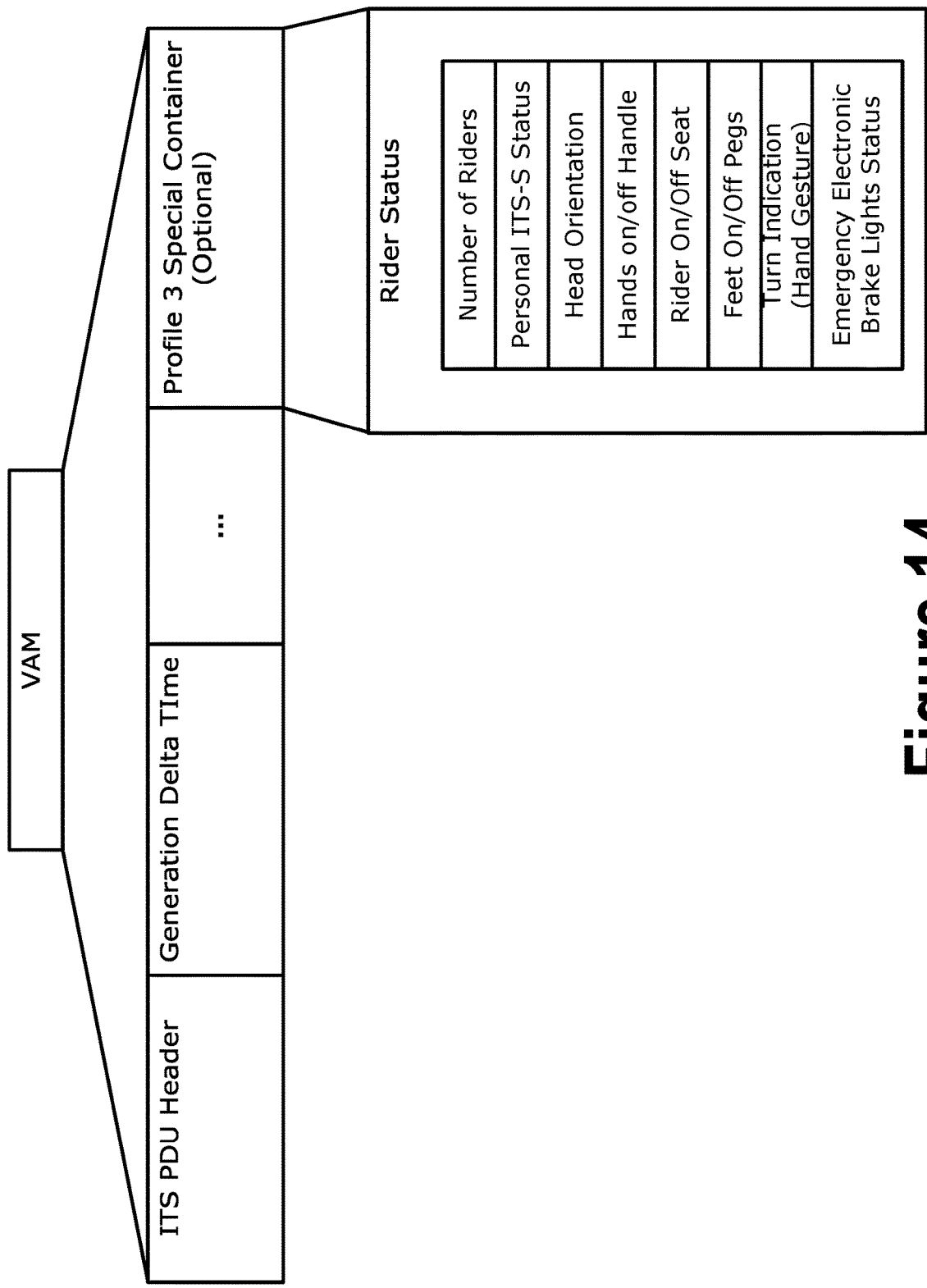

VRU Profile 3 Special Container with new DEs. FIG. 14 depicts an example VRU Profile 3 (Motorcyclist) Special Vehicle Container Proposal within VAM. A VAM includes the VRU Profile 3 Special Container comprising of the Rider Status Container accompanied by the new DEs as shown in FIG. 14. The DFs/DEs within the container of FIG. 14 may be the same or similar to those discussed previously. Note that in case of VAM, all DEs except the Emergency Electronic Brake Light (EEBL) Status are new.

3.5. Example Implementations of VRU Special Vehicle Related CAM Extensions

Table 13 shows an example ASN.1 based implementation specification of the CA extensions for VRU special vehicles are presented below. Portions of ASN.1 relevant to the example extensions and details are imported from Annex A of [EN302637-2].

TABLE 13

```
CAM-PDU-Descriptions {
itu-t (0) identified-organization (4) etsi (0) itsDomain (5) wg1 (1) en (302637) cam (2)
version (2)
}
DEFINITIONS AUTOMATIC TAGS ::=
BEGIN
IMPORTS
ItsPduHeader, CauseCode, ReferencePosition, AccelerationControl, Curvature,
CurvatureCalculationMode, Heading, LanePosition, EmergencyPriority, EmbarkationStatus,
Speed, DriveDirection, LongitudinalAcceleration, LateralAcceleration, VerticalAcceleration,
StationType, ExteriorLights, DangerousGoodsBasic, SpecialTransportType, LightBarSirenInUse,
VehicleRole, VehicleLength, VehicleWidth, PathHistory, RoadworksSubCauseCode, ClosedLanes,
TrafficRule, SpeedLimit, SteeringWheelAngle, PerformanceClass, YawRate,
ProtectedCommunicationZone, PtActivation, Latitude, Longitude,
ProtectedCommunicationZonesRSU, CenDsrcTollingZone, YawRate, FROM ITS-Container {
itu-t (0) identified-organization (4) etsi (0) itsDomain (5) wg1 (1) ts (102894) cdd (2)
version (2)
};
VruProfile, VruSubProfile, VruSizeClass, VruWeightClass, VruExteriorLights,
VruMotionPredictionContainer, FROM ITS-Container {
itu-t (0) identified-organization (4) etsi (0) itsDomain (5) wg1 (1) ts (103300-3) vru (3)
version (2)
};
-- The root data frame for cooperative awareness messages
CAM ::= SEQUENCE {
    header ItsPduHeader,
    cam CoopAwareness
}
CoopAwareness ::= SEQUENCE {
    generationDeltaTime GenerationDeltaTime,
    camParameters CamParameters
}
CamParameters ::= SEQUENCE {
    basicContainer BasicContainer,
    highFrequencyContainer HighFrequencyContainer,
    lowFrequencyContainer LowFrequencyContainer OPTIONAL,
    specialVehicleContainer SpecialVehicleContainer OPTIONAL,
    ...
}
HighFrequencyContainer ::= CHOICE {
    basicVehicleContainerHighFrequency BasicVehicleContainerHighFrequency,
    rsuContainerHighFrequency RSUContainerHighFrequency,
    ...
}
LowFrequencyContainer ::= CHOICE {
    basicVehicleContainerLowFrequency ,         BasicVehicleContainerLowFrequency
    ...
}
SpecialVehicleContainer ::= CHOICE {
    publicTransportContainer           PublicTransportContainer,
    specialTransportContainer          SpecialTransportContainer,
    dangerousGoodsContainer            DangerousGoodsContainer,
    roadWorksContainerBasic            RoadWorksContainerBasic,
    rescueContainer                    RescueContainer,
    emergencyContainer                 EmergencyContainer,
    safetyCarContainer                 SafetyCarContainer,
    vruMotorcyclistContainer           VruMotorcyclistContainer,
    ...
}
BasicVehicleContainerLowFrequency ::= SEQUENCE {
    vehicleRole VehicleRole,
    exteriorLights ExteriorLights,
    pathHistory PathHistory,
}
-- proposed vruMotorcyclist role choice within VehicleRole defined in TS 102-894
VehicleRole ::= ENUMERATED {default(0), publicTransport(1),
specialTransport(2), dangerousGoods(3), roadwork(4), rescue(5),
```

TABLE 13-continued

```
emergency(6), safetyCar(7), agriculture(8), commercial(9),
military(10), roadOperator(11), taxi(12), vruMotorcyclist(13), reserved2(14),
reserved3(15)}
VruMotorcyclistContainer ::= SEQUENCE {
    vruMotorcyclePhysicalInfoContainer          VruMotorcyclePhysicalInfoContainer,
    vruMotorcycleDynamicContainer               VruMotorcycleDynamicContainer,
    vruRiderStatusContainer                     VruRiderStatusContainer,
}
VruMotorcyclePhysicalInfoContainer ::= SEQUENCE {
    vruProfile          VruProfile,           -- imported from TS 103 300-3
    vruSubProfile       VruSubProfile,        -- imported from TS 103 300-3
    vruSizeClass        VruSizeClass,         -- imported from TS 103 300-3
    vruWeightClass      VruWeightClass        -- imported from TS 103 300-3
}
VruMotorcycleDynamicContainer ::= SEQUENCE {
    vruMotionPredictionContainer VruMotionPredictionContainer, -- imported from TS 103 300-3
    vruEmergencyElectronicBrakeLight           VruExteriorLights, -- imported from TS 103 300-3
}
VruRiderStatusContainer :: = SEQUENCE {
    vruNumRiders        NumberOfOccupants,    -- imported from ITS-Container.asn defined in
    -- TS 102 894
    vruRiderItssStatus VruRiderItssStatus,
    vruHeadOrientation  YawRate, -- imported from ITS-Container.asn defined in TS 102 894
    vruHandsStatus      VruHandsStatus,
    vruRiderOnOffSeat   VruRiderOnOffSeat,
    vruFeetOnOffPegs    VruFeetOnOffPegs,
    vruTurnPhysicalIndication VruTurnPhysicalIndication,
}
VruRiderItssStatus ::= BOOLEAN, -- FALSE: ITS-S unequipped rider, TRUE: ITS-S equipped rider
VruHandsStatus ::= ENUMERATED {
    unavailable(0), leftHandOff(2), rightHandOff3) , bothHandsOff(4)
}
VruOnOffSeat ::= ENUMERATED {
    unavailable(0), onSeat(1), offSeat(2)
}
VruFeetOnOffPegs ::= ENUMERATED {
    unavailable(0), leftFeetOff(1), rightFeetOff(2), bothFeetOff(3)
}
VruTurnPhysicalIndication ::= ENUMERATED {
    unavailable(0), leftTurnGesture(2), rightTurnGesture(3), stopGesture(4)
}
...
```

3.6. Example Implementations of VRU Special Vehicle Related VAM Extensions

Table 14 shows an example ASN.1 based implementation specification of the VAM extensions for VRU Profile 3 are presented below. Portions of ASN.1 relevant to the example extensions and details are imported from Annex A of [TS103300-3].

TABLE 14

```
VAM-PDU-Descriptions {itu-t(0) identified-organization(4) etsi(0) itsDomain(5)
    wg1(1) ts(103300) vam(3) version(1)}
DEFINITIONS AUTOMATIC TAGS ::=
BEGIN
    IMPORTS
        ItsPduHeader, CauseCode, ReferencePosition, AccelerationControl,
            Curvature, CurvatureCalculationMode, Heading, HeadingValue, LanePosition,
            EmergencyPriority, EmbarkationStatus, Speed, DriveDirection,
            LongitudinalAcceleration, LateralAcceleration, StationID,
            VerticalAcceleration, StationType, ExteriorLights,
            DangerousGoodsBasic, SpecialTransportType, LightBarSirenInUse,
            VehicleRole, VehicleLength, VehicleWidth, PathHistory,
            RoadworksSubCauseCode, ClosedLanes, TrafficRule, SpeedLimit,
            SteeringWheelAngle, PerformanceClass, YawRate,
            ProtectedCommunicationZone, PtActivation, Latitude, Longitude,
            ProtectedCommunicationZonesRSU, CenDsrcTollingZone
        FROM ITS-Container {itu-t(0) identified-organization(4) etsi(0)
            itsDomain(5) wg1(1) ts(102894) cdd(2) version(2)}
```

TABLE 14-continued

```
GenerationDeltaTime
FROM CAM-PDU-Descriptions {itu-t(0) identified-organization(4) etsi(0)
   itsDomain(5) wg1(1) en(302637) cam(2) version(2)}
AreaCircular, AreaRectangle, AreaPolygon
FROM CPM-CommonDataTypes -Descriptions {
   itu-t (0) identified-organization (4) etsi (0) itsDomain (5) wg1(1)
   ts (103324) commonDataTypes (2) version1 (1) }
;
VAM ::= SEQUENCE {
   header ItsPduHeaderVam,
   vam    VruAwareness
}
VAM ::= SEQUENCE {
   header   ItsPduHeaderVam,
   vam    VruAwareness
}
-- contains StationID
-- StationID should change when certificate changes, or when VRU
-- enters or leaves a cluster (as leader or otherwise)
ItsPduHeaderVam ::= ItsPduHeader (WITH COMPONENTS {
      ...,
      messageID(vam)
})
VruAwareness ::= SEQUENCE {
   generationDeltaTime GenerationDeltaTime,
   vamParameters      VamParameters
}
VamParameters ::= SEQUENCE {
   basicContainer        BasicContainer,
      vruHighFrequencyContainer   VruHighFrequencyContainer OPTIONAL,
      vruLowFrequencyContainer   VruLowFrequencyContainer OPTIONAL,
      vruClusterInformationContainer   VruClusterInformationContainer OPTIONAL,
      vruClusterOperationContainer   VruClusterOperationContainer OPTIONAL,
   vruMotionPredictionContainer   VruMotionPredictionContainer OPTIONAL,
      vruMotorcyclistContainer       VruMotorcyclistContainer, OPTIONAL,
   ...
}
   VruMotorcyclistContainer ::= SEQUENCE {
      vruRiderStatusContainer        VruRiderStatusContainer
   }
   VruRiderStatusContainer ::= SEQUENCE {
      vruNumRiders      NumberOfOccupants,   -- imported from ITS-Container.asn defined
in
      -- TS 102 894
      vruRiderItssStatus VruRiderItssStatus,
      vruHeadOrientation YawRate, -- imported from ITS-Container.asn defined in TS 102
894
      vruHandsStatus      VruHandsStatus,
      vruRiderOnOffSeat      VruRiderOnOffSeat,
      vruFeetOnOffPegs       VruFeetOnOffPegs,
      vruTurnPhysicalIndication      VruTurnPhysicalIndication,
   }
   VruTurnPhysicalIndication ::= ENUMERATED {
      unavailable(0), leftTurnGesture(2), rightTurnGesture(3), stopGesture(4)
   }
   ...
```

4. VRU Motion Prediction Container Generation and Dynamic State Triggering

The VRU Motion Prediction Container as specified in [TS103300-3] carries data on past and future motion states including past locations, predicted future locations, safe distance between VRU and other road users/objects, potential interception of VRU's trajectory with other road objects/users, change in acceleration, heading change and stability change information.

However, the encoding and generation process of the motion dynamic container is not comprehensive in [TS103300-3] including the triggering conditions and parameters associated to such triggering. On the other hand, a VRU profile may change over the course of time thus causing the VBS to enter and leave various intermediate states before the actual profile transition occurs (e.g., a pedestrian may be walking a bike as Profile 1 VRU but may start riding the bike thus transition into Profile 2). Hence, there is a need to define and formalize the triggering conditions for such intermediate states within the scope of the four VRU Basic Service (VBS) states: VRU-IDLE, VRU-ACTIVE-STANDALONE, VRU-ACTIVE-CLUSTERHEAD and VRU-PASSIVE (e.g., four states specified in Table 5 of [TS103300-3]).

To this end, the present disclosure addresses the problems above by providing the following: Encoding and generation processes with underlying rules for the motion dynamic container with the triggering conditions and new parameter generation and encoding; and VBS dynamic states-based operation rules with intermediate sub-state transitions and triggering conditions for supporting VRU profile transition awareness within the scope of the four VBS states including new parameter definitions and support for such service in the VBS (e.g., motorcycle) is equipped with an ITS-S.

4.1. Possible States of the VRU Basic Service

[TS103300-2] specifies various requirements for the C-ITS service related to VRU protection, as well as the VRU system architecture, and [TS103300-3] discusses various details of the VRU basic service (VBS) and the transmission of VRU Awareness Messages (VAMs). VAMs are messages transmitted from a VRU ITS-S ("Vru-ITS-S") to create and maintain awareness of VRUs participating in the VRU system/service.

Only VRU-ITS-S shall send VAMs, other ITS-S including infrastructure and vehicle ITS-S can use CPM to signal the identified presence of a VRU in the vicinity. These use cases are depicted in [TR103300-1]. VRU-ITS-Ss are capable of receiving CPMs in order to get the full environment awareness. Infrastructure ITS-S (e.g., R-ITS-S) and vehicular ITS-S (V-ITS-S) may also be capable of receiving VAMs. The information included in the VAM can be used to enhance the overall perception.

A VAM contains status and attribute information of an originating VRU-ITS-S (also referred to as a transmitting (Tx) VRU-ITS-S or ego VRU-ITS-S). The content may vary depending on the profile of the VRU-ITS-S. VRU Profiles are specified in [TS103300-2]. Typical status information includes time, position, motion state, cluster status, and/or the like. Typical attribute information includes data about the VRU profile, type, dimensions, and/or the like. On reception of a VAM the receiving ITS-S becomes aware of the presence, type, and status of the originating VRU-ITS-S. The received information can be used by the receiving ITS-S to support several VRU related ITS applications. For example, by comparing the status of the originating VRU-ITS-S with its own status, a receiving ITS-S is able to estimate the collision risk with the originating VRU-ITS-S and may inform the ITS-S user via the HMI.

The VRU basic service (VBS) is the facilities layer entity (see e.g., FIGS. 23-25, and INT-S architecture in [EN302665]) supporting ITS applications for the transmission and reception of the VAM message. Multiple ITS applications may rely on the VBS. It is assigned to domain application support facilities in [TS102894-1].

Besides the support of applications, the awareness of other ITS-S gained by the VRU basic service may be used in the networking & transport layer for the position dependent dissemination of messages (e.g., DENM by GeoBroadcasting as specified in ETSI EN 302 636-4-1 ("[EN302636-4-1]")). The generation and transmission of VAMs is managed by the VBS by implementing the VAM protocol.

4.1.1. VRU Clustering

The clustering operation as part of the VRU basic service is intended to optimize the resource usage in the ITS system. These resources are mainly spectrum resources and processing resources.

A huge number of VRUs in a certain area (pedestrian crossing in urban environment, large squares in urban environment, special events like large pedestrian gatherings) would lead to a significant number of individual messages sent out by the VRU ITS-S and thus a significant need for spectrum resources. Additionally, all these messages would need to be processed by the receiving ITS-S, potentially including overhead for security operations.

In order to reduce this resource usage, the present document specifies clustering functionality. A VRU cluster is a group of VRUs with a homogeneous behaviour (see e.g., [TS103300-2]), where VAMs related to the VRU cluster provide information about the entire cluster. Within a VRU cluster, VRU devices take the role of either leader (one per cluster) or member. A leader device sends VAMs containing cluster information and/or cluster operations. Member devices send VAMs containing cluster operation container to join/leave the VRU cluster. Member devices do not send VAMs containing cluster information container at any time.

A cluster may contain VRU devices of multiple profiles. A cluster is referred to as "homogeneous" if it contains devices of only one profile, and "heterogeneous" if it contains VRU devices of more than one profile (e.g. a mixed group of pedestrians and bicyclists). The VAM ClusterInformationContainer contains a field allowing the cluster container to indicate which VRU profiles are present in the cluster. Indicating heterogeneous clusters is important since it provides useful information about trajectory and behaviours prediction when the cluster is broken up.

4.1.1.1. The Support of the Clustering Function is Optional in the VBS for all VRU Profiles.

The decision to support the clustering or not is implementation dependent for all the VRU profiles. When the conditions are satisfied (see clause 5.4.2.4), the support of clustering is recommended for VRU profile 1. An implementation that supports clustering may also allow the device owner to activate it or not by configuration. This configuration is also implementation dependent. If the clustering function is supported and activated in the VRU device, and only in this case, the VRU ITS-S shall comply with the requirements specified in clause 5.4.2 and clause 7 of [TS103300-3] and as discussed intra, and define the parameters specified in clause 5.4.3 of [TS103300-3]. As a consequence, cluster parameters are grouped in two specific and conditional mandatory containers in the present document.

The basic operations to be performed as part of the VRU cluster management in the VRU basic service are: cluster identification (e.g., intra-cluster identification by cluster participants in Ad-Hoc mode); cluster creation (e.g., creation of a cluster of VRUs including VRU devices located nearby and with similar intended directions and speeds. The details of the cluster creation operation are given in clause 5.4.2.2 of [TS103300-3] and discussed infra); cluster breaking up (e.g., disbanding of the cluster when it no longer participates in the safety related traffic or the cardinality drops below a given threshold); cluster joining and leaving (e.g., intro-cluster operation, adding or deleting an individual member to an existing cluster); and/or cluster extension or shrinking (e.g., operation to increase or decrease the size (area or cardinality).

Any VRU device shall lead a maximum of one cluster. Accordingly, a cluster leader shall break up its cluster before starting to join another cluster. This requirement also applies to combined VRUs as defined in [TS103300-2] joining a different cluster (e.g. while passing a pedestrian crossing). The combined VRU may then be re-created after leaving the heterogeneous cluster as needed. For example, if a bicyclist with a VRU device, currently in a combined cluster with his bicycle which also has a VRU device, detects it could join a larger cluster, then the leader of the combined VRU breaks up the cluster and both devices each join the larger cluster separately. The possibility to include or merge VRU clusters or combined VRUs inside a VRU cluster is left for further study.

The present document specifies a simple in-band VAM signalling for the operation of VRU clustering. Further methods may be optionally defined to establish, maintain and tear up the association between devices (e.g. Bluetooth, UWB, and/or the like).

4.1.2. VBS Clustering States

Depending on its context, the VBS may be in one of the states specified by Table 16.

TABLE 16

Possible states of the VRU basic service related to cluster operation

| VBS State | Specification | Valid VRU profiles | Valid VRU types | Additional explanation |
|---|---|---|---|---|
| VRU-IDLE | The device user is not considered as a VRU | ALL | ALL | The VRU role as defined in clause 4.2 is VRU_ROLE_OFF. |
| VRU-ACTIVE-STANDALONE | VAMs or CAMs are transmitted on behalf of the VRU only. | ALL | VRU-St, VRU-Tx | In this state a VRU-ITS-S may indicate an intention to join a cluster or indicate that it has just left a cluster. |
| VRU-ACTIVE-CLUSTER-LEADER | VAMs are transmitted and include a container with specific data elements related to the cluster | VRU profile 1, VRU profile 2 | VRU-St | |
| VRU-PASSIVE | The VRU device does not transmit VAMs | ALL except VRU profile 3 | VRU-St, VRU-Tx | The VRU is member of a cluster or located in a low-risk geographical area defined in 3.1 (see FCOM03 in [TS103300-2]) |

The possible states for the VBS in case of standalone (non-clustered) and clustered modes shown by Table 16. In all VBS states, the VRU basic service in a VRU device shall remain operational. In addition to the normal VAM triggering conditions defined in clause 6 of [TS103300-3], the following events shall trigger a VBS State transition related to cluster operation. Parameters that control these events are summarized in Table 17 and Table 18. The parameters in Table 17 govern the VRU decision to create, join or leave a cluster. The parameters may be set on individual devices or system wide and may depend on external conditions or be independent of them. The parameters in Table 18 govern the messaging behaviour around joining and leaving clusters. The parameters may be set on individual devices or system wide and may depend on external conditions or be independent of them.

TABLE 17

Parameters for VRU clustering decisions (clause 5.4.2)

| Parameter | Type | Meaning | Recommended range |
|---|---|---|---|
| numCreateCluster | Integer | Number of VRU devices that a potential cluster leader anticipates will join a cluster, if one is created | [3 to 5] |
| maxClusterDistance | distance (in m) | maximum distance between the edge of the cluster and the VRU performing the evaluation. This value also restricts the size of a VRU cluster | [3 to 5] |
| maxClusterVelocityDifference | percentage | maximum speed velocity difference inside a cluster | 5% |
| maxCombinedClusterDistance | distance (in m) | maximum distance between the edge of the combined VRU cluster and the VRU performing the evaluation. This value also restricts the size of a combined VRU cluster | [1 to 2] |
| minClusterSize | Integer | minimal size of a VRU cluster. It is used to fill the clusterCardinalitySize field, just after creation and before any VRU has joined (see note 1). | 1 |
| maxClusterSize | Integer | maximal size (or number of active ITS-S) of a VRU cluster. It is used by a VRU to check whether it can join the cluster. In practice, the cluster may be larger and include non-equipped VRUs, which cannot take part in the clustering operation and be identified as such by the cluster leader. | 20 (see note 2) |
| numClusterVAMRepeat | Integer | Number of VAM repetitions with former identifiers in case of a cluster cancelled-join or a failed-join | 3 |

NOTE 1:
The minimal size of 1 for the cluster cardinality size does not mean any VRU can be its own cluster as a revision after more evaluations of clustering have been performed. VRU should comply with the criteria set in clause 5.4.2.4 before it creates a cluster. This value is set to 1 to reflect the cluster condition just after it was created and before any other VRU has had an opportunity to join.

NOTE 2:
The value given in the present document is an initial indicative value. It may be revised in a later revision after more evaluations of clustering have been performed.

TABLE 18

Cluster membership parameters

| Parameter | Type | Meaning | Recommended default value |
| --- | --- | --- | --- |
| timeClusterUniquenessThreshold | Time period | When a cluster leader selects a cluster ID, it has to be different from any cluster ID received by the cluster leader within this time | 30 seconds |
| timeClusterBreakupWarning | Time period | When a cluster leader has made the decision to end a cluster, it includes in its VAMs an indication of the forthcoming end of the cluster for this time. | 3 seconds |
| timeClusterJoinNotification | Time period | When a VRU device sending individual VAMs intends to join a cluster, it includes in its VAMs an indication of this intention for this time | 3 seconds |
| timeClusterJoinSuccess | Time period | After a VRU device joins a cluster, it waits this amount of time for the cluster VAM to reflect the fact that the VRU device has joined and leaves the cluster if not | 0.5 seconds |
| timeClusterIdChangeNotification | Time period | The time for which a cluster leader advertises that it is going to change its ID before changing it | 3 seconds |
| timeClusterIdPersist | Time period | If the cluster ID for a particular device changes, the time for which it can continue to use the old ID in a cluster leave indication | 3 seconds |
| timeClusterContinuity | Time period | If a VRU device that is a member of a cluster does not receive a cluster VAM for this period of time, it leaves the cluster | 2 seconds |
| timeClusterLeaveNotification | Time period | After a VRU device has left a cluster, it includes in its VAMs an indication of the cluster it has left for this time | 1 second |
| timeCombinedVruClusterOpportunity | Time period | The time for which an ITS-S advertises that it is offering to form a combined VRU cluster | 15 seconds |

4.1.3. Events Triggering a Transition Between VBS Clustering States

Entering VRU role: VRU-IDLE. When the VBS 2021 in VRU-IDLE determines that the VRU device user has changed its role to VRU_ROLE_ON (e.g., by exiting a bus), it shall start the transmission of VAMs, as defined in clause 4.2. A VBS 2021 executing this transition shall not belong to any cluster. Next state: VRU-ACTIVE-STANDALONE Leaving VRU role: VRU-ACTIVE-STANDALONE. When the VBS 2021 in VRU-ACTIVE-STANDALONE determines that the VRU device user has changed its role to VRU_ROLE_OFF (e.g., by entering a bus or a passenger car), it shall stop the transmission of VAMs, as defined in clause 4.2 of [TS103300-3]. A VBS 2021 executing this transition shall not belong to any cluster. Next state: VRU-IDLE.

Creating a VRU cluster Initial state: VRU-ACTIVE STANDALONE. When the VBS 2021 in VRU-ACTIVE-STANDALONE determines that it can form a cluster based on the received VAMs from other VRUs (see conditions in clause 5.4.2.4 of [TS103300-3]), it takes the following actions: 1) Generate a random cluster identifier. The identifier shall be locally unique, e.g., it shall be different from any cluster identifier in a VAM received by the VBS 2021 in the last timeClusterUniquenessThreshold time, and it shall be non-zero. The identifier does not need to be globally unique, as a cluster is a local entity and can be expected to live for a short time frame. 2) Determine an initial cluster dimension to delimit the cluster bounding box. To avoid false positives, the initial bounding box shall be set to include only the cluster leader VRU. 3) Set the size of the cluster to minClusterSize and the VRU cluster profiles field to its own VRU profile. 4) Transition to the next state, e.g., start transmitting cluster VAMs. The random selection of the cluster ID protects against the case where two cluster leaders, which select an ID simultaneously, select the same identifier. Cluster creation is different from cluster joining as defined in clause 5.4.2.4 of [TS103300-3] in that a VRU device joining a cluster gives an indication that it will join the cluster beforehand, while a VRU device creating a cluster simply switches from sending individual VAMs to sending cluster VAMs. Next state: VRU-ACTIVE-CLUSTER-LEADER Breaking up a VRU cluster: Initial state: VRU-ACTIVE-CLUSTER-LEADER. When the VBS 2021 in VRU-ACTIVE-CLUSTER-LEADER determines that it should break up the cluster, it shall include in the cluster VAMs a VRU cluster operation field indicating that it will disband the cluster with the VRU cluster's identifier and a reason to break up the VRU cluster (see clause 7.3.5 for the list of possible reasons). It shall then shortly stop sending cluster VAMs. This indication is transmitted for timeClusterBreakupWarning in consecutive VAMs. All VRU devices in the cluster shall resume sending individual VAMs (e.g., they transition to state VRU-ACTIVE-STANDALONE). Other VRUs may then attempt to form new clusters with themselves as leaders as specified above. Next state: VRU-ACTIVE-STANDALONE.

Joining a VRU cluster: Initial state: VRU-ACTIVE-STANDALONE. When a VRU device receives cluster VAMs from a cluster leader, the VBS 2021 in VRU-ACTIVE-STANDALONE shall analyse the received cluster VAMs and decide whether it should join the cluster or not (see conditions in clause 5.4.2.4 of [TS103300-3]). Joining a cluster is an optional operation. Before joining the cluster, the VRU shall include in its individual VAMs an indication that it is joining the identified cluster along with an indication of the time at which it intends to stop sending individual VAMs. It shall send these indications for a time timeClusterJoinNotification. Once the VRU has sent the appropriate number of notifications, it joins the cluster, e.g., it stops transmission and starts monitoring the cluster VAMs from the cluster leader.

Cancelled-join handling: If the VBS 2021 determines that it will not join the cluster after having started the joining operation (for example because it receives a VAM with the maximal cluster size (cardinality) maxClusterSize exceeded), it stops including the cluster join notification in its individual VAMs and includes the cluster leave notification for a time timeClusterLeaveNotification. This allows the cluster leader to track the size of its cluster.

Failed-join handling: If after ceasing to send individual VAMs the VBS 2021 determines that the cluster leader has not updated the cluster state to contain that new member (e.g., the device is not inside the bounding box information provided in the received cluster VAM from the cluster leader, or the size is not consistent with observed cluster join and leave notifications), or the cluster it intended to join does not exist anymore, the VBS 2021 leaves the cluster (e.g., it starts transmitting individual VAMs again and remain in VRU-ACTIVE-STANDALONE state). The VBS 2021 takes this action if the first cluster VAM received after timeClusterJoinSuccess passes does not account for the ego VBS 2021. When the ego VBS 2021 transmits individual VAMs after a cancelled-join or a failed-join, it: a) uses the same station ID it used before the cancelled-join or failed-join; and b) includes the cluster leave notification for a time timeClusterLeaveNotification. A VRU ITS-S that experiences a "failed join" of this type may make further attempts to join the cluster. Each attempt shall follow the process defined in this transition case. A VRU device may determine that it is within a cluster bounding box indicated by a message other than a VAM (for example a CPM). In that case, it shall follow the cluster join process described here, but shall provide the special value "0" as identifier of the cluster it joins. Next state: VRU-PASSIVE.

Leaving a VRU cluster: Initial state: VRU-PASSIVE. When a VRU in a cluster receives VAMs from the VRU cluster leader, the VBS 2021 analyzes the received VAMs and decide whether it should leave the cluster or not (see clause 5.4.2.4 of [TS103300-3]). Leaving the cluster consists of resuming to send individual VAMs. When the VRU ITS-S leaves the cluster, the VAMs that it sends after state VRU-PASSIVE ends, shall indicate that it is leaving the identified cluster with a reason why it leaves the identified cluster (see clause 7.3.5 of [TS103300-3] for the list of reasons). It shall include this indication for time timeClusterLeaveNotification. A VRU is always allowed to leave a cluster for any reason, including its own decision or any safety risk identified. After a VRU leaves a cluster and starts sending individual VAMs, it should use different identifiers (including Station ID in the VAM and pseudonym certificate) from the ones it used in individual VAMs sent before it joined the cluster. Exception, if the VRU experiences a cancelled-join or a failed-join as specified above (in "Joining a VRU cluster" transition), it should use the Station ID and other identifiers that it was using before the failed join to allow better tracking by the cluster leader of the state of the cluster for a numClusterVAMRepeat number of VAMs, and resume the pseudonymization of its Station ID afterwards. A VRU device that is in VRU-PASSIVE state and within a cluster indicated by a message other than a VAM (e.g., a CPM) may decide to resume sending the VAM because it has determined it was within the cluster indicated by the other message, but is now going to leave or has left that cluster bounding box. In that case, it shall follow the cluster leave process described here, indicating the special cluster identifier value "0". Next state: VRU-ACTIVE-STANDALONE.

Determining VRU cluster leader lost: In some cases, the VRU cluster leader may lose communication connection or fail as a node. In this case, the VBS 2021 of the cluster leader cannot send VAMs any more on behalf of the cluster. When a VBS 2021 in VRU-PASSIVE state because of clustering determines that it did not receive VAMs from the VRU cluster leader for a time timeClusterContinuity, it shall assume that the VRU cluster leader is lost and shall leave the cluster as specified previously. Next state: VRU-ACTIVE-STANDALONE 4.1.4. Events not Triggering a Transition Between VBS Clustering States The following actions do not trigger a state transition but shall cause an update of information.

Extending or shrinking a VRU cluster: State: VRU-ACTIVE-CLUSTER-LEADER. A VAM indicating that a VRU is joining the cluster allows the VRU cluster leader to determine whether the cluster is homogeneous or heterogeneous, its profile, bounding box, velocity and reference position, and/or the like. The cluster data elements in the cluster VAM shall be updated by the VRU cluster leader to include the new VRU. The same applies when a VRU leaves the cluster.

Changing a VRU cluster ID: State: VRU-ACTIVE-CLUSTER-LEADER, VRU-PASSIVE. A cluster leader may change the cluster ID at any time and for any reason. The cluster leader shall include in its VAMs an indication that the cluster ID is going to change for time timeClusterIdChangeNotification before implementing the change. The notification indicates the time at which the change will happen. The cluster leader shall transmit a cluster VAM with the new cluster ID as soon as possible after the ID change. VRU devices in the cluster shall observe at that time whether there is a cluster with a new ID that has similar bounding boxes and dynamic properties to the previous cluster. If there is such a cluster, the VRU devices shall update their internal record of the cluster ID to the newly observed cluster ID. If there is no such cluster, the VRU devices shall execute the leave process with respect to the old cluster. VRU devices that leave a cluster that has recently changed ID may use either the old or the new cluster ID in their leave indication for time timeClusterIdPersist. After that time, they shall only use the new cluster ID. If the VBS 2021 of a cluster leader receives a VAM from another VRU with the same identifier as its own, it shall immediately trigger a change of the cluster ID complying with the process described in the previous paragraph.

The transmission of intent to change cluster ID does not significantly impact privacy. This is because an eavesdropper who is attempting to track a cluster and is listening to the cluster VAMs at the time of an ID change will be able to determine continuity of the cluster anyway, by "joining the dots" of its trajectory through the ID change using the dynamic information. ID change is intended mainly to protect against an eavesdropper who is not continually listening, but instead has the capability to listen only in discrete, isolated locations. For this eavesdropper model, including a "change prepare" notification for a short time does not significantly increase the likelihood that the eavesdropper will be able to track the cluster through the ID change. The new cluster ID is not provided in the notification, only the time when the ID is intended to change.

4.1.5. Conditions for Clustering Operations

Conditions to determine whether to create a cluster: a VRU device with a VBS 2021 in VRU-ACTIVE-STANDALONE can create a cluster if all these conditions are met: It has sufficient processing power (indicated in the VRU configuration received from the VRU profile management function). It has been configured with VRU equipment type VRU-St (as defined in clause 4.4 of [TR103300-1]). It is receiving VAMs from numCreateCluster different VRUs not further away than maxClusterDistance. It has failed to identify a cluster it could join. Another possible condition is that the VRU-ITS-S has received an indication from a neighbouring V-ITS-S 110 or R-ITS-S 130 that a cluster should be created.

Conditions to determine whether to join or leave a cluster in normal conditions: a VRU device whose VBS 2021 is in VRU-ACTIVE-STANDALONE state shall determine whether it can join or should leave a cluster by comparing its measured position and kinematic state with the position and kinematic state indicated in the VAM of the VRU cluster leader. Joining a cluster is an optional operation.

If the compared information fulfils certain conditions, e.g., the cluster has not reached its maximal size (cardinality) maxClusterSize, the VRU is within the VRU cluster bounding box or at a certain distance maxClusterDistance away from the VRU cluster leader and velocity difference less than maxClusterVelocityDifference of own velocity, the VRU device may join the cluster.

After joining the cluster, when the compared information does not fulfil the previous conditions any longer, the VRU device shall leave the cluster. If changing its role to non-VRU (e.g., by entering a bus or a passenger car), the VRU device shall also follow the leaving process described in clause 5.4.2.2 of [TS103300-3]. If the VRU device receives VAMs from two different clusters that have the same cluster ID (e.g., due to hidden node situation), it shall not join any of the two clusters. In the case the VBS 2021, after leaving a VRU cluster, determines that it has entered a low-risk geographical area as defined in clause 3.1 of [TS103300-3] (e.g., through the reception of a MAPEM), according to requirement FCOM03 in [TS103300-2], it shall transition to the VRU-PASSIVE state (see clause 6 of [TS103300-3]). The VBS 2021 indicates in the VAM the reason why it leaves a cluster, as defined in clause 7.3.5 of [TS103300-3].

In some cases, merging VRU clusters can further reduce VRU messaging in the network. For example, moving VRU clusters on a sidewalk with similar coherent cluster velocity profiles may have fully or partially overlapped bounding boxes (see clause 5.4.3 of [TS103300-3]) and so may merge to form one larger cluster. This shall be done as specified in clause 5.4.1 of [TS103300-3], e.g., the second cluster leader shall break up its cluster, enter VRU-ACTIVE-STAND-ALONE state and join the new cluster as an individual VRU. All devices that were part of the cluster led by the second cluster leader become individual VRUs (e.g., enter VRU-ACTIVE-STANDALONE state) and may choose individually to join the cluster led by the first cluster leader.

4.2. VAM and CAM Formats

As discussed previously, FIG. 10 illustrates the structure of a VAM (see e.g., [TS103300-3]) for standalone VRU-ITS-S as the originating ITS-S. The VAM comprises multiple containers. As shown by FIG. 10, the VAM comprises an ITS PDU Header, Generation Delta Time, Basic Container, High Frequency (HF) Container, Low Frequency (LF) container, Cluster Information Container, Cluster Information Container, Cluster Operation Container, and Motion Prediction Container. Details of these containers are discussed super with respect to FIG. 10.

Current ETSI standards may define various containers as comprising a sequence of optional or mandatory data elements (DEs) and/or data frames (DFs). It should be understood that the requirements of any particular standard should not limit the scope of the present disclosure, and as such, any combination of containers, DFs, DEs, values, actions, and/or features are possible, including any combination of containers, DFs, DEs, values, actions, and/or features that are strictly required to be followed in order to conform to such standards or any combination of containers, DFs, DEs, values, actions, and/or features strongly recommended and/or used with or in the presence/absence of optional elements. The DEs and DFs included in the CPM format are based on the ETSI Common Data Dictionary (CDD) [TS102894-2] and/or makes use of certain elements defined in [CEN19091].

4.3. Process and Rules for Generating and Encoding Motion Prediction Container

Figure 17:
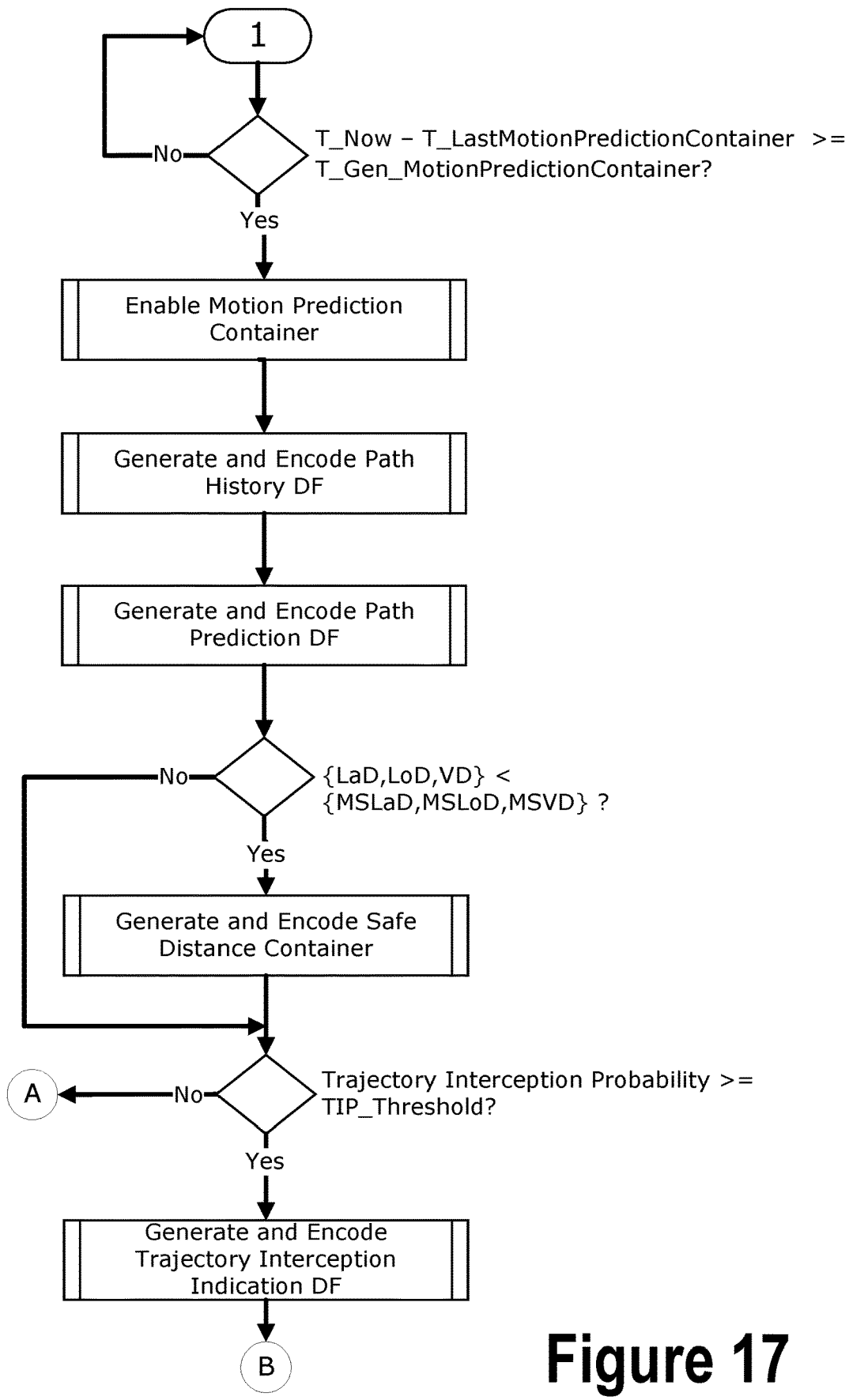
FIGS. 17 and 18 illustrate triggering conditions.
Figure 18:
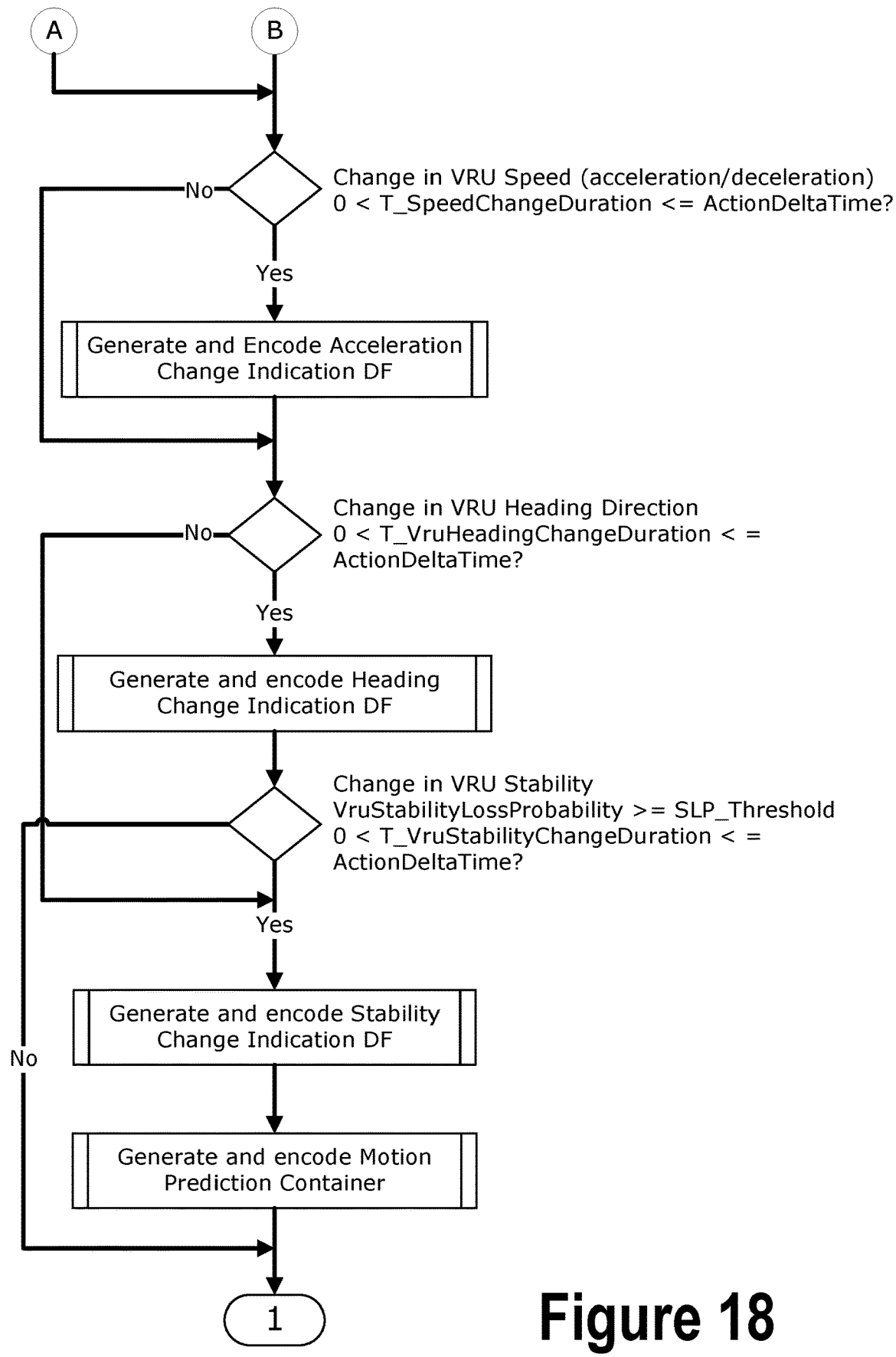

FIGS. 17 and 18 depict a Motion Dynamic Prediction Container Generation and Encoding process, which includes the triggering condition for each of the DF or DE within the container. Nine major sub-processes as shown in FIGS. 17 and 18 where the processes are connected for illustrating the steps of composing a motion prediction container. Each step of the process is elaborated along the triggering conditions and the underlying parameters is discussed below:

Sub-Process 1—Triggering/Enabling Motion Prediction Container: The decision on how fast/frequent to Enable the Motion Prediction container is based on the timer condition check $T\_Now - T\_LastMotionPredictionContainer \geq T\_Gen\_MotionPredictionContainer$ with T_Now being the current timestamp corresponding to this generation event, T_LastMotionPredictionContainer being the time elapsed since last generation of the motion prediction container for motion generation container periodicity T_GenMotionPredictionContainer where (T_GenVamMin<T_Gen_MotionPredictionContainer<T_GenVamMax)

Sub-Process 2—Generating and encoding Path History DF: In case condition in 1 is satisfied, then the Motion Prediction Container sub-process is enabled and the Path History DF of type pathHistory is generated and encoded.

Sub-Process 2 and Sub-Process 3—Generating and encoding Path Prediction DF: After Sub-Process 2 is executed, the Path Prediction DF of type pathHistory are generated and encoded.

Sub-Process 4—Generating and encoding Safe Distance DF: The sub-process for generating safe distance indication DF of type safeDistanceIndication is executed if the following three conditional relations are simultaneously satisfied: lateral distance (LaD)<minimum safe lateral distance (MSLaD), longitudinal distance (LoD)<minimum safe longitudinal distance (MSLoD), and vertical distance (VD) <minimum safe vertical distance (MSVD), where the LaD, LoD, VD and their respective thresholds MSLaD, MSLoD and MSVD carry their usual meanings as specified in [TS103300-3].

Sub-Process 5—Generating and encoding Trajectory Interception Indication (TII) DF: If the Trajectory Interception Probability of the ego-VRU is above the preset threshold hereby defined as TIP_Threshold, then the Trajectory Interception Indication DF of type trajectoryInterceptionIndication is generated and encoded.

Sub-Process 6—Generating and encoding Acceleration Change Indication DF: If a change in VRU speed (acceleration or deceleration) is detected during a speed sensor observation period, T_SpeedChangeDuration, such that 0<T_SpeedChangeDuration<=ActionDeltaTime, then the acceleration change indication DF of type accelerationChangeIndication is generated and encoded.

Sub-Process 7—Generating and encoding Heading Change Indication DF: If a change in VRU heading (left or right) DE of type headingChangeIndication is detected during a heading sensor observation period, T_VruHeadingChangeDuration, such that 0<T_VruHeadingChangeDuration<=ActionDeltaTime, then the heading change indication DF is generated and encoded.

Sub-Process 8—Generating and encoding Stability Change Indication DF: If a change in VRU stability in terms of stability loss probability DE of type VRUStabilityLossProbability exceeding a predefined threshold SLP_Threshold, that is VruStabilityLossProbability≥SLP_Threshold (e.g., 0.6) observed within a time window T_VruStabilityChangeDuration such that 0<T_VruStabilityChangeDuration<=ActionDeltaTime, then generate and encode stability change indication DF.

Sub-Process 9—Generating and encoding Motion Prediction Container: Once all the above sub-processes 1 through 8 are completed in sequence, this final sub-process then assembles all the DFs generated to this point and generates the motion prediction container. After execution of this sub-process, the timestamp corresponding to this generation event is updated and the process control is passed out of the motion prediction container generation process.

4.4. Operation of VBS Motion Dynamic State for Enabling VRU Profile Transition Awareness The operation of VBS motion dynamic states are depicted in relation to VRU Profile transitions by taking example of Profile 1 to Profile 2 transition and vice-versa in FIGS. 3A and 3B. However, The rules may be extendable to profile transition triggering conditions for any profile 1 through 4 and vice versa as applicable with corresponding thresholds adapted to suit the triggering conditions customized for any given profile transition.

4.4.1. Sub-States/Physical State (PS) Categories for all Profiles, Typical Speed (TS) and Trajectory Ambiguity (TA)

Figure 15:
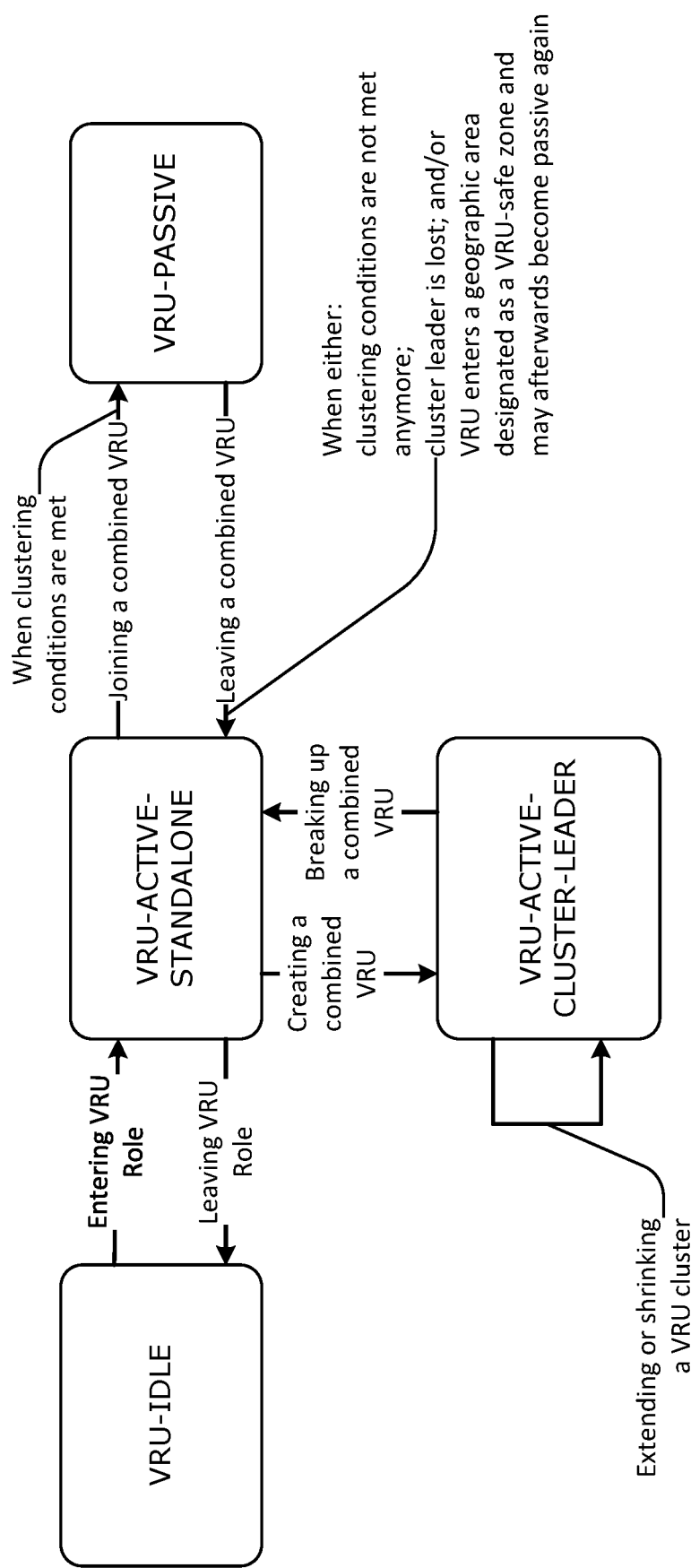
FIG. 15 illustrates VBS state diagrams.
Figure 16:
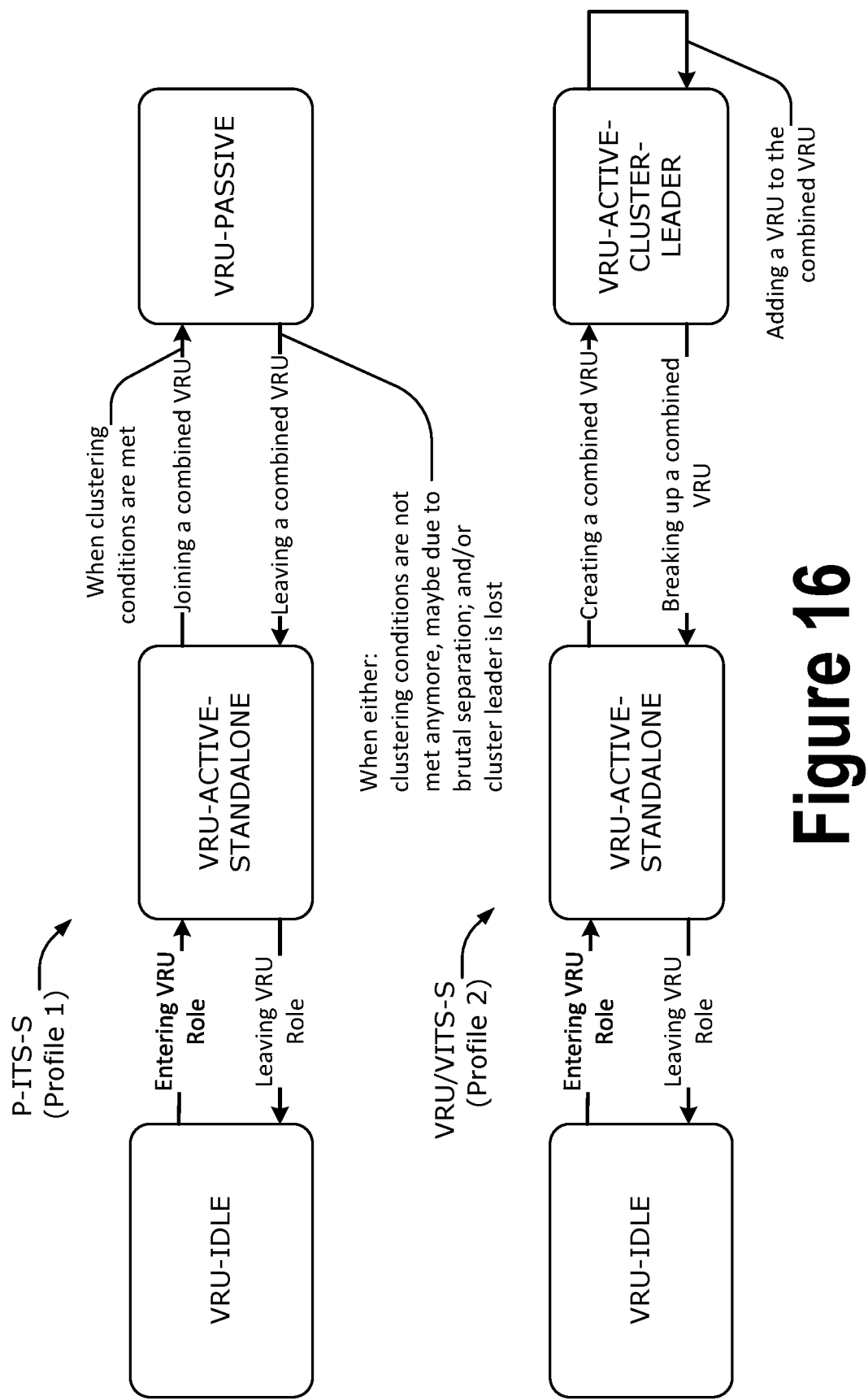
FIG. 16 illustrates instantiation of the state diagrams in FIG. 15.

FIGS. 15 and 16 shows VBS state diagrams illustrating the VBS state transitions for cluster operation.

FIG. 15 illustrates an example VBS state diagram related to VRU cluster operation. A combined VRU groups the device of at least one VRU from VRU Profile 1 (e.g. a pedestrian) and the device located in a VRU vehicle from VRU Profile 2 or VRU Profile 3 (e.g. motorcycle, bicycle, wheel chair, mounted animal), as described in [TS103300-2]. As a pre-requisite to the creation of a combined VRU, the VBS in the VRU vehicle device is activated and has its role set to VRU. In the case when only one element of the couple {VRU, VRU vehicle} is equipped with a VRU device, it shall behave as a regular VRU. The combined clustering function is an optional function in the VBS, in the same manner as the clustering (see e.g., clause 5.4.1 of [TS103300-3]).

When the combined clustering function is used, the operation of a combined VRU shall follow the same rules as the operation of a VRU cluster:

When the VBS in VRU-ACTIVE-STANDALONE of the VRU vehicle ITS-S (see e.g., clause 4.4 in [TS103300-2] determines that it can form a combined VRU, it shall send a VAM indicating that it will lead the cluster by including cluster information (if it is a profile 2 device) or a CAM containing cluster information in the VRU extension (if it is a profile 3 device).

If the VRU vehicle ITS-S is a profile 3 VRU, then when the VBS in the P-ITS-S of the VRU determines that the cluster joining conditions are met, it shall send a VAM indicating that it joins the combined cluster using the standard cluster join process. In the case of a combined VRU, the maximal bounding box of a VRU cluster is reduced to maxCombinedClusterDistance.

If the VRU vehicle ITS-S is a profile 2 VRU, it shall continue to send cluster VAMs for at least timeCombinedVruClusterOpportunity. If no P-ITS-S has in that time indicated that it will join the cluster, the VRU vehicle ITS-S shall stop sending cluster VAMs (the P-ITS-S does not need to complete the join in that time so long as it has started to include the join indication in its VAMs). If the VRU vehicle ITS-S has stopped sending cluster VAMs, the P-ITS-S may create a combined cluster, i.e. it may send cluster VAMs with cluster cardinality 1, and shall send the cluster VAM for a time at least equal to timeCombinedVruClusterOpportunity. While the P-ITS-S is sending cluster VAMs, the VRU vehicle ITS-S may initiate the process of joining the cluster.

This process allows flexibility in which ITS-S is the cluster leader because in practice either the P-ITS-S or the profile 2 VRU vehicle ITS-S may be better equipped to act as the leader. The present document does not specify how either ITS-S determines whether or not to join a cluster; the process may, for example, involve user intervention on either or both ITS-S or pre-configured setting. Future versions of the present document may provide more support for automated cluster leader decisions, for example by including the data structures for cluster leaders to make statements about their capabilities that could be inputs to those decisions.

When the VBS in the cluster member VRU device determines that the clustering conditions are not met anymore (separation from the cluster leader VRU device), it shall leave the cluster using the cluster leave process specified in clause 5.4.2.2 of [TS103300-3].

FIG. 16 illustrates an example of the instantiation of the state diagram in FIG. 15 for a combined VRU made of a person holding a VRU-enabled personal device (e.g., P-ITS-S 2401 of FIG. 24) and a VRU-enabled bicycle. The state diagrams corresponding to the VAM/CAM triggering conditions will be found in clause 6 of [TS103300-3].

The VRU clustering state(s) may transition among the VRU-IDLE, VRU-ACTIVE-STANDALONE, VRU-ACTIVE-CLUSTERHEAD and VRU-PASSIVE states as shown in FIGS. 15 and 16 (and as described in Table 16, supra), where the VRU Profile 1 to Profile 2 and vice-versa transition is chosen for illustrative purposes. The following four possible dynamic sub-states specific for Profile as captured in Table 19 are defined for this process.

TABLE 19

Profile Specific sub-states or physical state (PS)

| Sub-/Physical State (PS) | Explanation |
| --- | --- |
| Waiting | No change in location |
| Moving | Changing location with Profile Typical Speed (TS) |
| Accelerating | Increasing speed |
| Decelerating | Moving with decreasing speed |

The typical speed (TS) definition along with the trajectory ambiguity (TA) is discussed previously. The summary of these Profile specific parameters is shown below in Table 20. Also, the confidence level ranges of trajectory ambiguity probability (TAP) are shown in Table 21 along with corresponding labels called TAP Index (TAPI) in Table 21. No new DE or DFs are needed for computation of the TAP since the existing DFs Path History and Path Prediction in the motion prediction are sufficient to infer the trajectory of VRU and categorize it among one of the 3 possible levels {High, Medium, Low}, which can yield profile specific designations as in the last column of Table 21 and corresponding mapping to profile shown in last column of Table 20. Table 20 shows examples of typical Speeds, Maximum Speeds and Trajectory Ambiguity Levels for VRU Profiles and notations for Typical Speed (TS) thresholds per VRU profile in The typical speed values are not limited to the values shown in the below table and are only example values influenced by the examples in [TS103300-2] and [TS103300-3].

TABLE 20

Speeds, Maximum Speeds and Trajectory Ambiguity Levels for VRU Profiles and notations for Typical Speed (TS) thresholds per VRU profile

| VRU Profile | Typical Speed | TS Notation | Maximum Speed | Trajectory Ambiguity |
|---|---|---|---|---|
| 1 | 5 kmph | TS_P1 | 12 kmph (humans) | High |
| 2 | 20 kmph | TS_P2 | 25 kmph | Medium |
| 3 | 35 kmph | TS_P3 | 45 kmph | Low |
| 4 | 5 kmph | TS_P3 | 40 kmph | High |

TABLE 21

Trajectory Ambiguity Probability Indication (TAPI) designations based on Trajectory Ambiguity Probability (TAP) range-based designations for {LOW, HIGH} levels

| TAP Index (TAPI) | TAP Range | TA Designation |
|---|---|---|
| 1 | 0 to 0.25 | LOW |
| 2 | 0.25 and above | HIGH |

The conditions for transition from one profile to another based on the condition check discussed previously can be used and are shown by Table 22.

TABLE 22

VRU Profile Transition Check Condition/Rules for triggering Profile transition in VBS

| Conditions Check | VRU Profile Designation |
|---|---|
| VRU Speed <= TS_P1 and TAP: HIGH | 1 |
| TS_P1 < VRU Speed <= TS_P2 and TAP: MEDIUM | 2 |
| TS_P2 < VRU Speed <= TS_P3 and TAP: LOW | 3 |

Figure 19A:
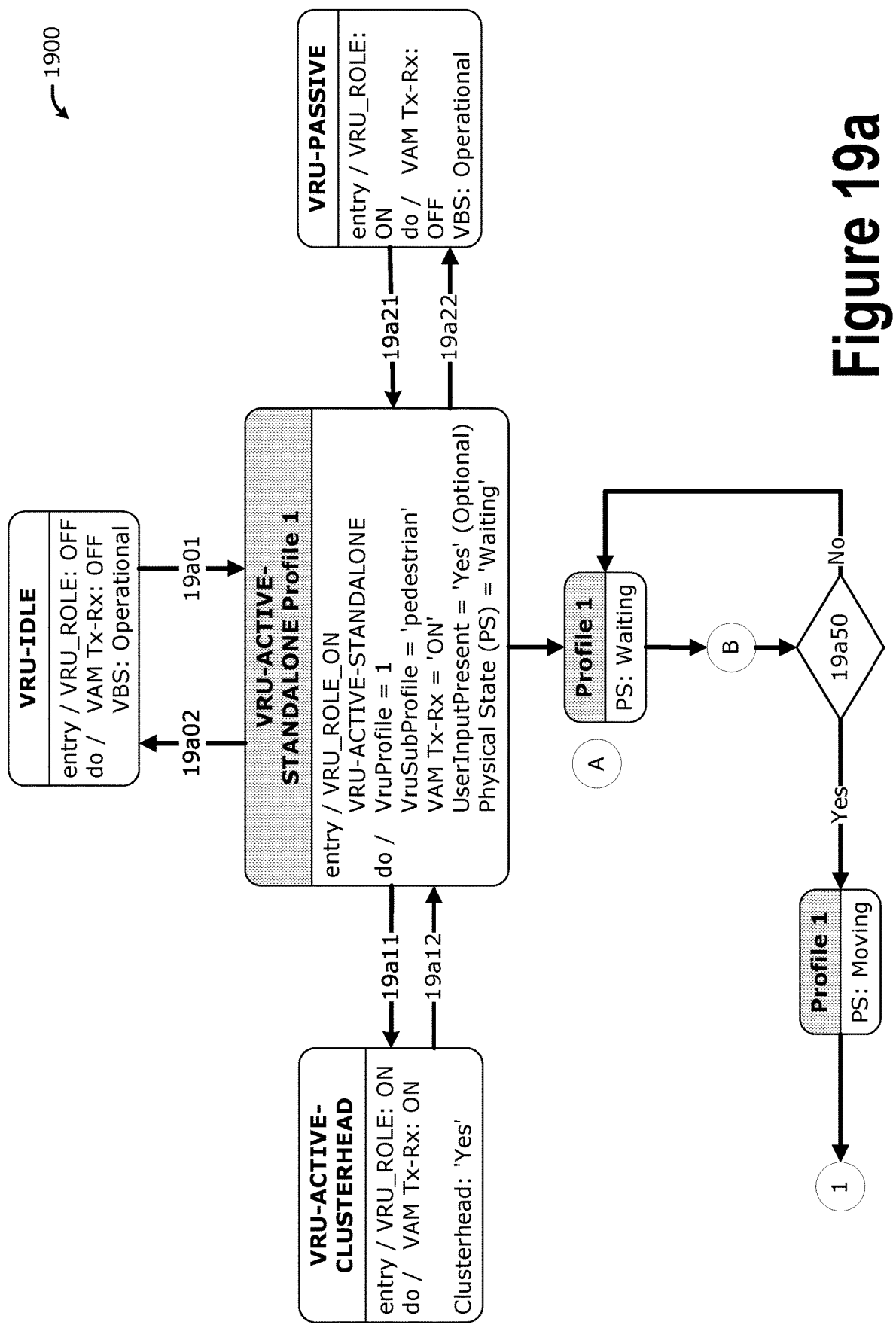
FIGS. 19*a*, 19*b*, 19*c*, and 19*d* illustrate motion dynamic prediction container generation and encoding process.
Figure 19B:
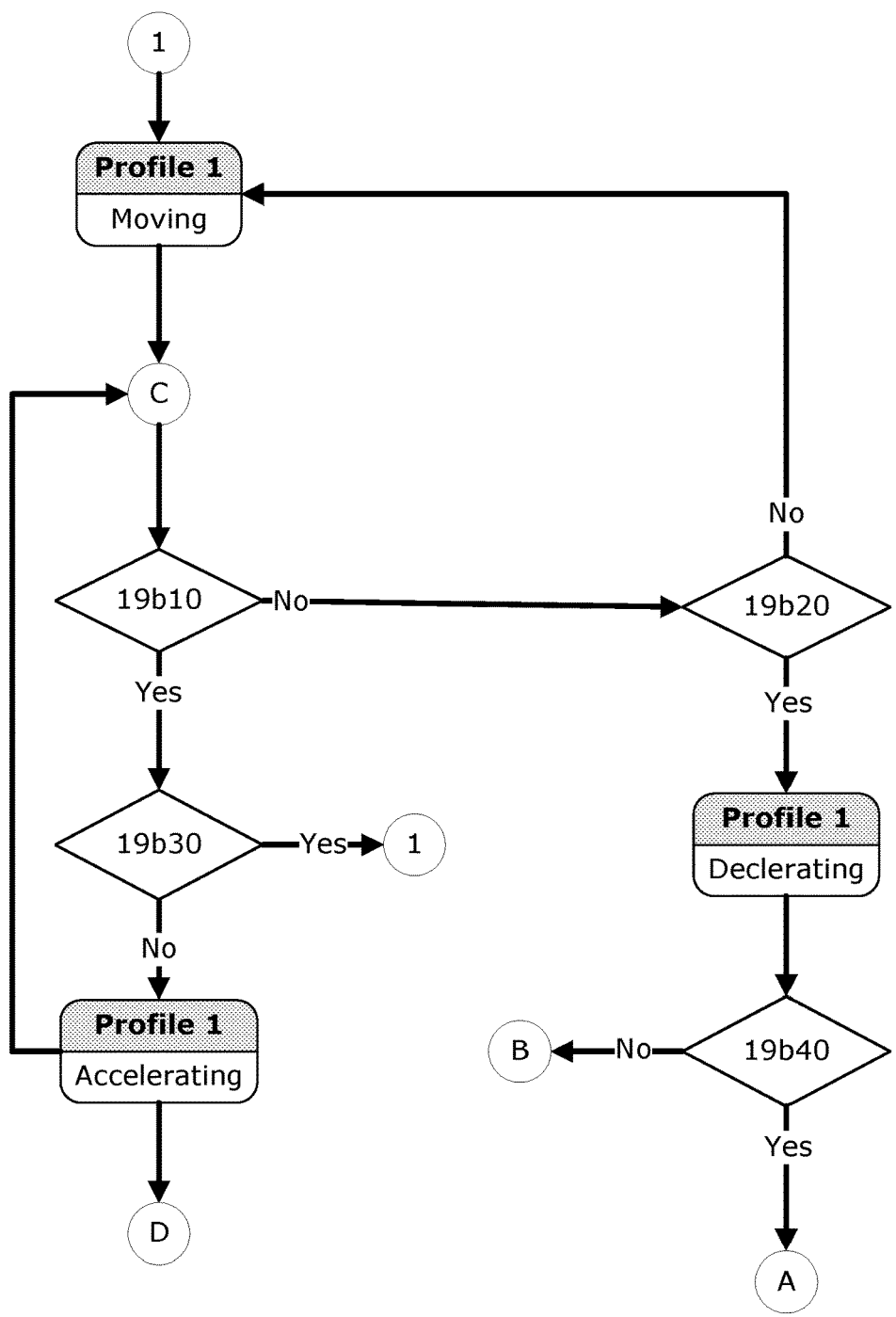

4.4.2. Summary Operation of VBS Motion Dynamic State for Enabling VRU Profile Transition Awareness FIGS. 19A-19D depict an example Motion Dynamic Prediction Container Generation and Encoding process 1900. The process 1900 begins at FIG. 19A, is continued from FIG. 19A to FIG. 19B, is continued from FIG. 19B to FIG. 19C, and is continued from FIG. 19C to FIG. 19D. FIGS. 19A-19D involves the transitions of the VBS dynamic states operation as exemplified in determining (formalizing) Profile 1 to Profile 2 (and vice versa) transitions.

The VBS dynamic states transition in relation to profile determination is illustrated using state machine and flow-chart representation in FIGS. 19A-19D. The representation itself is self-explanatory and thus we exclude explanations in text for brevity. Some existing parameters in [TS103300-3] may be used and some new parameters are provided for enabling the VBS dynamic motion state transitions, which are shown by Table 23.

TABLE 23

VRU Profile Transition Check Condition/Rules for triggering Profile transition in VBS

| Parameter | Definition | Remarks |
|---|---|---|
| UserInputPresent | If available, the VRU user device may take user input directly to augment/help the device know the current VBS state, VRU Profile, and the like based on deliberate user input. For example, a pedestrian walking a bike may indicate on their smart phone or wearable device that they are about to ride a bike (for tracking exercise or miles, for instance) | Optional input field for helping initialize VBS state based on user input. See e.g., Section 4.4.2. |
| minReferencePointPositionChangeThreshold | "Minimum Euclidian absolute distance between the current estimated position of the reference point of the VRU (or VRU Cluster) and the estimated position of the reference point lastly included in a VAM" | Distance (in m). Defined in Table 12 of [TS103300-3]. |
| T_PositionChangeDuration | 0 < T_PositionChangeDuration ≤ ActionDeltaTime | See e.g., Section 4.4.2. |
| Profile1_TypicalSpeed | Typical Speed for VRU Profile 1 | See e.g., section 4.2.1. |
| T_SpeedChangeDuration | 0 < T_SpeedChangeDuration ≤ ActionDeltaTime | See e.g., section 4.3. |
| minGroundSpeedChangeThreshold | "Minimum difference between the current estimated ground speed of the reference point of the VRU (or VRU Cluster) and the estimated absolute speed of the reference point of the VRU (or VRU Cluster)" | Speed (in m/s). Defined in Table 12 of [TS103300-3]. |
| Profile2_TypicalSpeed | Typical Speed for VRU Profile 2 | See e.g., section 4.2.1. |

In FIG. 19A: VRU-IDLE state transitions 19A01 to VRU-ACTIVE-STANDALONE Profile 1 state when device user is not in (or exits) VRU context (e.g., inside bus). VRU-ACTIVE-STANDALONE Profile 1 state transitions 19A02 to VRU-IDLE state when device user is in or enters VRU context (e.g., on road). VRU-ACTIVE-STANDALONE Profile 1 state transitions 19A11 to VRU-ACTIVE-CLUSTERHEAD state when Clustering Conditions met. VRU-ACTIVE-CLUSTERHEAD state transitions 19A12 to VRU-ACTIVE-STANDALONE Profile 1 state when Clustering Conditions are not met. VRU-PASSIVE state transitions 19A21 to VRU-ACTIVE-STANDALONE Profile 1 state when Clustering Conditions not met, Cluster head is lost, and/or Entering low-risk Geo area. VRU-ACTIVE-STANDALONE Profile 1 state transitions 19A22 to VRU-PASSIVE state when VRU Joining Cluster. Operation 19A50 is a determination of whether a change in VRU location>minReferencePointPositionChangeThreshold for 0<T_PositionChangeDuration≤ActionDeltaTime.

In FIG. 19B: Operation 19B10 is a determination of whether there is an increase in VRU Speed>Profile1_Typical_Speed for 0<T_SpeedChangeDuration≤ActionDeltaTime. Operation 19B20 is a determination of whether there is a decrease in VRU Speed>minGroundSpeedChangeThreshold for 0<T_SpeedChangeDuration≤ActionDeltaTime. Operation 19B30 is a determination of whether a Trajectory Ambiguity is High. Operation 19B40 is a determination of whether VRU Speed almost 0.

Figure 19C:
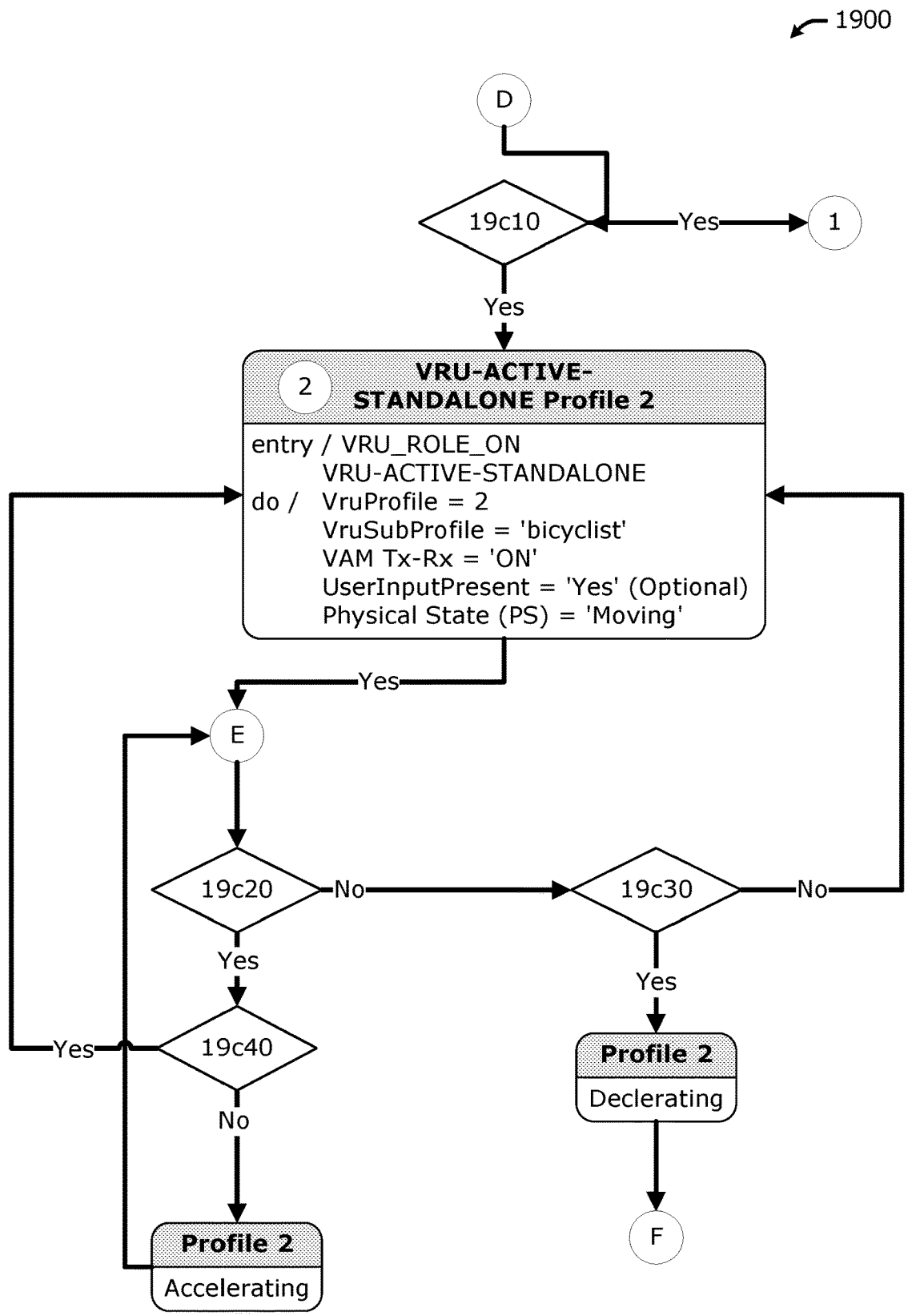

In FIG. 19C: Operation 19C10 is a determination of whether VRU Speed>Profile1_Typical_Speed and ≤Profile2_Typical_Speed for 0<T_SpeedChangeDuration≤ActionDeltaTime. Operation 19C20 is a determination of whether there is an increase in VRU Speed>Profile2_Typical_Speed for 0<T_SpeedChangeDuration≤ActionDeltaTime. Operation 19C30 is a determination of whether there is a decrease in VRU Speed>minGroundSpeedChangeThreshold for 0<T_SpeedChangeDuration≤ActionDeltaTime. Operation 19C0 is a determination of whether a Trajectory Ambiguity is High.

Figure 19D:
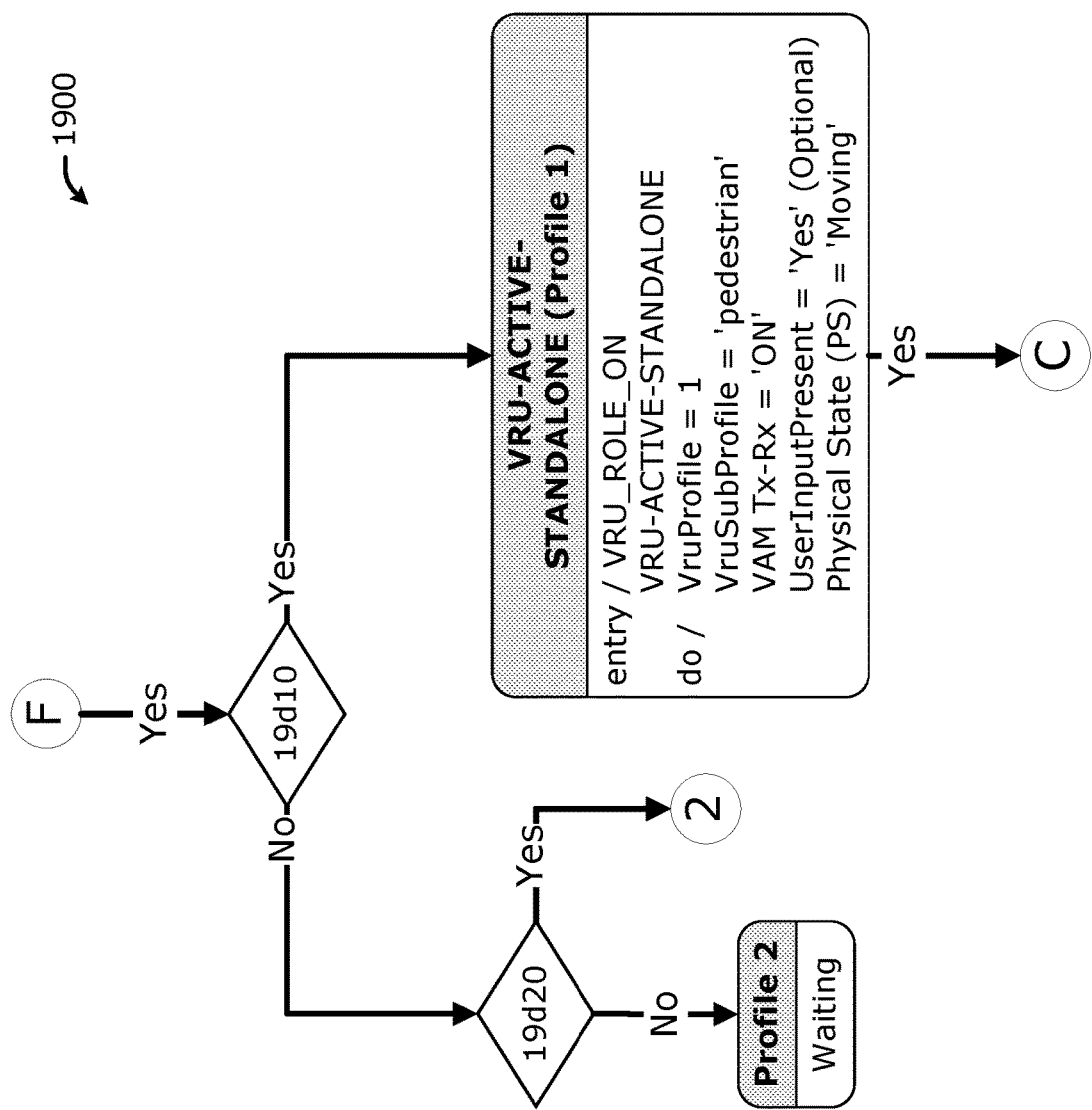

In FIG. 19D: Operation 19D10 is a determination of whether VRU Speed<Profile2_Typical_Speed and Trajectory Ambiguity Low. Operation 19D20 is a determination of whether a change in VRU location>minReferencePointPositionChangeThreshold for 0<T_PositionChangeDuration≤ActionDeltaTime?

5. ITS-Station Configurations and Arrangements

Figure 20:
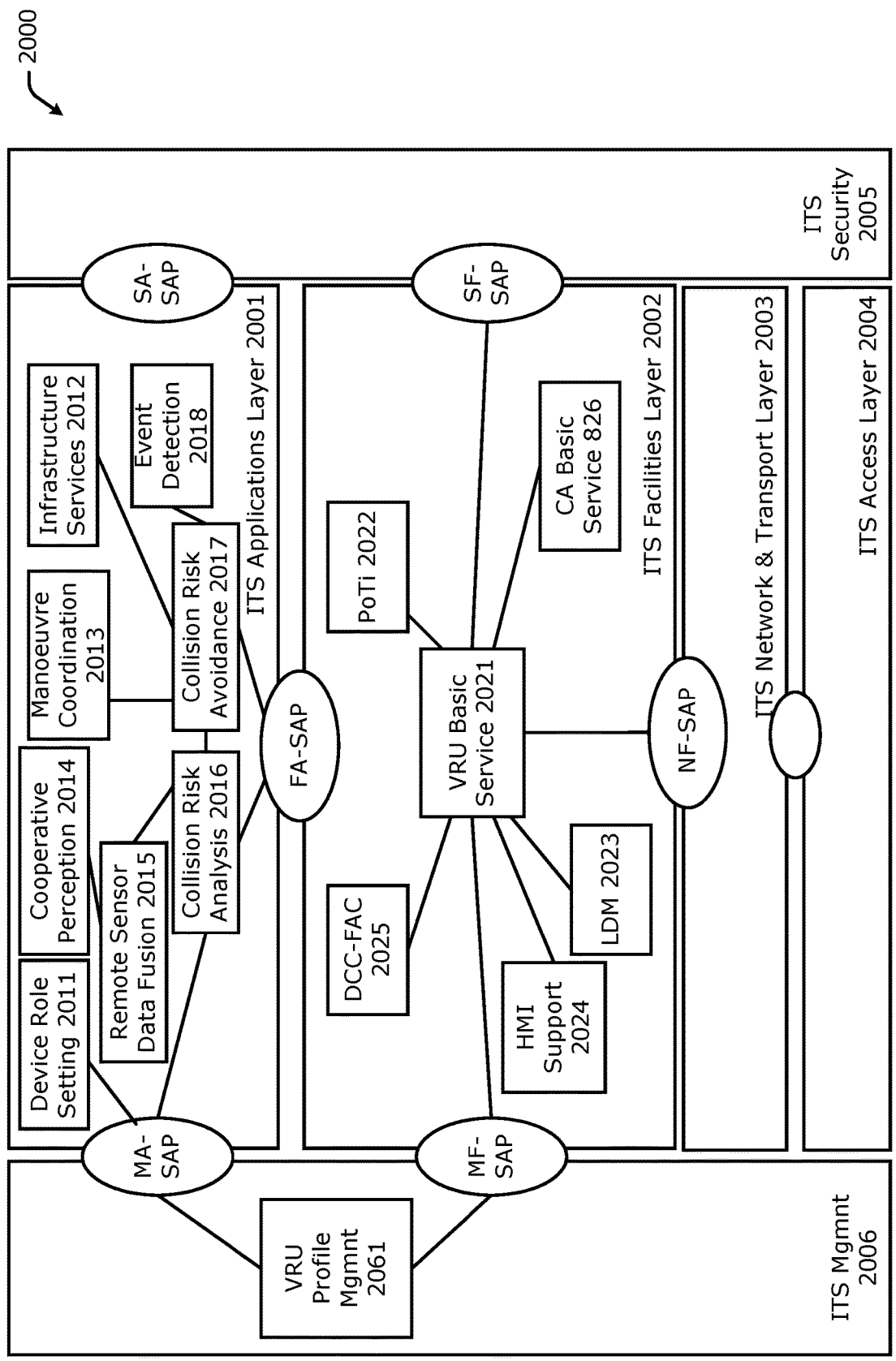
FIG. 20 shows an ITS-S reference architecture.

FIG. 20 depicts an example ITS-S reference architecture 2000. In ITS-based implementations, some or all of the components depicted by FIG. 20 may follow the ITSC protocol, which is based on the principles of the OSI model for layered communication protocols extended for ITS applications. The ITSC includes, inter alia, an access layer which corresponds with the OSI layers 1 and 2, a networking & transport (N&T) layer which corresponds with OSI layers 3 and 4, the facilities layer which corresponds with OSI layers 5, 6, and at least some functionality of OSI layer 7, and an applications layer which corresponds with some or all of OSI layer 7. Each of these layers are interconnected via respective interfaces, SAPs, APIs, and/or other like connectors or interfaces.

The applications layer 2001 provides ITS services, and ITS applications are defined within the application layer 2001. An ITS application is an application layer entity that implements logic for fulfilling one or more ITS use cases. An ITS application makes use of the underlying facilities and communication capacities provided by the ITS-S. Each application can be assigned to one of the three identified application classes: road safety, traffic efficiency, and other applications (see e.g., [EN302663]), ETSI TR 102 638 V1.1.1 (2009 June) (hereinafter "[TR102638]")). Examples of ITS applications may include driving assistance applications (e.g., for cooperative awareness and road hazard warnings) including AEB, EMA, and FCW applications, speed management applications, mapping and/or navigation applications (e.g., turn-by-turn navigation and cooperative navigation), applications providing location based services, and applications providing networking services (e.g., global Internet services and ITS-S lifecycle management services). A V-ITS-S 110 provides ITS applications to vehicle drivers and/or passengers, and may require an interface for accessing in-vehicle data from the in-vehicle network or in-vehicle system. For deployment and performances needs, specific instances of a V-ITS-S 110 may contain groupings of Applications and/or Facilities.

The facilities layer 2002 comprises middleware, software connectors, software glue, or the like, comprising multiple facility layer functions (or simply a "facilities"). In particular, the facilities layer contains functionality from the OSI application layer, the OSI presentation layer (e.g., ASN.1 encoding and decoding, and encryption) and the OSI session layer (e.g., inter-host communication). A facility is a component that provides functions, information, and/or services to the applications in the application layer and exchanges data with lower layers for communicating that data with other ITS-Ss. Example facilities include Cooperative Awareness Services, Collective Perception Services, Device Data Provider (DDP), Position and Time management (POTI), Local Dynamic Map (LDM), collaborative awareness basic service (CABS) and/or cooperative awareness basic service (CABS), signal phase and timing service (SPATS), vulnerable road user basic service (VBS), Decentralized Environmental Notification (DEN) basic service, maneuver coordination services (MCS), and/or the like. For a vehicle ITS-S, the DDP is connected with the in-vehicle network and provides the vehicle state information. The POTI entity provides the position of the ITS-S and time information. A list of the common facilities is given by ETSI TS 102 894-1 V1.1.1 (2013 August) (hereinafter "[TS102894-1]").

Each of the aforementioned interfaces/Service Access Points (SAPs) may provide the full duplex exchange of data with the facilities layer, and may implement suitable APIs to enable communication between the various entities/elements.

For a vehicle ITS-S, the facilities layer 2002 is connected to an in-vehicle network via an in-vehicle data gateway as shown and described in [TS102894-1]. The facilities and applications of a vehicle ITS-S receive required in-vehicle data from the data gateway in order to construct messages (e.g., CSMs, VAMs, CAMs, DENMs, MCMs, and/or CPMs) and for application usage. For sending and receiving CAMs, the CA-BS includes the following entities: an encode CAM entity, a decode CAM entity, a CAM transmission management entity, and a CAM reception management entity. For sending and receiving DENMs, the DEN-BS includes the following entities: an encode DENM entity, a decode DENM entity, a DENM transmission management entity, a DENM reception management entity, and a DENM keep-alive forwarding (KAF) entity. The CAM/DENM transmission management entity implements the protocol operation of the originating ITS-S including activation and termination of CAM/DENM transmission operation, determining CAM/

DENM generation frequency, and triggering generation of CAMs/DENMs. The CAM/DENM reception management entity implements the protocol operation of the receiving ITS-S including triggering the decode CAM/DENM entity at the reception of CAMs/DENMs, provisioning received CAM/DENM data to the LDM, facilities, or applications of the receiving ITS-S, discarding invalid CAMs/DENMs, and checking the information of received CAMs/DENMs. The DENM KAF entity KAF stores a received DENM during its validity duration and forwards the DENM when applicable; the usage conditions of the DENM KAF may either be defined by ITS application requirements or by a cross-layer functionality of an ITSC management entity 2006. The encode CAM/DENM entity constructs (encodes) CAMs/DENMs to include various, the object list may include a list of DEs and/or DFs included in an ITS data dictionary.

The ITS station type/capabilities facility provides information to describe a profile of an ITS-S to be used in the applications and facilities layers. This profile indicates the ITS-S type (e.g., vehicle ITS-S, road side ITS-S, personal ITS-S, or central ITS-S), a role of the ITS-S, and detection capabilities and status (e.g., the ITS-S's positioning capabilities, sensing capabilities, and/or the like). The station type/capabilities facility may store sensor capabilities of various connected/coupled sensors and sensor data obtained from such sensors. FIG. 20 shows the VRU-specific functionality, including interfaces mapped to the ITS-S architecture. The VRU-specific functionality is centered around the VRU Basic Service (VBS) 2021 located in the facilities layer, which consumes data from other facility layer services such as the Position and Time management (PoTi) 2022, Local Dynamic Map (LDM) 2023, HMI Support 2024, DCC-FAC 2025, CA basic service (CBS) 2026, and/or the like. The PoTi entity 2022 provides the position of the ITS-S and time information. The LDM 2023 is a database in the ITS-S, which in addition to on-board sensor data may be updated with received CAM and CPM data (see e.g., ETSI TR 102 863 v1.1.1 (2011 June)). Message dissemination-specific information related to the current channel utilization are received by interfacing with the DCC-FAC entity 2025. The DCC-FAC 2025 provides access network congestion information to the VBS 2021.

The Position and Time management entity (PoTi) 2022 manages the position and time information for use by ITS applications, facility, network, management, and security layers. For this purpose, the PoTi 2022 gets information from sub-system entities such as GNSS, sensors and other subsystem of the ITS-S. The PoTi 2022 ensures ITS time synchronicity between ITS-Ss in an ITS constellation, maintains the data quality (e.g., by monitoring time deviation), and manages updates of the position (e.g., kinematic and attitude state) and time. An ITS constellation is a group of ITS-S's that are exchanging ITS data among themselves. The PoTi entity 2022 may include augmentation services to improve the position and time accuracy, integrity, and reliability. Among these methods, communication technologies may be used to provide positioning assistance from mobile to mobile ITS-Ss and infrastructure to mobile ITS-Ss. Given the ITS application requirements in terms of position and time accuracy, PoTi 2022 may use augmentation services to improve the position and time accuracy. Various augmentation methods may be applied. PoTi 2022 may support these augmentation services by providing messages services broadcasting augmentation data. For instance, a roadside ITS-S may broadcast correction information for GNSS to oncoming vehicle ITS-S; ITS-Ss may exchange raw GPS data or may exchange terrestrial radio position and time relevant information. PoTi 2022 maintains and provides the position and time reference information according to the application and facility and other layer service requirements in the ITS-S. In the context of ITS, the "position" includes attitude and movement parameters including velocity, heading, horizontal speed and optionally others. The kinematic and attitude state of a rigid body contained in the ITS-S included position, velocity, acceleration, orientation, angular velocity, and possible other motion related information. The position information at a specific moment in time is referred to as the kinematic and attitude state including time, of the rigid body. In addition to the kinematic and attitude state, PoTi 2022 should also maintain information on the confidence of the kinematic and attitude state variables.

The VBS 2021 is also linked with other entities such as application support facilities including, for example, the collaborative/cooperative awareness basic service (CABS), signal phase and timing service (SPATS), Decentralized Environmental Notification (DEN) service, Collective Perception Service (CPS), Maneuver Coordination Service (MCS), Infrastructure service 2012, and/or the like. The VBS 2021 is responsible for transmitting the VAMs, identifying whether the VRU is part of a cluster, and enabling the assessment of a potential risk of collision. The VBS 2021 may also interact with a VRU profile management entity in the management layer to VRU-related purposes.

The VBS 2021 interfaces through the Network—Transport/Facilities (NF)-Service Access Point (SAP) with the N&T for exchanging of CPMs with other ITS-Ss. The VBS 2021 interfaces through the Security—Facilities (SF)-SAP with the Security entity to access security services for VAM transmission and VAM reception 2103. The VBS 2021 interfaces through the Management-Facilities (MF)-SAP with the Management entity and through the Facilities—Application (FA)-SAP with the application layer if received VAM data is provided directly to the applications. Each of the aforementioned interfaces/SAPs may provide the full duplex exchange of data with the facilities layer, and may implement suitable APIs to enable communication between the various entities/elements.

The VBS module/entity 2021 resides or operates in the facilities layer, generates VAMs, checks related services/messages to coordinate transmission of VAMs in conjunction with other ITS service messages generated by other facilities and/or other entities within the ITS-S, which are then passed to the N&T and access layers for transmission to other proximate ITS-Ss. The VAMs are included in ITS packets, which are facilities layer PDUs that may be passed to the access layer via the N&T layer or passed to the application layer for consumption by one or more ITS applications. In this way, VAM format is agnostic to the underlying access layer and is designed to allow VAMs to be shared regardless of the underlying access technology/RAT.

The application layer recommends a possible distribution of functional entities that would be involved in the protection of VRUs 116, based on the analysis of VRU use cases. The application layer also includes device role setting function/application (app) 2011, infrastructure services function/app 2012, maneuver coordination function/app 2013, cooperative perception function/app 2014, remote sensor data fusion function/app 2015, collision risk analysis (CRA) function/app 2016, collision risk avoidance function/app 2017, and event detection function/app 2018.

The device role setting module 2011 takes the configuration parameter settings and user preference settings and enables/disables different VRU profiles depending on the parameter settings, user preference settings, and/or other data (e.g., sensor data and the like). A VRU can be equipped with a portable device which needs to be initially configured and may evolve during its operation following context changes which need to be specified. This is particularly true for the setting-up of the VRU profile and type which can be achieved automatically at power on or via an HMI. The change of the road user vulnerability state needs to be also provided either to activate the VBS 2021 when the road user becomes vulnerable or to de-activate it when entering a protected area. The initial configuration can be set-up automatically when the device is powered up. This can be the case for the VRU equipment type which may be: VRU-Tx (a VRU only with the communication capability to broadcast messages complying with the channel congestion control rules); VRU-Rx (a VRU only communication capability to receive messages); and VRU-St (a VRU with full duplex (Tx and Rx) communication capabilities). During operation the VRU profile may also change due to some clustering or de-assembly. Consequently, the VRU device role will be able to evolve according to the VRU profile changes The infrastructure services module 2012 is responsible for launching new VRU instantiations, collecting usage data, and/or consuming services from infrastructure stations. Existing infrastructure services 2012 such as those described below can be used in the context of the VBS 2021:

The broadcast of the SPAT (Signal Phase And Timing) & MAP (SPAT relevance delimited area) is already standardized and used by vehicles at intersection level. In principle they protect VRUs 116 crossing. However, signal violation warnings may exist and can be detected and signaled using DENM. This signal violation indication using DENMs is very relevant to VRU devices as indicating an increase of the collision risk with the vehicle which violates the signal. If it uses local captors or detects and analyses VAMs, the traffic light controller may delay the red phase change to green and allow the VRU to safely terminate its road crossing.

The contextual speed limit using IVI (In Vehicle Information) can be adapted when a large cluster of VRUs 116 is detected (ex: limiting the vehicles' speed to 30 km/hour). At such reduced speed a vehicle may act efficiently when perceiving the VRUs 116 by means of its own local perception system.

Remote sensor data fusion and actuator applications/functions 2015 (including ML/AI) is also included in some implementations. The local perception data obtained by the computation of data collected by local sensors may be augmented by remote data collected by elements of the VRU system (e.g., VRU system 117, V-ITS-Ss 110, R-ITS-Ss 130) via the ITS-S. These remote data are transferred using standard services such as the CPS and/or the like. In such case it may be necessary to fuse these data. In some implementations, the data fusion may provide at least three possible results: (i) After a data consistency check, the received remote data are not coherent with the local data, wherein the system element has to decide which source of data can be trusted and ignore the other; (ii) only one input is available (e.g., the remote data) which means that the other source does not have the possibility to provide information, wherein the system element may trust the only available source; and (iii) after a data consistency check, the two sources are providing coherent data which augment the individual inputs provided. The use of ML/AI may be necessary to recognize and classify the detected objects (e.g., VRU, motorcycle, type of vehicle, and/or the like) but also their associated dynamics. The AI can be located in any element of the VRU system. The same approach is applicable to actuators, but in this case, the actuators are the destination of the data fusion.

Collective perception (CP) involves ITS-Ss sharing information about their current environments with one another. An ITS-S participating in CP broadcasts information about its current (e.g., driving) environment rather than about itself. For this purpose, CP involves different ITS-Ss actively exchanging locally perceived objects (e.g., other road participants and VRUs 116, obstacles, and the like) detected by local perception sensors by means of one or more V2X RATs. In some implementations, CP includes a perception chain that can be the fusion of results of several perception functions at predefined times. These perception functions may include local perception and remote perception functions.

The local perception is provided by the collection of information from the environment of the considered ITS element (e.g., VRU device, vehicle, infrastructure, and/or the like). This information collection is achieved using relevant sensors (optical camera, thermal camera, radar, LIDAR, and/or the like). The remote perception is provided by the provision of perception data via C-ITS (mainly V2X communication). Existing basic services like the Cooperative Awareness (CA) or more recent services such as the Collective Perception Service (CPS) can be used to transfer a remote perception.

Several perception sources may then be used to achieve the cooperative perception function 2014. The consistency of these sources may be verified at predefined instants, and if not consistent, the CP function may select the best one according to the confidence level associated with each perception variable. The result of the CP should comply with the required level of accuracy as specified by PoTi. The associated confidence level may be necessary to build the CP resulting from the fusion in case of differences between the local perception and the remote perception. It may also be necessary for the exploitation by other functions (e.g., risk analysis) of the CP result.

The perception functions from the device local sensors processing to the end result at the cooperative perception 2014 level may present a significant latency time of several hundred milliseconds. For the characterization of a VRU trajectory and its velocity evolution, there is a need for a certain number of the vehicle position measurements and velocity measurements thus increasing the overall latency time of the perception. Consequently, it is necessary to estimate the overall latency time of this function to take it into account when selecting a collision avoidance strategy.

The CRA function 2016 analyses the motion dynamic prediction of the considered moving objects associated to their respective levels of confidence (reliability). An objective is to estimate the likelihood of a collision and then to identify as precisely as possible the Time To Collision (TTC) if the resulting likelihood is high. Other variables may be used to compute this estimation.

The VRU CRA function 2016, and dynamic state prediction are able to reliably predict the relevant road users maneuvers with an acceptable level of confidence for the purpose of triggering the appropriate collision avoidance action, assuming that the input data is of sufficient quality. The CRA function 2016 analyses the level of collision risk based on a reliable prediction of the respective dynamic state evolution. Consequently, the reliability level may be characterized in terms of confidence level for the chosen collision risk metrics as discussed in clauses 6.5.10.5 and 6.5.10.9 of [TS103300-2]. The confidence of a VRU dynamic state prediction is computed for the purpose of risk analysis. The prediction of the dynamic state of the VRU is complicated especially for some specific VRU profiles (e.g., animal, child, disabled person, and/or the like). Therefore, a confidence level may be associated to this prediction as explained in clauses 6.5.10.5, 6.5.10.6 and 6.5.10.9 of [TS103300-2]. The VRU movement reliable prediction is used to trigger the broadcasting of relevant VAMs when a risk of collision involving a VRU is detected with sufficient confidence to avoid false positive alerts (see e.g., clauses 6.5.10.5, 6.5.10.6 and 6.5.10.9 of [TS103300-2]).

The following two conditions are used to calculate the TTC. First, two or more considered moving objects follow trajectories which intersect somewhere at a position which can be called "potential conflict point". Second, if the moving objects maintain their motion dynamics (e.g., approaches, trajectories, speeds, and/or the like) it is possible to predict that they will collide at a given time which can be estimated through the computation of the time (referred to as Time To Collision (TTC)) necessary for them to arrive simultaneously at the level of the identified potential conflict point. The TTC is a calculated data element enabling the selection of the nature and urgency of a collision avoidance action to be undertaken.

A TTC prediction may only be reliably established when the VRU 116 enters a collision risk area. This is due to the uncertainty nature of the VRU pedestrian motion dynamic (mainly its trajectory) before deciding to cross the road.

At the potential conflict point level, another measurement, the 'time difference for pedestrian and vehicle travelling to the potential conflict point' (TDTC) can be used to estimate the collision risk level. For example, if it is not acted on the motion dynamic of the pedestrian or/and on the motion dynamic of the vehicle, TDTC is equal to 0 and the collision is certain. Increasing the TDTC reduces the risk of collision between the VRU and the vehicle. The potential conflict point is in the middle of the collision risk area which can be defined according to the lane width (e.g., 3.5 m) and vehicle width (maximum 2 m for passenger cars).

The TTC is one of the variables that can be used to define a collision avoidance strategy and the operational collision avoidance actions to be undertaken. Other variables may be considered such as the road state, the weather conditions, the triple of {Longitudinal Distance (LoD), Lateral Distance (LaD), Vertical Distance (VD)} along with the corresponding threshold triple of {MSLaD, MSLoD, MSVD}, Trajectory Interception Indicator (TII), and the mobile objects capabilities to react to a collision risk and avoid a collision (see e.g., clause 6.5.10.9 in [TS103300-2]). The TII is an indicator of the likelihood that the VRU 116 and one or more other VRUs 116, non-VRUs, or even objects on the road are going to collide.

The CRA function 2016 compares LaD, LoD and VD, with their respective predefined thresholds, MSLaD, MSLoD, MSVD, respectively, if all the three metrics are simultaneously less than their respective thresholds, that is LaD<MSLaD, LoD<MSLoD, VD<MSVD, then the collision avoidance actions would be initiated. Those thresholds could be set and updated periodically or dynamically depending on the speed, acceleration, type, and loading of the vehicles and VRUs 116, and environment and weather conditions. On the other hand, the TII reflects how likely is the ego-VRU ITS-S 117 trajectory going to be intercepted by the neighboring ITSs (other VRUs 116 and/or non-VRU ITSs such as vehicles 110).

The likelihood of a collision associated with the TTC may also be used as a triggering condition for the broadcast of messages (e.g., an infrastructure element getting a complete perception of the situation may broadcast DENM, IVI (contextual speed limit), CPM or MCM).

The collision risk avoidance function/application 2017 includes the collision avoidance strategy to be selected according to the TTC value. In the case of autonomous vehicles 110, the collision risk avoidance function 2017 may involve the identification of maneuver coordination 2013/vehicle motion control 2308 to achieve the collision avoidance as per the likelihood of VRU trajectory interception with other road users captured by TII and Maneuver Identifier (MI) as discussed infra.

The collision avoidance strategy may consider several environmental conditions such as visibility conditions related to the local weather, vehicle stability conditions related to the road state (e.g., slippery), and vehicle braking capabilities. The vehicle collision avoidance strategy then needs to consider the action capabilities of the VRU according to its profile, the remaining TTC, the road and weather conditions as well as the vehicle autonomous action capabilities. The collision avoidance actions may be implemented using maneuver coordination 2013 (and related maneuver coordination message (MCM) exchange) as done in the French PAC V2X project or other like systems.

In one example, when in good conditions, it is possible to trigger a collision avoidance action when the TTC is greater than two seconds (one second for the driver reaction time and one second to achieve the collision avoidance action). Below two seconds, the vehicle can be considered to be in a "pre-crash" situation and so it needs to trigger a mitigation action to reduce the severity of the collision impact for the VRU 116/117. The possible collision avoidance actions and impact mitigation actions have been listed in requirement FSYS08 in clause 5 of [TS103300-2].

Road infrastructure elements (e.g., R-ITS-Ss 130) may also include a CRA function 2016 as well as a collision risk avoidance function 2017. These functions may indicate collision avoidance actions to the neighboring VRUs 116/117 and vehicles 110.

The collision avoidance actions (e.g., using MCM as done in the French PAC V2X project) for VRUs, V-ITS-Ss 110, and/or R-ITS-Ss 130 may depend on the vehicle level of automation. The collision avoidance action or impact mitigation action are triggered as a warning/alert to the driver or as a direct action on the vehicle 110 itself. Examples of collision avoidance include any combination of: extending or changing the phase of a traffic light; acting on the trajectory and/or velocity of the vehicles 110 (e.g., slow down, change lane, and/or the like) if the vehicle 110 has a sufficient level of automation; alert the ITS device user through the HMI; disseminate a C-ITS message to other road users, including the VRU 116/117 if relevant. Examples of impact mitigation actions may include any combination of triggering a protective mean at the vehicle level (e.g., extended external airbag); triggering a portable VRU protection airbag.

The road infrastructure may offer services to support the road crossing by VRU such as traffic lights. When a VRU starts crossing a road at a traffic light level authorizing him, the traffic light should not change of phase as long as the VRU has not completed its crossing. Accordingly, the VAM should contain data elements enabling the traffic light to determine the end of the road crossing by the VRU 116/117.

The maneuver coordination function 2013 executes the collision avoidance actions which are associated with the collision avoidance strategy that has been decided (and selected). The collision avoidance actions are triggered at the level of the VRU 116/117, the vehicle 110, or both, depending on the VRU capabilities to act (e.g., VRU profile and type), the vehicle type and capabilities and the actual risk of collision. VRUs 116/117 do not always have the capability to act to avoid a collision (e.g., animal, children, aging person, disabled, and/or the like), especially if the TTC is short (a few seconds) (see e.g., clauses 6.5.10.5 and 6.5.10.6 of [TS103300-2]. This function should be present at the vehicle 110 level, depending also on the vehicle 110 level of automation (e.g., not present in non-automated vehicles), and may be present at the VRU device 117 level according to the VRU profile. At the vehicle 110 level, this function interfaces the vehicle electronics controlling the vehicle dynamic state in terms of heading and velocity. At the VRU device 117 level, this function may interface the HMI support function, according to the VRU profile, to be able to issue a warning or alert to the VRU 116/117 according to the TTC.

Maneuver coordination 2013 can be proposed to vehicles from an infrastructure element, which may be able to obtain a better perception of the motion dynamics of the involved moving objects, by means of its own sensors or by the fusion of their data with the remote perception obtained from standard messages such as CAMs.

The maneuver coordination 2013 at the VRU 116 may be enabled by sharing among the ego-VRU and the neighboring ITSs, first the TII reflecting how likely is the ego VRU ITS-Ss 117 trajectory going to be intercepted by the neighboring ITSs (other VRU or non-VRU ITSs such as vehicles), and second a Maneuver Identifier (MI) to indicate the type of VRU maneuvering needed. An MI is an identifier of a maneuver (to be) used in a maneuver coordination service (MCS) 2013. The choice of maneuver may be generated locally based on the available sensor data at the VRU ITS-S 117 and may be shared with neighboring ITS-S (e.g., other VRUs 116 and/or non-VRUs) in the vicinity of the ego VRU ITS-S 117 to initiate a joint maneuver coordination among VRUs 116 (see e.g., clause 6.5.10.9 of [TS103300-3]).

Depending upon the analysis of the scene in terms of the sensory as well as shared inputs, simple TII ranges can be defined to indicate the likelihood of the ego-VRU's 116 path to be intercepted by another entity. Such indication helps to trigger timely maneuvering. For instance, TII could be defined in terms of TII index that may simply indicate the chances of potential trajectory interception (low, medium, high or very high) for CRA 2016. If there are multiple other entities, the TII may be indicated for the specific entity differentiable via a simple ID which depends upon the simultaneous number of entities in the vicinity at that time. The vicinity could even be just one cluster that the current VRU is located in. For example, the minimum number of entities or users in a cluster is 50 per cluster (worst case). However, the set of users that may have the potential to collide with the VRU could be much less than 50 thus possible to indicate via few bits in say, VAM.

On the other hand, the MI parameter can be helpful in collision risk avoidance 2017 by triggering/suggesting the type of maneuver action needed at the VRUs 116/117. The number of such possible maneuver actions may be only a few. For simplicity, it could also define as the possible actions to choose from as {longitudinal trajectory change maneuvering, lateral trajectory change maneuvering, heading change maneuvering or emergency braking/deceleration} in order to avoid potential collision indicated by the TII. The TII and MI parameters can also be exchanged via inclusion in part of a VAM DF structure.

The event detection function 2018 assists the VBS 2021 during its operation when transitioning from one state to another. Examples of the events to be considered include: change of a VRU role when a road user becomes vulnerable (activation) or when a road user is not any more vulnerable (de-activation); change of a VRU profile when a VRU enters a cluster with other VRU(s) or with a new mechanical element (e.g., bicycle, scooter, moto, and/or the like), or when a VRU cluster is disassembling; risk of collision between one or several VRU(s) and at least one other VRU (using a VRU vehicle) or a vehicle (such event is detected via the perception capabilities of the VRU system); change of the VRU motion dynamic (trajectory or velocity) which will impact the TTC and the reliability of the previous prediction; and change of the status of a road infrastructure piece of equipment (e.g., a traffic light phase) impacting the VRU movements.

Additionally or alternatively, existing infrastructure services 2012 such as those described herein can be used in the context of the VBS 2021. For example, the broadcast of the Signal Phase And Timing (SPAT) and SPAT relevance delimited area (MAP) is already standardized and used by vehicles at intersection level. In principle they protect VRUs 116/117 crossing. However, signal violation warnings may exist and can be detected and signaled using DENM. This signal violation indication using DENMs is very relevant to VRU devices 117 as indicating an increase of the collision risk with the vehicle which violates the signal. If it uses local captors or detects and analyses VAMs, the traffic light controller may delay the red phase change to green and allow the VRU 116/117 to safely terminate its road crossing. The contextual speed limit using In-Vehicle Information (IVI) can be adapted when a large cluster of VRUs 116/117 is detected (e.g., limiting the vehicles' speed to 30 km/hour). At such reduced speed a vehicle 110 may act efficiently when perceiving the VRUs by means of its own local perception system.

The ITS management (mgmnt) layer includes a VRU profile mgmnt entity. The VRU profile management function is an important support element for the VBS 2021 as managing the VRU profile during a VRU active session. The profile management is part of the ITS-S configuration management and is then initialized with necessary typical parameters' values to be able to fulfil its operation. The ITS-S configuration management is also responsible for updates (for example: new standard versions) which are necessary during the whole life cycle of the system.

When the VBS 2021 is activated (vulnerability configured), the VRU profile management needs to characterize a VRU personalized profile based on its experience and on provided initial configuration (generic VRU type). The VRU profile management may then continue to learn about the VRU habits and behaviors with the objective to increase the level of confidence (reliability) being associated to its motion dynamic (trajectories and velocities) and to its evolution predictions.

The VRU profile management 2061 is able to adapt the VRU profile according to detected events which can be signaled by the VBS management and the VRU cluster management 2102 (cluster building/formation or cluster disassembly/disbandenment).

According to its profile, a VRU may or may not be impacted by some road infrastructure event (e.g., evolution of a traffic light phase), so enabling a better estimation of the confidence level to be associated to its movements. For example, an adult pedestrian will likely wait at a green traffic light and then cross the road when the traffic light turns to red. An animal will not take care of the traffic light color and a child can wait or not according to its age and level of education.

Figure 21:
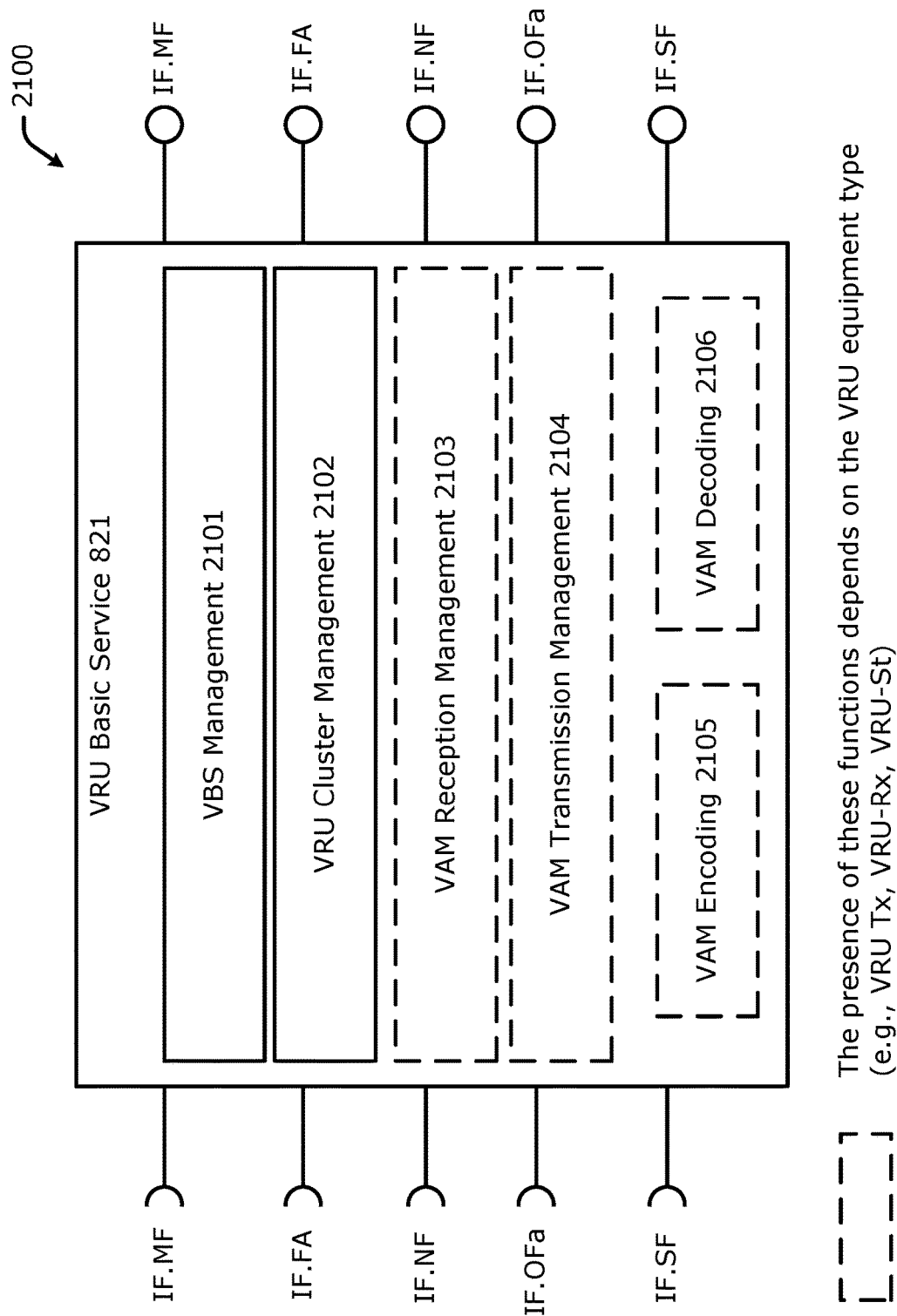
FIG. 21 depicts a VRU basic service (VBS) functional model.

FIG. 21 shows an example VBS functional model 2100. The VBS 2021 is a facilities layer entity that operates the VAM protocol. It provides three main services: handling the VRU role, sending and receiving of VAMs. The VBS uses the services provided by the protocol entities of the ITS networking & transport layer to disseminate the VAM. In some implementations, the presence/absence of the dotted/dashed blocks depend on whether the VRU equipment type is VRU-Tx, VRU-Rx or VRU-St (see e.g., [TS103300-2]).

Among other functions, within the scope of this disclosure are briefly summarized as follows: The VBS (Service) Management 2101 is responsible for activating or deactivating the VAM transmission according to the device role parameters as well as managing the triggering conditions for VAM transmission. The VRU Cluster Management 2102 is responsible for managing combined and clustered VRU creation and breaking down. The VAM Reception Management 2103, after VAM message decoding, checks the relevance, consistency, plausibility, integrity, and/or the like. of the Rx message and stores or deletes the Rx message data elements in the local dynamic map (LDM). The VAM Transmission Management 2104 assembles VAM DEs and sending to the encoding function. The VAM Encoding 2105 is responsible for encodes the VAM DEs coming from the VAM Tx management function and triggers VAM transmission to Networking and Transport layer (the function is present only if the VRU-ITS-S VRU-Rx capable). The VRU decoding 2106 extracts the relevant DEs in the received VAM (the function is present only if the VRU-ITS-S VRU-Rx capable) and sending them to the reception management function.

Handling VRU role: The VBS 2021 receives unsolicited indications from the VRU profile management entity (see e.g., clause 6.4 in [TS103300-2]) on whether the device user is in a context where it is considered as a VRU (e.g., pedestrian crossing a road) or not (e.g., passenger in a bus). The VBS 2021 remains operational in both states, as defined by Table 24.

VRU_ROLE_OFF. This is implementation dependent, as the receiving ITS-S should have very strong plausibility check and take into account the VRU context during their risk analysis. The precision of the positioning system (both at transmitting and receiving side) would also have a strong impact on the detection of such cases Sending VAMs includes two activities: generation of VAMs and transmission of VAMs. In VAM generation, the originating ITS-S 117 composes the VAM, which is then delivered to the ITS networking and transport layer for dissemination. In VAM transmission, the VAM is transmitted over one or more communications media using one or more transport and networking protocols. A natural model is for VAMs to be sent by the originating ITS-S to all ITS-Ss within the direct communication range. VAMs are generated at a frequency determined by the controlling VBS 2021 in the originating ITS-S. If a VRU ITS-S is not in a cluster, or is the leader of a cluster, it transmits the VAM periodically. VRU ITS-S 117 that are in a cluster, but not the leader of a cluster, do not transmit the VAM. The generation frequency is determined based on the change of kinematic state, location of the VRU ITS-S 117, and congestion in the radio channel. Security measures such as authentication are applied to the VAM during the transmission process in coordination with the security entity.

Upon receiving a VAM, the VBS 2021 makes the content of the VAM available to the ITS applications and/or to other facilities within the receiving ITS-S 117/130/110, such as a Local Dynamic Map (LDM). It applies all necessary security measures such as relevance or message integrity check in coordination with the security entity.

The VBS 2021 includes a VBS management function 2101, a VRU cluster management function 2102, a VAM reception management function 2103, a VAM transmission management function 2104, VAM encoding function 2105, and VAM decoding function 2106. The presence of some or all of these functions depends on the VRU equipment type (e.g., VRU-Tx, VRU-Rx, or VRU-St), and may vary depending on application, use case, design choice, and/or the like.

TABLE 24

Possible roles of the VRU during VRU basic service operation

| VRU role | Specification | Valid VRU profiles | Valid VRU types | Additional explanation |
| --- | --- | --- | --- | --- |
| VRU_ROLE_ON | The device user is considered as a VRU. Based on information received from VRU profile management entity, the VBS shall check the type of VRU and the profile of VRU. It shall also handle the VBS clustering state and provide services to other entities, as defined in clause 5. | ALL | ALL | The VBS state should be changed according to the condition of VRU device user as notified by the VRU profile Management entity. The VRU device can send VAMs, receive VAMs, or both while checking the position of VRU device user through the PoTi entity. Except for VRUs of profile 3, it may execute the VRU clustering functions (see clause 5). |
| VRU_ROLE_OFF | The device user is not considered as a VRU. The VRU device shall neither send nor receive VAMs | ALL | ALL | The VRU is located in a "zero-risk" geographical area, for example in a bus, in a passenger car, and/or the like. The VBS remains operational in this state to monitor any notification that the role has changed to VRU_ROLE_ON. |

There may be cases where the VRU profile management entity provides invalid information, e.g., the VRU device user is considered as a VRU, while its role should be The VBS management function 2101 executes the following operations: store the assigned ITS AID and the assigned Network Port to use for the VBS 2021; store the VRU configuration received at initialization time or updated later for the coding of VAM data elements; receive information from and transmit information to the HMI; activate/deactivate the VAM transmission service 2104 according to the device role parameter (for example, the service is deactivated when a pedestrian enters a bus); and manage the triggering conditions of VAM transmission 2104 in relation to the network congestion control. For example, after activation of a new cluster, it may be decided to stop the transmission of element(s) of the cluster.

The VRU cluster management function 2102 performs the following operations: detect if the associated VRU can be the leader of a cluster; compute and store the cluster parameters at activation time for the coding of VAM data elements specific to the cluster; manage the state machine associated to the VRU according to detected cluster events (see e.g., state machines examples provided in section 6.2.4 of [TS103300-2]); and activate or de-activate the broadcasting of the VAMs or other standard messages (e.g., DENMs) according to the state and types of associated VRU.

The clustering operation as part of the VBS 2021 is intended to optimize the resource usage in the ITS system. These resources are mainly spectrum resources and processing resources.

A huge number of VRUs in a certain area (pedestrian crossing in urban environment, large squares in urban environment, special events like large pedestrian gatherings) would lead to a significant number of individual messages sent out by the VRU ITS-S and thus a significant need for spectrum resources. Additionally, all these messages would need to be processed by the receiving ITS-S, potentially including overhead for security operations.

In order to reduce this resource usage, the present document specifies clustering functionality. A VRU cluster is a group of VRUs with a homogeneous behavior (see e.g., [TS103300-2]), where VAMs related to the VRU cluster provide information about the entire cluster. Within a VRU cluster, VRU devices take the role of either leader (one per cluster) or member. A leader device sends VAMs containing cluster information and/or cluster operations. Member devices send VAMs containing cluster operation container to join/leave the VRU cluster. Member devices do not send VAMs containing cluster information container at any time.

A cluster may contain VRU devices of multiple profiles. A cluster is referred to as "homogeneous" if it contains devices of only one profile, and "heterogeneous" if it contains VRU devices of more than one profile (e.g., a mixed group of pedestrians and bicyclists). The VAM ClusterInformationContainer contains a field allowing the cluster container to indicate which VRU profiles are present in the cluster. Indicating heterogeneous clusters is important since it provides useful information about trajectory and behaviors prediction when the cluster is broken up.

The support of the clustering function is optional in the VBS 2021 for all VRU profiles. The decision to support the clustering or not is implementation dependent for all the VRU profiles. When the conditions are satisfied (see clause 5.4.2.4 of [TS103300-3]), the support of clustering is recommended for VRU profile 1. An implementation that supports clustering may also allow the device owner to activate it or not by configuration. This configuration is also implementation dependent. If the clustering function is supported and activated in the VRU device, and only in this case, the VRU ITS-S shall comply with the requirements specified in clause 5.4.2 and clause 7 of [TS103300-3], and define the parameters specified in clause 5.4.3 of [TS103300-3]. As a consequence, cluster parameters are grouped in two specific and conditional mandatory containers in the present document.

The basic operations to be performed as part of the VRU cluster management 2102 in the VBS 2021 are: Cluster identification: intra-cluster identification by cluster participants in Ad-Hoc mode; Cluster creation: creation of a cluster of VRUs including VRU devices located nearby and with similar intended directions and speeds. The details of the cluster creation operation are given in clause 5.4.2.2 of [TS103300-3]; Cluster breaking up: disbanding of the cluster when it no longer participates in the safety related traffic or the cardinality drops below a given threshold; Cluster joining and leaving: intro-cluster operation, adding or deleting an individual member to an existing cluster; Cluster extension or shrinking: operation to increase or decrease the size (area or cardinality).

Any VRU device shall lead a maximum of one cluster. Accordingly, a cluster leader shall break up its cluster before starting to join another cluster. This requirement also applies to combined VRUs as defined in [TS103300-2] joining a different cluster (e.g., while passing a pedestrian crossing). The combined VRU may then be re-created after leaving the heterogeneous cluster as needed. For example, if a bicyclist with a VRU device, currently in a combined cluster with his bicycle which also has a VRU device, detects it could join a larger cluster, then the leader of the combined VRU breaks up the cluster and both devices each join the larger cluster separately. The possibility to include or merge VRU clusters or combined VRUs inside a VRU cluster is left for further study. In some implementations, a simple in-band VAM signaling may be used for the operation of VRU clustering. Further methods may be defined to establish, maintain and tear up the association between devices (e.g., Bluetooth®, UWB, and/or the like).

The interactions between the VRU basic service and other facilities layer entities in the ITS-S architecture are used to obtain information for the generation of the VAM. The interfaces for these interactions are described in Table 25. The IF.OFa (interfaces to other facilities) are implementation dependent

TABLE 25

| VRU Basic Service interfaces (IF.OFa) | |
| --- | --- |
| Interfaced functionality | Parameters |
| PoTi | Information of the positioning and timing are sent to the VRU basic service, i.e. the position of the ITS-S and time information specified in ETSI EN 302 890-2. Further details are described in clause 6.5.10.3 of [TS103300-2]. |
| CA Basic service | In case of a motorcycle, the VRU basic service needs to inform the Cooperative Awareness basic service that the vehicle is a VRU from VRU profile 3 and trigger the dedicated container when transmitting CAMs. It |

TABLE 25-continued

VRU Basic Service interfaces (IF.OFa)

| Interfaced functionality | Parameters |
| --- | --- |
| | also needs to provide associated DEs to put in the VRU special container, e.g. type of profile, roll angle, path prediction, and/or the like. |
| Congestion Control | Information to optimize the use of the available channel are sent to the VRU basic service, e.g. T_GenVam_Dcc in the case of the ITS-G5 access layer. Further details are described in clause 6.5.10.5 of [TS103300-2]. |
| HMI support | The interactions between the VRU basic service and the HMI support function of the facilities layer are necessary for the exchange of information (parameters, data elements) to be used for the management of the VRU awareness service and the provisioning of data elements in VAMs. The HMI support function can be implemented to select any proper data in the candidate list such as VRU profile. The HMI support function can forward input data from the touchscreen or button in the device of VRU to VRU basic service. Awareness advices and alert may be provided to VRU via its HMI according to its personalized characteristics. Further details are described in clause 6.5.7 of [TS103300-2]. |
| LDM | LDM/VAM data are exchanged via the interface between LDM and the VRU Basic Service. Further details are described in clause 6.5.10.2 of [TS103300-2]. |
| Device Data Provider (DDP) | The DDP provides the device status information obtained from its local perception entities (see e.g., [TS103300-2]) to the VRU Basic Service. |
| Other Application Support Facilities | Information to trigger the transmission of messages are sent to the VRU Basic Service. The VRU Basic Service forwards received messages to the relevant applications. Further details are described in clause 6.5.10.4 [TS103300-2]. |

For VRU Cluster operation, depending on its context, the VBS 2021 is in one of the cluster states specified in Table 16. In addition to the normal VAM triggering conditions defined in clause 6 of [TS103300-3], the events discussed previously in section 4 can trigger a VBS state transition related to cluster operation. Parameters that control these events are summarized in clause 8 of [TS103300-3] (tables 14 and 15) and discussed supra.

The VAM reception management function 2103 performs the following operations after VAM messages decoding: check the relevance of the received message according to its current mobility characteristics and state; check the consistency, plausibility and integrity (see the liaison with security protocols) of the received message semantic; and destroy or store the received message data elements in the LDM according to previous operations results.

The VAM Transmission management function 2104 is only available at the VRU device level, not at the level of other ITS elements such as V-ITS-Ss 110 or R-ITS-Ss 130. Even at the VRU device level, this function may not be present depending on its initial configuration (see device role setting function 2011). The VAM transmission management function 2104 performs the following operations upon request of the VBS management function 2101: assemble the message data elements in conformity to the message standard specification; and send the constructed VAM to the VAM encoding function 2105. The VAM encoding function 2105 encodes the Data Elements provided by the VAM transmission management function 2104 in conformity with the VAM specification. The VAM encoding function 2105 is available only if the VAM transmission management function 2104 is available.

The VAM decoding function 2106 extracts the relevant Data Elements contained in the received message. These data elements are then communicated to the VAM reception management function 2103. The VAM decoding function 2106 is available only if the VAM reception management function 2103 is available.

A VRU may be configured with a VRU profile. VRU profiles are the basis for the further definition of the VRU functional architecture. The profiles are derived from the various use cases discussed herein. VRUs 116 usually refers to living beings. A living being is considered to be a VRU only when it is in the context of a safety related traffic environment. For example, a living being in a house is not a VRU until it is in the vicinity of a street (e.g., 2 m or 3 m), at which point, it is part of the safety related context. This allows the amount of communications to be limited, for example, a C-ITS communications device need only start to act as a VRU-ITS-S when the living being associated with it starts acting in the role of a VRU.

A VRU can be equipped with a portable device. The term "VRU" may be used to refer to both a VRU and its VRU device unless the context dictates otherwise. The VRU device may be initially configured and may evolve during its operation following context changes that need to be specified. This is particularly true for the setting-up of the VRU profile and VRU type which can be achieved automatically at power on or via an HMI. The change of the road user vulnerability state needs to be also provided either to activate the VBS when the road user becomes vulnerable or to de-activate it when entering a protected area. The initial configuration can be set-up automatically when the device is powered up. This can be the case for the VRU equipment type which may be: VRU-Tx with the only communication capability to broadcast messages and complying with the channel congestion control rules; VRU-Rx with the only communication capability to receive messages; and/or VRU-St with full duplex communication capabilities. During operation, the VRU profile may also change due to some clustering or de-assembly. Consequently, the VRU device role will be able to evolve according to the VRU profile changes.

The following profile classification parameters may be used to classify different VRUs 116: Maximum and average (e.g., typical) speed values (e.g., may be with its standard deviation); minimum and average (e.g., typical) communication range, The communication range may be calculated based on the assumption that an awareness time of 5 seconds is needed to warn/act on the traffic participants; environment or type of area (e.g., urban, sub-urban, rural, highway, and/or the like); average Weight and standard deviation; directivity/trajectory ambiguity (give the level of confidence in the predictability of the behavior of the VRU in its movements);

and/or cluster size (e.g., number of VRUs 116 in the cluster. A VRU may be leading a cluster and then indicate its size. In such case, the leading VRU can be positioned as serving as the reference position of the cluster).

These profile parameters are not dynamic parameters maintained in internal tables, but indications of typical values to be used to classify the VRUs 116 and evaluate the behavior of a VRU 116 belonging to a specific profile. Example VRU profiles may be as follows:

VRU Profile 1—Pedestrian. VRUs 116 in this profile may include any road users not using a mechanical device, and includes, for example, pedestrians on a pavement, children, prams, disabled persons, blind persons guided by a dog, elderly persons, riders off their bikes, and the like.

VRU Profile 2—Bicyclist. VRUs 116 in this profile may include bicyclists and similar light vehicle riders, possibly with an electric engine. This VRU profile includes bicyclists, and also unicycles, wheelchair users, horses carrying a rider, skaters, e-scooters, Segway's, and/or the like. It should be noted that the light vehicle itself does not represent a VRU, but only in combination with a person creates the VRU.

VRU Profile 3—Motorcyclist. VRUs 116 in this profile may include motorcyclists, which are equipped with engines that allow them to move on the road. This profile includes users (e.g., driver and passengers, e.g., children and animals) of Powered Two Wheelers (PTW) such as mopeds (motorized scooters), motorcycles or side-cars, and may also include four-wheeled all-terrain vehicles (ATVs), snowmobiles (or snow machines), jet skis for marine environments, and/or other like powered vehicles.

VRU Profile 4—Animals presenting a safety risk to other road users. VRUs 116 in this profile may include dogs, wild animals, horses, cows, sheep, and/or the like. Some of these VRUs 116 might have their own ITS-S (e.g., dog in a city or a horse) or some other type of device (e.g., GPS module in dog collar, implanted RFID tags, and/or the like), but most of the VRUs 116 in this profile will only be indirectly detected (e.g., wild animals in rural areas and highway situations). Clusters of animal VRUs 116 might be herds of animals, like a herd of sheep, cows, or wild boars. This profile has a lower priority when decisions have to be taken to protect a VRU.

Point-to-multipoint communication as discussed in ETSI EN 302 636-4-1 v 1.3.1 (2017 August) (hereinafter "[EN302634-4-1]"), ETSI EN 302 636-3 v1.1.2 (2014 March) ("[EN302636-3]") may be used for transmitting VAMs, as specified in ETSI TS 103 300-3 V0.1.11 (2020 May) ("[TS103300-3]").

Frequency Periodicity range of VAMs. A VAM generation event results in the generation of one VAM. The minimum time elapsed between the start of consecutive VAM generation events are equal to or larger than T_GenVam. T_GenVam is limited to T_GenVamMin≤T_GenVam≤T_GenVamMax, where T_GenVamMin and T_GenVamMax are specified in Table 11 (Section 8). When a cluster VAM is transmitted, the T_GenVam could be smaller than that of individual VAM.

In case of ITS-G5, T_GenVam is managed according to the channel usage requirements of Decentralized Congestion Control (DCC) as specified in ETSI TS 103 175. The parameter T_GenVam is provided by the VBS management entity in the unit of milliseconds. If the management entity provides this parameter with a value above T_GenVamMax, T_GenVam is set to T_GenVamMax and if the value is below T_GenVamMin or if this parameter is not provided, the T_GenVam is set to T_GenVamMin. The parameter T_GenVam represents the currently valid lower limit for the time elapsed between consecutive VAM generation events.

In case of C-V2X PC5, T_GenVam is managed in accordance to the congestion control mechanism defined by the access layer in ETSI TS 103 574.

Triggering conditions. Individual VAM Transmission Management by VBS at VRU-ITS-S. First time individual VAM is generated immediately or at earliest time for transmission if any of the following conditions is satisfied and the individual VAM transmission does not subject to redundancy mitigation techniques: (1) A VRU 116 is in VRU-IDLE VBS State and has entered VRU-ACTIVE-STAND-ALONE; (2) A VRU 116/117 is in VRU-PASSIVE VBS State; has decided to leave the cluster and enter VRU-ACTIVE-STANDALONE VBS State;

(3) A VRU 116/117 is in VRU-PASSIVE VBS State; VRU has determined that one or more new vehicles or other VRUs 116/117 (e.g., VRU Profile 3—Motorcyclist) have come closer than minimum safe lateral distance (MSLaD) laterally, closer than minimum safe longitudinal distance (MSLoD) longitudinally and closer than minimum safe vertical distance (MSVD) vertically, and has determined to leave cluster and enter VRU-ACTIVE-STANDALONE VBS State in order to transmit immediate VAM; (4) a VRU 116/117 is in VRU-PASSIVE VBS State; has determined that VRU Cluster leader is lost and has decided to enter VRU-ACTIVE-STANDALONE VBS State; and/or (5) a VRU 116/117 is in VRU-ACTIVE-CLUSTERLEADER VBS State; has determined breaking up the cluster and has transmitted VRU Cluster VAM with disband indication; and has decided to enter VRU-ACTIVE-STANDALONE VBS State.

Consecutive VAM Transmission is contingent to conditions as described here. Consecutive individual VAM generation events occurs at an interval equal to or larger than T_GenVam. An individual VAM is generated for transmission as part of a generation event if the originating VRU-ITS-S 117 is still in VBS VRU-ACTIVE-STANDALONE VBS State, any of the following conditions is satisfied and individual VAM transmission does not subject to redundancy mitigation techniques: (1) The time elapsed since the last time the individual VAM was transmitted exceeds T_GenVamMax. (2) The Euclidian absolute distance between the current estimated position of the reference point of the VRU and the estimated position of the reference point lastly included in an individual VAM exceeds a pre-defined Threshold minReferencePointPositionChangeThreshold. (3) The difference between the current estimated ground speed of the reference point of the VRU 116 and the estimated absolute speed of the reference point of the VRU lastly included in an individual VAM exceeds a pre-defined Threshold minGroundSpeedChangeThreshold. (4) The difference between the orientation of the vector of the current estimated ground velocity of the reference point of the VRU 116 and the estimated orientation of the vector of the ground velocity of the reference point of the VRU 116 lastly included in an individual VAM exceeds a pre-defined Threshold minGroundVelocityOrientationChangeThreshold. (5) The difference between the current estimated collision probability with vehicle(s) or other VRU(s) 116 (e.g., as measured by Trajectory Interception Probability) and the estimated collision probability with vehicle(s) or other VRU (s) 116 lastly reported in an individual VAM exceeds a pre-defined Threshold minCollisionProbabilityChangeThreshold. (6) The originating ITS-S is a VRU in VRU-ACTIVE-STANDALONE VBS State and has decided to join a Cluster after its previous individual VAM transmission. A VRU 116/117 has determined that one or more new vehicles or other VRUs 116/117 have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically.

VRU cluster VAM transmission management by VBS at VRU-ITS-S. First time VRU cluster VAM is generated immediately or at earliest time for transmission if any of the following conditions is satisfied and the VRU cluster VAM transmission does not subject to redundancy mitigation techniques: A VRU 116 in VRU-ACTIVE-STANDALONE VBS State determines to form a VRU cluster.

Consecutive VRU cluster VAM Transmission is contingent to conditions as described here. Consecutive VRU cluster VAM generation events occurs at cluster leader at an interval equal to or larger than T_GenVam. A VRU cluster VAM is generated for transmission by the cluster leader as part of a generation event if any of the following conditions is satisfied and VRU cluster VAM transmission does not subject to redundancy mitigation techniques: (1) The time elapsed since the last time the VRU cluster VAM was transmitted exceeds T_GenVamMax. (2) The Euclidian absolute distance between the current estimated position of the reference point of the VRU cluster and the estimated position of the reference point lastly included in a VRU cluster VAM exceeds a pre-defined Threshold minReferencePointPositionChangeThreshold. (3) The difference between the current estimated Width of the cluster and the estimated Width included in the lastly transmitted VAM exceeds a pre-defined Threshold minClusterWidthChangeThreshold. (4) The difference between the current estimated Length of the cluster and the estimated Length included in the lastly transmitted VAM exceeds a pre-defined Threshold minClusterLengthChange Threshold. (5) The difference between the current estimated ground speed of the reference point of the VRU cluster and the estimated absolute speed of the reference point lastly included a VRU cluster VAM exceeds a pre-defined Threshold minGroundSpeedChangeThreshold. (6) The difference between the orientation of the vector of the current estimated ground velocity of the reference point of the VRU cluster and the estimated orientation of the vector of the ground velocity of the reference point lastly included in a VRU cluster VAM exceeds a pre-defined Threshold minGroundVelocityOrientationChangeThreshold. (7) The difference between the current estimated probability of collision of the VRU cluster with vehicle(s) or other VRU(s) (e.g., as measured by Trajectory Interception Probability of other vehicles/VRUs 116/117 with cluster Bounding Area) and the estimated collision probability with vehicle(s) or other VRU(s) lastly reported in a VAM exceeds minCollisionProbabilityChange Threshold. (8) VRU cluster type has been changed (e.g., from homogeneous to heterogeneous cluster or vice versa) after previous VAM generation event. (9) Cluster leader has determined to break up the cluster after transmission of previous VRU cluster VAM. (10) More than a pre-defined number of new VRUs 116/117 have joined the VRU cluster after transmission of previous VRU cluster VAM. (11) More than a pre-defined number of members has left the VRU cluster after transmission of previous VRU cluster VAM. (12) VRU in VRU-ACTIVE-CLUSTERLEADER VBS State has determined that one or more new vehicles or non-member VRUs 116/117 (e.g., VRU Profile 3—Motorcyclist) have satisfied the following conditions simultaneously after the lastly transmitted VAM. The conditions are: coming closer than minimum safe lateral distance (MSLaD) laterally, coming closer than minimum safe longitudinal distance (MSLoD) longitudinally and coming closer than minimum safe vertical distance (MSVD) vertically to the cluster bounding box.

VAM Redundancy Mitigation. A balance between Frequency of VAM generation at facilities layer and communication overhead at access layer is considered without impacting VRU safety and VRU awareness in the proximity. VAM transmission at a VAM generation event may subject to the following redundancy mitigation techniques: An originating VRU-ITS-S 117 skips current individual VAM if all the following conditions are satisfied simultaneously. The time elapsed since the last time VAM was transmitted by originating VRU-ITS-S 117 does not exceed N (e.g., 4) times T_GenVamMax; The Euclidian absolute distance between the current estimated position of the reference point and the estimated position of the reference point in the received VAM is less than minReferencePointPositionChangeThreshold; the difference between the current estimated speed of the reference point and the estimated absolute speed of the reference point in received VAM is less than minGroundSpeedChangeThreshold; and The difference between the orientation of the vector of the current estimated ground velocity and the estimated orientation of the vector of the ground velocity of the reference point in the received VAM is less than minGroundVelocityOrientationChangeThreshold. Additionally or alternatively, one of the following conditions are satisfied: VRU 116 consults appropriate maps to verify if the VRU 116 is in protected or non-drivable areas such as buildings, and/or the like; VRU is in a geographical area designated as a pedestrian only zone. Only VRU profiles 1 and 4 allowed in the area; VRU 116 considers itself as a member of a VRU cluster and cluster break up message has not been received from the cluster leader; the information about the ego-VRU 116 has been reported by another ITS-S within T_GenVam.

VAM generation time. Besides the VAM generation frequency, the time required for the VAM generation and the timeliness of the data taken for the message construction are decisive for the applicability of data in the receiving ITS-Ss. In order to ensure proper interpretation of received VAMs, each VAM is timestamped. An acceptable time synchronization between the different ITS-Ss is expected and it is out of scope for this specification. The time required for a VAM generation is less than T_AssembleVAM. The time required for a VAM generation refers to the time difference between time at which a VAM generation is triggered and the time at which the VAM is delivered to the N&T layer.

VAM timestamp. The reference timestamp provided in a VAM disseminated by an ITS-S corresponds to the time at which the reference position provided in BasicContainer DF is determined by the originating ITS-S. The format and range of the timestamp is defined in clause B.3 of ETSI EN 302 637-2 V1.4.1 (2019 April) (hereinafter "[EN302637-2]"). The difference between VAM generation time and reference timestamp is less than 32 767 ms as in [EN302637-2]. This may help avoid timestamp wrap-around complications.

Transmitting VAMs. VRU-ITS-S 117 in VRU-ACTIVE-STANDALONE state sends 'individual VAMs', while VRU-ITS-S in VRU-ACTIVE-CLUSTERLEADER VBS state transmits 'Cluster VAMs' on behalf of the VRU cluster. Cluster member VRU-ITS-S 117 in VRU-PASSIVE VBS State sends individual VAMs containing VruClusterOperationContainer while leaving the VRU cluster. VRU-ITS-S 117 in VRU-ACTIVE-STANDALONE sends VAM as 'individual VAM' containing VruClusterOperationContainer while joining the VRU cluster.

VRUs 116/117 present a diversity of profiles which lead to random behaviors when moving in shared areas. Moreover, their inertia is much lower than vehicles (for example a pedestrian can do a U turn in less than one second) and as such their motion dynamic is more difficult to predict.

The VBS 2021 enables the dissemination of VRU Awareness Messages (VAM), whose purpose is to create awareness at the level of other VRUs 116/117 or vehicles 110, with the objective to solve conflicting situations leading to collisions. The vehicle possible action to solve a conflict situation is directly related to the time left before the conflict, the vehicle velocity, vehicle deceleration or lane change capability, weather and vehicle condition (for example state of the road and of the vehicle tires). In the best case, a vehicle needs 1 to 2 seconds to be able to avoid a collision, but in worst cases, it can take more than 4 to 5 seconds to be able to avoid a collision. If a vehicle is very close to a VRU and with constant velocity (for example time-to-collision between 1 to 2 seconds), it is not possible any more to talk about awareness as this becomes really an alert for both the VRU and the vehicle.

VRUs 116/117 and vehicles which are in a conflict situation need to detect it at least 5 to 6 seconds before reaching the conflict point to be sure to have the capability to act on time to avoid a collision. Generally, collision risk indicators (for example TTC, TDTC, PET, and/or the like, see e.g., [TS103300-2]) are used to predict the instant of the conflict. These indicators need a prediction of: the trajectory (path) followed by the subject VRU and the subject vehicle; and/or the time required by the subject VRU and the subject vehicle to reach together the conflict point.

These predictions should be derived from data elements which are exchanged between the subject VRU and the subject vehicle. For vehicles, the trajectory and time predictions can be better predicted than for VRUs, because vehicles' trajectories are constrained to the road topography, traffic, traffic rules, and/or the like, while VRUs 116/117 have much more freedom to move. For vehicles, their dynamics is also constrained by their size, their mass and their heading variation capabilities, which is not the case for most of the VRUs.

Accordingly, it is not possible, in many situations, to predict the VRUs 116/117 exact trajectory or their velocity only based on their recent path history and on their current position. If this is performed, a lot of false positive and false negative results can be expected, leading to decisions of wrong collision avoidance action.

A possible way to avoid false positive and false negative results is to base respectively the vehicle and VRU path predictions on deterministic information provided by the vehicle and by the VRU (motion dynamic change indications) and by a better knowledge of the statistical VRU behavior in repetitive contextual situations. A prediction can always be verified a-posteriori when building the path history. Detected errors can then be used to correct future predictions.

VRU Motion Dynamic Change Indications (MDCI) are built from deterministic indicators which are directly provided by the VRU device itself or which result from a mobility modality state change (e.g., transiting from pedestrian to bicyclist, transiting from pedestrian riding his bicycle to pedestrian pushing his bicycle, transiting from motorcyclist riding his motorcycle to motorcyclist ejected from his motorcycle, transitioning from a dangerous area to a protected area, for example entering a tramway, a train, and/or the like).

In the present document, the VRUs 116/117 can be classified into four profiles which are defined in clause 4.1 of [TS103300-3]. SAE International, "Taxonomy and Classification of Powered Micromobility Vehicles", Powered Micromobility Vehicles Committee, SAE Ground Vehicle Standard J3194 (20 Nov. 2019) ("[SAE-J3194]") also proposes a taxonomy and classification of powered micromobility vehicles: powered bicycle (e.g., electric bikes); powered standing scooter (e.g., Segway®); powered seated scooter; powered self-balancing board sometimes referred to as "self-balancing scooter" (e.g., Hoverboard® self-balancing board, and Onewheel® self-balancing single wheel electric board.); powered skates; and/or the like. Their main characteristics are their kerb weight, vehicle width, top speed, power source (electrical or combustion). Human powered micro-mobility vehicles (bicycle, standing scooter) should be also considered. Transitions between engine powered vehicles and human powered vehicles may occur, changing the motion dynamic of the vehicle. Both, human powered and engine powered may also occur in parallel, also impacting the motion dynamic of the vehicle.

In [TS103300-2] and in clause 5.4.2.6 of [TS103300-3], a combined VRU 116/117 is defined as the assembly of a VRU profile 1, potentially with one or several additional VRU(s) 116/117, with one VRU vehicle or animal. Several VRU vehicle types are possible. Even if most of them can carry VRUs, their propulsion mode can be different, leading to specific threats and vulnerabilities: they can be propelled by a human (human riding on the vehicle or mounted on an animal); they can be propelled by a thermal engine. In this case, the thermal engine is only activated when the ignition system is operational; and/or they can be propelled by an electrical engine. In this case, the electrical engine is immediately activated when the power supply is on (no ignition).

A combined VRU 116/117 can be the assembly of one human and one animal (e.g., human with a horse or human with a camel). A human riding a horse may decide to get off the horse and then pull it. In this case, the VRU 116/117 performs a transition from profile 2 to profile 1 with an impact on its velocity.

This diversity of VRUs 116/117 and cluster association leads to several VBS state machines conditioning standard messages dissemination and their respective motion dynamics. These state machines and their transitions can be summarized as in FIG. 22.

Figure 22:
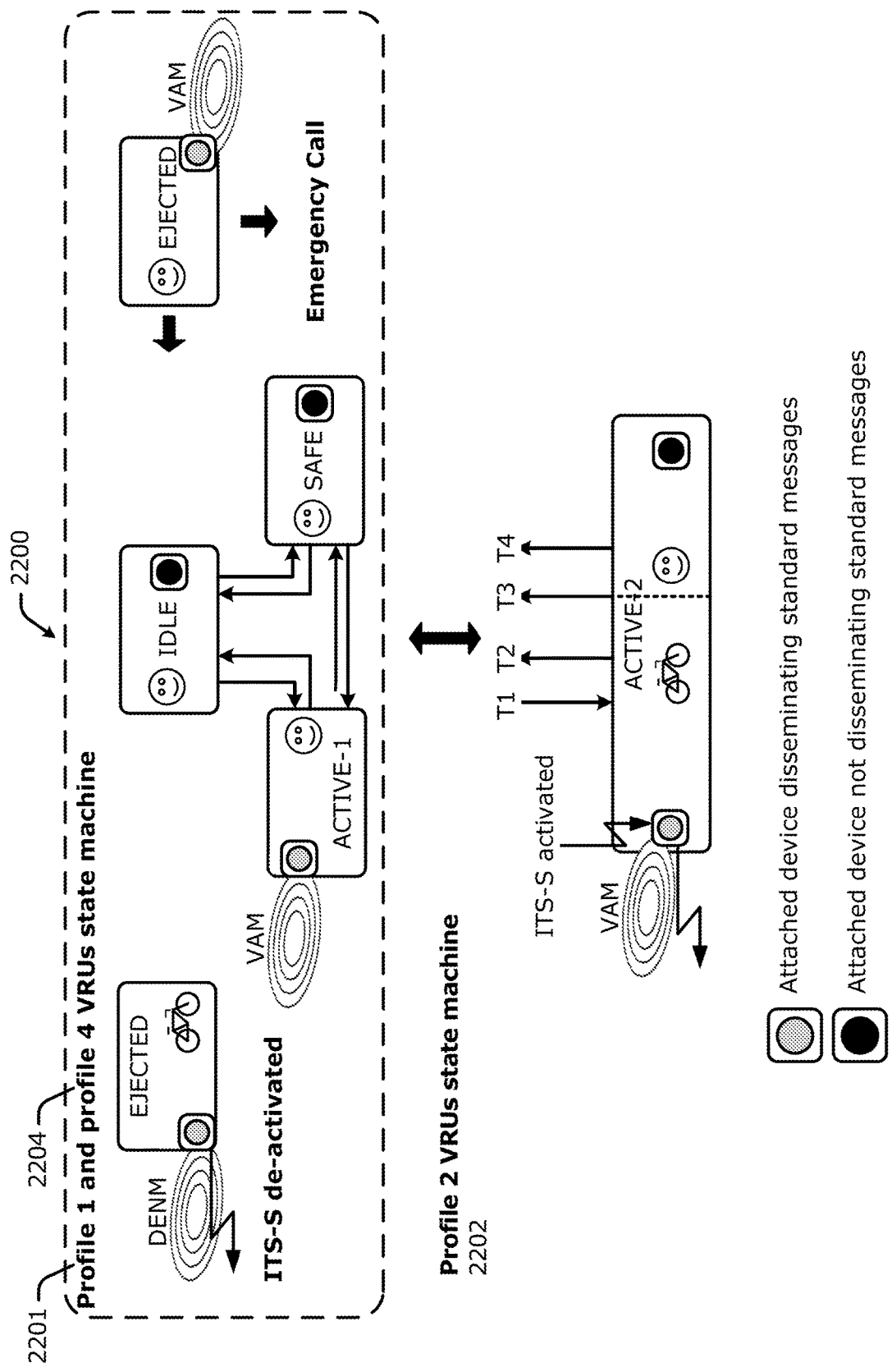
FIG. 22 shows VBS state machines.

FIG. 22 shows example state machines and transitions 2200. In FIG. 22, when a VRU is set as a profile 2 VRU 2202, with multiple attached devices, it is necessary to select an active one. This can be achieved for each attached device at the initialization time (configuration parameter) when the device is activated. In FIG. 22, the device attached to the bicycle has been configured to be active during its combination with the VRU. But when the VRU returns to a profile 1 state 2201, the device attached to the VRU vehicle needs to be deactivated, while the VBS 2021 in the device attached to the VRU transmits again VAMs if not in a protected location.

In the future, profile 2 2202, profile 1 2201, and profile 4 2204 VRUs may become members of a cluster, thus adding to their own state the state machine associated to clustering operation. This means that they need to respect the cluster management requirements while continuing to manage their own states. When transitioning from one state to another, the combined VRU may leave a cluster if it does not comply anymore with its requirements.

The machine states' transitions which are identified in FIG. 22 (e.g., T1 to T4) impact the motion dynamic of the VRU. These transitions are deterministically detected consecutively to VRU decisions or mechanical causes (for example VRU ejection from its VRU vehicle). The identified transitions have the following VRU motion dynamic impacts.

T1 is a transition from a VRU profile 1 2201 to profile 2 2202. This transition is manually or automatically triggered when the VRU takes the decision to use actively a VRU vehicle (riding). The motion dynamic velocity parameter value of the VRU changes from a low speed (pushing/pulling his VRU vehicle) to a higher speed related to the class of the selected VRU vehicle.

T2 is a transition from a VRU profile 2 2202 to profile 1 2201. This transition is manually or automatically triggered when the VRU gets off his VRU vehicle and leaves it to become a pedestrian. The motion dynamic velocity parameter value of the VRU changes from a given speed to a lower speed related to the class of the selected VRU vehicle.

T3 is a transition from a VRU profile 2 2202 to profile 1 2201. This transition is manually or automatically triggered when the VRU gets off his VRU vehicle and pushes/pulls it for example to enter a protected environment (for example tramway, bus, train). The motion dynamic velocity parameter value of the VRU changes from a given speed to a lower speed related to the class of the selected VRU vehicle.

T4 is a transition from a VRU profile 2 2202 to profile 1 2201. This transition is automatically triggered when a VRU is detected to be ejected from his VRU vehicle. The motion dynamic velocity parameter value of the VRU changes from a given speed to a lower speed related to the VRU state resulting from his ejection. In this case, the VRU vehicle is considered as an obstacle on the road and accordingly should disseminate DENMs until it is removed from the road (its ITS-S is deactivated).

The ejection case can be detected by stability indicators including inertia sensors and the rider competence level derived from its behavior. The stability can then be expressed in terms of the risk level of a complete stability lost. When the risk level is 100% this can be determined as a factual ejection of the VRU.

From the variation of the motion change dynamic velocity parameter value, a new path prediction can be provided from registered "contextual" past path histories (average VRU traces). The contextual information consider several parameters which are related to a context similar to the context in which the VRU is evolving.

Adding to the state transitions identified above, which may drastically impact the VRU velocity, the following VRU indications also impact the VRU velocity and/or the VRU trajectory (in addition to the parameters already defined in the VAM).

Stopping indicator. The VRU or an external source (a traffic light being red for the VRU) may indicate that the VRU is stopping for a moment. When this indicator is set, it could also be useful to know the duration of the VRU stop. This duration can be estimated either when provided by an external source (for example the SPATEM information received from a traffic light) or when learned through an analysis of the VRU behavior in similar circumstances.

Visibility indicators. Weather conditions may impact the VRU visibility and accordingly change its motion dynamic. Even if the local vehicles may detect these weather conditions, in some cases, the impact on the VRU could be difficult to estimate by vehicles. A typical example is the following: according to its orientation, a VRU can be disturbed by a severe glare of the sun (for example, in the morning when the sun rises, or in the evening when sun goes down), limiting its speed Referring back to FIG. 20, the N&T layer 2003 provides functionality of the OSI network layer and the OSI transport layer and includes one or more networking protocols, one or more transport protocols, and network and transport layer management. Additionally, sensor interfaces and communication interfaces may be part of the N&T layer 2003 and access layer 2004. The networking protocols may include, inter alia, IPv4, IPv6, IPv6 networking with mobility support, IPv6 over GeoNetworking, the CALM FAST protocol, and/or the like. The transport protocols may include, inter alia, BOSH, BTP, GRE, GeoNetworking protocol, MPTCP, MPUDP, QUIC, RSVP, SCTP, TCP, UDP, VPN, one or more dedicated ITSC transport protocols, or some other suitable transport protocol. Each of the networking protocols may be connected to a corresponding transport protocol.

The access layer includes a physical layer (PHY) 2004 connecting physically to the communication medium, a data link layer (DLL), which may be sub-divided into a medium access control sub-layer (MAC) managing the access to the communication medium, and a logical link control sub-layer (LLC), management adaptation entity (MAE) to directly manage the PHY 2004 and DLL, and a security adaptation entity (SAE) to provide security services for the access layer. The access layer may also include external communication interfaces (CIs) and internal CIs. The CIs are instantiations of a specific access layer technology or RAT and protocol such as 3GPP LTE, 3GPP 5G/NR, C-V2X (e.g., based on 3GPP LTE and/or 5G/NR), WiFi, W-V2X (e.g., including ITS-G5 and/or DSRC), DSL, Ethernet, Bluetooth, and/or any other RAT and/or communication protocols discussed herein, or combinations thereof. The CIs provide the functionality of one or more logical channels (LCHs), where the mapping of LCHs on to physical channels is specified by the standard of the particular access technology involved. As alluded to previously, the V2X RATs may include ITS-G5/DSRC and 3GPP C-V2X. Additionally or alternatively, other access layer technologies (V2X RATs) may be used.

Figure 25:
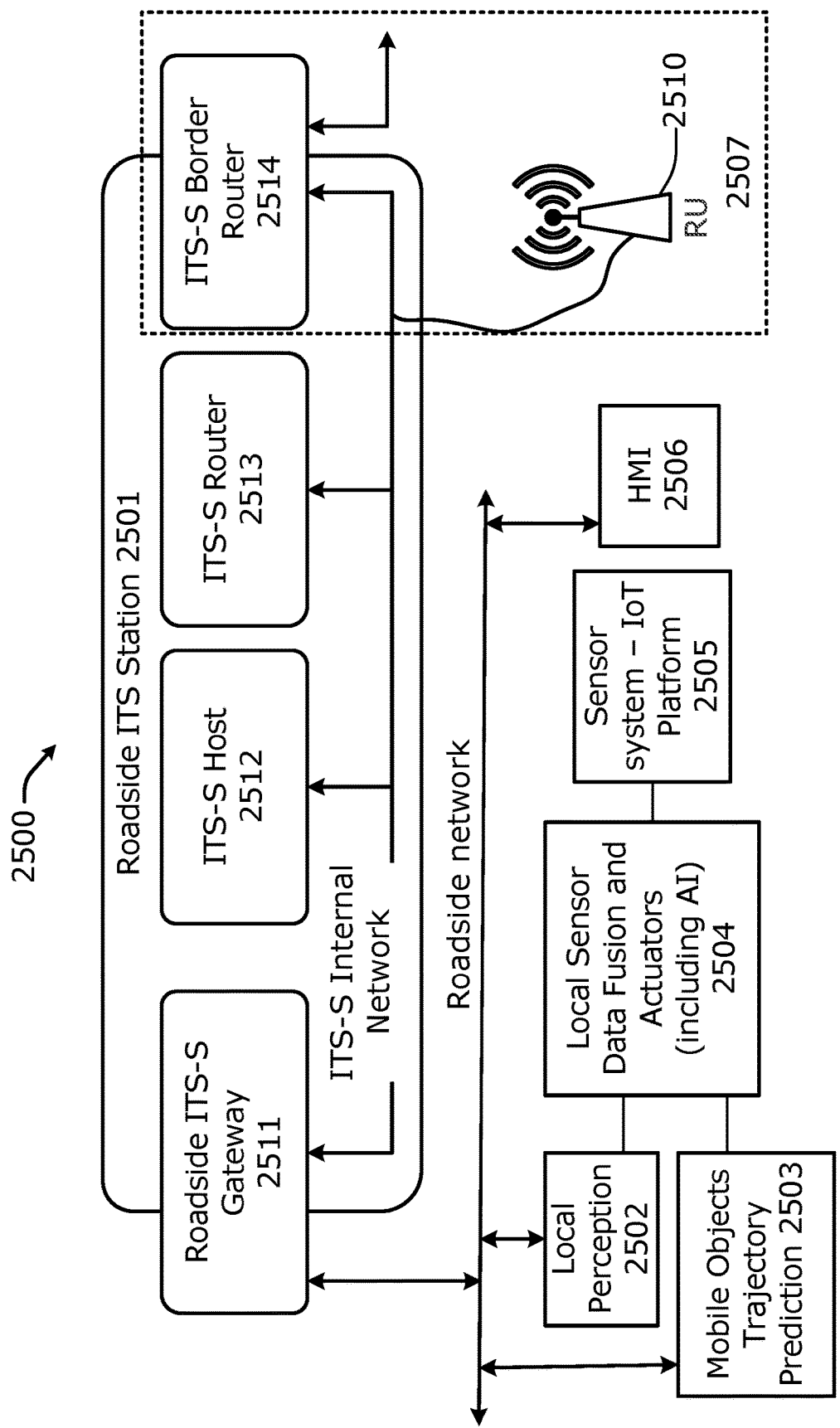
FIG. 25 depicts a roadside ITS-S in a roadside infrastructure node.

The ITS-S reference architecture 2000 may be applicable to the elements of FIGS. 23 and 25. The ITS-S gateway 2311, 2511 (see e.g., FIGS. 23 and 25) interconnects, at the facilities layer, an OSI protocol stack at OSI layers 5 to 7. The OSI protocol stack is typically is connected to the system (e.g., vehicle system or roadside system) network, and the ITSC protocol stack is connected to the ITS station-internal network. The ITS-S gateway 2311, 2511 (see e.g., FIGS. 23 and 25) is capable of converting protocols. This allows an ITS-S to communicate with external elements of the system in which it is implemented. The ITS-S router 2311, 2511 provides the functionality the ITS-S reference architecture 2000 excluding the Applications and Facilities layers. The ITS-S router 2311, 2511 interconnects two different ITS protocol stacks at layer 3. The ITS-S router 2311, 2511 may be capable to convert protocols. One of these protocol stacks typically is connected to the ITS station-internal network. The ITS-S border router 2514 (see e.g., FIG. 25) provides the same functionality as the ITS-S router 2311, 2511, but includes a protocol stack related to an external network that may not follow the management and security principles of ITS (e.g., the ITS Mgmnt and ITS Security layers in FIG. 20).

Additionally, other entities that operate at the same level but are not included in the ITS-S include the relevant users at that level, the relevant HMI (e.g., audio devices, display/touchscreen devices, and/or the like); when the ITS-S is a vehicle, vehicle motion control for computer-assisted and/or automated vehicles (both HMI and vehicle motion control entities may be triggered by the ITS-S applications); a local device sensor system and IoT Platform that collects and shares IoT data; local device sensor fusion and actuator application(s), which may contain ML/AI and aggregates the data flow issued by the sensor system; local perception and trajectory prediction applications that consume the output of the fusion application and feed the ITS-S applications; and the relevant ITS-S. The sensor system can include one or more cameras, radars, LIDARs, and/or the like, in a V-ITS-S 110 or R-ITS-S 130. In the central station, the sensor system includes sensors that may be located on the side of the road, but directly report their data to the central station, without the involvement of a V-ITS-S 110 or R-ITS-S 130. In some cases, the sensor system may additionally include gyroscope(s), accelerometer(s), and the like (see e.g., sensor circuitry 2972 of FIG. 29). Details of these elements are discussed infra with respect to FIGS. 23, 24, and 25

FIG. 23 depicts an example vehicle computing system 2300. In this example, the vehicle computing system 2300 includes a V-ITS-S 2301 and Electronic Control Units (ECUs) 2305. The V-ITS-S 2301 includes a V-ITS-S gateway 2311, an ITS-S host 2312, and an ITS-S router 2313. The vehicle ITS-S gateway 2311 provides functionality to connect the components at the in-vehicle network (e.g., ECUs 2305) to the ITS station-internal network. The interface to the in-vehicle components (e.g., ECUs 2305) may be the same or similar as those discussed herein (see e.g., IX 2956 of FIG. 29) and/or may be a proprietary interface/interconnect. Access to components (e.g., ECUs 2305) may be implementation specific. The ECUs 2305 may be the same or similar to the driving control units (DCUs) 174 discussed previously with respect to FIG. 1. The ITS station connects to ITS ad hoc networks via the ITS-S router 2313.

Figure 24:
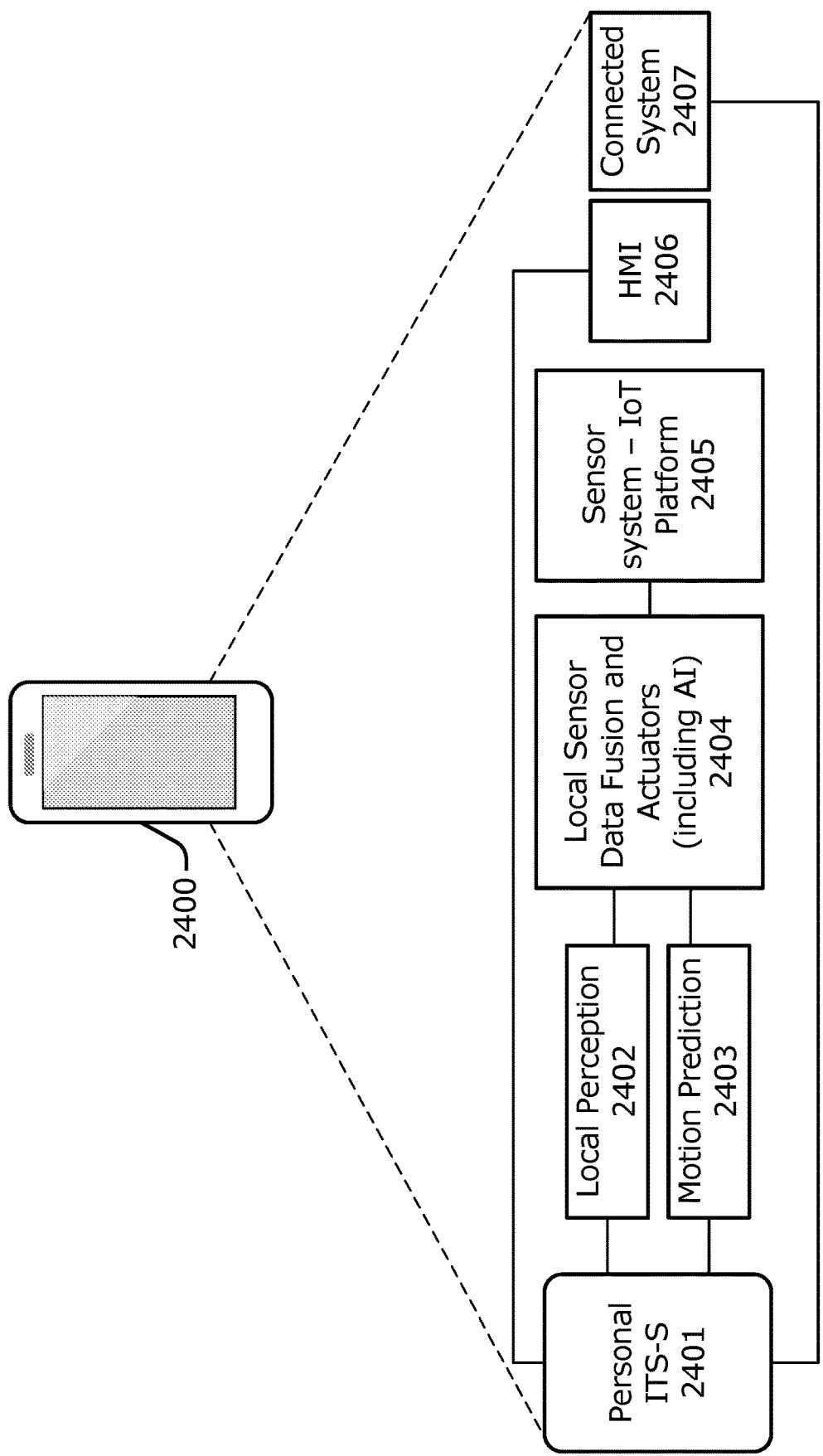
FIG. 24 depicts a personal ITS station, which may be used as a VRU ITS-S.

FIG. 24 depicts an example personal computing system 2400. The personal ITS sub-system 2400 provides the application and communication functionality of ITSC in mobile devices, such as smartphones, tablet computers, wearable devices, PDAs, portable media players, laptops, and/or other mobile devices. The personal ITS sub-system 2400 contains a personal ITS station (P-ITS-S) 2401 and various other entities not included in the P-ITS-S 2401, which are discussed in more detail infra. The device used as a personal ITS station may also perform HMI functionality as part of another ITS sub-system, connecting to the other ITS sub-system via the ITS station-internal network (not shown). For purposes of the present disclosure, the personal ITS sub-system 2400 may be used as a VRU ITS-S 117.

FIG. 25 depicts an example roadside infrastructure system 2500. In this example, the roadside infrastructure system 2500 includes an R-ITS-S 2501, output device(s) 2505, sensor(s) 2508, and one or more radio units (RUs) 2510. The R-ITS-S 2501 includes a R-ITS-S gateway 2511, an ITS-S host 2512, an ITS-S router 2513, and an ITS-S border router 2514. The ITS station connects to ITS ad hoc networks and/or ITS access networks via the ITS-S router 2513. The R-ITS-S gateway 2311 provides functionality to connect the components of the roadside system (e.g., output devices 2505 and sensors 2508) at the roadside network to the ITS station-internal network. The interface to the in-vehicle components (e.g., ECUs 2305) may be the same or similar as those discussed herein (see e.g., IX 2956 of FIG. 29) and/or may be a proprietary interface/interconnect. Access to components (e.g., ECUs 2305) may be implementation specific. The sensor(s) 2508 may be inductive loops and/or sensors that are the same or similar to the sensors 172 discussed infra with respect to FIG. 1 and/or sensor circuitry 2972 discussed infra with respect to FIG. 29.

The actuators 2513 are devices that are responsible for moving and controlling a mechanism or system. The actuators 2513 are used to change the operational state (e.g., on/off, zoom or focus, and/or the like), position, and/or orientation of the sensors 2508. The actuators 2513 are used to change the operational state of some other roadside equipment, such as gates, traffic lights, digital signage or variable message signs (VMS), and/or the like. The actuators 2513 are configured to receive control signals from the R-ITS-S 2501 via the roadside network, and convert the signal energy (or some other energy) into an electrical and/or mechanical motion. The control signals may be relatively low energy electric voltage or current. The actuators 2513 comprise electromechanical relays and/or solid state relays, which are configured to switch electronic devices on/off and/or control motors, and/or may be that same or similar or actuators 2974 discussed infra with respect to FIG. 29.

Each of FIGS. 23, 24, and 25 also show entities which operate at the same level but are not included in the ITS-S including the relevant HMI 2306, 2406, and 2506; vehicle motion control 2308 (only at the vehicle level); local device sensor system and IoT Platform 2305, 2405, and 2505; local device sensor fusion and actuator application 2304, 2404, and 2504; local perception and trajectory prediction applications 2302, 2402, and 2502; motion prediction 2303 and 2403, or mobile objects trajectory prediction 2503 (at the RSU level); and connected system 2307, 2407, and 2507.

The local device sensor system and IoT Platform 2305, 2405, and 2505 collects and shares IoT data. The VRU sensor system and IoT Platform 2405 is at least composed of the PoTi management function present in each ITS-S of the system (see e.g., ETSI EN 302 890-2 ("[EN302890-2]")). The PoTi entity provides the global time common to all system elements and the real time position of the mobile elements. Local sensors may also be embedded in other mobile elements as well as in the road infrastructure (e.g., camera in a smart traffic light, electronic signage, and/or the like). An IoT platform, which can be distributed over the system elements, may contribute to provide additional information related to the environment surrounding the VRU system 2400. The sensor system can include one or more cameras, radars, LiDARs, and/or other sensors (see e.g., 2922 of FIG. 29), in a V-ITS-S 110 or R-ITS-S 130. In the VRU device 117/2400, the sensor system may include gyroscope(s), accelerometer(s), and the like (see e.g., 2922 of FIG. 29). In a central station (not shown), the sensor system includes sensors that may be located on the side of the road, but directly report their data to the central station, without the involvement of a V-ITS-S 110 or an R-ITS-S 130.

The (local) sensor data fusion function and/or actuator applications 2304, 2404, and 2504 provides the fusion of local perception data obtained from the VRU sensor system and/or different local sensors. This may include aggregating data flows issued by the sensor system and/or different local sensors. The local sensor fusion and actuator application(s) may contain machine learning (ML)/Artificial Intelligence (AI) algorithms and/or models. Sensor data fusion usually relies on the consistency of its inputs and then to their timestamping, which correspond to a common given time, the sensor data fusion and/or ML/AL techniques may be used to determine occupancy values for the DCROM discussed herein.

Various ML/AI techniques can be used to carry out the sensor data fusion and/or may be used for other purposes, such as the DCROM discussed herein. Where the apps 2304, 2404, and 2504 are (or include) AI/ML functions, the apps 2304, 2404, and 2504 may include AI/ML models that have the ability to learn useful information from input data (e.g., context information, and/or the like) according to supervised learning, unsupervised learning, reinforcement learning (RL), and/or neural network(s) (NN). Separately trained AI/ML models can also be chained together in a AI/ML pipeline during inference or prediction generation.

The input data may include AI/ML training information and/or AI/ML model inference information. The training information includes the data of the ML model including the input (training) data plus labels for supervised training, hyperparameters, parameters, probability distribution data, and other information needed to train a particular AI/ML model. The model inference information is any information or data needed as input for the AI/ML model for inference generation (or making predictions). The data used by an AI/ML model for training and inference may largely overlap, however, these types of information refer to different concepts. The input data is called training data and has a known label or result.

Supervised learning is an ML task that aims to learn a mapping function from the input to the output, given a labeled data set. Examples of supervised learning include regression algorithms (e.g., Linear Regression, Logistic Regression), and the like), instance-based algorithms (e.g., k-nearest neighbor, and the like), Decision Tree Algorithms (e.g., Classification And Regression Tree (CART), Iterative Dichotomiser 3 (ID3), C4.5, chi-square automatic interaction detection (CHAID), and/or the like), Fuzzy Decision Tree (FDT), and the like), Support Vector Machines (SVM), Bayesian Algorithms (e.g., Bayesian network (BN), a dynamic BN (DBN), Naive Bayes, and the like), and Ensemble Algorithms (e.g., Extreme Gradient Boosting, voting ensemble, bootstrap aggregating ("bagging"), Random Forest and the like). Supervised learning can be further grouped into Regression and Classification problems. Classification is about predicting a label whereas Regression is about predicting a quantity. For unsupervised learning, Input data is not labeled and does not have a known result. Unsupervised learning is an ML task that aims to learn a function to describe a hidden structure from unlabeled data. Some examples of unsupervised learning are K-means clustering and principal component analysis (PCA). Neural networks (NNs) are usually used for supervised learning, but can be used for unsupervised learning as well. Examples of NNs include deep NN (DNN), feed forward NN (FFN), a deep FNN (DFF), convolutional NN (CNN), deep CNN (DCN), deconvolutional NN (DNN), a deep belief NN, a perception NN, recurrent NN (RNN) (e.g., including Long Short Term Memory (LSTM) algorithm, gated recurrent unit (GRU), and/or the like), deep stacking network (DSN), Reinforcement learning (RL) is a goal-oriented learning based on interaction with environment. In RL, an agent aims to optimize a long-term objective by interacting with the environment based on a trial and error process. Examples of RL algorithms include Markov decision process, Markov chain, Q-learning, multi-armed bandit learning, and deep RL.

In one example, the ML/AI techniques are used for object tracking. The object tracking and/or computer vision techniques may include, for example, edge detection, corner detection, blob detection, a Kalman filter, Gaussian Mixture Model, Particle filter, Mean-shift based kernel tracking, an ML object detection technique (e.g., Viola-Jones object detection framework, scale-invariant feature transform (SIFT), histogram of oriented gradients (HOG), and/or the like), a deep learning object detection technique (e.g., fully convolutional neural network (FCNN), region proposal convolution neural network (R-CNN), single shot multibox detector, 'you only look once' (YOLO) algorithm, and/or the like), and/or the like.

In another example, the ML/AI techniques are used for motion detection based on the y sensor data obtained from the one or more sensors. Additionally or alternatively, the ML/AI techniques are used for object detection and/or classification. The object detection or recognition models may include an enrollment phase and an evaluation phase. During the enrollment phase, one or more features are extracted from the sensor data (e.g., image or video data). A feature is an individual measurable property or characteristic. In the context of object detection, an object feature may include an object size, color, shape, relationship to other objects, and/or any region or portion of an image, such as edges, ridges, corners, blobs, and/or some defined regions of interest (ROI), and/or the like. The features used may be implementation specific, and may be based on, for example, the objects to be detected and the model(s) to be developed and/or used. The evaluation phase involves identifying or classifying objects by comparing obtained image data with existing object models created during the enrollment phase. During the evaluation phase, features extracted from the image data are compared to the object identification models using a suitable pattern recognition technique. The object models may be qualitative or functional descriptions, geometric surface information, and/or abstract feature vectors, and may be stored in a suitable database that is organized using some type of indexing scheme to facilitate elimination of unlikely object candidates from consideration.

For any of the implementations discussed herein, any suitable data fusion or data integration technique(s) may be used to generate the composite information. For example, the data fusion technique may be a direct fusion technique or an indirect fusion technique. Direct fusion combines data acquired directly from multiple vUEs or sensors, which may be the same or similar (e.g., all vUEs or sensors perform the same type of measurement) or different (e.g., different vUE or sensor types, historical data, and/or the like). Indirect fusion utilizes historical data and/or known properties of the environment and/or human inputs to produce a refined data set. Additionally, the data fusion technique may include one or more fusion algorithms, such as a smoothing algorithm (e.g., estimating a value using multiple measurements in real-time or not in real-time), a filtering algorithm (e.g., estimating an entity's state with current and past measurements in real-time), and/or a prediction state estimation algorithm (e.g., analyzing historical data (e.g., geolocation, speed, direction, and signal measurements) in real-time to predict a state (e.g., a future signal strength/quality at a particular geolocation coordinate)). As examples, the data fusion algorithm may be or include a structured-based algorithm (e.g., tree-based (e.g., Minimum Spanning Tree (MST)), cluster-based, grid and/or centralized-based), a structure-free data fusion algorithm, a Kalman filter algorithm and/or Extended Kalman Filtering, a fuzzy-based data fusion algorithm, an Ant Colony Optimization (ACO) algorithm, a fault detection algorithm, a Dempster-Shafer (D-S) argumentation-based algorithm, a Gaussian Mixture Model algorithm, a triangulation based fusion algorithm, and/or any other like data fusion algorithm.

A local perception function (which may or may not include trajectory prediction application(s)) 2302, 2402, and 2502 is provided by the local processing of information collected by local sensor(s) associated to the system element. The local perception (and trajectory prediction) function 2302, 2402, and 2502 consumes the output of the sensor data fusion application/function 2304, 2404, and 2504 and feeds ITS-S applications with the perception data (and/or trajectory predictions). The local perception (and trajectory prediction) function 2302, 2402, and 2502 detects and characterize objects (static and mobile) which are likely to cross the trajectory of the considered moving objects. The infrastructure, and particularly the road infrastructure 2500, may offer services relevant to the VRU support service. The infrastructure may have its own sensors detecting VRUs 116/117 evolutions and then computing a risk of collision if also detecting local vehicles' evolutions, either directly via its own sensors or remotely via a cooperative perception supporting services such as the CPS (see e.g., ETSI TR 103 562). Additionally, road marking (e.g., zebra areas or crosswalks) and vertical signs may be considered to increase the confidence level associated with the VRU detection and mobility since VRUs 116/117 usually have to respect these marking/signs.

The motion dynamic prediction function 2303 and 2403, and the mobile objects trajectory prediction 2503 (at the RSU level), are related to the behavior prediction of the considered moving objects. The motion dynamic prediction function 2303 and 2403 predict the trajectory of the vehicle 110 and the VRU 116, respectively. The motion dynamic prediction function 2303 may be part of the VRU Trajectory and Behavioral Modeling module and trajectory interception module of the V-ITS-S 110. The motion dynamic prediction function 2403 may be part of the dead reckoning module and/or the movement detection module of the VRU ITS-S 117. Alternatively, the motion dynamic prediction functions 2303 and 2403 may provide motion/movement predictions to the aforementioned modules. Additionally or alternatively, the mobile objects trajectory prediction 2503 predict respective trajectories of corresponding vehicles 110 and VRUs 116, which may be used to assist the VRU ITS-S 117 in performing dead reckoning and/or assist the V-ITS-S 110 with VRU Trajectory and Behavioral Modeling entity.

Motion dynamic prediction includes a moving object trajectory resulting from evolution of the successive mobile positions. A change of the moving object trajectory or of the moving object velocity (acceleration/deceleration) impacts the motion dynamic prediction. In most cases, when VRUs 116/117 are moving, they still have a large amount of possible motion dynamics in terms of possible trajectories and velocities. This means that motion dynamic prediction 2303, 2403, 2503 is used to identify which motion dynamic will be selected by the VRU 116 as quickly as possible, and if this selected motion dynamic is subject to a risk of collision with another VRU or a vehicle.

The motion dynamic prediction functions 2303, 2403, 2503 analyze the evolution of mobile objects and the potential trajectories that may meet at a given time to determine a risk of collision between them. The motion dynamic prediction works on the output of cooperative perception considering the current trajectories of considered device (e.g., VRU device 117) for the computation of the path prediction; the current velocities and their past evolutions for the considered mobiles for the computation of the velocity evolution prediction; and the reliability level which can be associated to these variables. The output of this function is provided to the risk analysis function (see e.g., FIG. 20).

In many cases, working only on the output of the cooperative perception is not sufficient to make a reliable prediction because of the uncertainty which exists in terms of VRU trajectory selection and its velocity. However, complementary functions may assist in increasing consistently the reliability of the prediction. For example, the use of the device (e.g., VRU device 117) navigation system, which provides assistance to the user (e.g., VRU 116) to select the best trajectory for reaching its planned destination. With the development of Mobility as a Service (MaaS), multimodal itinerary computation may also indicate to the VRU 116 dangerous areas and then assist to the motion dynamic prediction at the level of the multimodal itinerary provided by the system. In another example, the knowledge of the user (e.g., VRU 116) habits and behaviors may be additionally or alternatively used to improve the consistency and the reliability of the motion predictions. Some users (e.g., VRUs 116/117) follow the same itineraries, using similar motion dynamics, for example when going to the main Point of Interest (POI), which is related to their main activities (e.g., going to school, going to work, doing some shopping, going to the nearest public transport station from their home, going to sport center, and/or the like). The device (e.g., VRU device 117) or a remote service center may learn and memorize these habits. In another example, the indication by the user (e.g., VRU 116) itself of its selected trajectory in particular when changing it (e.g., using a right turn or left turn signal similar to vehicles when indicating a change of direction).

The vehicle motion control 2308 may be included for computer-assisted and/or automated vehicles 110. Both the HMI entity 2306 and vehicle motion control entity 2308 may be triggered by one or more ITS-S applications. The vehicle motion control entity 2308 may be a function under the responsibility of a human driver or of the vehicle if it is able to drive in automated mode.

The Human Machine Interface (HMI) 2306, 2406, and 2506, when present, enables the configuration of initial data (parameters) in the management entities (e.g., VRU profile management) and in other functions (e.g., VBS management). The HMI 2306, 2406, and 2506 enables communication of external events related to the VBS to the device owner (user), including the alerting about an immediate risk of collision (TTC<2 s) detected by at least one element of the system and signaling a risk of collision (e.g., TTC>2 seconds) being detected by at least one element of the system. For a VRU system 117 (e.g., personal computing system 2400), similar to a vehicle driver, the HMI provides the information to the VRU 116, considering its profile (e.g., for a blind person, the information is presented with a clear sound level using accessibility capabilities of the particular platform of the personal computing system 2400). In various implementations, the HMI 2306, 2406, and 2506 may be part of the alerting system.

The connected systems 2307, 2407, and 2507 refer to components/devices used to connect a system with one or more other systems. As examples, the connected systems 2307, 2407, and 2507 may include communication circuitry and/or radio units. The VRU system 2400 may be a connected system made of up to 4 different levels of equipment. The VRU system 2400 may also be an information system which collects, in real time, information resulting from events, processes the collected information and stores them together with processed results. At each level of the VRU system 2400, the information collection, processing and storage is related to the functional and data distribution scenario which is implemented.

6. Computer-Assisted and Autonomous Driving Platforms and Technologies

Except for the UVCS technology of the present disclosure, in-vehicle system 101 and CA/AD vehicle 110 otherwise may be any one of a number of in-vehicle systems and CA/AD vehicles, from computer-assisted to partially or fully autonomous vehicles. Additionally, the in-vehicle system 101 and CA/AD vehicle 110 may include other components/subsystems not shown by FIG. 1 such as the elements shown and described elsewhere herein (see e.g., FIG. 29). These and other details of the underlying UVCS technology used to implement in-vehicle system 101 will be further described with references to remaining FIGS. 26-28.

Figure 26:
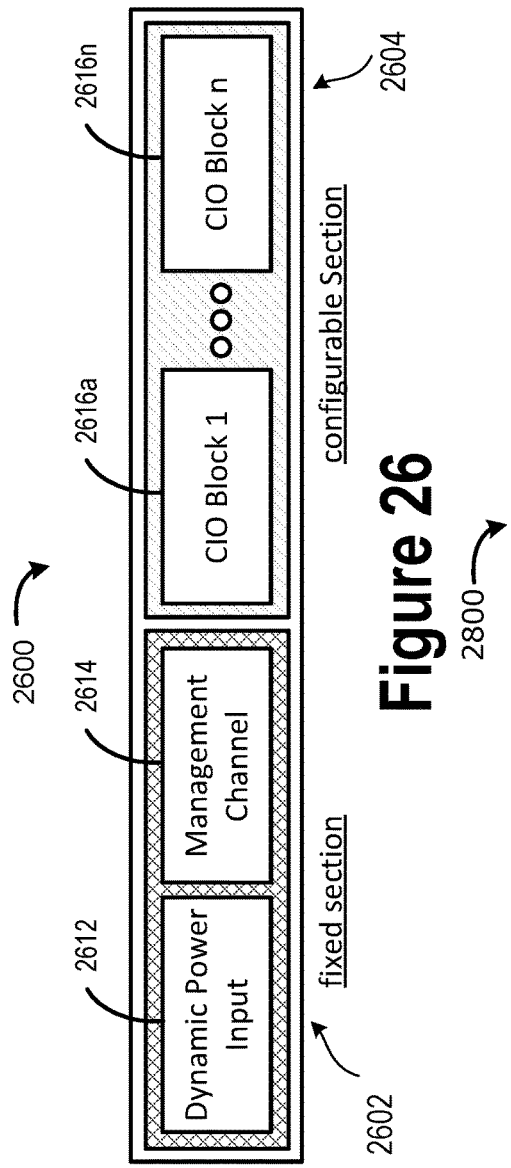
FIG. 26 illustrates an Upgradeable Vehicular Compute Systems (UVCS) interface.

FIG. 26 illustrates an example UVCS interface 2600. UVCS interface 2600 is a modular system interface designed to couple a pluggable compute module (having compute elements such as CPU, memory, storage, radios, and/or the like) to an in-vehicle compute hub or subsystem (having peripheral components, such as power supplies, management, I/O devices, automotive interfaces, thermal solution, and/or the like) pre-disposed in a vehicle to form an instance of a UVCS for the vehicle. Different pluggable compute modules having different compute elements, or compute elements of different functionalities or capabilities, may be employed to mate with an in-vehicle compute hub/subsystem pre-disposed in the vehicle, forming different instances of UVCS. Accordingly, the computing capability of a vehicle having a pre-disposed in-vehicle compute hub/subsystem may be upgraded by having a newer, more function or more capable pluggable compute module be mated with the pre-disposed in-vehicle compute hub/subsystem, replacing a prior older, less function or less capable pluggable compute module.

In the example of FIG. 26, UVCS 2600 includes a fixed section 2602 and a configurable section 2604. Fixed section 2602 includes a dynamic power input interface 2612 (also referred to as dynamic power delivery interface), and a management channel interface 2614. Configuration section 2604 includes a number of configurable I/O (CIO) blocks 2616a-2616n.

Dynamic power input interface 2612 is arranged to deliver power from the in-vehicle compute hub/subsystem to the compute elements of a pluggable compute module plugged into UVCS interface 2600 to mate with the in-vehicle compute hub to form an instance of an UVCS. Management channel interface 2614 is arranged to facilitate the in-vehicle compute hub in managing/coordinating the operations of itself and the pluggable compute module plugged into UVCS interface 2600 to form the instance of an UVCS. CIO blocks 2616a-2616n are arranged to facilitate various I/O between various compute elements of the pluggable compute module and the peripheral components of the in-vehicle compute hub/subsystem mated to each other through UVCS interface 2600 to form the instance of an UVCS. The I/O between the compute elements of the pluggable compute module and the peripheral components of the mated in-vehicle compute hub/subsystem vary from instance to instance, depending on the compute elements of the pluggable compute module used to mate with the in-vehicle compute hub to form a particular instance of the UVCS. At least some of CIO blocks 2616a-2616a are arranged to facilitate high-speed interfaces.

The CIO blocks 2616a-2616n represent a set of electrically similar high speed, differential serial interfaces, allowing a configuration of the actually used interface type and standard on a case-by-case basis. This way, different UVCS compute hubs can connect different peripherals to the same UVCS interface 2600, and allow the different peripherals to perform I/O operations in different I/O protocols with compute elements of a UVCS module.

The number of CIO blocks 2616a-2616n may vary depending on use case and/or for different market segments. For example, there may be few CIO blocks 2616a-2616n (e.g., 2 to 4) for implementations designed for the lower end markets. On the other hand, there may be many more CIO blocks 2616-2616n (e.g., 8 to 16) for implementations designed for the higher end markets. However, to achieve the highest possible interoperability and upgradeability, for a given UVCS generation, the number and functionality/configurability of the number of CIO blocks may be kept the same.

Figure 27:
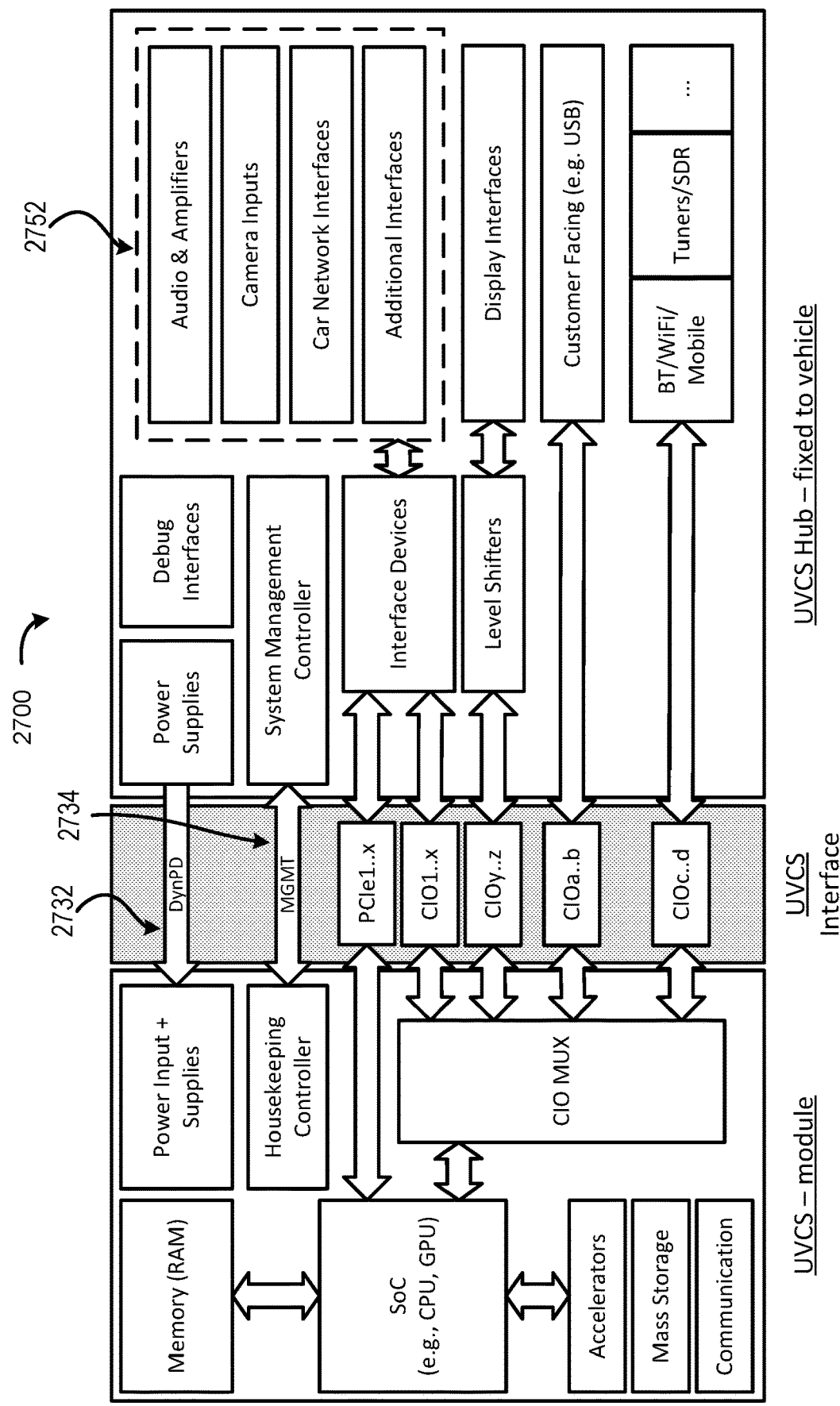
FIG. 27 illustrates a UVCS formed using a UVCS interface.

FIG. 27 illustrates an example UVCS 2700 formed using a UVCS interface. As shown, UVCS interface, which may be UVCS interface 2600, is used to facilitate mating of pluggable UVCS module with UVCS hub pre-disposed in a vehicle, to form UVCS 2700 for the vehicle, which may be one of the one or more UVCS of in-vehicle system PT100 of FIG. PT1. UVCS interface, as UVCS interface 2600, includes a fixed section and a configurable section. The fixed section includes a dynamic power delivery interface (DynPD) 2732 and a management channel (MGMT) interface 2734. The configurable section includes a number of configurable I/O interfaces (CIOs), PCIe1 . . . x, CIO1 . . . x, CIOy . . . z, CIOa . . . b, CIOc . . . d.

Pre-disposed UVCS hub includes power supplies and system management controller. Further, UVCS hub includes debug interfaces 2744, interface devices, level shifters, and a number of peripheral components 2752, such as audio and amplifiers, camera interface, car network interfaces, other interfaces, display interfaces, customer facing interfaces (e.g., a USB interface), and communication interfaces (e.g., Bluetooth®\BLE, WiFi, other mobile interfaces, tuners, software define radio (SDR)), coupled to power supplies, system management controller, and each other as shown. A UVCS hub may include more or less, or different peripheral elements.

Pluggable UVCS module 2706 includes an SoC (e.g., CPU, GPU, FPGA, or other circuitry), memory, power input+supplies circuitry, housekeeping controller and CIO multiplexer(s) (MUX). Further, UVCS module includes hardware accelerators, persistent mass storage, and communication modules (e.g., BT, WiFi, 5G/NR, LTE, and/or other like interfaces), coupled to the earlier enumerated elements and each other as shown. Additionally or alternatively, the UVCS module may include more or less, or different compute elements.

Power Supplies of UVCS hub delivers power to compute elements of UVCS module, via DynPD 2732 of UVCS interface and Power Input+Supplies circuitry of UVCS module. System management controller of UVCS hub manages and coordinates its operations and the operations of the compute elements of UVCS module via the management channel 2734 of UVCS interface and housekeeping controller of UVCS module. CIO MUX is configurable or operable to provide a plurality of I/O channels of different I/O protocols between the compute elements of UVCS module and the peripheral components of UVCS hub, via the configurable I/O blocks of UVCS interface, interface devices and level shifters of UVCS hub. For example, one of the I/O channels may provide for I/O between the compute elements of UVCS module and the peripheral components of UVCS hub in accordance with PCIe I/O protocol. Another I/O channel may provide for I/O between the compute elements of UVCS module and the peripheral components of UVCS hub in accordance with USB I/O protocol. Still other I/O channels provide for I/O between the compute elements of UVCS module and the peripheral components of UVCS hub in accordance with other high speed serial or parallel I/O protocols.

Housekeeping controller is configurable or operable to control power supply in its delivery of power to static and dynamic loads, as well as the consumption of power by static and dynamic loads, based on the operating context of the vehicle (e.g., whether the vehicle is in a "cold crank" or "cold start" scenario). Housekeeping controller is configurable or operable to control power consumption of static and dynamic loads by selectively initiating sleep states, lowering clock frequencies, or powering off the static and dynamic loads.

Management channel 2734 may be a small low pin count serial interface, a Universal Asynchronous Receiver-Transmitter (UART) interface, a Universal Synchronous and Asynchronous Receiver-Transmitter (USART) interface, a USB interface, or some other suitable interface (including any of the other IX technologies discussed herein). Additionally or alternatively, a management channel may be a parallel interface such as an IEEE 1284 interface.

CIO blocks of UVCS interface represent a set of electrically similar high speed interfaces (e.g., high speed differential serial interfaces) allowing a configuration of the actually used interface type and standard on a case-by-case basis. In particular, housekeeping controller is arranged to configure CIO MUX to provide a plurality of I/O channels through the various CIO blocks to facilitate I/O operations in different I/O protocols. The plurality of I/O channels include a USB I/O channel, a PCIe I/O channel, a HDMI and DP (DDI) I/O channel, and a Thunderbolt (TBT) I/O channel. The plurality of I/O channels may also include other I/O channel types (xyz [1..r]) beside the enumerated I/O channel types.

A CIO multiplexer comprises sufficient circuit paths to be configurable to multiplex any given combination of I/O interfaces exposed by the SoC to any of the connected CIO blocks. Additionally or alternatively, CIO MUX may support a limited multiplexing scheme, such as when the CIO blocks support a limited number of I/O protocols (e.g., supporting display interfaces and Thunderbolt, while not offering PCIe support). In some implementations, the CIO MUX may be integrated as part of the SoC.

System management controller of UVCS hub and housekeeping controller of UVCS module are configurable or operable to negotiate, during an initial pairing of the UVCS hub and UVCS module a power budget or contract. The power budget/contract may provide for minimum and maximum voltages, current/power needs of UVCS module and the current power delivery limitation of UVCS interface, if any. This allows for the assessments of the compatibility of a given pair of UCS hub and module, as well as for operational benefits.

Figure 28:
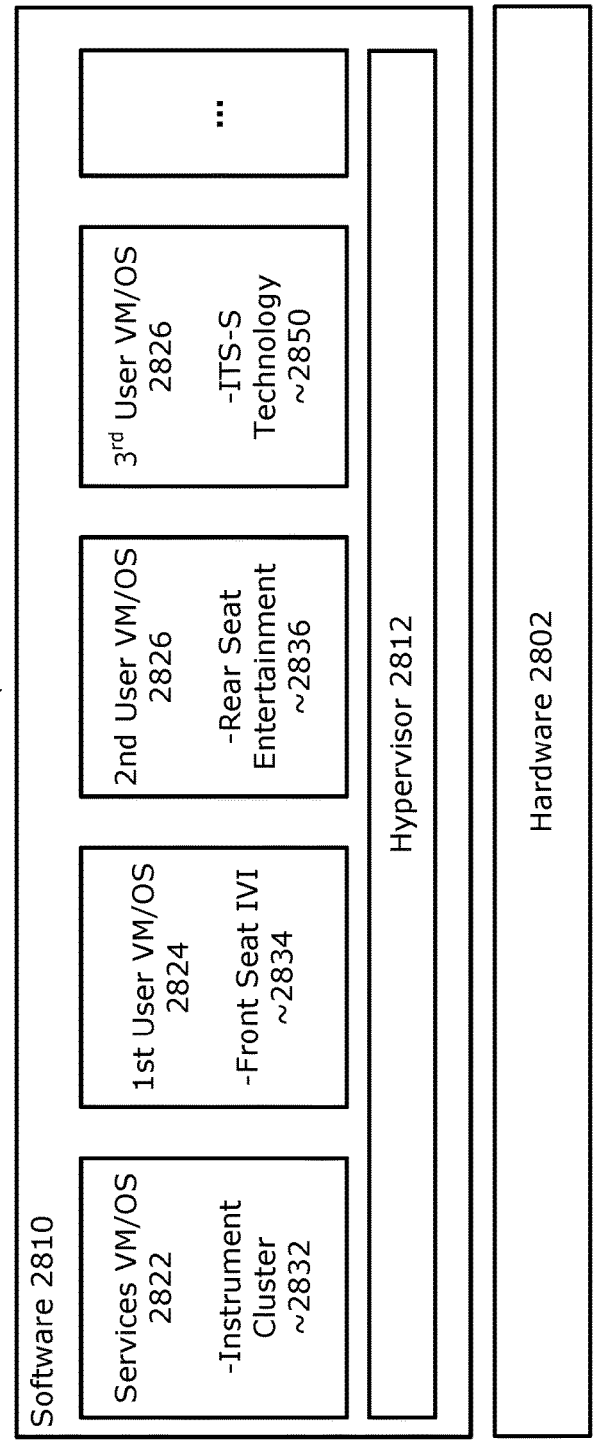
FIG. 28 shows a software component view of an in-vehicle system formed with a UVCS.

FIG. 28 shows a software component view of an example in-vehicle system formed with a UVCS. As shown, in-vehicle system 2800, which could be formed with UVCS 2700, includes hardware 2802 and software 2810. Software 2810 includes hypervisor 2812 hosting a number of virtual machines (VMs) 2822-2828. Hypervisor 2812 is configurable or operable to host execution of VMs 2822-2828. Hypervisor 2812 may also implement some or all of the functions described earlier for a system management controller of a UVCS module. As examples, hypervisor 2812 may be a KVM hypervisor, Xen provided by Citrix Inc., VMware provided by VMware Inc., and/or any other suitable hypervisor or VM manager (VMM) technologies such as those discussed herein. The VMs 2822-2828 include a service VM 2822 and a number of user VMs 2824-2828. Service machine 2822 includes a service OS hosting execution of a number of instrument cluster applications 2832. As examples, service OS of service VM 2822 and user OS of user VMs 2824-2828 may be Linux, available e.g., from Red Hat Enterprise of Raleigh, NC, Android, available from Google of Mountain View, CA, and/or any other suitable OS such as those discussed herein.

User VMs 2824-2828 may include a first user VM 2824 having a first user OS hosting execution of front seat infotainment applications 2834, a second user VM 2826 having a second user OS hosting execution of rear seat infotainment applications 2836, a third user VM 2828 having a third user OS hosting execution of ITS-S subsystem 2850, and/or any other suitable OS/applications such as those discussed herein. In some implementations, the VMs 2822-2826 may be, or may include isolated user-space instances such as containers, partitions, virtual environments (VEs), and/or the like, which may be implemented using a suitable OS-level virtualization technology.

7. Computing System and Hardware Configurations

Figure 29:
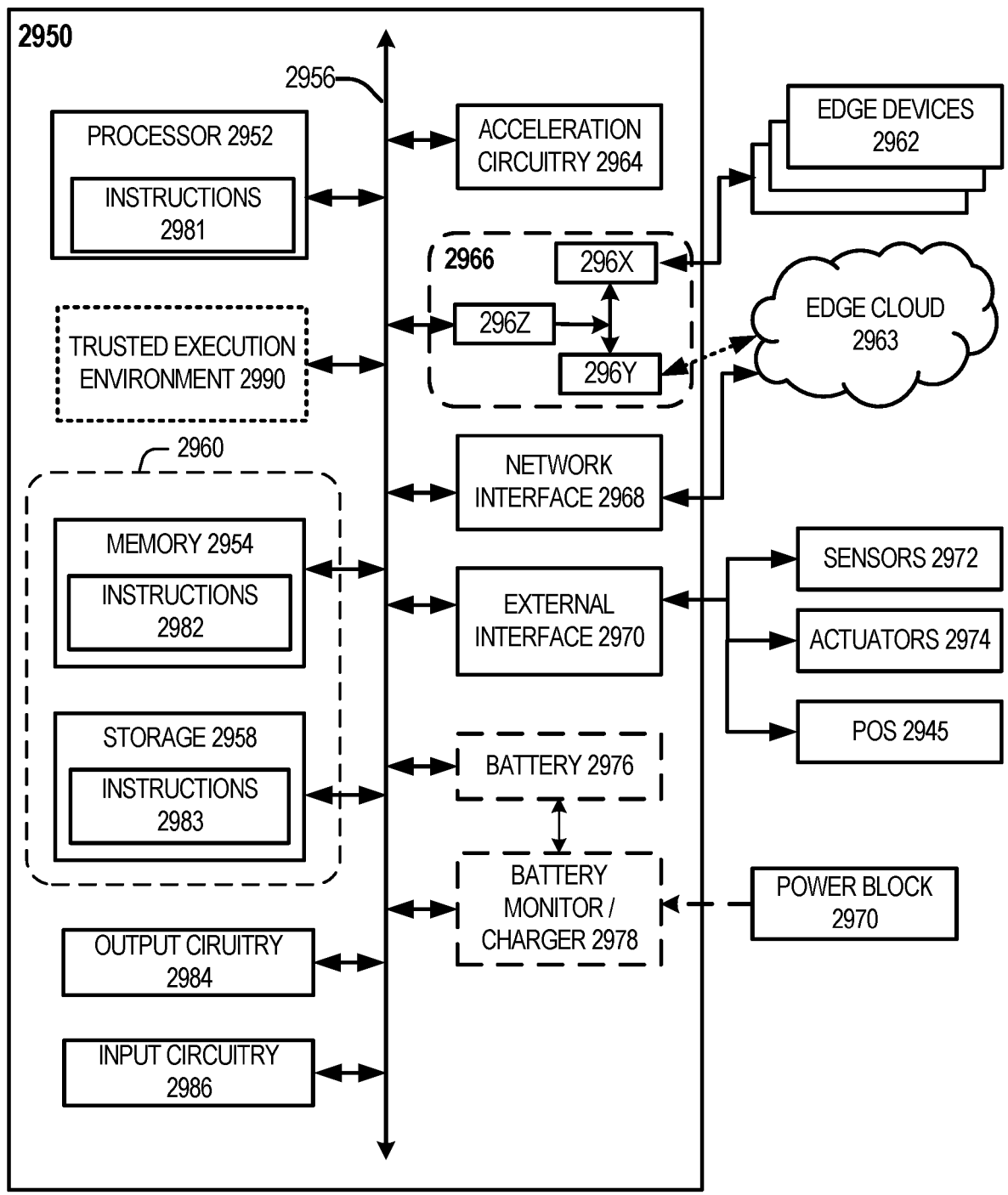
FIG. 29 depicts components of various compute nodes in edge computing systems.

FIG. 29 depicts an example edge computing systems and environments that may fulfill any of the compute nodes or devices discussed herein. The edge compute node 2950 may be embodied as a type of device, appliance, computer, or other "thing" capable of communicating with other edge, networking, or endpoint components. For example, an edge compute device 2950 may be embodied as a smartphone, a mobile compute device, a smart appliance, an in-vehicle compute system (e.g., a navigation system), or other device or system capable of performing the described functions.

FIG. 29 illustrates an example of components that may be present in an edge computing node 2950 for implementing the techniques (e.g., operations, processes, methods, and methodologies) described herein. This edge computing node 2950 provides a closer view of the respective components of node 2950 when implemented as or as part of a computing device (e.g., as a mobile device, a base station, server, gateway, infrastructure equipment, road side unit (RSU) or R-ITS-S 130, radio head, relay station, server, and/or any other element/device discussed herein). The edge computing node 2950 may include any combinations of the hardware or logical components referenced herein, and it may include or couple with any device usable with an edge communication network or a combination of such networks. The components may be implemented as ICs, portions thereof, discrete electronic devices, or other modules, instruction sets, programmable logic or algorithms, hardware, hardware accelerators, software, firmware, or a combination thereof adapted in the edge computing node 2950, or as components otherwise incorporated within a chassis of a larger system.

The edge computing node 2950 includes processing circuitry in the form of one or more processors 2952. The processor circuitry 2952 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 2952 may include one or more hardware accelerators (e.g., same or similar to acceleration circuitry 2964), which may be microprocessors, programmable processing devices (e.g., FPGA, ASIC, and/or the like), or the like. The one or more accelerators may include, for example, computer vision and/or deep learning accelerators. In some implementations, the processor circuitry 2952 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein The processor circuitry 2952 may include, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, or any other known processing elements, or any suitable combination thereof. The processors (or cores) 2952 may be coupled with or may include memory/storage and may be configured to execute instructions stored in the memory/storage to enable various applications or operating systems to run on the node 2950. The processors (or cores) 2952 is configured to operate application software to provide a specific service to a user of the node 2950. The processor(s) 2952 may be a special-purpose processor(s)/controller(s) configured (or configurable) to operate according to the various functionality discussed herein.

As examples, the processor(s) 2952 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number of other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 2952 may be a part of a system on a chip (SoC), System-in-Package (SiP), a multi-chip package (MCP), and/or the like, in which the processor(s) 2952 and other components are formed into a single integrated circuit, or a single package, such as the Edison™ or Galileo™ SoC boards from Intel® Corporation. Other examples of the processor(s) 2952 are mentioned elsewhere in the present disclosure.

In server implementations, the processor(s) 2952 may include, for example, one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. The system 2950 may not utilize processor(s) 2952, and instead may include a special-purpose processor/controller to process IP data received from an EPC or 5GC, for example.

In some implementations, such as implementations where subsystems of the system 2950 are individual software agents or AI agents, each agent is implemented in a respective hardware accelerator that are configured with appropriate bit stream(s) or logic blocks to perform their respective functions. In these implementations, processor(s) and/or hardware accelerators of the processor(s) 2952 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. The hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like The processor(s) 2952 may communicate with system memory 2954 over an interconnect (IX) 2956. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2958 may also couple to the processor 2952 via the IX 2956. In an example, the storage 2958 may be implemented via a solid-state disk drive (SSDD) and/or high-speed electrically erasable memory (commonly referred to as "flash memory"). Other devices that may be used for the storage 2958 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 2954 and/or storage circuitry 2958 may also incorporate three-dimensional (3D) cross-point (XPOINT) memories from Intel® and Micron®.

In low power implementations, the storage 2958 may be on-die memory or registers associated with the processor 2952. However, in some examples, the storage 2958 may be implemented using a micro hard disk drive (HDD). Further, any number of new technologies may be used for the storage 2958 in addition to, or instead of, the technologies described, such resistance change memories, phase change memories, holographic memories, or chemical memories, among others.

The storage circuitry 2958 store computational logic 2982 (or "modules 2982") in the form of software, firmware, or hardware commands to implement the techniques described herein. The computational logic 2982 may be employed to store working copies and/or permanent copies of computer programs, or data to create the computer programs, for the operation of various components of node 2950 (e.g., drivers, and/or the like), an OS of node 2950 and/or one or more applications for carrying out the functionality discussed herein. The computational logic 2982 may be stored or loaded into memory circuitry 2954 as instructions 2982, or data to create the instructions 2988, for execution by the processor circuitry 2952 to provide the functions described herein. The various elements may be implemented by assembler instructions supported by processor circuitry 2952 or high-level languages that may be compiled into such instructions (e.g., instructions 2988, or data to create the instructions 2988). The permanent copy of the programming instructions may be placed into persistent storage devices of storage circuitry 2958 in the factory or in the field through, for example, a distribution medium (not shown), through a communication interface (e.g., from a distribution server (not shown)), or over-the-air (OTA).

In an example, the instructions 2983, 2982 provided via the memory circuitry 2954 and/or the storage circuitry 2958 of FIG. 29 are embodied as one or more non-transitory computer readable storage media (see e.g., NTCRSM 2960) including program code, a computer program product or data to create the computer program, with the computer program or data, to direct the processor circuitry 2952 of node 2950 to perform electronic operations in the node 2950, and/or to perform a specific sequence or flow of actions, for example, as described with respect to the flowchart(s) and block diagram(s) of operations and functionality depicted previously. The processor circuitry 2952 accesses the one or more non-transitory computer readable storage media over the interconnect 2956.

Additionally or alternatively, programming instructions (or data to create the instructions) may be disposed on multiple NTCRSM 2960. Additionally or alternatively, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 2960 may be embodied by devices described for the storage circuitry 2958 and/or memory circuitry 2954. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, and/or the like), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, and/or the like.

The program code (or data to create the program code) described herein may be stored in one or more of a compressed format, an encrypted format, a fragmented format, a packaged format, and/or the like. Program code (or data to create the program code) as described herein may require one or more of installation, modification, adaptation, updating, combining, supplementing, configuring, decryption, decompression, unpacking, distribution, reassignment, and/ or the like. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), and/or the like. in order to execute the instructions on a particular computing device or other device. In another example, the program code (or data to create the program code) may need to be configured (e.g., settings stored, data input, network addresses recorded, and/or the like) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 2983, instructions 2982, instructions 2981 discussed previously) may be written in any combination of one or more programming languages, including an object oriented programming language such as Python, Ruby, Scala, Smalltalk, Java™, C++, C #, or the like; a procedural programming languages, such as the "C" programming language, the Go (or "Golang") programming language, or the like; a scripting language such as JavaScript, Server-Side JavaScript (SSJS), JQuery, PUP, Pearl, Python, Ruby on Rails, Accelerated Mobile Pages Script (AMPscript), Mustache Template Language, Handlebars Template Language, Guide Template Language (GTL), PUP, Java and/or Java Server Pages (JSP), Node.js, ASP.NET, JAMscript, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 2950, partly on the system 2950, as a stand-alone software package, partly on the system 2950 and partly on a remote computer or entirely on the remote computer or server. In the latter scenario, the remote computer may be connected to the system 2950 through any type of network, including a LAN or WAN, or the connection may be made to an external computer (e.g., through the Internet using an Internet Service Provider).

In an example, the instructions 2981 on the processor circuitry 2952 (separately, or in combination with the instructions 2982 and/or logic/modules 2983 stored in computer-readable storage media) may configure execution or operation of a trusted execution environment (TEE) 2990. The TEE 2990 operates as a protected area accessible to the processor circuitry 2952 to enable secure access to data and secure execution of instructions. The TEE 2990 may be a physical hardware device that is separate from other components of the system 2950 such as a secure-embedded controller, a dedicated SoC, or a tamper-resistant chipset or microcontroller with embedded processing devices and memory devices.

Additionally or alternatively, the TEE 2990 may be implemented as secure enclaves, which are isolated regions of code and/or data within the processor and/or memory/storage circuitry of the system 2950. Only code executed within a secure enclave may access data within the same secure enclave, and the secure enclave may only be accessible using the secure application (which may be implemented by an application processor or a tamper-resistant microcontroller). Various implementations of the TEE 2950, and an accompanying secure area in the processor circuitry 2952 or the memory circuitry 2954 and/or storage circuitry 2958 may be provided, for instance, through use of Software Guard Extensions (SGX), hardware security extensions, secure enclaves, and/or the like. Other details of security hardening, hardware roots-of-trust, and trusted or protected operations may be implemented in the device 2950 through the TEE 2990 and the processor circuitry 2952.

The memory circuitry 2954 and/or storage circuitry 2958 may be divided into isolated user-space instances such as containers, partitions, virtual environments (VEs), and/or the like. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. The memory circuitry 2954 and/or storage circuitry 2958 may be divided into one or more trusted memory regions for storing applications or software modules of the TEE 2990.

Although the instructions 2982 are shown as code blocks included in the memory circuitry 2954 and the computational logic 2983 is shown as code blocks in the storage circuitry 2958, it should be understood that any of the code blocks may be replaced with hardwired circuits, for example, built into an FPGA, ASIC, or some other suitable circuitry. For example, where processor circuitry 2952 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 2954 and/or storage circuitry 2958 may store program code of an operating system (OS), which may be a general purpose OS or an OS specifically written for and tailored to the computing node 2950. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the node 2950, attached to the node 2950, or otherwise communicatively coupled with the node 2950. The drivers may include individual drivers allowing other components of the node 2950 to interact or control various I/O devices that may be present within, or connected to, the node 2950. For example, the drivers may include a display driver to control and allow access to a display device, a touchscreen driver to control and allow access to a touchscreen interface of the node 2950, sensor drivers to obtain sensor readings of sensor circuitry 2972 and control and allow access to sensor circuitry 2972, actuator drivers to obtain actuator positions of the actuators 2974 and/or control and allow access to the actuators 2974, a camera driver to control and allow access to an embedded image capture device, audio drivers to control and allow access to one or more audio devices. The OSs may also include one or more libraries, drivers, APIs, firmware, middleware, software glue, and/or the like, which provide program code and/or software components for one or more applications to obtain and use the data from a secure execution environment, trusted execution environment, and/or management engine of the node 2950 (not shown).

The components of edge computing device 2950 may communicate over the IX 2956. The IX 2956 may include any number of bus and/or interconnect (IX) technologies such as industry standard architecture (ISA), extended ISA (EISA), inter-integrated circuit (I2C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

The IX 2956 couples the processor 2952 to communication circuitry 2966 for communications with other devices, such as a remote server (not shown) and/or the connected edge devices 2962. The communication circuitry 2966 is a hardware element, or collection of hardware elements, used to communicate over one or more networks (e.g., cloud 2963) and/or with other devices (e.g., edge devices 2962). The modem circuitry 296Z may convert data for transmission over-the-air using one or more radios 296X and 296Y, and may convert receive signals from the radios 296X and 296Y into digital signals/data for consumption by other elements of the system 2950.

The transceiver 2966 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios 296X and 296Y (or "RAT circuitries 296X and 296Y"), configured for a particular wireless communication protocol, may be used for the connections to the connected edge devices 2962. For example, wireless local area network (WLAN) circuitry 296X may be used to implement WiFi® communications in accordance with the Institute of Electrical and Electronics Engineers (IEEE) 802.11 standard. In addition, wireless wide area communications (e.g., according to a cellular or other wireless wide area protocol) may occur via wireless wide area network (WWAN) circuitry 296Y.

The wireless network transceiver 2966 (or multiple transceivers) may communicate using multiple standards or radios for communications at a different range. For example, the edge computing node 2950 may communicate with close devices, e.g., within about 10 meters, using a local transceiver based on BLE, or another low power radio, to save power. More distant connected edge devices 2962, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 2966 (e.g., a radio transceiver) may be included to communicate with devices or services in the edge cloud 2963 via local or wide area network protocols. The wireless network transceiver 2966 may be an LPWA transceiver that follows the IEEE 802.15.4, or IEEE 802.15.4g standards, among others. The edge computing node 2963 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 2966, as described herein. For example, the transceiver 2966 may include a cellular transceiver that uses spread spectrum (SPA/SAS) communications for implementing high-speed communications. Further, any number of other protocols may be used, such as WiFi® networks for medium speed communications and provision of network communications. The transceiver 2966 may include radios 296X and 296Y that are compatible with any number of 3GPP specifications, such as LTE and 5G/NR communication systems, discussed in further detail at the end of the present disclosure. A network interface controller (NIC) 2968 may be included to provide a wired communication to nodes of the edge cloud 2963 or to other devices, such as the connected edge devices 2962 (e.g., operating in a mesh). The wired communication may provide an Ethernet connection or may be based on other types of networks, such as Controller Area Network (CAN), Local Interconnect Network (LIN), DeviceNet, ControlNet, Data Highway Plus (DH+), PROFIBUS, or PROFINET, among many others. An additional NIC 2968 may be included to enable connecting to a second network, for example, a first NIC 2968 providing communications to the cloud over Ethernet, and a second NIC 2968 providing communications to other devices over another type of network.

Given the variety of types of applicable communications from the device to another component or network, applicable communications circuitry used by the device may include or be embodied by any one or more of components 2964, 2966, 2968, or 2970. Accordingly, in various examples, applicable means for communicating (e.g., receiving, transmitting, and/or the like) may be embodied by such communications circuitry.

The edge computing node 2950 may include or be coupled to acceleration circuitry 2964, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 2964 may comprise logic blocks or logic fabric and other interconnected resources that may be programmed (configured) to perform various functions, such as the procedures, methods, functions, and/or the like discussed herein. In such implementations, the acceleration circuitry 2964 may also include memory cells (e.g., EPROM, EEPROM, flash memory, static memory (e.g., SRAM, anti-fuses, and/or the like) used to store logic blocks, logic fabric, data, and/or the like in LUTs and the like.

The IX 2956 also couples the processor 2952 to a sensor hub or external interface 2970 that is used to connect additional devices or subsystems. The additional/external devices may include sensors 2972, actuators 2974, and positioning circuitry 2945.

The sensor circuitry 2972 includes devices, modules, or subsystems whose purpose is to detect events or changes in its environment and send the information (sensor data) about the detected events to some other a device, module, subsystem, and/or the like. Examples of such sensors 2972 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temp sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like); depth sensors; ambient light sensors; optical light sensors; ultrasonic transceivers; microphones; and the like.

Additionally or alternatively, some of the sensors 172 may be sensors used for various vehicle control systems, and may include, inter alia, exhaust sensors including exhaust oxygen sensors to obtain oxygen data and manifold absolute pressure (MAP) sensors to obtain manifold pressure data; mass air flow (MAF) sensors to obtain intake air flow data; intake air temperature (IAT) sensors to obtain IAT data; ambient air temperature (AAT) sensors to obtain AAT data; ambient air pressure (AAP) sensors to obtain AAP data (e.g., tire pressure data); catalytic converter sensors including catalytic converter temperature (CCT) to obtain CCT data and catalytic converter oxygen (CCO) sensors to obtain CCO data; vehicle speed sensors (VSS) to obtain VSS data; exhaust gas recirculation (EGR) sensors including EGR pressure sensors to obtain ERG pressure data and EGR position sensors to obtain position/orientation data of an EGR valve pintle; Throttle Position Sensor (TPS) to obtain throttle position/orientation/angle data; a crank/cam position sensors to obtain crank/cam/piston position/orientation/angle data; coolant temperature sensors; drive train sensors to collect drive train sensor data (e.g., transmission fluid level), vehicle body sensors to collect vehicle body data (e.g., data associated with buckling of the front grill/fenders, side doors, rear fenders, rear trunk, and so forth); and so forth. The sensors 172 may include other sensors such as an accelerator pedal position sensor (APP), accelerometers, magnetometers, level sensors, flow/fluid sensors, barometric pressure sensors, and/or any other sensor(s) such as those discussed herein. Sensor data from sensors 172 of the host vehicle may include engine sensor data collected by various engine sensors (e.g., engine temperature, oil pressure, and so forth).

The actuators 2974, allow node 2950 to change its state, position, and/or orientation, or move or control a mechanism or system. The actuators 2974 comprise electrical and/or mechanical devices for moving or controlling a mechanism or system, and converts energy (e.g., electric current or moving air and/or liquid) into some kind of motion. The actuators 2974 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 2974 may include one or more electromechanical devices such as pneumatic actuators, hydraulic actuators, electromechanical switches including electromechanical relays (EMRs), motors (e.g., DC motors, stepper motors, servomechanisms, and/or the like), power switches, valve actuators, wheels, thrusters, propellers, claws, clamps, hooks, audible sound generators, visual warning devices, and/or other like electromechanical components. The node 2950 may be configured to operate one or more actuators 2974 based on one or more captured events and/or instructions or control signals received from a service provider and/or various client systems The actuators 2974 may be driving control units (e.g., DCUs 174 of FIG. 1), Examples of DCUs 2974 include a Drivetrain Control Unit, an Engine Control Unit (ECU), an Engine Control Module (ECM), EEMS, a Powertrain Control Module (PCM), a Transmission Control Module (TCM), a Brake Control Module (BCM) including an anti-lock brake system (ABS) module and/or an electronic stability control (ESC) system, a Central Control Module (CCM), a Central Timing Module (CTM), a General Electronic Module (GEM), a Body Control Module (BCM), a Suspension Control Module (SCM), a Door Control Unit (DCU), a Speed Control Unit (SCU), a Human-Machine Interface (HMI) unit, a Telematic Control Unit (TTU), a Battery Management System, a Portable Emissions Measurement Systems (PEMS), an evasive maneuver assist (EMA) module/system, and/or any other entity or node in a vehicle system. Examples of the CSD that may be generated by the DCUs 174 may include, but are not limited to, real-time calculated engine load values from an engine control module (ECM), such as engine revolutions per minute (RPM) of an engine of the vehicle; fuel injector activation timing data of one or more cylinders and/or one or more injectors of the engine, ignition spark timing data of the one or more cylinders (e.g., an indication of spark events relative to crank angle of the one or more cylinders), transmission gear ratio data and/or transmission state data (which may be supplied to the ECM by a transmission control unit (TCU)); and/or the like.

In vehicular implementations, the actuators/DCUs 2974 may be provisioned with control system configurations (CSCs), which are collections of software modules, software components, logic blocks, parameters, calibrations, variants, and/or the like used to control and/or monitor various systems implemented by node 2950 (e.g., when node 2950 is a CA/AD vehicle 110). The CSCs define how the DCUs 2974 are to interpret sensor data of sensors 2972 and/or CSD of other DCUs 2974 using multidimensional performance maps or lookup tables, and define how actuators/components are to be adjust/modified based on the sensor data. The CSCs and/or the software components to be executed by individual DCUs 2974 may be developed using any suitable object-oriented programming language (e.g., C, C++, Java, and/or the like), schema language (e.g., XML schema, AUTomotive Open System Architecture (AUTOSAR) XML schema, and/or the like), scripting language (VBScript, JavaScript, and/or the like), or the like. the CSCs and software components may be defined using a hardware description language (HDL), such as register-transfer logic (RTL), very high speed integrated circuit (VHSIC) HDL (VHDL), Verilog, and/or the like for DCUs 2974 that are implemented as field-programmable devices (FPDs). The CSCs and software components may be generated using a modeling environment or model-based development tools, the CSCs may be generated or updated by one or more autonomous software agents and/or AI agents based on learnt experiences, ODDs, and/or other like parameters.

The IVS 101 and/or the DCUs 2974 is configurable or operable to operate one or more actuators based on one or more captured events (as indicated by sensor data captured by sensors 2972) and/or instructions or control signals received from user inputs, signals received over-the-air from a service provider, or the like. Additionally, one or more DCUs 2974 may be configurable or operable to operate one or more actuators by transmitting/sending instructions or control signals to the actuators based on detected events (as indicated by sensor data captured by sensors 2972). One or more DCUs 2974 may be capable of reading or otherwise obtaining sensor data from one or more sensors 2972, processing the sensor data to generate control system data (or CSCs), and providing the control system data to one or more actuators to control various systems of the vehicle 110. An embedded device/system acting as a central controller or hub may also access the control system data for processing using a suitable driver, API, ABI, library, middleware, firmware, and/or the like; and/or the DCUs 2974 may be configurable or operable to provide the control system data to a central hub and/or other devices/components on a periodic or aperiodic basis, and/or when triggered.

The various subsystems, including sensors 2972 and/or DCUs 2974, may be operated and/or controlled by one or more AI agents. The AI agents is/are autonomous entities configurable or operable to observe environmental conditions and determine actions to be taken in furtherance of a particular goal. The particular environmental conditions to be observed and the actions to take may be based on an operational design domain (ODD). An ODD includes the operating conditions under which a given AI agent or feature thereof is specifically designed to function. An ODD may include operational restrictions, such as environmental, geographical, and time-of-day restrictions, and/or the requisite presence or absence of certain traffic or roadway characteristics.

Individual AI agents are configurable or operable to control respective control systems of the host vehicle, some of which may involve the use of one or more DCUs 2974 and/or one or more sensors 2972. The actions to be taken and the particular goals to be achieved may be specific or individualized based on the control system itself. Additionally, some of the actions or goals may be dynamic driving tasks (DDT), object and event detection and response (OEDR) tasks, or other non-vehicle operation related tasks depending on the particular context in which an AI agent is implemented. DDTs include all real-time operational and tactical functions required to operate a vehicle 110 in on-road traffic, excluding the strategic functions (e.g., trip scheduling and selection of destinations and waypoints. DDTs include tactical and operational tasks such as lateral vehicle motion control via steering (operational); longitudinal vehicle motion control via acceleration and deceleration (operational); monitoring the driving environment via object and event detection, recognition, classification, and response preparation (operational and tactical); object and event response execution (operational and tactical); maneuver planning (tactical); and enhancing conspicuity via lighting, signaling and gesturing, and/or the like (tactical). OEDR tasks may be subtasks of DDTs that include monitoring the driving environment (e.g., detecting, recognizing, and classifying objects and events and preparing to respond as needed) and executing an appropriate response to such objects and events, for example, as needed to complete the DDT or fallback task.

To observe environmental conditions, the AI agents is/are configurable or operable to receive, or monitor for, sensor data from one or more sensors 2972 and receive control system data (CSD) from one or more DCUs 2974 of the host vehicle 110. The act of monitoring may include capturing CSD and/or sensor data from individual sensors 172 and DCUs 2974. Monitoring may include polling (e.g., periodic polling, sequential (roll call) polling, and/or the like) one or more sensors 2972 for sensor data and/or one or more DCUs 2974 for CSD for a specified/selected period of time. Additionally or alternatively, monitoring may include sending a request or command for sensor data/CSD in response to an external request for sensor data/CSD. Additionally or alternatively, monitoring may include waiting for sensor data/CSD from various sensors/modules based on triggers or events, such as when the host vehicle reaches predetermined speeds and/or distances in a predetermined amount of time (with or without intermitted stops). The events/triggers may be AI agent specific, and may vary depending of a particular implementation. The monitoring may be triggered or activated by an application or subsystem of the IVS 101 or by a remote device, such as compute node 140 and/or server(s) 160.

Additionally or alternatively, one or more of the AI agents may be configurable or operable to process the sensor data and CSD to identify internal and/or external environmental conditions upon which to act. Examples of the sensor data may include, but are not limited to, image data from one or more cameras of the vehicle providing frontal, rearward, and/or side views looking out of the vehicle; sensor data from accelerometers, inertia measurement units (IMU), and/or gyroscopes of the vehicle providing speed, acceleration, and tilt data of the host vehicle; audio data provided by microphones; and control system sensor data provided by one or more control system sensors. In an example, one or more of the AI agents may be configurable or operable to process images captured by sensors 2972 (image capture devices) and/or assess conditions identified by some other subsystem (e.g., an EMA subsystem, CAS and/or CPS entities, and/or the like) to determine a state or condition of the surrounding area (e.g., existence of potholes, fallen trees/utility poles, damages to road side barriers, vehicle debris, and so forth). In another example, one or more of the AI agents may be configurable or operable to process CSD provided by one or more DCUs 2974 to determine a current amount of emissions or fuel economy of the host vehicle. The AI agents may also be configurable or operable to compare the sensor data and/or CSDs with training set data to determine or contribute to determining environmental conditions for controlling corresponding control systems of the vehicle.

To determine actions to be taken in furtherance of a particular goal, each of the A1 agents are configurable or operable to identify a current state of the IVS 101, the host vehicles 110, and/or the AI agent itself, identify or obtain one or more models (e.g., ML models), identify or obtain goal information, and predict a result of taking one or more actions based on the current state/context, the one or more models, and the goal information. The one or more models may be any algorithms or objects created after an AI agent is trained with one or more training datasets, and the one or more models may indicate the possible actions that may be taken based on the current state. The one or more models may be based on the ODD defined for a particular AI agent. The current state is a configuration or set of information in the IVS 101 and/or one or more other systems of the host vehicle 110, or a measure of various conditions in the IVS 101 and/or one or more other systems of the host vehicle 110. The current state is stored inside an AI agent and is maintained in a suitable data structure. The AI agents are configurable or operable to predict possible outcomes as a result of taking certain actions defined by the models. The goal information describes desired outcomes (or goal states) that are desirable given the current state. Each of the AI agents may select an outcome from among the predict possible outcomes that reaches a particular goal state, and provide signals or commands to various other subsystems of the vehicle 110 to perform one or more actions determined to lead to the selected outcome. The AI agents may also include a learning module configurable or operable to learn from an experience with respect to the selected outcome and some performance measure(s). The experience may include sensor data and/or new state data collected after performance of the one or more actions of the selected outcome. The learnt experience may be used to produce new or updated models for determining future actions to take.

The positioning circuitry 2945 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), and/or the like), or the like. The positioning circuitry 2945 comprises various hardware elements (e.g., including hardware devices such as switches, filters, amplifiers, antenna elements, and the like to facilitate OTA communications) to communicate with components of a positioning network, such as navigation satellite constellation nodes. The positioning circuitry 2945 may include a Micro-Technology for Positioning, Navigation, and Timing (Micro-PNT) IC that uses a master timing clock to perform position tracking/estimation without GNSS assistance. The positioning circuitry 2945 may also be part of, or interact with, the communication circuitry 2966 to communicate with the nodes and components of the positioning network. The positioning circuitry 2945 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 2945 is, or includes an INS, which is a system or device that uses sensor circuitry 2972 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the node 2950 without the need for external references.

In some optional examples, various input/output (I/O) devices may be present within or connected to, the edge computing node 2950, which are referred to as input circuitry 2986 and output circuitry 2984 in FIG. 29. The input circuitry 2986 and output circuitry 2984 include one or more user interfaces designed to enable user interaction with the node 2950 and/or peripheral component interfaces designed to enable peripheral component interaction with the node 2950. Input circuitry 2986 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 2984 may be included to show information or otherwise convey information, such as sensor readings, actuator position(s), or other like information. Data and/or graphics may be displayed on one or more user interface components of the output circuitry 2984. Output circuitry 2984 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, and/or the like), with the output of characters, graphics, multimedia objects, and the like being generated or produced from the operation of the node 2950. The output circuitry 2984 may also include speakers or other audio emitting devices, printer(s), and/or the like. The sensor circuitry 2972 may be used as the input circuitry 2984 (e.g., an image capture device, motion capture device, or the like) and one or more actuators 2974 may be used as the output device circuitry 2984 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, and/or the like. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 2976 may power the edge computing node 2950, although, in examples in which the edge computing node 2950 is mounted in a fixed location, it may have a power supply coupled to an electrical grid, or the battery may be used as a backup or for temporary capabilities. The battery 2976 may be a lithium ion battery, or a metal-air battery, such as a zinc-air battery, an aluminum-air battery, a lithium-air battery, and the like.

A battery monitor/charger 2978 may be included in the edge computing node 2950 to track the state of charge (SoCh) of the battery 2976, if included. The battery monitor/charger 2978 may be used to monitor other parameters of the battery 2976 to provide failure predictions, such as the state of health (SoH) and the state of function (SoF) of the battery 2976. The battery monitor/charger 2978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2978 may communicate the information on the battery 2976 to the processor 2952 over the IX 2956. The battery monitor/charger 2978 may also include an analog-to-digital (ADC) converter that enables the processor 2952 to directly monitor the voltage of the battery 2976 or the current flow from the battery 2976. The battery parameters may be used to determine actions that the edge computing node 2950 may perform, such as transmission frequency, mesh network operation, sensing frequency, and the like.

A power block 2980, or other power supply coupled to a grid, may be coupled with the battery monitor/charger 2978 to charge the battery 2976. In some examples, the power block 2980 may be replaced with a wireless power receiver to obtain the power wirelessly, for example, through a loop antenna in the edge computing node 2950. A wireless battery charging circuit, such as an LTC4020 chip from Linear Technologies of Milpitas, California, among others, may be included in the battery monitor/charger 2978. The specific charging circuits may be selected based on the size of the battery 2976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2958 may include instructions 2983 in the form of software, firmware, or hardware commands to implement the techniques described herein. Although such instructions 2983 are shown as code blocks included in the memory 2954 and the storage 2958, it may be understood that any of the code blocks may be replaced with hardwired circuits, for example, built into an application specific integrated circuit (ASIC).

In an example, the instructions 2981, 2982, 2983 provided via the memory 2954, the storage 2958, or the processor 2952 may be embodied as a non-transitory, machine-readable medium 2960 including code to direct the processor 2952 to perform electronic operations in the edge computing node 2950. The processor 2952 may access the non-transitory, machine-readable medium 2960 over the IX 2956. For instance, the non-transitory, machine-readable medium 2960 may be embodied by devices described for the storage 2958 or may include specific storage units such as optical disks, flash drives, or any number of other hardware devices. The non-transitory, machine-readable medium 2960 may include instructions to direct the processor 2952 to perform a specific sequence or flow of actions, for example, as described with respect to the flowchart(s) and block diagram (s) of operations and functionality depicted above. As used herein, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, and/or the like), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, and/or the like) on one or several remote servers. The source code packages may be encrypted when in transit over a network and decrypted, uncompressed, assembled (e.g., linked) if necessary, and compiled or interpreted (e.g., into a library, stand-alone executable, and/or the like) at a local machine, and executed by the local machine.

The illustrations of FIGS. 26-29 is intended to depict a high-level view of components of a varying device, subsystem, or arrangement of an edge computing node. However, some of the components shown may be omitted, additional components may be present, and a different arrangement of the components may occur in other implementations. Further, these arrangements are usable in a variety of use cases and environments, including those discussed herein (e.g., a mobile UE in industrial compute for smart city or smart factory, among many other examples). The compute platform of FIG. 29 may support multiple edge instances (e.g., edge clusters) by use of tenant containers running on a single compute platform. Likewise, multiple edge nodes may exist as subnodes running on tenants within the same compute platform. Accordingly, based on available resource partitioning, a single system or compute platform may be partitioned or divided into supporting multiple tenants and edge node instances, each of which may support multiple services and functions—even while being potentially operated or controlled in multiple compute platform instances by multiple owners. These various types of partitions may support complex multi-tenancy and many combinations of multi-stakeholders through the use of an LSM or other implementation of an isolation/security policy. References to the use of an LSM and security features which enhance or implement such security features are thus noted in the following sections. Likewise, services and functions operating on these various types of multi-entity partitions may be load-balanced, migrated, and orchestrated to accomplish necessary service objectives and operations.

At least one of the systems or components set forth in one or more of the preceding figures may be configurable or operable to perform one or more operations, techniques, processes, and/or methods as set forth in the implementation examples section below.

8. Implementation Examples

Example A01 includes a method, comprising: generating or causing to generate a VRU Awareness Message (VAM); and transmitting or causing to transmit the VAM.

Example B01 includes a method, comprising: generating or causing to generate a message comprising a Cooperative Awareness Message (CAM) and/or a Vulnerable Road User (VRU) Awareness Message (VAM); and transmitting or causing to transmit the message.

Example B02 includes the method of example B01 and/or some other example(s) herein, wherein the CAM or the VAM includes a Special Vehicle Container.

Example B03 includes the method of example B02 and/or some other example(s) herein, wherein the Special Vehicle Container includes a VRU Profile 3 Container.

Example B04 includes the method of example B03 and/or some other example(s) herein, wherein the VRU Profile 3 in the CAM is represented as {CAM.cam.specialVehicleContainer.vruProfile3Container} or {CAM.cam.specialVehicleContainer.vruMotorcyclistContainer}.

Example B05 includes the method of examples B03-AD0503-04 and/or some other example(s) herein, wherein the VRU Profile 3 in the VAM indicates a rider status.

Example C01 includes a method, comprising: generating a Vulnerable Road User (VRU) Awareness Message (VAM); and transmitting or broadcasting the VAM.

Example C02 includes the method of example C01 and/or some other example(s) herein, further comprising: generating the VAM include to include a Motion Prediction Container.

Example C03 includes the method of example C02 and/or some other example(s) herein, further comprising: triggering enablement of the Motion Prediction Container.

Example C04 includes the method of example C04 and/or some other example(s) herein, further comprising: determining how frequent to enable the Motion Prediction container based on a timer condition including: $T\_Now - T\_LastMotionPredictionContainer \geq T\_Gen\_MotionPredictionContainer$, wherein $T\_Now$ is a current timestamp corresponding to a generation event, $T\_LastMotionPredictionContainer$ is a time elapsed since a last generation of the motion prediction container for motion generation container periodicity: $T\_GenMotionPredictionContainer$ where $(T\_GenVamMin < T\_Gen\_MotionPredictionContainer < T\_GenVamMax)$.

Example C05 includes the method of examples C02-C04 and/or some other example(s) herein, further comprising: generating and encoding a Path History DF of the Motion Prediction Container.

Example C06 includes the method of example C05 and/or some other example(s) herein, wherein generating and encoding the Path Prediction DF of the Motion Prediction Container after the Path Prediction DF of type pathHistory is generated and encoded.

Example C07 includes the method of examples C02-C06 and/or some other example(s) herein, further comprising: generating and encoding a Safe Distance DF in the Motion Prediction Container when a lateral distance (LaD)<minimum safe lateral distance (MSLaD), a longitudinal distance (LoD)<minimum safe longitudinal distance (MSLoD), and vertical distance (VD)<minimum safe vertical distance (MSVD).

Example C08 includes the method of examples C02-C07 and/or some other example(s) herein, further comprising: generating and encoding a Trajectory Interception Indication (TII) DF of type trajectoryInterceptionIndication in the Motion Prediction Container when a Trajectory Interception Probability is above a TIP_Threshold.

Example C09 includes the method of example C08 and/or some other example(s) herein, further comprising: generating and encoding an Acceleration Change Indication DF of type accelerationChangeIndication in the Motion Prediction Container when a change in VRU speed (e.g., acceleration or deceleration) is detected during a speed sensor observation period, T_SpeedChangeDuration, such that $0 < T\_SpeedChangeDuration \leq ActionDeltaTime$.

Example C10 includes the method of examples C02-C09 and/or some other example(s) herein, further comprising: generating and encoding a Heading Change Indication DF when a change in VRU heading (e.g., left or right) DE of type headingChangeIndication is detected during a heading sensor observation period, T_VruHeadingChangeDuration, such that $0 < T\_VruHeadingChangeDuration <= ActionDeltaTime$.

Example C11 includes the method of examples C02-C10 and/or some other example(s) herein, further comprising: generating and encoding a Stability Change Indication DF when a change in VRU stability in terms of stability loss probability DE of type VRUStabilityLossProbability exceeds an SLP_Threshold, wherein $VruStabilityLossProbability \geq SLP\_Threshold$ (e.g., 0.6) observed within a time window T_VruStabilityChangeDuration such that 0<T_VruStabilityChangeDuration<=ActionDeltaTime.

Example C12 includes the method of examples C02-C1 1 and/or some other example(s) herein, further comprising: generating and encoding the Motion Prediction Container when all of the DFs of examples C04-C11 are completed in sequence, wherein generating and encoding the Motion Prediction Container comprises: assembling all of the generated and encoded DFs into the motion prediction container; and updating a timestamp corresponding to generation of the Motion Prediction Container.

Example C13 includes the method of example C12 and/or some other example(s) herein, further comprising: passing process control out of the motion prediction container generation process after the timestamp is updated.

Example C14 includes the method of examples C01-C13 and/or some other example(s) herein, further comprising: performing state transitions according to the state machines shown and described herein, including the state transitions shown and described with respect to FIGS. 19A, 19B, 19C, and 19D.

Example C15 includes the method of examples C01-C14 and/or some other example(s) herein, wherein the method is performed by a VRU ITS station.

Example C16 includes the method of example C15 and/or some other example(s) herein, wherein the VRU ITS station is included in, or implemented by a mobile device or user equipment.

Example Y01 includes an apparatus employed in a vehicle, the apparatus comprising: communication circuitry communicatively coupled with processor circuitry, the processor circuitry communicatively coupled with memory circuitry, the processor circuitry is configurable or operable to perform the method of any one of examples A01, B01-B05, C01-C16.

Example Y02 includes an apparatus employed in a roadside infrastructure, the apparatus comprising: communication circuitry communicatively coupled with processor circuitry, the processor circuitry communicatively coupled with memory circuitry, the processor circuitry is configurable or operable to perform the method of any one of examples A01, B01-B05, C01-C16.

Example Y03 includes an apparatus employed as a mobile device, the apparatus comprising: communication circuitry communicatively coupled with processor circuitry, the processor circuitry communicatively coupled with memory circuitry, the processor circuitry is configurable or operable to perform the method of any one of examples A01, B01-B05, C01-C16.

Example Z01 includes one or more computer readable media comprising instructions, wherein execution of the instructions by processor circuitry is to cause the processor circuitry to perform the method of any one of examples A01, B01-B05, C01-C16 and/or Y01-Y03. Example Z02 includes a computer program comprising the instructions of example Z01. Example Z03a includes an Application Programming Interface defining functions, methods, variables, data structures, and/or protocols for the computer program of example Z02.

Example Z03b includes an API or specification defining functions, methods, variables, data structures, protocols, and/or the like, defining or involving use of any of examples A01, B01-B05, C01-C16 and/or Y01-Y03 or portions thereof, or otherwise related to any of examples A01, B01-B05, C01-C16 and/or Y01-Y03 or portions thereof.

Example Z04 includes an apparatus comprising circuitry loaded with the instructions of example Z01. Example Z05 includes an apparatus comprising circuitry operable to run the instructions of example Z01. Example Z06 includes an integrated circuit comprising one or more of the processor circuitry of example Z01 and the one or more computer readable media of example Z01. Example Z07 includes a computing system comprising the one or more computer readable media and the processor circuitry of example Z01. Example Z08 includes an apparatus comprising means for executing the instructions of example Z01. Example Z09 includes a signal generated as a result of executing the instructions of example Z01. Example Z10 includes a data unit generated as a result of executing the instructions of example Z01.

Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object. Example Z12 includes a signal encoded with the data unit of examples Z10 and/or Z11. Example Z13 includes an electromagnetic signal carrying the instructions of example Z01. Example Z14 includes an apparatus comprising means for performing the method of any one of examples A01, B01-B05, C01-C16 and/or Y01-Y03 and/or some other example(s) herein. Example Z15 includes a Multi-access Edge Computing (MEC) host executing a service as part of one or more MEC applications instantiated on a virtualization infrastructure, the service being related to any of examples A01, B01-B05, C01-C16 and/or Y01-Y03 or portions thereof and/or some other example(s) herein, and wherein the MEC host is configurable or operable to operate according to a standard from one or more ETSI MEC standards families.

An example implementation is an edge computing system, including respective edge processing devices and nodes to invoke or perform the operations of examples A01, B01-B05, C01-C16, or other subject matter described herein. Another example implementation is a client endpoint node, operable to invoke or perform the operations of examples A01, B01-B05, C01-C16, or other subject matter described herein. Another example implementation is an aggregation node, network hub node, gateway node, or core data processing node, within or coupled to an edge computing system, operable to invoke or perform the operations of examples A01, B01-B05, C01-C16 and/or Y01-Y03, or other subject matter described herein. Another example implementation is an access point, base station, road-side unit, street-side unit, or on-premise unit, within or coupled to an edge computing system, operable to invoke or perform the operations of examples A01, B01-B05, C01-C16 and/or Y01-Y03, or other subject matter described herein. Another example implementation is an edge provisioning node, service orchestration node, application orchestration node, or multi-tenant management node, within or coupled to an edge computing system, operable to invoke or perform the operations of examples A01, B01-B05, C01-C16 and/or Y01-Y03, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of examples A01, B01-B05, C01-C16 and/or Y01-Y03, or other subject matter described herein. Another example implementation is an edge computing system operable as an edge mesh, as an edge mesh with side car loading, or with mesh-to-mesh communications, operable to invoke or perform the operations of examples A01, B01-B05, C01-C16 and/or Y01-Y03, or other subject matter described herein. Another example implementation is an edge computing system including network functions, acceleration functions, acceleration hardware, storage hardware, or computation hardware resources, operable to invoke or perform the use cases discussed herein, with use of examples A01, B01-B05, C01-C16 and/or Y01-Y03, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of examples A01, B01-B05, C01-C16 and/or Y01-Y03, or other subject matter described herein. Another example implementation is an edge computing system adapted for mobile wireless communications, including configurations according to an 3GPP 4G/LTE or 5G network capabilities, operable to invoke or perform the use cases discussed herein, with use of examples A01, B01-B05, C01-C16, and/or other subject matter described herein. Another example implementation is an edge computing system adapted for supporting xApps and operating according to O-RAN specifications, operable to invoke or perform the use cases discussed herein, with use of examples A01, B01-B05, C01-C16 and/or Y01-Y03, or other subject matter described herein. Another example implementation is an edge computing system adapted for operating according to Open Visual Inference and Neural network Optimization (OpenVINO) specifications, operable to invoke or perform the use cases discussed herein, with use of examples A01, B01-B05, C01-C16 and/or Y01-Y03, or other subject matter described herein. Another example implementation is an edge computing system adapted for operating according to OpenNESS specifications, operable to invoke or perform the use cases discussed herein, with use of examples A01, B01-B05, C01-C16 and/or Y01-Y03, or other subject matter described herein. Another example implementation is an edge computing system adapted for operating according to Intel® Smart Edge computing frameworks, operable to invoke or perform the use cases discussed herein, with use of examples A01, B01-B05, C01-C16 and/or Y01-Y03, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of the present disclosure to the precise form disclosed. Modifications and variations are possible in light of the above teachings or may be acquired from practice of the discussion herein.

9. Terminology

The terminology used herein is for the purpose of describing particular implementations only and is not intended to be limiting of the disclosure. The present disclosure has been described with reference to flowchart illustrations and/or block diagrams of methods, apparatus (systems), and/or computer program products of the present disclosure. In the drawings, some structural or method features may be shown in specific arrangements and/or orderings. However, it should be appreciated that such specific arrangements and/or orderings may not be required. Rather, such features may be arranged in a different manner and/or order than shown in the illustrative figures. Additionally, the inclusion of a structural or method feature in a particular figure is not meant to imply that such feature is required in all implementations and, in some cases, may not be included or may be combined with other features.

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). Furthermore, the terms "comprising," "including," "having," and the like, as used herein, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an ASIC, a FPGA, programmable logic controller (PLC), SoC, SiP, multi-chip package (MCP), DSP, and/or the like, that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "element" refers to a unit that is indivisible at a given level of abstraction and has a clearly defined boundary, wherein an element may be any type of entity including, for example, one or more devices, systems, controllers, network elements, modules, and/or the like, or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

As used herein, the term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, and/or the like). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory. Specific arrangements of edge computing applications and services accessible via mobile wireless networks (e.g., cellular and WiFi data networks) may be referred to as "mobile edge computing" or "multi-access edge computing", which may be referenced by the acronym "MEC". The usage of "MEC" herein may also refer to a standardized implementation promulgated by the European Telecommunications Standards Institute (ETSI), referred to as "ETSI MEC". Terminology that is used by the ETSI MEC specification is generally incorporated herein by reference, unless a conflicting definition or usage is provided herein.

As used herein, the term "compute node" or "compute device" refers to an identifiable entity implementing edge computing operations, whether part of a larger system, distributed collection of systems, or a standalone apparatus. In some examples, a compute node may be referred to as a "edge node", "edge device", "edge system", whether in operation as a client, server, or intermediate entity. Specific implementations of a compute node may be incorporated into a server, base station, gateway, road side unit, on premise unit, UE or end consuming device, or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, and/or the like. Furthermore, the term "user equipment" or "UE" may include any type of wireless/wired device or any computing device including a wireless communications interface. The term "station" or "STA" refers to a logical entity that is a singly addressable instance of a medium access control (MAC) and physical layer (PHY) interface to the wireless medium (WM). The term "wireless medium" or WM" refers to the medium used to implement the transfer of protocol data units (PDUs) between peer physical layer (PHY) entities of a wireless local area network (LAN).

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

As used herein, the term "access point" or "AP" refers to an entity that contains one station (STA) and provides access to the distribution services, via the wireless medium (WM) for associated STAs. An AP comprises a STA and a distribution system access function (DSAF). As used herein, the term "base station" refers to a network element in a radio access network (RAN), such as a fourth-generation (4G) or fifth-generation (5G) mobile communications network which is responsible for the transmission and reception of radio signals in one or more cells to or from a user equipment (UE). A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved node-B (eNB) or a next generation node-B (gNB). In some examples, the base station may operate or include compute hardware to operate as a compute node. However, in many of the scenarios discussed herein, a RAN base station may be substituted with an access point (e.g., wireless network access point) or other network access hardware.

As used herein, the term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for edge applications and services, or even local implementations of cloud-like services.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, and/or the like), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, and/or the like. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" refers to an amount of work performed by a computing system, device, entity, and/or the like, during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, and/or the like), and/or the like. Various algorithms may be used to determine a workload and/or workload characteristics, which may be based on any of the aforementioned workload types.

As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "access edge layer" indicates the sub-layer of infrastructure edge closest to the end user or device. For example, such layer may be fulfilled by an edge data center deployed at a cellular network site. The access edge layer functions as the front line of the infrastructure edge and may connect to an aggregation edge layer higher in the hierarchy.

As used herein, the term "aggregation edge layer" indicates the layer of infrastructure edge one hop away from the access edge layer. This layer can exist as either a medium-scale data center in a single location or may be formed from multiple interconnected micro data centers to form a hierarchical topology with the access edge to allow for greater collaboration, workload failover, and scalability than access edge alone.

As used herein, the term "network function virtualization" or "NFV" indicates the migration of NFs from embedded services inside proprietary hardware appliances to software-based virtualized NFs (VNFs) running on standardized CPUs using industry standard virtualization and cloud computing technologies. NFV processing and data storage may occur at the edge data centers that are connected directly to the local cellular site, within the infrastructure edge. As used herein, the term "virtualized NF" or "VNF" indicates a software-based NF operating on multi-function, multi-purpose compute resources (e.g., x86, ARM processing architecture) which are used by NFV in place of dedicated physical equipment. Several VNFs may operate on an edge data center at the infrastructure edge.

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of a network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some services or resources in an edge computing setting.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

As used herein, the term "radio technology" refers to technology for wireless transmission and/or reception of electromagnetic radiation for information transfer. The term "radio access technology" or "RAT" refers to the technology used for the underlying physical connection to a radio based communication network. The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols that may be used include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, and/or the like) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, and/or the like), V2X communication technologies (including C-V2X), Dedicated Short Range Communications (DSRC) communication systems such as Intelligent-Transport-Systems (ITS) including the European ITS-G5, ITS-G5B, ITS-G5C, and/or the like. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "Interoperability" refers to the ability of UEs and/or stations, such as ITS-Ss including vehicle ITS-Ss (V-ITS-Ss), roadside ITS-Ss (R-ITS-Ss), and VRU ITS-Ss utilizing one RAT to communicate with other stations utilizing another RAT. The term "Coexistence" refers to sharing or allocating radiofrequency resources among stations/UEs using either vehicular communication system.

The term "V2X" refers to vehicle to vehicle (V2V), vehicle to infrastructure (V2I), infrastructure to vehicle (I2V), vehicle to network (V2N), and/or network to vehicle (N2V) communications and associated radio access technologies.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element (s) that integrate local data by utilizing a combination of localized network(s) and distributed computation.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. The term "database object", "data structure", or the like may refer to any representation of information that is in the form of an object, attribute-value pair (AVP), key-value pair (KVP), tuple, and/or the like, and may include variables, data structures, functions, methods, classes, database records, database fields, database entities, associations between data and/or database entities (also referred to as a "relation"), blocks and links between blocks in block chain implementations, and/or the like. The term "data element" or "DE" refers to a data type that contains one single data. The term "data frame" or "DF" refers to a data type that contains more than one data element in a predefined order.

As used herein, the term "reliability" refers to the ability of a computer-related component (e.g., software, hardware, or network element/entity) to consistently perform a desired function and/or operate according to a specification. Reliability in the context of network communications (e.g., "network reliability") may refer to the ability of a network to carry out communication. Network reliability may also be (or be a measure of) the probability of delivering a specified amount of data from a source to a destination (or sink).

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. The term "session" refers to a temporary and interactive information interchange between two or more communicating devices, two or more application instances, between a computer and user, or between any two or more entities or elements.

The term "ego" used with respect to an element or entity, such as "ego ITS-S" or the like, refers to an ITS-S that is under consideration, the term "ego vehicle" refers to a vehicle embedding an ITS-S being considered, and the term "neighbors" or "proximity" used to describe elements or entities refers to other ITS-Ss different than the ego ITS-S and/or ego vehicle.

The term "Geo-Area" refers to one or more geometric shapes such as circular areas, rectangular areas, and elliptical areas. A circular Geo-Area is described by a circular shape with a single point A that represents the center of the circle and a radius r. The rectangular Geo-Area is defined by a rectangular shape with a point A that represents the center of the rectangle and a parameter a which is the distance between the center point and the short side of the rectangle (perpendicular bisector of the short side, a parameter b which is the distance between the center point and the long side of the rectangle (perpendicular bisector of the long side, and a parameter θ which is the azimuth angle of the long side of the rectangle. The elliptical Geo-Area is defined by an elliptical shape with a point A that represents the center of the rectangle and a parameter a which is the length of the long semi-axis, a parameter b which is the length of the short semi-axis, and a parameter θ which is the azimuth angle of the long semi-axis. An ITS-S can use a function F to determine whether a point P(x,y) is located inside, outside, at the center, or at the border of a geographical area. The function F(x,y) assumes the canonical form of the geometric shapes: The Cartesian coordinate system has its origin in the center of the shape. Its abscissa is parallel to the long side of the shapes. Point P is defined relative to this coordinate system. The various properties and other details of function F(x,y) are discussed in ETSI EN 302 931 v1.1.1 (2011 July).

The term "Interoperability" refers to the ability of ITS-Ss utilizing one communication system or RAT to communicate with other ITS-Ss utilizing another communication system or RAT. The term "Coexistence" refers to sharing or allocating radiofrequency resources among ITS-Ss using either communication system or RAT.

The term "ITS data dictionary" refers to a repository of DEs and DFs used in the ITS applications and ITS facilities layer. The term "ITS message" refers to messages exchanged at ITS facilities layer among ITS stations or messages exchanged at ITS applications layer among ITS stations.

The term "Collective Perception" or "CP" refers to the concept of sharing the perceived environment of an ITS-S based on perception sensors, wherein an ITS-S broadcasts information about its current (driving) environment. CP is the concept of actively exchanging locally perceived objects between different ITS-Ss by means of a V2X RAT. CP decreases the ambient uncertainty of ITS-Ss by contributing information to their mutual FoVs. The term "Collective Perception basic service" (also referred to as CP service (CPS)) refers to a facility at the ITS-S facilities layer to receive and process CPMs, and generate and transmit CPMs. The term "Collective Perception Message" or "CPM" refers to a CP basic service PDU. The term "Collective Perception data" or "CPM data" refers to a partial or complete CPM payload. The term "Collective Perception protocol" or "CPM protocol" refers to an ITS facilities layer protocol for the operation of the CPM generation, transmission, and reception. The term "CP object" or "CPM object" refers to aggregated and interpreted abstract information gathered by perception sensors about other traffic participants and obstacles. CP/CPM Objects can be represented mathematically by a set of variables describing, amongst other, their dynamic state and geometric dimension. The state variables associated to an object are interpreted as an observation for a certain point in time and are therefore always accompanied by a time reference. The term "Environment Model" refers to a current representation of the immediate environment of an ITS-S, including all perceived objects perceived by either local perception sensors or received by V2X. The term "object", in the context of the CP Basic Service, refers to the state space representation of a physically detected object within a sensor's perception range. The term "object list" refers to a collection of objects temporally aligned to the same timestamp.

The term "ITS Central System" refers to an ITS system in the backend, for example, traffic control center, traffic management center, or cloud system from road authorities, ITS application suppliers or automotive OEMs (see e.g., clause 4.5.1.1 of [EN302665]).

The term "personal ITS-S" refers to an ITS-S in a nomadic ITS sub-system in the context of a portable device (e.g., a mobile device of a pedestrian).

The term "vehicle" may refer to road vehicle designed to carry people or cargo on public roads and highways such as AVs, busses, cars, trucks, vans, motor homes, and motorcycles; by water such as boats, ships, and/or the like; or in the air such as airplanes, helicopters, UAVs, satellites, and/or the like.

The term "sensor measurement" refers to abstract object descriptions generated or provided by feature extraction algorithm(s), which may be based on the measurement principle of a local perception sensor mounted to an ITS-S. The feature extraction algorithm processes a sensor's raw data (e.g., reflection images, camera images, and/or the like) to generate an object description. The term "State Space Representation" is a mathematical description of a detected object, which includes state variables such as distance, speed, object dimensions, and the like. The state variables associated with/to an object are interpreted as an observation for a certain point in time, and therefore, are accompanied by a time reference.

The term "maneuvers" or "manoeuvres" refer to specific and recognized movements bringing an actor, e.g., pedestrian, vehicle or any other form of transport, from one position to another within some momentum (velocity, velocity variations and vehicle mass). The term "Maneuver Coordination" or "MC" refers to the concept of sharing, by means of a V2X RAT, an intended movement or series of intended movements of an ITS-S based on perception sensors, planned trajectories, and the like, wherein an ITS-S broadcasts information about its current intended maneuvers. The term "Maneuver Coordination basic service" (also referred to as Maneuver Coordination Service (MCS)) refers to a facility at the ITS-S facilities layer to receive and process MCMs, and generate and transmit MCMs. The term "Maneuver Coordination Message" or "MCM" refers to an MC basic service PDU. The term "Maneuver Coordination data" or "MCM data" refers to a partial or complete MCM payload. The term "Maneuver Coordination protocol" or "MCM protocol" refers to an ITS facilities layer protocol for the operation of the MCM generation, transmission, and reception. The term "MC object" or "MCM object" refers to aggregated and interpreted abstract information gathered by perception sensors about other traffic participants and obstacles, as well as information from applications and/or services operated or consumed by an ITS-S.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, and/or the like). Furthermore, various standards (e.g., 3GPP, ETSI, and/or the like) may define various message formats, PDUs, containers, frames, and/or the like, as comprising a sequence of optional or mandatory data elements (DEs), data frames (DFs), information elements (IEs), and/or the like. However, it should be understood that the requirements of any particular standard should not limit the scope of the present disclosure, and as such, any combination of containers, frames, DFs, DEs, IEs, values, actions, and/or features are possible, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements The configurations, arrangements, implementations, and processes described herein can be used in various combinations and/or in parallel. The accompanying drawings that form a part hereof show, by way of illustration, and not of limitation, specific implementations in which the subject matter may be practiced. The illustrated implementations are described in sufficient detail to enable those skilled in the art to practice the teachings disclosed herein. Other implementations and arrangements may be utilized and derived therefrom, such that structural and logical substitutions and changes may be made without departing from the scope of this disclosure. The scope of the invention is set out in the appended set of claims, along with the full range of equivalents to which such claims are entitled.

The invention claimed is:

1. An apparatus in an originating Intelligent Transportation System Station (ITS-S), the apparatus comprising:
   memory circuitry to store instructions of a Vulnerable Road User (VRU) Basic Service (VBS) facility; and
   processor circuitry connected to the memory circuitry, wherein the processor circuitry is to operate the VBS to:
      generate a VRU Awareness Message (VAM) to include a motion prediction container, the motion prediction container to include one or more of a safe distance data field (DF), trajectory change indication DF, acceleration change indication DF, and heading change indication DF; and
      cause transmission of the VAM to one or more VRU ITS-Ss.

2. The apparatus of claim 1, wherein the motion prediction container is to carry motion state information of the originating ITS-S.

3. The apparatus of claim 1, wherein the motion prediction container includes the safe distance DF, and the processor circuitry is to operate the VBS to:
   determine a recommended safe distance laterally, longitudinally, and vertically from at least one VRU ITS-S based on:
      a comparison of a Lateral Distance (LaD) between the originating ITS-S and the at least one VRU ITS-S with a Minimum Safe Lateral Distance (MSLaD),
      a comparison of a Longitudinal Distance (LoD) between the originating ITS-S and the at least one VRU ITS-S with a Minimum Safe Longitudinal Distance (MSLoD), and
      a comparison of a Vertical Distance (VD) with a Minimum Safe Vertical Distance (MSVD);
   generate a safe distance indication (SDI) based on the comparisons; and
   generate the safe distance container to include a VruSafeDistanceIndication DF, and the VruSafeDistanceIndication DF to include the SDI.

4. The apparatus of claim 1, wherein the motion prediction container includes the trajectory change indication DF, and the processor circuitry is to operate the VBS to:
   determine a trajectory interception probability (TIP) of the originating ITS-S with respect to at least one VRU ITS-S in a path of potential trajectory interception;
   determine a confidence value for the TIP; and
   change indication DF to include a generate the trajectory TrajectoryInterceptionProbability data element (DE) and a TrajectoryInterceptionConfidence DE, the TrajectoryInterceptionProbability DE to include the TIP and the TrajectoryInterceptionProbability DE to include the confidence value.

5. The apparatus of claim 1, wherein the motion prediction container includes the acceleration change indication DF, and the processor circuitry is to operate the VBS to:
   predict a change in acceleration of the originating ITS-S for a period of time; and
   generate the acceleration change indication DF to include the predicted change in acceleration and the time period.

6. The apparatus of claim 1, wherein the motion prediction container includes the heading change indication DF, and the processor circuitry is to operate the VBS to:
   determine a future change of heading in a leftward or rightward direction for a time period; and
   generate the heading change indication DF to include the determined future change of heading.

7. The apparatus of claim 1, wherein the processor circuitry is to operate the VBS to:
   collect and process sensor data;
   generate a Dynamic Contextual Road Occupancy Map (DCROM) based on the collected and processed sensor data; and
   generate the VAM to include one or more DCROM DFs for sharing DCROM information.

8. The apparatus of claim 7, wherein the collected sensor data includes sensor data collected from sensors of the originating ITS-S.

9. The apparatus of claim 1, wherein the originating ITS-S is one of a Vehicle ITS-S (V-ITS-S), a Roadside ITS-S(R-ITS-S), or a VRU ITS-S.

10. A method of operating a Vulnerable Road User (VRU) Basic Service (VBS) facility of an ego-VRU Intelligent Transportation System Station (ITS-S), the method comprising:
   generating a VRU Awareness Message (VAM) to include a motion prediction container, wherein the motion prediction container is to include a stability change indication data field (DF), and the stability change indication DF is to include stability information of the ego-VRU ITS-S; and
   sending the VAM to one or more VRU ITS-Ss.

11. The method of claim 10, wherein the change in stability is expressed as a probability, and the generating the VAM comprises:

determining the stability information based on a change in stability of an originating ITS-S for a time period.

12. The method of claim 11, wherein the change in stability is expressed as a probability, and the generating the VAM comprises:
generating the stability change indication DF to include a StabilityLossProbability data element (DE) and an ActionDeltaTime DE, wherein the StabilityLossProbability DE is to indicate the probability of the change in stability and the ActionDeltaTime DE is to indicate a duration of the time period.

13. The method of claim 10, wherein the VAM is a VRU special container to be included in a Cooperative Awareness Message (CAM) when the ego-ITS-S is a VRU with a VRU Profile 3.

14. The method of claim 13, wherein the causing transmission comprises:
triggering a Cooperative Awareness basic service (CBS) facility of an originating ITS-S to include the VRU special container when transmitting one or more CAMs; and
providing one or more DEs to be included in the VRU special container based on the triggering.

15. The method of claim 14, wherein the one or more DEs to be included in the VRU special container include one or more of:
the stability change indication DF;
a VRU profile DE to indicate that the originating ITS-S is a VRU Profile 3 VRU;
a VRU size class DE to indicate that the originating ITS-S is one of a low, medium, or high size class;
a VRU orientation DE to indicate an orientation of the originating ITS-S;
a safe distance DF to indicate a recommended safe distance laterally, longitudinally, and vertically from at least one VRU ITS-S; and
a path prediction DF to indicate one or more future path points of the originating ITS-S, corresponding confidence values for each future path point of the one or more future path points and corresponding time instances for each future path point.

16. One or more non-transitory computer readable media (NTCRM) comprising instructions of a Vulnerable Road User (VRU) Basic Service (VBS) facility, wherein execution of the instructions by one or more processors of an VRU Intelligent Transportation System Station (ITS-S) is to cause the ego-VRU ITS-S to:
detect a VRU trigger event while the VBS is in a first VBS cluster state;
transition the VBS to a second VBS cluster state in response to the detection of the trigger event; and
perform a VRU clustering operation based on the second VBS cluster state.

17. The one or more NTCRM of claim 16, wherein the first VBS cluster state is a VRU-IDLE state, the trigger event includes changing a VRU role to VRU_ROLE_ON, the second VBS cluster state is a VRU-ACTIVE-STANDALONE state, and to perform the VRU clustering operation, execution of the instructions is to cause the ego-VRU ITS-S to:
cause transmission of one or more VRU Awareness Messages (VAMs).

18. The one or more NTCRM of claim 17, wherein the first VBS cluster state is the VRU-ACTIVE-STANDALONE state, the trigger event includes changing the VRU role to VRU_ROLE_OFF, the second VBS cluster state is the VRU-IDLE state, and to perform the VRU clustering operation, execution of the instructions is to cause the ego-VRU ITS-S to:
stop transmission of the one or more VAMs.

19. The one or more NTCRM of claim 16, wherein the first VBS cluster state is a VRU-ACTIVE-STANDALONE state, the trigger event includes determining to form a VRU cluster based on one or more VRU Awareness Messages (VAMs) received from one or more other VRU ITS-Ss, the second VBS cluster state is a VRU-ACTIVE-CLUSTER-LEADER state, and to perform the VRU clustering operation, execution of the instructions is to cause the ego-VRU ITS-S to:
create the VRU cluster including an originating ITS-S and at least one other VRU ITS-S of the one or more other VRU ITS-Ss when at least one cluster creation condition is met.

20. The one or more NTCRM of claim 19, wherein the at least one cluster creation condition is among a plurality of cluster creation conditions, and the plurality of cluster creation conditions comprises:
a processing power of the originating ITS-S being at or higher than a threshold amount of processing power,
the originating ITS-S being a VRU equipment type having both VAM reception and transmission capabilities,
receiving VAMs from a predetermined number of VRUs not further away than a predetermined distance from the originating ITS-S, and
failing to identify a VRU cluster with which the originating ITS-S could join.

21. The one or more NTCRM of claim 19, wherein the first VBS cluster state is the VRU-ACTIVE-CLUSTER-LEADER state, the trigger event includes determining to break up the VRU cluster, the second VBS cluster state is the VRU-ACTIVE-STANDALONE state, and to perform the VRU clustering operation, execution of the instructions is to cause the ego-VRU ITS-S to:
cause transmission, to the at least one VRU ITS-S, of a VAM to indicate to break up the VRU cluster.

22. The one or more NTCRM of claim 16, wherein the first VBS cluster state is a VRU-ACTIVE-STANDALONE state, the trigger event includes determining whether to join an existing VRU cluster, the second VBS cluster state is a VRU-PASSIVE state, and to perform the VRU clustering operation, execution of the instructions is to cause the ego-VRU ITS-S to:
receive a cluster VRU Awareness Messages (VAM) from a VRU ITS-S acting as a cluster leader of the existing VRU cluster; and
determine whether to join the existing VRU cluster based on contents of the cluster VAM and when at least one cluster joining condition has been met.

23. The one or more NTCRM of claim 22, wherein the first VBS cluster state is the VRU-PASSIVE state, the trigger event includes determining whether to leave the existing VRU cluster, the second VBS cluster state is the VRU-ACTIVE-STANDALONE state, and to perform the VRU clustering operation, execution of the instructions is to cause the ego-VRU ITS-S to:
receive another cluster VAM from the VRU ITS-S acting as the cluster leader of the existing VRU cluster; and
determine whether to leave the existing VRU cluster based on contents of the other cluster VAM and when at least one cluster exit condition has been met.

24. The one or more NTCRM of claim 22, wherein the first VBS cluster state is the VRU-PASSIVE state, the trigger event includes determining whether to leave the existing VRU cluster, the second VBS cluster state is the VRU-ACTIVE-STANDALONE state, and to perform the VRU clustering operation, execution of the instructions is to cause the ego-VRU ITS-S is to:

declare the VRU ITS-S acting as a cluster leader is lost when no cluster VAMs are received from the cluster lead after time period.

25. The one or more NTCRM of claim 16, wherein the ego-VRU ITS-S is a low complexity (LC) VRU ITS-S or a high complexity (HC) VRU ITS-S.

* * * * *